US012416881B2

(12) United States Patent
Tetsuno et al.

(10) Patent No.: US 12,416,881 B2
(45) **Date of Patent: *Sep. 16, 2025**

(54) IMAGE FORMING APPARATUS

(71) Applicant: CANON KABUSHIKI KAISHA, Tokyo (JP)

(72) Inventors: Shuichi Tetsuno, Kanagawa (JP); Shinji Katagiri, Kanagawa (JP); Koji An, Saitama (JP); Hiroko Yokoyama, Tokyo (JP); Wataru Takahashi, Tokyo (JP); Shohei Ishio, Tokyo (JP); Takayuki Tanaka, Tokyo (JP); Tomonori Matsunaga, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,049

(22) Filed: Nov. 9, 2023

(65) Prior Publication Data

US 2024/0094661 A1 Mar. 21, 2024

Related U.S. Application Data

(63) Continuation of application No. 17/386,368, filed on Jul. 27, 2021, now Pat. No. 11,846,899.

(30) Foreign Application Priority Data

Jul. 28, 2020 (JP) ................................ 2020-127697
Jul. 28, 2020 (JP) ................................ 2020-127698
(Continued)

(51) Int. Cl.
*G03G 15/16* (2006.01)
*G03G 21/00* (2006.01)

(52) U.S. Cl.
CPC ....... *G03G 15/161* (2013.01); *G03G 21/0005* (2013.01)

(58) Field of Classification Search
CPC ......................... G03G 15/161; G03G 21/0005
See application file for complete search history.

(56) References Cited

U.S. PATENT DOCUMENTS 6,819,901 B1 * 11/2004 Yasutomi ........... G03G 15/0921 399/277
11,846,899 B2 * 12/2023 Tetsuno ............. G03G 15/0806
(Continued)

FOREIGN PATENT DOCUMENTS

EP 1347348 A1 9/2003
JP H1152610 A 2/1999
(Continued)

*Primary Examiner* — Stephanie E Bloss
*Assistant Examiner* — Michael A Harrison
(74) *Attorney, Agent, or Firm* — Canon U.S.A., Inc. IP Division

(57) ABSTRACT

An image forming apparatus includes a rotatable image bearing member and a rotatable developing member to carry developer made up of toner particles and carrier particles adhered to surfaces of the toner particles. Where a pressing force pressing the developing member against the image bearing member is F1, a total number of the carrier particles interposed between the toner particles and the image bearing member is N1, and an adhesion Ft between a carrier particle and a toner particle, measured when the carrier particle is pressed against the toner particle with F1/N1 that is a pressing force per unit carrier particle, and an adhesion Fdr1 between the carrier particle and the image bearing member, measured when the carrier particle is pressed against the image bearing member with F1/N1, satisfy Ft≤Fdr1.

25 Claims, 52 Drawing Sheets

(30) Foreign Application Priority Data

| | | | |
|---|---|---|---|
| Jul. 28, 2020 | (JP) | ................................. | 2020-127699 |
| Jul. 28, 2020 | (JP) | ................................. | 2020-127701 |
| Jul. 28, 2020 | (JP) | ................................. | 2020-127702 |
| Jul. 28, 2020 | (JP) | ................................. | 2020-127703 |

(56) References Cited

U.S. PATENT DOCUMENTS

| | | | | |
|---|---|---|---|---|
| 2010/0190101 | A1* | 7/2010 | Shimmura ........... | G03G 9/0819<br>430/111.41 |
| 2014/0072349 | A1 | 3/2014 | Sakashita | |
| 2018/0143558 | A1* | 5/2018 | Nesher .................. | G03G 9/125 |

FOREIGN PATENT DOCUMENTS

| | | | |
|---|---|---|---|
| JP | H11038668 | A | 2/1999 |
| JP | 2000035741 | A | 2/2000 |
| JP | 2000258949 | A | 9/2000 |
| JP | 2001154456 | A | 6/2001 |
| JP | 2001281912 | A | 10/2001 |
| JP | 2002162767 | A | 6/2002 |
| JP | 2003207987 | A | 7/2003 |
| JP | 2003215861 | A | 7/2003 |
| JP | 2005189281 | A | 7/2005 |
| JP | 2018146954 | A | 9/2018 |
| JP | 2020012942 | A | 1/2020 |
| JP | 2020012943 | A | 1/2020 |

* cited by examiner

FIG. 14

| | RESIDUAL TONER DENSITY | TRANSFER CARRIER COVERAGE (%) |
|---|---|---|
| FIRST EMBODIMENT | 0.8 | 61.7 |
| SECOND EMBODIMENT | 0.7 | 62.2 |
| COMPARATIVE EXAMPLE 1 | 4.1 | 5.00 |

FIG. 15

| | ADHESION BETWEEN TRANSFER CARRIER PARTICLE AND TONER (nN) | ADHESION BETWEEN TRANSFER CARRIER PARTICLE AND PHOTOCONDUCTOR DRUM (nN) |
|---|---|---|
| FIRST EMBODIMENT | 32.8 | 210.1 |
| COMPARATIVE EXAMPLE 1 | 304.6 | 210.1 |

FIG. 37

| | T1 CONFIGURATION | MATERIAL | | RATE OF CHANGE IN COVERAGE (%) | YOUNG'S MODULUS (GPa) | | POISSON'S RATIO | | CALCULATED ADHESION | | MEASURED ADHESION | |
|---|---|---|---|---|---|---|---|---|---|---|---|---|
| | PRESSING FORCE (nN) | DRUM | BELT | | DRUM | BELT | DRUM | BELT | Fdr(nN) | Fi(nN) | Fdr(nN) | Fi(nN) |
| NINTH EMBODIMENT | 0.33 | POLYCARBONATE | ACRYLIC | 2 | 2.20 | 3.00 | 0.37 | 0.38 | 4.43 | 4.25 | 15.76 | 7.56 |
| MODIFICATION 1 | 0.33 | POLYALLYLATE | ACRYLIC | 3 | 2.15 | 3.00 | 0.37 | 0.38 | 4.45 | 4.25 | | |
| MODIFICATION 2 | 0.33 | POLYCARBONATE | PI | 5 | 2.20 | 2.65 | 0.37 | 0.30 | 4.43 | 4.33 | | |
| MODIFICATION 3 | 0.33 | POLYALLYLATE | PI | 7 | 2.15 | 2.65 | 0.37 | 0.30 | 4.45 | 4.33 | | |
| MODIFICATION 4 | 0.33 | POLYCARBONATE | PEEK | 13 | 2.20 | 3.70 | 0.37 | 0.40 | 4.43 | 4.14 | 15.76 | 13.40 |
| MODIFICATION 5 | 0.33 | POLYALLYLATE | PEEK | 12 | 2.15 | 3.70 | 0.37 | 0.40 | 4.45 | 4.14 | | |
| COMPARATIVE EXAMPLE 7 | 0.33 | POLYCARBONATE | URETHANE | 41 | 2.20 | 1.50 | 0.37 | 0.48 | 4.43 | 4.63 | 15.76 | 16.60 |
| COMPARATIVE EXAMPLE 8 | 0.33 | Si | ACRYLIC | 52 | 185.00 | 3.00 | 0.28 | 0.38 | 3.48 | 4.25 | | |
| COMPARATIVE EXAMPLE 9 | 0.33 | POLYCARBONATE | PBT | 30 | 2.20 | 2.00 | 0.37 | 0.38 | 4.43 | 4.49 | | |
| COMPARATIVE EXAMPLE 10 | 0.33 | POLYALLYLATE | PBT | 28 | 2.15 | 2.00 | 0.37 | 0.38 | 4.45 | 4.49 | | |

| CONFIGURATION | NEW | | AFTER PRINTING 1000 SHEETS | |
|---|---|---|---|---|
| | RESIDUAL TONER DENSITY | MELT-ADHESION | RESIDUAL TONER DENSITY | MELT-ADHESION |
| ELEVENTH EMBODIMENT | 0.3 | NOT OBSERVED | 0.5 | NOT OBSERVED |
| TWELFTH EMBODIMENT | 0.3 | NOT OBSERVED | 0.3 | NOT OBSERVED |
| COMPARATIVE EXAMPLE 11 | 0.2 | NOT OBSERVED | 4.5 | OBSERVED |

FIG. 52

| CONFIGURATION | AREA RATIO OF TRANSFER CARRIER PARTICLE COLLECTING PORTIONS | DEVELOPMENT ROLLER PERIPHERAL SPEED RATIO | AREA RATIO OF PHOTOCONDUCTOR DRUM SURFACE THAT CONTACTS WITH TRANSFER CARRIER PARTICLE COLLECTING PORTIONS | NEW | | AFTER PRINTING 1000 SHEETS | |
|---|---|---|---|---|---|---|---|
| | | | | RESIDUAL TONER DENSITY | MELT-ADHESION | RESIDUAL TONER DENSITY | MELT-ADHESION |
| THIRTEENTH EMBODIMENT | 6.80% | 1 | 6.80% | 0.4 | NOT OBSERVED | 0.4 | NOT OBSERVED |
| MODIFICATION 6 | 1.35% | 1 | 1.35% | 0.3 | NOT OBSERVED | 0.4 | NOT OBSERVED |
| FOURTEENTH EMBODIMENT | 0.72% | 1.4 | 1.01% | 0.4 | NOT OBSERVED | 0.4 | NOT OBSERVED |
| COMPARATIVE EXAMPLE 12 | 0.72% | 1 | 0.72% | 0.3 | NOT OBSERVED | 1.4 | PARTIALLY OBSERVED |

IMAGE FORMING APPARATUS

CROSS-REFERENCE TO RELATED APPLICATIONS

The present application is a continuation of U.S. patent application Ser. No. 17/386,368, filed on Jul. 27, 2021, which claims priority from Japanese Patent Application No. 2020-127697, filed Jul. 28, 2020, Japanese Patent Application No. 2020-127698, filed Jul. 28, 2020, Japanese Patent Application No. 2020-127699, filed Jul. 28, 2020, Japanese Patent Application No. 2020-127701, filed Jul. 28, 2020, Japanese Patent Application No. 2020-127702, filed Jul. 28, 2020, and Japanese Patent Application No. 2020-127703, filed Jul. 28, 2020, all of which are hereby incorporated by reference herein in their entirety.

BACKGROUND

Field

The present disclosure relates to an image forming apparatus using an electrophotographic process or the like.

Description of the Related Art

Generally, an image forming apparatus, such as a copying machine and a laser printer, that performs image formation by using an electrophotographic process is known.

The image forming apparatus, in a transfer step, applies a voltage from a voltage source to a transfer member disposed in an area opposite a photoconductor drum serving as an image bearing member to electrostatically transfer a toner image formed on the surface of the photoconductor drum to an intermediate transfer member or a recording medium. When a multi-color toner image is formed, the multi-color toner image is formed on the intermediate transfer member or the surface of a recording medium by sequentially performing the transfer steps for toner images of the respective colors. Developer (toner) not transferred from the photoconductor drum to the intermediate transfer member or a recording medium is removed from the photoconductor drum by a cleaning member and contained as waste toner in a waste toner containing portion in a cleaning unit.

In recent years, for the purpose of an apparatus size reduction, a cleanerless system not equipped with a cleaning system for the surface of a photoconductor drum has been suggested. To achieve the cleanerless system, it is conceivable that residual toner remaining on the surface of the photoconductor drum after a toner image is transferred by a transfer member is reduced by improving the transfer efficiency of the toner image from the photoconductor drum to the intermediate transfer member.

Japanese Patent Laid-Open No. 10-063027 suggests a configuration that, in order to achieve a cleanerless system, the transfer efficiency is improved by reducing the adhesion between a photoconductor drum and toner in such a manner that fine particles are adhered to the surface of the photoconductor drum in advance and the fine particles are interposed between the photoconductor drum and a toner image.

Japanese Patent Laid-Open No. 10-063027 further suggests a configuration as a manner of adhering fine particles to the surface of the photoconductor drum. In the configuration, fine particles are supplied from a developing device to the photoconductor drum by using toner to which fine particles are externally added.

It is known that, in a primary transfer nip portion, when the peripheral speed of a photoconductor drum and the peripheral speed of an intermediate transfer belt are completely the same, the transfer efficiency decreases and, as a result, a so-called void that a white patch appears at the center part of a toner image, such as a character and a line. In Japanese Patent Laid-Open No. 10-063027, a peripheral speed difference is actively provided between the peripheral speed of the photoconductor drum and the peripheral speed of the intermediate transfer belt. With this configuration, the primary transfer efficiency is increased to reduce occurrence of a void, with the result that image quality is improved.

In the above-described image forming apparatus, when a toner image formed on the surface of the photoconductor drum is primarily transferred to the surface of the intermediate transfer belt, rapid fluctuations in the rotation of the photoconductor drum may occur. Uneven exposure may occur in laser exposure due to the rapid fluctuations in rotation, with the result that image streaks may occur in a toner image subsequently formed on the surface of the photoconductor drum. This is because, when the leading edge of a toner image developed on the photoconductor drum enters the primary transfer nip portion in a state where no toner is present in the primary transfer nip portion, frictional force caused by the surface of the intermediate transfer belt to act on the surface of the photoconductor drum rapidly reduces.

In contrast, it is known that fluctuations in the rotation of the photoconductor drum or the intermediate transfer belt are reduced by forming small dot toner images using toner in yellow or the like on the photoconductor drum in addition to a toner image of image pattern and, as a result, various image defects can be prevented. In an image forming apparatus described in, for example, Japanese Patent Laid-Open No. 11-052758, occurrence of color deviation on a toner image to be primarily transferred to an intermediate transfer belt is reduced by forming small dot toner images on a photoconductor drum in a uniformly distributed manner.

To supply only fine particles from toner in the developing device to the surface of the photoconductor drum as in the case of Japanese Patent Laid-Open No. 10-063027, fine particles adhered to toner need to be separated from the toner and transferred to the drum. As for toner to which generally used fine particles of silica or the like are externally added, the adhesion between the toner and the fine particles is large, so it has been difficult to supply the surface of the photoconductor drum with a sufficient amount of fine particles to improve the transfer efficiency.

To improve the transfer efficiency, when toner to which fine particles are externally added are supplied from a developing device to a photoconductor drum and then a toner image is transferred to a recording medium, the fine particles are transferred to the surface of the recording medium together with the transferred toner image. Particularly, to improve the transfer efficiency of multi-color high-resolution printing, more fine particles need to be supplied to the surface of a photoconductor drum. Then, a large amount of fine particles may be transferred to the surface of a recording medium together with transferred toner particles. As a result, at the time of fixing toner on a recording medium, a large amount of fine particles may impede thermal conduction to the toner to impair fixability. When a process member that is rotated by contact with a photoconductor drum is provided, the frictional force between the photoconductor drum and the process member is reduced by fine particles interposed between the photoconductor drum and the process member. When the frictional force reduces, the rotation of the process member may be instable. When the rotation of the process member is instable, an image forming process may not be performed under desired process conditions. As a result, an adverse effect in an image may be caused.

The image forming apparatus described in Japanese Patent Laid-Open No. 11-052758 has the following inconvenience. When image formation is performed with the addition of dot toner images at the time of printing on a recording medium of a type, such as high-brightness paper, coated paper, and glossy paper, the added dot toner images can be prominent on the recording medium, the recording medium can take on a yellow tint as a whole, and image quality may decrease. This is because recording media, such as high-brightness paper, coated paper, and glossy paper, have a high surface smoothness and a high secondary transferability. Yellow dot toner images that are primarily transferred to an intermediate transfer belt, that make it easy for the surfaces of the photoconductor drum and intermediate transfer belt to slide on each other, and that reduce the frictional force are faithfully reproduced on a recording medium.

SUMMARY

The present disclosure improves the transfer efficiency by effectively supplying fine particles from a developing device to the surface of a photoconductor drum, reduces occurrence of an adverse effect in an image by stabilizing the rotation of a process member that is rotated by contact with the photoconductor drum in a configuration in which a sufficient amount of fine particles is supplied to the surface of the photoconductor drum to improve the transfer efficiency, or reduces occurrence of an adverse effect in an image by reducing fluctuations in the rotation of the photoconductor drum or an intermediate transfer belt without adding dot toner images.

According to an aspect of the present disclosure, an image forming apparatus includes an image bearing member configured to be rotatable, a developing member configured to be rotatable and to carry developer made up of toner particles and carrier particles adhered to surfaces of the toner particles, wherein the developing member further is configured to contact with the image bearing member to form a developing portion and to supply the developer to a surface of the image bearing member in the developing portion, a developer containing portion configured to contain the developer, and a transfer member configured to transfer the developer, supplied to the surface of the image bearing member, to a transfer-receiving member, wherein, in a state where the image bearing member is rotating, the carrier particles contained in the developer containing portion and carried on a surface of the developing member are supplied to the surface of the image bearing member in the developing portion, and wherein, where a pressing force pressing the developing member against the image bearing member is F1 and a total number of the carrier particles interposed between the toner particles and the image bearing member is N1, and an adhesion Ft between a carrier particle and a toner particle, measured when the carrier particle is pressed against the toner particle with F1/N1 that is a pressing force per unit carrier particle, and an adhesion Fdr1 between the carrier particle and the image bearing member, measured when the carrier particle is pressed against the image bearing member with F1/N1, satisfy Ft≤Fdr1.

Further features of the present disclosure will become apparent from the following description of exemplary embodiments with reference to the attached drawings.

BRIEF DESCRIPTION OF THE DRAWINGS

FIG. 14 shows effect confirmation test results in the first embodiment.

FIG. 15 shows measured results of adhesion in the first embodiment.

FIG. 37 shows the relationship between a combination of the material of a photoconductor drum and the material of an intermediate transfer belt and adhesions in the ninth embodiment and other examples.

FIG. 52 shows effect confirmation test results for the image forming apparatus in the thirteenth embodiment.

DESCRIPTION OF THE EMBODIMENTS

Hereinafter, embodiments of the present disclosure will be described exemplarily in detail with reference to the attached drawings. The dimensions, materials, and shapes of components that will be described in the following embodiments, the relative arrangement of the components, and the like, should be changed as needed depending on the configuration of an apparatus to which the present disclosure is applied or various conditions. Unless otherwise specified, those are not intended to limit the scope of the present disclosure to them only.

First Embodiment

1. Image Forming Apparatus

The present disclosure particularly relates to an image forming apparatus using a so-called drum cleanerless system having no cleaner for an image bearing member.

Figure 1:
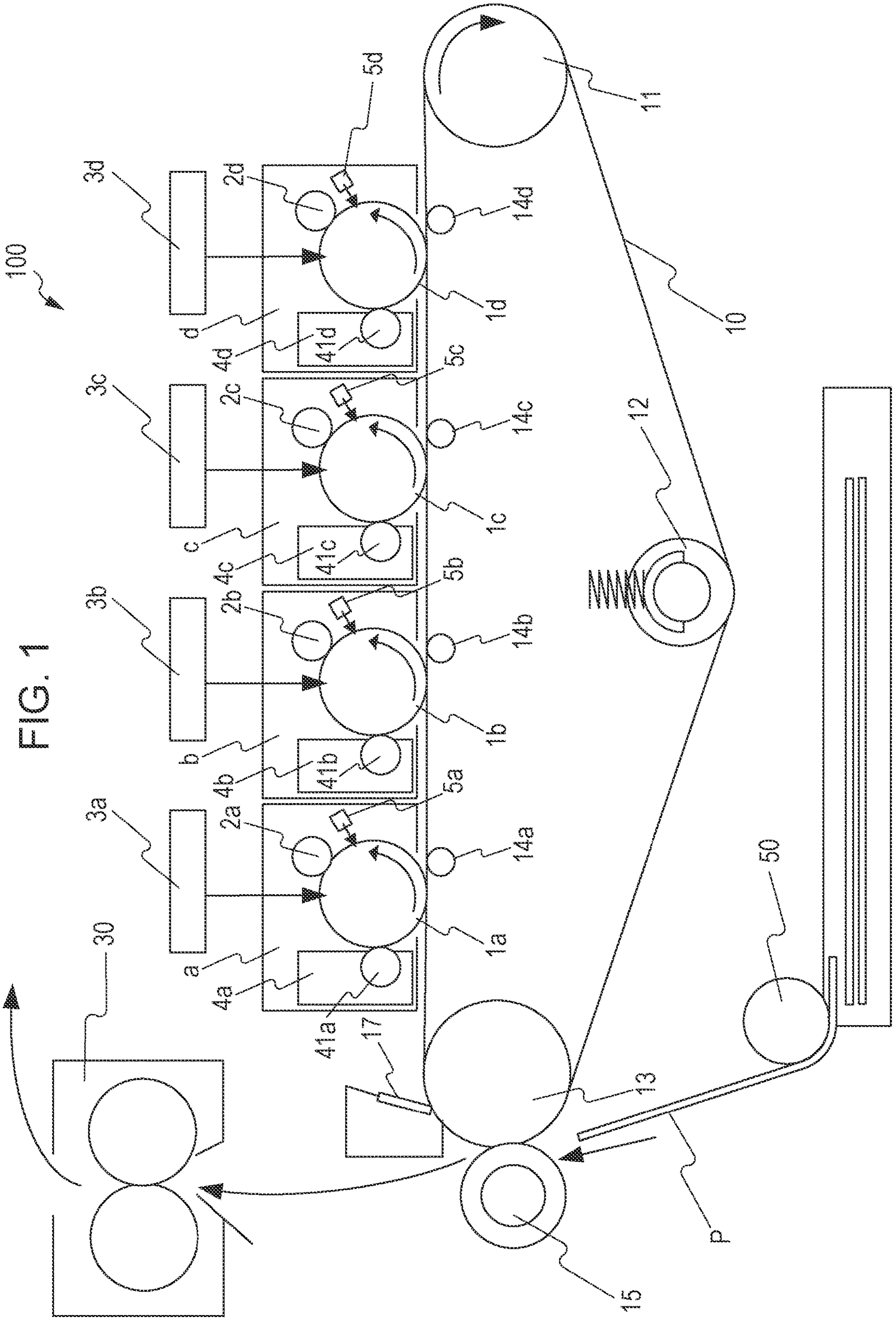
FIG. 1 is a schematic diagram of an image forming apparatus in a first embodiment.

FIG. 1 is a schematic diagram showing an example of a color image forming apparatus. The configuration and operation of the image forming apparatus of the present embodiment will be described with reference to FIG. 1. The image forming apparatus of the present embodiment is a so-called tandem-type printer in which image forming stations a to d are provided. The first image forming station a forms a yellow (Y) image. The second image forming station b forms a magenta (M) image. The third image forming station c forms a cyan (C) image. The fourth image forming station d forms a black (Bk) image. The configuration of each image forming station is the same except for the color of toner to be contained. Hereinafter, the configuration of each image forming station will be described by using the first image forming station a. Hereinafter, unless otherwise specifically distinguished from one another, a to d in Y, M, C, and K are omitted, and the configuration will be generally described.

The first image forming station a includes a drum-shaped electrophotographic photoconductor member (hereinafter, referred to as photoconductor drum) 1*a*, a charging roller 2*a* serving as a charging device, an exposure unit 3*a*, and a developing unit 4*a*.

The photoconductor drum 1*a* is an image bearing member that is driven for rotation by a photoconductor drum drive 110 at a peripheral speed (process speed) of 150 mm/sec in the direction of the arrow and that carries a toner image. The photoconductor drum 1*a* is made up of an aluminum pipe with a diameter of 20 mm, and a photoconductor layer and a surface layer provided on the aluminum pipe. The surface layer is a thin film layer made of polyallylate with a film thickness of 20 μm.

An image forming operation is started when a control section 200, such as a controller, receives an image signal, and the photoconductor drum 1*a* is driven for rotation. In process of rotation, the photoconductor drum 1*a* is uniformly charged by the charging roller 2*a* to a predetermined potential with a predetermined polarity (in the present embodiment, the normal polarity is a negative polarity) and is exposed according to the image signal by the exposure unit 3*a*. Thus, an electrostatic latent image corresponding to a yellow component image of an intended color image is formed. Subsequently, the electrostatic latent image is developed by the developing unit (yellow developing unit) 4*a* at a developing position and is visualized as a yellow toner image.

The charging roller 2*a* serving as a charging member is in contact with the surface of the photoconductor drum 1*a* at a predetermined pressure contact force in a charging portion and is rotated by the photoconductor drum 1*a* under friction with the surface of the photoconductor drum 1*a*. A predetermined direct current voltage is applied from a charging voltage source 120 to the rotating shaft of the charging roller 2*a* in accordance with the image forming operation. In the first embodiment, the charging roller 2*a* is made up of a metal shaft and an elastic layer provided on the metal shaft. The metal shaft has a diameter of 5.5 mm. The elastic layer is made of an electrically conductive elastic material with a thickness of 1.5 mm and a volume resistivity of about $1\times10^6$ Ωcm. In accordance with the image forming operation, the control section 200 charges the surface of the photoconductor drum 1*a* to −500 V that is a predetermined potential by applying a direct current voltage of −1050 V as a charging voltage to the rotating shaft of the charging roller 2*a*. The surface potential of the photoconductor drum 1*a* was measured with the surface electrometer Model 344 produced by TREK, Inc. The surface potential −500V of the photoconductor drum 1*a* at this time is the surface potential of the photoconductor drum 1 during a non-image-forming period and is a dark potential (Vd) at which a toner image is not developed. A large number of protruded portions are provided on the surface layer of the charging roller 2*a*. An average height of the protruded portions is about 10 The protruded portions provided on the surface layer of the charging roller 2*a* play a role as a spacer between the charging roller 2*a* and the photoconductor drum 1*a* in the charging portion. The protruded portions play a role in suppressing a smear of the charging roller 2*a* with residual toner due to contact of portions other than the protruded portions with residual toner that is toner not transferred and remaining on the photoconductor drum 1*a* in a primary transfer portion (described later) when the residual toner enters the charging portion.

Figure 2:
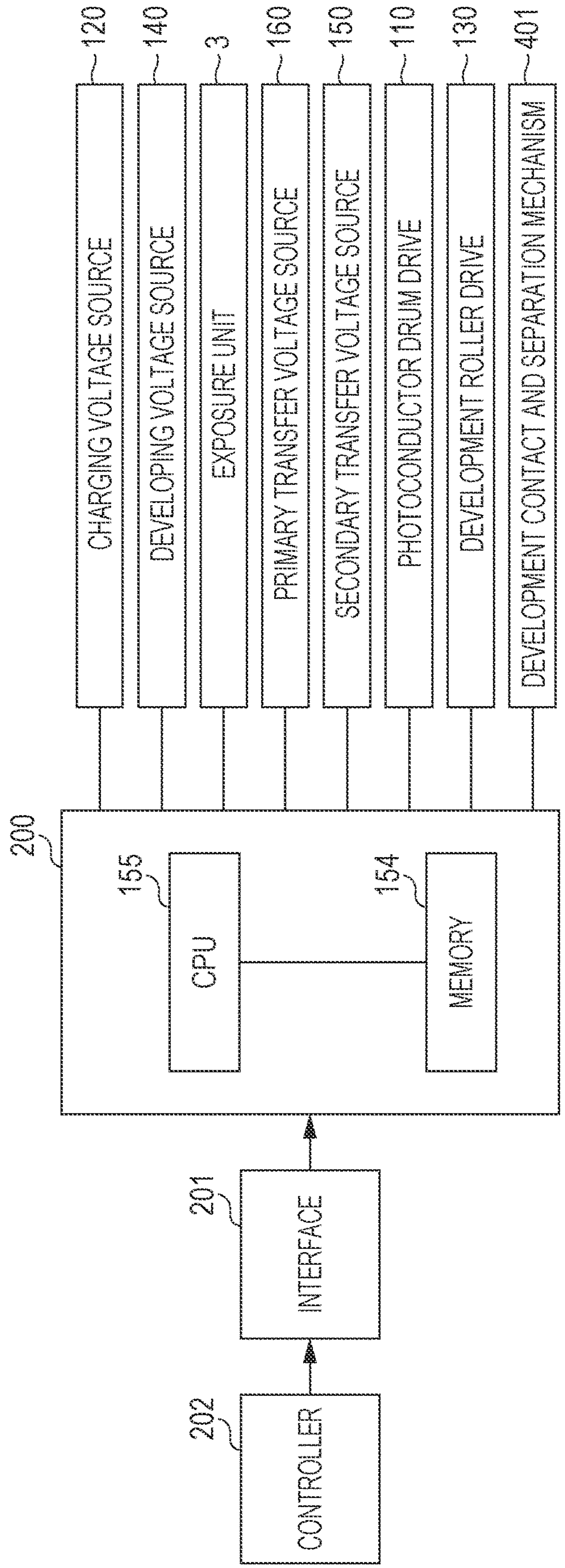
FIG. 2 is a control block diagram in the first embodiment.

The exposure unit 3*a* includes a laser driver, a laser diode, a polygon mirror, an optical lens system, and the like. As shown in FIG. 2, a time-series electrical digital image signal of image information input from a controller 202 to the control section 200 via an interface 201 and subjected to image processing is input to the exposure unit 3*a*. In the first embodiment, light exposure is adjusted such that an image forming potential V1 of the photoconductor drum 1 at an electrostatic latent image part exposed by the exposure unit 3*a* is −100 V. The image forming potential is also called bright potential.

The developing unit 4*a* includes a development roller 41*a* serving as a developing member (developing member) and a nonmagnetic one-component developer made up of toner and transfer carrier particles (described later). The developing unit 4*a* is a developing device that performs a developing action on the photoconductor drum 1 to develop an electrostatic latent image as a toner image and is also a developer containing portion that contains developer. As shown in FIG. 2, the developing unit 4*a* and an image forming apparatus main body 100 include a contact and separation mechanism 401 that controls contact and separation (development and separation) state between the development roller 41*a* and the photoconductor drum 1*a*. The control section 200 causes the development roller 41*a* and the photoconductor drum 1*a* to contact with or separate from each other in accordance with an image forming operation or the like. When the development roller 41*a* and the photoconductor drum 1*a* contact with each other, the development roller 41*a* contacts with a pressing force of 200 gf. The width of a developing nip portion that is the contact portion between the development roller 41*a* and the photoconductor drum 1*a* is such that the width in the rotation direction of the photoconductor drum 1*a* is 2 mm and the width in the longitudinal direction of the photoconductor drum 1*a* is 220 mm. The development roller 41*a* is driven for rotation by a development roller drive 130 in a forward direction relative to a surface moving direction of the photoconductor drum 1*a* such that the surface moving speed (hereinafter, peripheral speed) is equal to the peripheral speed of the photoconductor drum 1*a* in the developing nip portion.

A pre-exposure unit 5*a* serving as a neutralization device that eliminates electrostatic charge by exposing the surface of the photoconductor drum 1*a* before the surface of the photoconductor drum 1*a* is charged by the charging roller 2*a*. The pre-exposure unit 5*a* plays a role in neutralizing a surface potential formed on the photoconductor drum 1*a* by eliminating electrostatic charge on the surface of the photoconductor drum 1*a* and plays a role in controlling a discharge amount of discharge that occurs in the charging portion.

The control section 200 causes the development voltage source 140 to apply a direct current voltage of −300 V as a development voltage from the development voltage source 140 to the metal core of the development roller 41*a* when the development roller 41*a* and the photoconductor drum 1*a* contact with each other during image forming operation. During an image-forming period, toner carried on the development roller 41*a* is developed on the image forming potential V1 part on the photoconductor drum 1*a* with an electrostatic force generated by a potential difference between the development voltage Vdc=−300 V and the image forming potential V1=−100 V of the photoconductor drum 1*a*.

In the following description, regarding potentials and applied voltages, the potential is high when the absolute value is greater toward a negative polarity side (for example, −1000 V as compared to −500 V), and the potential is low when the absolute value is less toward the negative polarity side (for example, −300 V as compared to −500 V). This is because toner having a negative chargeability is considered as a reference in the first embodiment.

A voltage in the first embodiment is expressed as a potential difference from earth potential (0 V). Therefore, the development voltage Vdc=−300 V is interpreted that a potential difference of −300 V from the earth potential is provided by the development voltage applied to the metal core of the development roller 41*a*. This also applies to a charging voltage, a transfer voltage, and the like.

Next, the control section 200 will be described. FIG. 2 is a control block diagram showing a schematic control mode of a relevant part of the image forming apparatus 100 in the first embodiment. The controller 202 exchanges various pieces of electrical information with a host apparatus and generally controls the image forming operation of the image forming apparatus 100 in the control section 200 via the interface 201 in accordance with a predetermined control program and a reference table. The control section 200 is made up of a CPU 155 that is a central element and performs various calculations, a memory 154 such as a ROM and a RAM that are storage elements, and the like. Detection results of sensors, count results of counters, calculation results, and the like are stored in the RAM. Control programs, data tables obtained through experiments or the like in advance, and the like are stored in the ROM. Controlled objects, sensors, counters, and the like in the image forming apparatus 100 are connected to the control section 200. The control section 200, for example, controls a predetermined image forming sequence by exchanging various electrical information signals and controlling the timing of driving and the like of various portions. For example, voltages and light exposure to be applied by the charging voltage source 120, the development voltage source 140, the exposure unit 3, a primary transfer voltage source 160, and a secondary transfer voltage source 150 are controlled by the control section 200. The control section 200 further controls the photoconductor drum drive 110, the development roller drive 130, and the development contact and separation mechanism 401. The image forming apparatus 100 forms an image on a recording medium P in accordance with an electrical image signal input from the host apparatus to the controller 202. Examples of the host apparatus include an image reader, a personal computer, a facsimile, and a smartphone.

Toner in the first embodiment is a nonmagnetic toner having a negative chargeability and manufactured by a suspension polymerization method. The toner has a volume average particle diameter of 7.0 μm. The toner is charged with a negative polarity when carried on the development roller 41*a*. The volume average particle diameter of toner was measured with a laser diffraction particle size analyzer LS-230 produced by Beckman Coulter, Inc. The toner will be described in detail later.

An intermediate transfer belt 10 serving as an intermediate transfer member is stretched by a plurality of stretching members 11, 12, 13 and is driven for rotation at an equal peripheral speed relative to the photoconductor drum 1*a* in a direction to move in a circumferential direction in an area that is opposite the photoconductor drum 1*a* and that contacts with the photoconductor drum 1*a*. A direct current voltage of 200 V is applied from the primary transfer voltage source 160 to a primary transfer roller 14*a* serving as a primary transfer member in a primary transfer period during the image forming operation. A yellow toner image formed on the photoconductor drum 1*a* is electrostatically transferred to the intermediate transfer belt 10 in process of passing through the primary transfer portion that is the contact portion formed between the primary transfer roller 14*a* and the photoconductor drum 1*a* via the intermediate transfer belt 10.

The primary transfer roller 14*a* is a cylindrical metal roller with a diameter of 6 mm and is made of a nickel-plated SUS. The primary transfer roller 14*a* is disposed at a position offset 8 mm downstream in the moving direction of the intermediate transfer belt 10 with respect to the center position of the photoconductor drum 1*a*. The intermediate transfer belt 10 is configured so as to wrap around the photoconductor drum 1*a*. The primary transfer roller 14*a* is disposed at a position lifted 1 mm from a horizontal surface formed by the photoconductor drum 1*a* and the intermediate transfer belt 10 so that the wrapping amount of the intermediate transfer belt 10 around the photoconductor drum 1*a* can be ensured. The primary transfer roller 14*a* presses the intermediate transfer belt 10 with a force of about 200 gf. The primary transfer roller 14*a* is rotated by the rotation of the intermediate transfer belt 10. The primary transfer roller 14*b* disposed in the second image forming station b, the primary transfer roller 14*c* disposed in the third image forming station c, and the primary transfer roller 14*d* disposed in the fourth image forming station d have a similar configuration to the primary transfer roller 14*a*.

Hereinafter, similarly, a second-color magenta toner image, a third-color cyan toner image, and a fourth-color black toner image are respectively formed by the second, third, and fourth image forming stations b, c, d and are sequentially transferred to the intermediate transfer belt 10 in layers. As a result, a combined color image corresponding to an intended color image is obtained.

A four-color toner image on the intermediate transfer belt 10 is transferred at a time to the surface of a recording medium P fed by a sheet feeding device 50 in process of a secondary transfer step of passing through a secondary transfer nip portion formed by the intermediate transfer belt 10 and a secondary transfer roller 15 serving as a secondary transfer member. The secondary transfer roller 15 contacts with the intermediate transfer belt 10 with a pressure of 50 N to form the secondary transfer nip portion. The secondary transfer roller 15 is rotated by the intermediate transfer belt 10. The secondary transfer roller 15 is applied with a voltage of 1500 V from the secondary transfer voltage source 150 when secondarily transferring toner on the intermediate transfer belt 10 to a recording medium P, such as paper.

After that, the recording medium P carrying the four-color toner image is introduced into a fixing unit 30. The four-color toner is heated and pressurized by the fixing unit 30 to be fused and mixed and fixed to the recording medium P. Toner remaining on the intermediate transfer belt 10 after secondary transfer is cleaned and removed by a cleaning device 17.

The cleaning device 17 has a cleaning blade or the like that contacts with the outer peripheral surface of the intermediate transfer belt 10 to scrape toner remaining on the intermediate transfer belt 10 and collects the toner into the intermediate transfer belt cleaning device 17. The intermediate transfer belt cleaning device 17 is disposed so as to collect toner adhering on the intermediate transfer belt 10 on the downstream side with respect to the secondary transfer portion on the intermediate transfer belt 10 in the rotation direction of the intermediate transfer belt 10.

Through the above operation, a full-color print image is formed.

2. Developer, Toner, and Transfer Carrier Particles

Next, developer, toner, and transfer carrier particles used in the first embodiment will be described in detail.

In the first embodiment, a mixture of toner and an external additive A that is transfer carrier particles is used as developer. Here, transfer carrier particles mean particles that play a role in improving the primary transfer efficiency of a toner image by reducing the adhesion between the toner image and the photoconductor drum 1 when interposed between the photoconductor drum 1 and the toner image developed on the photoconductor drum 1. Toner is toner particles. Each of the toner base particles includes a toner base particle containing a release agent, and an organic silicon polymer on the surface of the toner base particle.

The organic silicon polymer has a T3 unit structure expressed by R—Si($O_{1/2}$)$_3$. R denotes an alkyl group or phenyl group having a carbon number of greater than or equal to one and less than or equal to six. The organic silicon polymer forms protruded portions on the surface of the toner base particle.

The protruded portions are in area contact with the toner base particle. Because of the area contact, the effect of suppressing displacement, desorption, and burial of the protruded portions is remarkably expected.

The degree of area contact will be described with reference to the schematic diagrams of the protruded portions shown in FIG. 3, FIG. 4, FIG. 5, and FIG. 6.

Figure 3:
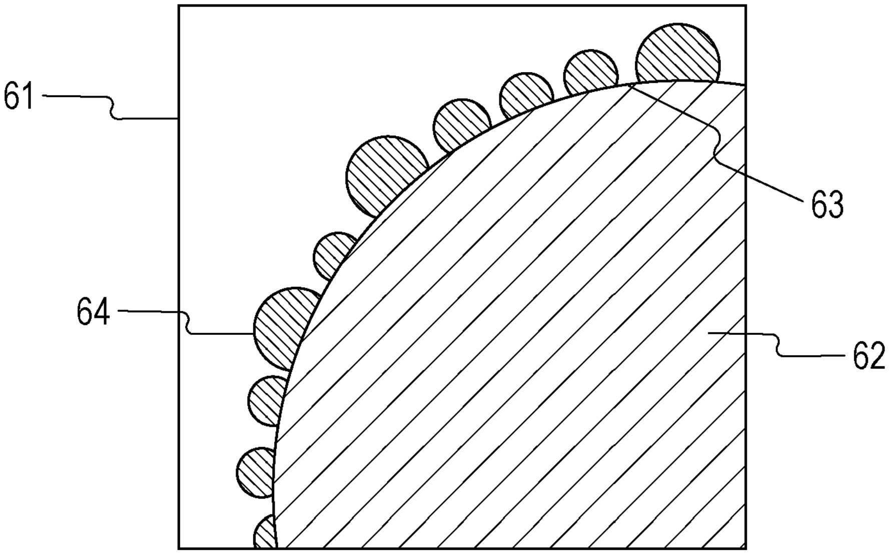
FIG. 3 is a schematic diagram of a toner particle surface in the first embodiment.

Reference numeral 61 in FIG. 3 indicates a cross-sectional image of a toner particle, showing about a quarter of the toner particle. Reference numeral 62 indicates the toner particle. Reference numeral 63 indicates a toner base particle surface. Reference numeral 64 indicates protruded portions. The cross section of a toner particle can be observed by using a scanning transmission electron microscope (hereinafter, also referred to as STEM) (described later).

The cross-sectional image of a toner particle is observed, and a line is drawn along the periphery of a toner base particle surface. The cross-sectional image of the toner particle is converted to a horizontal image with reference to the line along the periphery. In the horizontal image, the length of the line along the periphery in a part where the protruded portion and the toner base particle form a continuous interface is defined as protrusion width w.

The maximum length of the protruded portion in the direction of normal to the direction of the protrusion width w is defined as protrusion diameter D, and the length from the vertex of the protruded portion in a line segment forming the protrusion diameter D to the line along the periphery is defined as protrusion height H.

Figure 4:
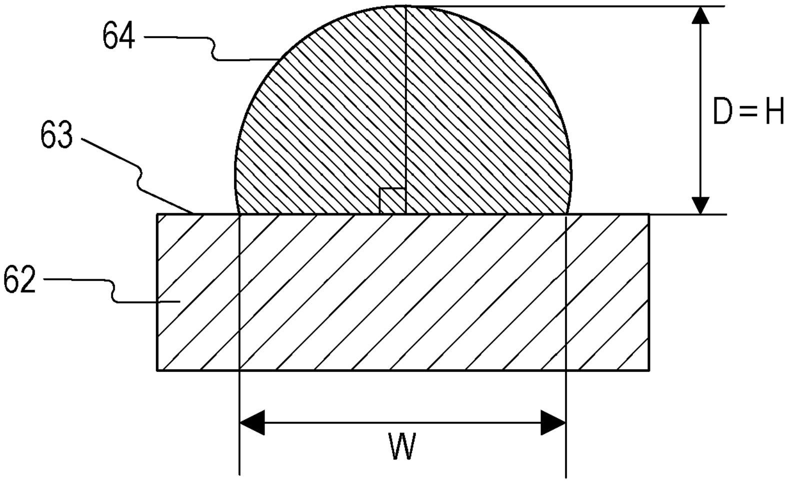
FIG. 4 is a schematic diagram of a protruded shape of the toner particle surface in the first embodiment.
Figure 5:
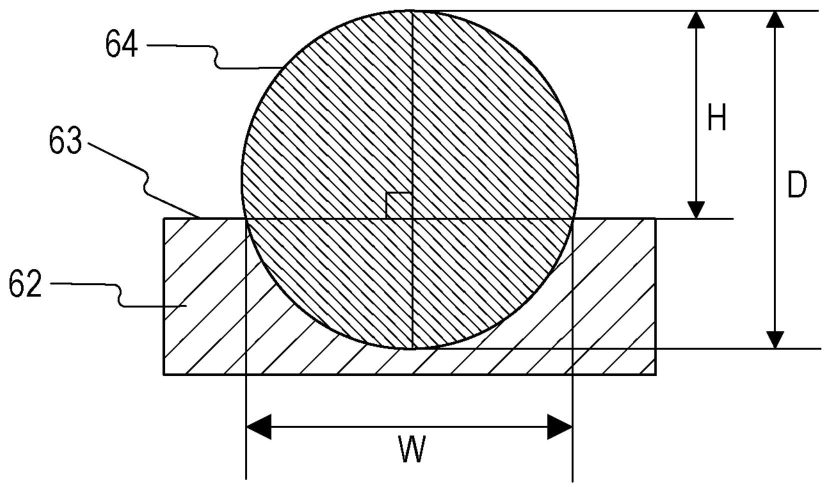
FIG. 5 is a schematic diagram of the protruded shape of the toner particle surface in the first embodiment.
Figure 6:
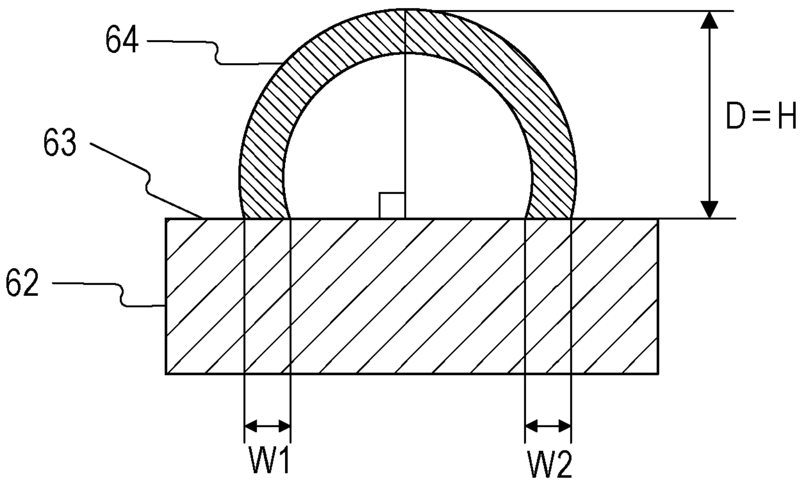
FIG. 6 is a schematic diagram of the protruded shape of the toner particle surface in the first embodiment.

In FIG. 4 and FIG. 6, the protrusion diameter D and the protrusion height H are the same. In FIG. 5, the protrusion diameter D is greater than the protrusion height H.

FIG. 6 schematically shows a stuck state of a particle like a bowl-shaped particle of which the central part of a semi-spherical particle is recessed, obtained by, for example, crushing or cleaving a hollow particle.

In FIG. 6, the protrusion width W is defined as the total length of organic silicon polymer in contact with the toner base particle surface. In other words, the protrusion width W in FIG. 6 is the sum of W1 and W2.

A number average value of the protrusion height H is greater than or equal to 30 nm and less than or equal to 300 nm and is preferably greater than or equal to 30 nm and less than or equal to 200 nm. When the number average value of the protrusion height H is greater than or equal to 30 nm, spacer effect is obtained between the toner base particle surface and the transfer member, with the result that transferability remarkably improves. On the other hand, when the number average value of the protrusion height H is less than or equal to 300 nm, the effect of suppressing displacement, desorption, and burial is remarkable, with the result that high transferability is maintained even in long-term use. A cumulative distribution of the protrusion height H is obtained for the protruded portions having a protrusion height H of greater than or equal to 30 nm and less than or equal to 300 nm. When the number average value of the protrusion heights corresponding to 80 percent by number and obtained by accumulating the protrusion height H in ascending order of the protrusion height H is defined as H80, H80 is preferably greater than or equal to 65 nm and less than or equal to 120 nm and more preferably greater than or equal to 75 nm and less than or equal to 100 nm. When H80 falls within the above range, transferability is further improved.

The number average particle diameter R of primary particles of the external additive A is preferably greater than or equal to 30 nm and less than or equal to 1200 nm. When R is greater than or equal to 30 nm, spacer effect is manifested against the transfer member, with the result that high transferability is exhibited. As R increases, transferability tends to improve. On the other hand, when R exceeds 1200 nm, fluidity of toner decreases, and image unevenness easily occurs.

The ratio of the number average particle diameter R of the primary particles of the external additive A to the number average value of the protrusion height H is preferably higher than or equal to 1.00 and lower than or equal to 4.00. When the ratio [(Number average particle diameter R of the primary particles of the external additive A)/(Number average value of the protrusion height H)] falls within the above range, both high transferability and low-temperature fixability for long service lifetime are possible.

When the number average value of the protrusion height H is 30 nm that is a minimum value, spacer effect is manifested against the transfer member and transferability is improved when R is greater than or equal to 30 nm. This is presumably because the external additive A substitutes in places where no protruded portions are present as a result of influences of desorption and the like and spacer effect is manifested. In other words, when R is less than 30 nm, spacer effect is difficult to be manifested.

A sticking rate of the external additive A on the toner particle surface is preferably higher than or equal to 0% and lower than or equal to 20% and more preferably higher than or equal to 0% and lower than or equal to 10%. When the sticking rate falls within the above range, the external additive A is easy to move on the surface of the toner particle, with the result that transferability is further improved through the action of substituting for protruded portions. In a fixing step of fixing toner on a fixing member, a release agent in an appropriate amount bleeds from toner base particles, thus improving separability between the fixing member and paper.

Through surface observation of the toner with a scanning electron microscope, a 1.5 μm-square backscattered electron image of the toner surface is acquired. When a binarized image is obtained such that an organic silicon polymer part in the backscattered electron image is a bright part, the area ratio of the bright part area of the image to the total area of the image (hereinafter, also simply referred to as the area ratio of the bright part area) is higher than or equal to 30.0% and lower than or equal to 75.0%. The area ratio of the bright part area of the image is preferably higher than or equal to 35.0% and lower than or equal to 70.0%. As the area ratio of the bright part area increases, the presence ratio of the organic silicon polymer on the toner base particle surface increases. When the area ratio of the bright part area is higher than 75.0%, the presence ratio of components coming from a toner base particle on the toner base particle surface is low, a release agent is more difficult to bleed from the toner base particle, so thin paper tends to wrap around the fixing unit during low-temperature fixation. On the other hand, when the area ratio of the bright part area of the image is lower than 30.0%, the presence ratio of components coming from a toner base particle on the toner base particle surface is high. In other words, the exposure area of components coming from a toner base particle on the toner base particle surface is high, so transferability at the initial stage of use decreases. The area ratio of the bright part area of the image is hereinafter also referred to as the coverage of organic silicon polymer on the surface of a toner base particle.

The external additive A is not limited as long as the number average particle diameter R of primary particles is greater than or equal to 30 nm and less than or equal to 1000 nm. Various organic fine particles or inorganic fine particles may be used as the external additive A. From the viewpoint of easiness to impart fluidity and easiness to be negatively charged as well as toner base particles, the external additive may contain silica fine particles. The content of silica fine particles in the external additive A is preferably higher than or equal to 50 percent by mass, and the external additive A may be silica fine particles. The content of the external additive A in toner is preferably higher than or equal to 0.02 percent by mass and lower than or equal to 5.00 percent by mass and more preferably higher than or equal to 0.05 percent by mass and lower than or equal to 3.00 percent by mass.

Examples of organic fine particles, other than silica fine particles, or inorganic fine particles include the following:

(1) Fluidity imparting agent: alumina fine particles, titanium oxide fine particles, carbon black, and carbon fluoride;

(2) Abrasives: fine particles of metal oxides (fine particles of strontium titanate, cerium oxide, alumina, magnesium oxide, chromium oxide, and the like), fine particles of nitrides (fine particles of silicon nitride, and the like), fine particles of carbides (fine particles of silicon carbide, and the like), and fine particles of metallic salts (fine particles of calcium sulfate, barium sulfate, calcium carbonate, and the like);

(3) Lubricant: fine particles of fluororesins (fine particles of vinylidene fluoride, polytetrafluoroethylene, and the like), and fine particles of fatty acid metallic salts (fine particles of zinc stearate, calcium stearate, and the like); and (4) Charge control fine particles: fine particles of metal oxides (fine particles of tin oxide, titanium oxide, zinc oxide, alumina, and the like), and carbon black.

Organic fine particles, such as silica fine particles, or inorganic fine particles may be subjected to hydrophobic treatment to improve the fluidity of toner and equalize the charge of toner particles.

Examples of a treatment agent for the hydrophobic treatment include unmodified silicone varnishes, various modified silicone varnishes, unmodified silicone oils, various modified silicone oils, silane compounds, silane coupling agents, other organic silicon compounds, and organic titanium compounds. These treatment agents may be used solely or in combination.

Known fine particles of silica may be used as the silica fine particles. The silica fine particles may be any one of fine particles of dry silica and fine particles of wet silica. The silica fine particles may be fine particles of wet silica (hereinafter, also referred to as sol-gel silica) obtained by sol-gel process.

Figure 7:
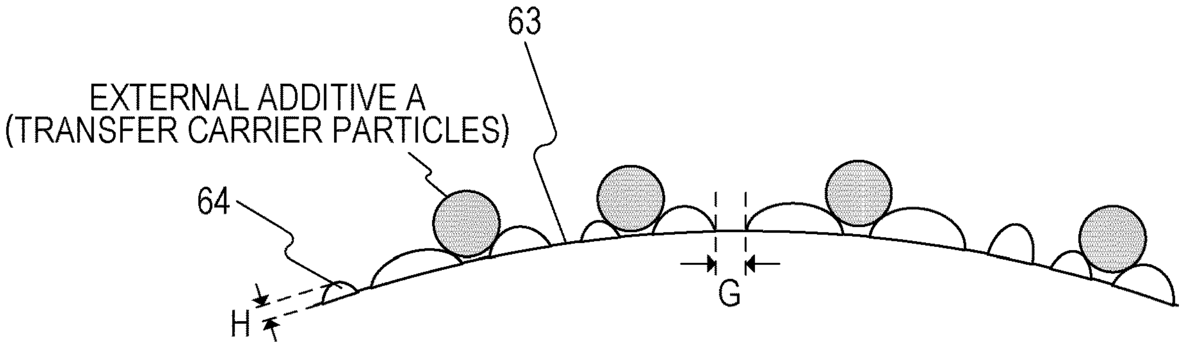
FIG. 7 is a schematic diagram of a toner particle and transfer carrier particles in the first embodiment.

FIG. 7 is an enlarged view of the developer used in the first embodiment. As shown in FIG. 7, the developer of the first embodiment is such that the external additive A made up of transfer carrier particles are disposed on a toner particle surface on which a large number of protruded portions made of organic silicon polymer are formed.

A protrusion gap G and a protrusion height H on the toner surface shown in FIG. 7 can be measured with a scanning transmission electron microscope (hereinafter, also referred to as STEM) (described later). The protrusion gap G and the protrusion height H can also be measured with a scanning probe microscope (hereinafter, SPM). A scanning probe microscope (hereinafter, SPM) includes a probe, a cantilever that supports the probe, and a displacement measurement system that detects the deflection of the cantilever. The scanning probe microscope observes the shape of a sample surface by detecting atomic force (attraction or repulsion) between the probe and the sample.

When the protrusion gap G is greater than the particle diameter of transfer carrier particles, transfer carrier particles contact with toner bases when disposed between protruded portions, and the adhesion Ft between transfer carrier particles and toner increases, with the result that transfer carrier particles are difficult to be transferred from toner to the photoconductor drum 1. For this reason, the number average value of the protrusion gap G can be less than the number average particle diameter of transfer carrier particles.

When the protrusion height H is greater than the particle diameter of transfer carrier particles, protruded portions contact with the photoconductor drum 1 in advance of transfer carrier particles, and transfer carrier particles are difficult to contact with the photoconductor drum 1, with the result that transfer carrier particles are difficult to be transferred from toner to the photoconductor drum 1. For this reason, the number average value of the protrusion height H can be less than the number average particle diameter of transfer carrier particles.

As described above, the adhesion Ft between transfer carrier particles and toner can be less than the adhesion Fdr between transfer carrier particles and the photoconductor drum 1. For this reason, the material of the transfer carrier particles can be selected so as to reduce the adhesion Ft of the transfer carrier particles to toner. For example, as in the case of the first embodiment, when the protruded portions on the toner surface are made of a silica-based material, such as an organic silica polymer, a silica-based material having a material composition similar to the material composition of the protruded portions can be selected as the material of transfer carrier particles to reduce the adhesion between the protruded portions and the transfer carrier particles.

The number of transfer carrier particles coating each toner particle can be greater the better from the viewpoint of supplying transfer carrier particles from the development roller 41 to the photoconductor drum 1. However, when the additive amount of transfer carrier particles is too much, the risk of contamination of members in the image forming apparatus 100 increases, so the additive amount of transfer carrier particles can be adjusted according to desired primary transferability.

Primary transferability improves with an increase in the coverage of transfer carrier particles on the photoconductor drum 1, and the coverage of transfer carrier particles coating the photoconductor drum 1 is preferably higher than or equal to 10% to obtain sufficient primary transferability. However, with an increase in the coverage of transfer carrier particles on the photoconductor drum 1, the degree of improvement in primary transferability slows down, and the risk of contamination of various members in the image forming apparatus due to transfer carrier particles increases. For this reason, the coverage of transfer carrier particles on the photoconductor drum 1 is preferably lower than or equal to 50%.

3. Method of Measuring Physical Properties of Developer

Hereinafter, various measuring methods will be described.

<Method of Observing Cross Section of Toner Particle with Scanning Transmission Electron Microscope (STEM)>

The cross section of a toner particle to be observed with a scanning transmission electron microscope (STEM) is prepared as follows.

Hereinafter, the procedure of preparing the cross section of a toner particle will be described. When organic fine particles or inorganic fine particles are externally added to toner, toner from which the organic fine particles or the inorganic fine particles are removed by the following method or the like is used as a sample.

160 g of sucrose (produced by Kishida Chemical, Co., Ltd.) is added to 100 mL of ion-exchanged water and dissolved while being warmed in hot water to prepare heavy sucrose solution. 31 g of the heavy sucrose solution and 6 mL of Contaminon® N (a pH7 aqueous solution containing 10 percent by mass of neutral detergent for washing precise measuring devices, made up of a nonionic surfactant, an anionic surfactant, and an organic builder, produced by Wako Pure Chemical Industries, Ltd.) are put in a centrifugation tube (a volume of 50 mL). 1.0 g of toner is added to the solution, and aggregates of toner are loosened with a spatula or the like. The centrifugation tube is shaken with a shaker (ΔS-1N sold by AS ONE Corporation) at 300 spm (strokes per min) for 20 minutes. After shaking, the solution is put in a swing rotor glass tube (50 mL) and separated with a centrifugal separator (H-9R, produced by KOKUSAN Co., Ltd.) at 3500 rpm for 30 minutes. Through this operation, toner particles and the external additive are separated. The situation in which the toner particles and the aqueous solution are sufficiently separated is visually checked, and the toner particles separated to a topmost layer are collected with a spatula or the like. After the collected toner particles are filtered with a vacuum filter, the collected toner particles are dried with a dryer for an hour or longer to obtain a test sample. This operation is performed multiple times to ensure the amount to be used.

Whether the protruded portions contain organic silicon polymer is checked in combination with elementary analysis using energy dispersive X-ray spectroscopy (EDS).

A layer of toner is applied onto a cover glass (Matsunami Glass Ind., Ltd., square cover glass; square No. 1), and an osmium (Os) film (5 nm) and a naphthalene film (20 nm) are applied as a protective film with an Os plasma coater (Filgen, Inc., OPC80T). Subsequently, a photocurable resin D800 (JEOL, Ltd.) is charged in a PTFE tube (outside diameter: 3 mm (bore diameter: 1.5 mm)×3 mm), and the cover glass is gently put on the tube such that the toner contacts with the photocurable resin D800. After light is irradiated in this state to cure the resin, the cover glass and the tube are removed. Thus, a columnar resin in the outermost surface of which the toner is embedded is formed. The columnar resin is cut from the outermost surface by the length of the radius of toner particles (for example, 4.0 μm when the weight average particle diameter (D4) is 8.0 μm) at a cutting speed of 0.6 mm/s with an ultrasonic ultramicrotome (Leica Camera, Inc., UC7) to expose the cross sections of toner central parts.

Subsequently, a sliced sample of the cross sections of toner particles is prepared by cutting the resin into a film thickness of 100 nm. By cutting the resin in such a manner, the cross sections of toner central parts are obtained.

JEM-2800 produced by JEOL, Ltd. was used as the scanning transmission electron microscope (STEM). The probe size of the STEM is 1 nm, and an image with an image size of 1024×1024 pixels is acquired. An image is acquired by adjusting Contrast to 1425 and Brightness to 3750 on a detector control panel for a bright field image and adjusting Contrast to 0.0, Brightness to 0.5, and Gammma to 1.00 on an image control panel. The image magnification is set to 100,000 times, and an image is acquired such that about a quarter to a half of the circumference of the cross section in a toner particle is fit as shown in FIG. 3. The obtained STEM image is subjected to image analysis with image processing software (Image J (available at https://imagej.nih.gov/ij/)) to measure protruded portions containing organic silicon polymer. The measurement is performed for 30 protruded portions randomly selected from the STEM image. Whether the protruded portions contain organic silicon polymer is checked by combining observation using a scanning electron microscope (SEM) with elementary analysis using energy dispersive X-ray spectroscopy (EDS). Initially, a line along the periphery of a toner base particle is drawn with a line drawing tool (select Segmented line on Straight tab). For a part where a protruded portion of organic silicon polymer is buried in the toner base particle, the burial is ignored, and a line is smoothly connected. The image is converted to a horizontal image with reference to the line (select Selection on Edit tab, change line width to 500 pixels in properties, then select Selection on Edit tab, and apply Straightener). In the horizontal image, one of the protruded portions containing organic silicon polymer is subjected to the following measurement. The length of the line along the periphery in a part where the protruded portion and the toner base particle form a continuous interface is defined as protrusion width w. The maximum length of the protruded portion in the direction of normal to the direction of the protrusion width w is defined as protrusion diameter D, and the length from the vertex of the protruded portion in a line segment forming the protrusion diameter D to the line along the periphery is defined as protrusion height H. The measurement is performed for the randomly selected 30 protruded portions, and an arithmetic average value of the measured values is obtained as the number average value of the protrusion height H.

<Method of Calculating H80>

In the STEM image of the cross sections of toner particles using the scanning transmission electron microscope (STEM), a cumulative distribution of the protrusion height H is obtained for the protruded portions having a protrusion height H of greater than or equal to 30 nm and less than or equal to 300 nm. The protrusion height corresponding to 80 percent by number and obtained by accumulating the protrusion height H in ascending order of the protrusion height H is defined as H80 (in nm).

<Method of Calculating Area Ratio of Bright Part Area in 1.5 μm-Square Backscattered Electron Image of Toner Particle Surface>

For the area ratio of the bright part area, the surface of a toner particle is observed with a scanning electron microscope. A 1.5 μm-square backscattered electron image of the toner particle surface is acquired. A binarized image is obtained such that an organic silicon polymer part in the backscattered electron image is a bright part, and the ratio of the bright part area of the image to the total area of the image is calculated. When organic fine particles or inorganic fine particles are externally added to toner, toner from which the organic fine particles or the inorganic fine particles are removed by the following method or the like is used as a sample.

160 g of sucrose (produced by Kishida Chemical, Co., Ltd.) is added to 100 mL of ion-exchanged water and dissolved while being warmed in hot water to prepare heavy sucrose solution. 31 g of the heavy sucrose solution and 6 mL of Contaminon® N (a pH7 aqueous solution containing 10 percent by mass of neutral detergent for washing precise measuring devices, made up of a nonionic surfactant, an anionic surfactant, and an organic builder, produced by Wako Pure Chemical Industries, Ltd.) are put in a centrifugation tube (a volume of 50 mL). 1.0 g of toner is added to the solution, and aggregates of toner are loosened with a spatula or the like. The centrifugation tube is shaken with a shaker (AS-1N sold by AS ONE Corporation) at 300 spm (strokes per min) for 20 minutes. After shaking, the solution is put in a swing rotor glass tube (50 mL) and separated with a centrifugal separator (H-9R, produced by KOKUSAN Co., Ltd.) at 3500 rpm for 30 minutes. Through this operation, toner particles and the external additive are separated. The situation in which toner particles and the aqueous solution are sufficiently separated is visually checked, and the toner particles separated to a topmost layer are collected with a spatula or the like. After the collected toner particles are filtered with a vacuum filter, the collected toner particles are dried with a dryer for an hour or longer to obtain a test sample. This operation is performed multiple times to ensure the amount to be used.

Whether the protruded portions contain organic silicon polymer is checked in combination with elementary analysis using energy dispersive X-ray spectroscopy (EDS) (described later).

The device and observation conditions of the SEM are as follows:

Device used: ULTRA PLUS produced by Carl Zeiss Microscopy Co., Ltd.;
Acceleration voltage: 1.0 kV;
WD: 2.0 mm;
Aperture Size: 30.0 μm;
Detected signal: EsB (energy selective backscattered electron);
EsB Grid: 800 V;
Visual magnification: 50,000 times;
Contrast: 63.0±5.0% (reference value);
Brightness: 38.0±5.0% (reference value);
Resolution: 1024×768; and
Preprocessing: Toner particles are dispersed on carbon tape (vapor deposition is not performed).

The acceleration voltage and EsB Grid are set so as to achieve the items, that is, acquiring the structural information of the outermost surface of toner particles, preventing a charge-up of an unevaporated sample, selectively detecting high-energy backscattered electrons. An area around a vertex where the curvature of a toner particle is the smallest is selected for an observation field of view. The fact that the bright part of a backscattered electron image came from organic silicon polymer was confirmed by superimposing an elemental mapping image that could be obtained with a scanning electron microscope (SEM) through energy dispersive X-ray spectroscopy (EDS) on the backscattered electron image.

The device and observation conditions of the SEM/EDS are as follows:

Device used (SEM): ULTRA PLUS produced by Carl Zeiss Microscopy Co., Ltd.;
Device used (EDS): NORAN System 7, Ultra Dry EDS Detector produced by Thermo
Fisher Scientific K.K.;
Acceleration voltage: 5.0 kV;
WD: 7.0 mm;
Aperture Size: 30.0 μm;
Detected signal: SE2 (secondary electron);
Visual magnification: 50,000 times;
Mode: Spectral Imaging; and
Preprocessing: Toner particles are dispersed on carbon tape, and platinum sputtering is applied.

The elemental mapping image of silicon, acquired in this technique, and the backscattered electron image are superimposed on top of each other, and the fact that the silicon atom part of the mapping image and the bright part of the backscattered electron image match each other.

The area ratio of the bright part area to the total area of the backscattered electron image was acquired by analyzing the backscattered electron image of the surface of the toner particle, obtained with the above-described technique, with the image processing software Image J (developed by Wayne Rashand). Hereinafter, the procedure will be described.

Initially, the backscattered electron image is converted to an 8-bit image from Type in Image menu. Subsequently, image noise is reduced by setting Median diameter to 2.0 pixels from Filters in Process menu. An image center is estimated while excluding an observation condition display section displayed below the backscattered electron image, and a 1.5 μm-square range is selected from the image center of the backscattered electron image with a rectangular tool on a toolbar. Subsequently, Threshold is selected from Adjust in Image menu. Default is selected, Auto is clicked, and then Apply is clicked to obtain a binarized image. With this operation, the bright part of the backscattered electron image is displayed in white. Again, an image center is estimated while excluding the observation condition display section displayed below the backscattered electron image, and a 1.5 μm-square range is selected from the image center of the backscattered electron image with the rectangular tool on the toolbar. Subsequently, Histogram in Analyze menu is selected. Count value (which corresponds to the total area of the backscattered electron image) is read from a newly opened Histogram window. In addition, List is clicked and Count value at a brightness of 0 (which corresponds to the bright part area of the backscattered electron image) is read. From the above values, the area ratio of the bright part area to the total area of the backscattered electron image is calculated. The above procedure is performed for 10 fields of view per toner particle to be evaluated, the number average value of the area ratios is calculated, and the calculated number average value is used as the area ratio (%) of the bright part area of the image to the total area of the image binarized such that the organic silicon polymer part in the backscattered electron image becomes a bright part.

<Method of Identifying Organic Silicon Polymer>

A method of identifying organic silicon polymer is performed by combining observation using a scanning electron microscope (SEM) with elementary analysis using energy dispersive X-ray spectroscopy (EDS).

Toner is observed in the field of view magnified up to 50,000 times with a scanning electron microscope "Hitachi Ultra-High Resolution Field Emission Scanning Electron Microscope S-4800" (Hitachi High-Technologies Corporation). While focusing on a toner particle surface, the surface is observed. Particles and the like present on the surface are subjected to EDS analysis, and whether the analyzed particles or the like are organic silicon polymer is determined in accordance with whether there is an Si element peak. When both organic silicon polymer and silica fine particles are included in a toner particle surface, the organic silicon polymer is identified by comparing the ratio of the elemental content (atomic %) of Si to the elemental content (atomic %) of O (Si/O ratio) with a sample. The samples of organic silicon polymer and silica fine particles each are subjected to ESD analysis under the same conditions, and the elementary content (atomic %) of each of Si and O is obtained. The Si/O ratio of organic silicon polymer is defined as A, and the Si/O ratio of silica fine particles is defined as B. A measurement condition in which A is significantly greater than B is selected. Specifically, the samples are measured 10 times in the same condition, and the arithmetic average value of each of A and B is obtained. A measurement condition that the obtained average values satisfy AB>1.1 is selected. When the Si/O ratio of a particle or the like to be identified is closer to A than (A+B)/2, the particle or the like is identified as organic silicon polymer.

Tospearl™ 120A (Momentive Performance Materials Japan LLC) is used as a sample of organic silicon polymer particles, and HDK V15 (Asahi Kasei Corporation) is used as a sample of silica fine particles.

<Method of Measuring Number Average Particle Diameter R of Primary Particles of External Additive>

Observation using a scanning electron microscope "Hitachi Ultra-High Resolution Field Emission Scanning Electron Microscope S-4800" (Hitachi High-Technologies Corporation) and elemental analysis using energy dispersive X-ray spectroscopy (EDS) are performed in combination.

In the field of view magnified up to 50,000 times, the images of external additive particles are randomly captured by using the above-described elemental analysis technique using EDS in combination. 100 external additive particles are randomly selected from the captured images, the longitudinal diameters of the primary particles of the selected external additive particles are measured, and the arithmetic average value of the longitudinal diameters is used as the number average particle diameter R. A visual magnification is adjusted as needed depending on the size of an external additive particle.

<Method of Identifying Composition and Ratio of Constituent Compounds of Organic Silicon Polymer>

NMR is used to identify the composition and ratio of constituent compounds of organic silicon polymer contained in toner. When toner contains an external additive, such as silica fine particles, other than organic silicon polymer, the following operation is performed.

1 g of toner is put in a vial container, dissolved in 31 g of chloroform, and dispersed. The solution is subjected to dispersion for 30 minutes with an ultrasonic homogenizer to prepare a dispersion solution.

Ultrasonic processor: ultrasonic homogenizer VP-050 (produced by TIETECH Co., Ltd.)
Microchip: step microchip, with a tip diameter of 2 mm
Tip end position of microchip: the center of a glass vial at a height of 5 mm from a vial bottom face
Ultrasonic wave condition: Strength 30%, 30 minutes At this time, ultrasonic wave is applied while the vial is cooled with ice water so that the temperature of the dispersion solution does not rise. The dispersion solution is put in a swing rotor glass tube (50 mL) and separated with a centrifugal separator (H-9R, produced by KOKUSAN Co., Ltd.) at 58.33 revolutions per second for 30 minutes. In the glass tube after centrifugal separation, particles with a high specific gravity, for example, silica fine particles, are contained in a lower layer. The chloroform solution containing organic silicon polymer in an upper layer is collected, chloroform is removed in vacuum drying (at 40° C. for 24 hours) to prepare a sample. By using the sample or organic silicon polymer, the presence amount ratio of constituent compounds in organic silicon polymer and the ratio of T3 unit structure expressed by R—$Si(O_{1/2})_3$ in the organic silicon polymer are measured and calculated by using solid $^{29}$Si-NMR.

Initially, a hydrocarbon group denoted by R is identified by using $^{13}$C-NMR. <<Measurement Condition of $^{13}$C-NMR (solid)>>

Device: JNM-ECX500II produced by JEOL RESONANCE
Sample tube: 3.2 mmϕ
Sample: sample or organic silicon polymer
Measurement temperature: room temperature
Pulse mode: CP/MAS
Measurement angular frequency: 123.25 MHz ($^{13}$C)
Reference material: adamantane (external standard: 29.5 ppm)
Sample rotation speed: 20 kHz
Contact time: 2 ms
Delay time: 2 s
Cumulated number: 1024

With the method, the hydrocarbon group denoted by R is identified in accordance with the presence or absence of a signal due to a methyl group combined with a silicon atom (Si—$CH_3$), an ethyl group combined with a silicon atom (Si—$C_2H_5$), a propyl group combined with a silicon atom (Si—$C_3H_7$), a butyl group combined with a silicon atom (Si—$C_4H_9$), a pentyl group combined with a silicon atom (Si—$O_5H_{11}$), a hexyl group combined with a silicon atom (Si—$C_6H_{13}$), a phenyl group combined with a silicon atom (Si—$C_6H_5$—), or the like. On the other hand, in the solid $^{29}$Si-NMR, peaks are detected in different shift ranges depending on the structure of a functional group combined with Si of the constituent compounds of organic silicon polymer. A structure combined with Si can be identified by identifying peak positions using a standard sample. The presence amount ratio of the constituent compounds can be calculated from the obtained peak areas. The ratio of a peak area of the T3 unit structure to all the peak areas can be calculated.

The measurement conditions of solid $^{29}$Si-NMR are specifically as follows:

Device: JNM-ECX5002 (JEOL RESONANCE);
Temperature: room temperature;
Measurement method: DDMAS method $^{29}$Si 45°;
Sample tube: zirconia 3.2 mmϕ;
Sample: filled in a test tube in a powder state;
Sample rotation speed: 10 kHz;
Relaxation delay: 180 s; and
Scan: 2000.

After the measurement, a plurality of silane components having a different substituent and a different linking group in the sample or the organic silicon polymer is subjected to peak separation by curve fitting into the following X1 structure, X2 structure, X3 structure, and X4 structure, and the respective peak areas are calculated.

The following X3 structure is the T3 unit structure.

X1 structure: $(Ri)(Rj)(Rk)SiO_{1/2}$ (A1)

X2 structure: $(Rg)(Rh)Si(O_{1/2})_2$ (A2)

X3 structure: $RmSi(O_{1/2})_3$ (A3)

X4 structure: $Si(O_{1/2})_4$ (A4)

X1 STRUCTURE

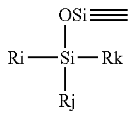

(A1)

X2 STRUCTURE

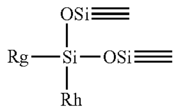

(A2)

X3 STRUCTURE

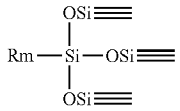

(A3)

X4 STRUCTURE

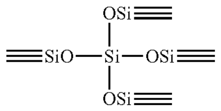

(A4)

In the chemical formulas A1, A2, and A3, Ri, Rj, Rk, Rg, Rh, and Rm each represent an organic group, such as hydrocarbon groups having a carbon number of 1 to 6, a halogen atom, a hydroxy group, an acetoxy group, or an alkoxy group, combined with silicon. When the structures need to be investigated in more detail, the structures may be identified in accordance with measurement results of $^{1}$H-NMR in combination with the measurement results of $^{13}$C-NMR and $^{29}$Si-NMR.

<Quantification Method for Organic Silicon Polymer or Silica Fine Particles Contained in Toner>

Toner is dispersed in chloroform as described above, and then samples are obtained by separating external additives such as organic silicon polymer and silica fine particles in accordance with a difference in specific gravity by using centrifugation. Then, the contents of the external additives such as organic silicon polymer and silica fine particles are determined.

Hereinafter, the case where the external additive is silica fine particles will be illustrated. Other fine particles can also be quantified with a similar technique.

Initially, pressed toner is measured with X-ray fluorescence and subjected to an analysis process, such as a calibration curve method and an FP method, to determine the content of silicon in the toner. Subsequently, for the constituent compounds of organic silicon polymer and silica fine particles, the structures are identified by using solid $^{29}$Si-NMR, pyrolysis GC/MS, and the like, and the contents of silicon in the organic silicon polymer and the silica fine particles are determined. In accordance with the relationship between the content of silicon in toner determined by X-ray fluorescence and the contents of silicon in the organic silicon polymer and the silica fine particles, determined by solid $^{29}$Si-NMR and pyrolysis GC/MS, the contents of the organic silicon polymer and silica fine particles in the toner are calculated.

<Method of Measuring Sticking Rate of External Additive such as Organic Silicon Polymer and Silica Fine Particles to Toner Base Particle or Toner Particle with Water Washing Method>

(Water Washing Step)

20 g of Contaminon® N (a pH7 aqueous solution containing 30 percent by mass of neutral detergent for washing precise measuring devices, made up of a nonionic surfactant, an anionic surfactant, and an organic builder) is weighed in a 50 mL vial and mixed with 1 g of toner. The obtained solution is set in KM Shaker (model: V.SX) produced by Iwaki Industry Co., Ltd., and shaking is performed at a set speed of 50 for 120 seconds. As a result, depending on the stuck state of the organic silicon polymer or the silica fine particles, the external additive such as the organic silicon polymer or the silica fine particles transfer from the toner base particles or the toner particle surfaces to the dispersion solution. After that, the toner and the external additive such as the organic silicon polymer or the silica fine particles having transferred to a supernatant solution are separated with a centrifugal separator (H-9R, produced by KOKUSAN Co., Ltd.) (at 16.67 revolutions per second for five minutes). The settled toner is dried and hardened in vacuum drying (at 40° C. for 24 hours) to obtain washed toner.

Subsequently, the images of the toner not subjected to the water washing process (unwashed toner) and the toner obtained through the water washing step (washed toner) are captured by using Hitachi Ultra-High Resolution Field Emission Scanning Electron Microscope S-4800 (Hitachi High-Technologies Corporation).

An object to be measured is identified by elementary analysis using energy dispersive X-ray spectroscopy (EDS).

The captured toner surface images are analyzed with an image analysis software Image-Pro Plus ver. 5.0 (Nippon Roper K.K.), and the coverages are calculated.

The imaging conditions of S-4800 are as follows.

(1) Sample Preparation

A light coating of electrically conductive paste is applied to a sample stage (aluminum sample stage, 15 mm×6 mm), and toner is sprayed onto the paste. By performing air blow, redundant toner is removed from the sample stage, and the paste is sufficiently dried. The sample stage is set in a sample holder, and the height of the sample stage is adjusted to 36 mm with a sample height gauge.

(2) Setting of S-4800 Observation Conditions

In measuring a coverage, the above-described elementary analysis using energy dispersive X-ray spectroscopy (EDS) is performed in advance to identify the external additive such as organic silicon polymer or silica fine particles on the toner surfaces, and then the coverage is measured. Liquid nitrogen is filled to overflowing into an anti-contamination trap attached to the housing of S-4800, and left standing for 30 minutes. "PC-SEM" of S-4800 is activated, and flushing (cleaning of an FE chip that is an electron source) is performed. An acceleration voltage display section in a control panel on the screen is clicked, and [Flushing] button is pressed to open a flushing execution dialog. It is confirmed that a flushing strength is set at 2, and flushing is executed. It is confirmed that an emission current for flushing is 20 to 40 μA. The sample holder is inserted in a sample chamber in the housing of S-4800. [Origin] on the control panel is pressed to move the sample holder to an observation position.

The acceleration voltage display section is clicked to open an HV setting dialog, the acceleration voltage is set to [1.1 kV], and the emission current is set to [20 μA]. In [Basic] tab on an operation panel, signal selection is set to [SE], an SE detector is set to an observation mode using a backscattered electron image by selecting [Up (U)] and [+BSE] and selecting [L.A.100] in a select box to the right of [+BSE]. Similarly, in [Basic] tab on the operation panel, a probe current in an electron optical system condition block is set to [Normal], a focal point mode is set to [UHR], and WD is set to [4.5 mm]. [ON] button on the acceleration voltage display section of the control panel is pressed to apply the acceleration voltage.

(3) Calculation of Number Average Particle Diameter (D1) of Toner

A magnification display section of the control panel is dragged to set the magnification to 5000 (5 k) times. A focus knob [COARSE] on the operation panel is rotated, and aperture alignment is adjusted at a point where the view comes into focus to a certain extent. [Align] on the control panel is clicked to display an alignment dialog, and [Beam] is selected. A STIGMA/ALIGNMENT knob (X,Y) on the operation panel is rotated to move a displayed beam to the center of concentric circles. Subsequently, [Aperture] is selected, and the STIGMA/ALIGNMENT knob (X,Y) is rotated one by one for adjustment such that movement of the image is stopped or minimum. The aperture dialog is closed, and the view is brought into focus by autofocusing. This operation is further repeated twice to bring the view into focus.

After that, the particle diameters of 300 particles of toner are measured, and the number average particle diameter (D1) is obtained. The particle diameter of each individual particle is the maximum diameter when the particle of toner is observed.

(4) Focus Adjustment

For the particles with the number average particle diameter (D1)±0.1 obtained in (3), the magnification display section of the control panel is dragged in a state where the middle point of the maximum diameter is placed in the center of the measurement screen, and the magnification is set to 10000 (10 k) times.

The focus knob [COARSE] on the operation panel is rotated, and aperture alignment is adjusted at a point where the view comes into focus to a certain extent. [Align] on the control panel is clicked to display the alignment dialog, and [Beam] is selected. The STIGMA/ALIGNMENT knob (X,Y) on the operation panel is rotated to move a displayed beam to the center of concentric circles. Subsequently, [Aperture] is selected, and the STIGMA/ALIGNMENT knob (X,Y) is rotated one by one for adjustment such that movement of the image is stopped or minimum. The aperture dialog is closed, and the view is brought into focus by autofocusing. After that, the magnification is set to 50,000 (50 k) times, focus adjustment is performed with the focus knob and the STIGMA/ALIGNMENT knob as in the case of the above, and the view is brought into focus again by autofocusing. This operation is repeated again to bring the view into focus. Here, when the inclination angle of an observation surface is large, coverage measurement accuracy tends to decrease. Therefore, the inclination angle at which the entire observation surface comes into focus at the same time is selected in focus adjustment to select the inclination angle at which the surface has almost no inclination, and then the observation surface is subjected to analysis.

(5) Image Saving

The brightness is adjusted in ABC mode, and a photograph with a size of 640×480 pixels is taken and saved. The following analysis is performed by using this image file. One photograph is taken for each toner particle, and images are obtained for toner particles.

(6) Image Analysis

The images obtained with the above-described technique are binarized by using the following analysis software to calculate coverages. At this time, the one screen is split into 12 sections in a square shape, and each section is subjected to analysis. The analysis conditions of the image analysis software Image-Pro Plus ver. 5.0 are as follows. However, when an external additive, such as an organic silicon polymer having particle diameters of less than 30 nm or greater than 300 nm or silica fine particles having particle diameters of less than 30 nm or greater than 1200 nm, is placed in a split section, the coverage in that section is not calculated.

In the image analysis software Image-Pro Plus 5.0, "Count/Size" and "Option" are selected in this order from "Measurement" on a toolbar, and binarization conditions are set. In an object extraction option, eight-connected is selected, and smoothing is set to 0. Other than that, sorting in advance, holes are filled, inclusion lines are not selected, and "Exclude boundary lines" is set to "None". "Measurement Item" is selected from "Measurement" on the toolbar, and 2 to $10^7$ is entered in an area selection range.

Calculation of the coverage is performed by surrounding a square region. At this time, the area (C) of the region is set to 24,000 to 26,000 pixels. Automatic binarization is performed by selecting "Process"-Binarization, and the total sum (D) of the area of a region where no external additive, such as organic silicon polymer or silica fine particles, is present is calculated. The coverage is determined from the area C of the square region and the total sum D of the area of the region where no external additive, such as organic silicon polymer or silica fine particles, is present by using the following expression.

$$\text{Coverage (\%)}=100-(D/C\times 100)$$

The arithmetic average value of all the obtained data is used as the coverage.

The coverage of each of the unwashed toner and the washed toner is calculated.

Then, (Coverage of washed toner)/(Coverage of unwashed toner)×100 is used as the "sticking rate" of the present disclosure.

4. Manufacturing Method for Toner Particles, External Additive, and Developer

Next, an example of manufacturing the toner particles, external additive A, and developer of the first embodiment will be described.

<Example of Manufacturing Toner Particles>

(Preparation of Aqueous Medium)

650.0 parts of ion-exchanged water and 14.0 parts of sodium phosphate (dodecahydrate, produced by Rasa Industries, Ltd.) were put in a reaction container equipped with an agitator, a thermometer, and a return tube, and maintained at 65° C. for 1.0 hour while nitrogen was being purged. While the above solution was being agitated at 15000 rpm with a T.K. Homomixer (produced by TOKUSHU KIKA KOGYO Co., Ltd.), a calcium chloride aqueous solution obtained by dissolving 9.2 parts of calcium chloride (dihydrate) in 10.0 parts of ion-exchanged water was put in the solution at a time to prepare an aqueous medium containing a dispersion stabilizer. Furthermore, 10 percent by mass of hydrochloric acid was put in the aqueous medium to adjust the pH to 5.0, with the result that an aqueous medium was obtained.

(Preparation of Polymerizable Monomer Composition)

Styrene: 60.0 parts

C.I. Pigment Blue 15:3: 6.5 parts

The above materials were put in an attritor (produced by Mitsui Mitsuike Chemical Engineering Machinery, Co., Ltd.), and dispersed at 220 rpm for 5.0 hours by using zirconia particles having a diameter of 1.7 mm, then the zirconia particles were removed, and a colorant dispersion solution was prepared.

Styrene: 20.0 parts n-Butyl acrylate: 20.0 parts

Crosslinking agent (divinylbenzene): 0.3 parts

Saturated polyester resin: 5.0 parts (a condensation polymer (a molar ratio of 10:12) of propylene oxide-modified bisphenol A (2-mol adduct) and terephthalic acid, with a glass transition temperature (Tg) of 68° C., a weight average molecular weight (Mw) of 10000, and a molecular weight distribution (Mw/Mn) of 5.12)

Fischer-Tropsch wax (melting point 78° C.): 7.0 parts

The above materials were added to the colorant dispersion solution, heated to 65° C., and dissolved and dispersed uniformly at 500 rpm with the T.K. Homomixer (produced by TOKUSHU KIKA KOGYO Co., Ltd.) to prepare a polymerizable monomer composition.

(Granulating Step)

The temperature of the aqueous medium was adjusted to 70° C. While the rotation speed of the T.K. Homomixer was kept at 15000 rpm, the polymerizable monomer composition was put into the aqueous medium 1, and 10.0 parts of t-butyl peroxypivalate that was a polymerization initiator was added. Then, granulation was directly performed for 10 minutes while the agitator was kept at 15000 rpm.

(Polymerization Step and Distillation Step)

After the granulation step, a propeller agitating blade was set in the agitator, polymerization was performed for 5.0 hours while the solution was being agitated at 150 rpm and held at 70° C., and then the temperature was increased to 85° C. and held for 2.0 hours. After that, the return tube of the reaction container was replaced with a cooling tube. The obtained slurry was heated to 100° C. and distilled for six hours to distill unreacted polymerizable monomer away to obtain a resin particle dispersion solution.

(Step of Forming Organic Silicon Polymer)

In a reaction container equipped with an agitator and a thermometer, 60.0 parts of ion-exchanged water was weighed and adjusted to a pH of 4.0 by using 10 percent by mass of hydrochloric acid. The solution was heated to a temperature of 40° C. while being agitated. After that, 40.0 parts of methyltriethoxysilane that was an organic silicon compound was added and agitated for two hours or longer to be hydrolyzed. The end of hydrolysis was visually determined when oil water was not separated and formed one layer, and the oil water was cooled to obtain a hydrolyzed solution of the organic silicon compound.

The temperature of the above-obtained resin particle dispersion solution was adjusted to 55° C., and 25.0 parts of the hydrolyzed solution of the organic silicon compound (the additive amount of organic silicon compound was 10.0 parts) was added to start polymerization of the organic silicon compound. The solution was directly held for 0.25 hours, and adjusted to a pH of 5.5 by using 3.0% sodium hydrogencarbonate solution. After the solution was held for 1.0 hour (condensation reaction 1) while agitation was being continued at 55° C., the solution was adjusted to a pH of 9.5 by using 3.0% sodium hydrogencarbonate solution, and was further held for 4.0 hours (condensation reaction 2) to obtain a toner-particle dispersion solution.

(Washing Step and Drying Step)

After the end of the step of forming organic silicon polymer, the toner-particle dispersion solution was cooled, hydrochloric acid was added to the toner-particle dispersion solution to adjust the pH to lower than or equal to 1.5, and the solution was left standing for 1.0 hour while being agitated. After that, the solution was subjected to solid-liquid separation with a pressure filter to obtain a toner cake. The obtained toner cake was reslurried with ion-exchanged water into dispersion solution again and subjected to solid-liquid separation with the above-described filter to obtain a toner cake. The obtained toner cake was put in a thermostatic bath of 40° C. and dried and classified by taking 72 hours to obtain toner particles.

<Example of Manufacturing External Additive A>

The external additive A was manufactured as follows. 150 parts of 5% aqueous ammonia was put in a 1.5 L glass reaction container equipped with an agitator, a dripping nozzle, and a thermometer to obtain an alkaline catalyst solution. After the alkaline catalyst solution was adjusted to 50° C., 100 parts of tetraethoxysilane and 50 parts of 5% aqueous ammonia were dripped at the same time while the solution was being agitated, and reacted for eight hours to obtain a silica fine particle dispersion solution. After that, the obtained silica fine particle dispersion solution was dried by spray drying, and crushed with a pin mill to obtain silica fine particles of which the number average particle diameter of primary particles was 100 nm as the external additive A.

<Example of Manufacturing Developer>

100 parts of the toner particles and 1.00 part of the external additive A were put in a Henschel Mixer® (FM10C model, produced by NIPPON COKE & ENGINEERING Co., Ltd.) in which 7° C. water was passed through a jacket. Subsequently, after the temperature of water in the jacket became stable at 7° C.±1° C., mixing was performed for 10 minutes at a rotary blade peripheral speed of 38 m/sec. In the mixing, the amount of water passing through the jacket was adjusted as needed so that the temperature in the tank of the Henschel mixer did not exceed 25° C. The obtained mixture was screened with a mesh having an aperture of 75 μm to obtain developer.

The physical properties of the developer are shown in Table 1.

TABLE 1

| NUMBER AVERAGE VALUE (nm) OF PROTRUSION HEIGHT H | NUMBER AVERAGE VALUE (nm) OF PROTRUSION GAP G | H80 (nm) | AREA RATIO (%) OF BRIGHT PART AREA | STICKING RATE (%) OF ORGANIC SILICON POLYMER | TYPE OF EXTERNAL ADDITIVE A | NUMBER AVERAGE PARTICLE DIAMETER R (nm) OF PRIMARY PARTICLES OF EXTERNAL ADDITIVE A | X | STICKING RATE (%) OF EXTERNAL ADDITIVE A |
|---|---|---|---|---|---|---|---|---|
| 50 | 30 | 75 | 60.0 | 99 | SILICA | 100 | 2.00 | 7 |

In Table, "X" denotes the ratio of the number average particle diameter R of primary particles of the external additive A to the number average value of the protrusion height H. When the manufactured developer was observed with an SEM, it was confirmed that the external additive A was placed as transfer carrier particles on the organic silicon polymer protruded portions of toner particles, and the average coverage number of the external additive A per toner particle was about 500.

5. Supply of Transfer Carrier Particles

Next, a manner of supplying transfer carrier particles to the photoconductor drum 1, which is one of the characteristics of the first embodiment, will be described. As described above, transfer carrier particles mean particles that play a role in improving the primary transfer efficiency of a toner image by reducing the adhesion between the toner image and the photoconductor drum 1 when interposed between the photoconductor drum 1 and the toner image developed on the photoconductor drum 1.

In the first embodiment, transfer carrier particles are supplied in advance to the surface of the photoconductor drum 1 by using toner carried on the development roller 41 before a toner image is developed. By coating the photoconductor drum 1 with transfer carrier particles in advance, transfer carrier particles are interposed between a toner image and the photoconductor drum 1.

Figure 8B:
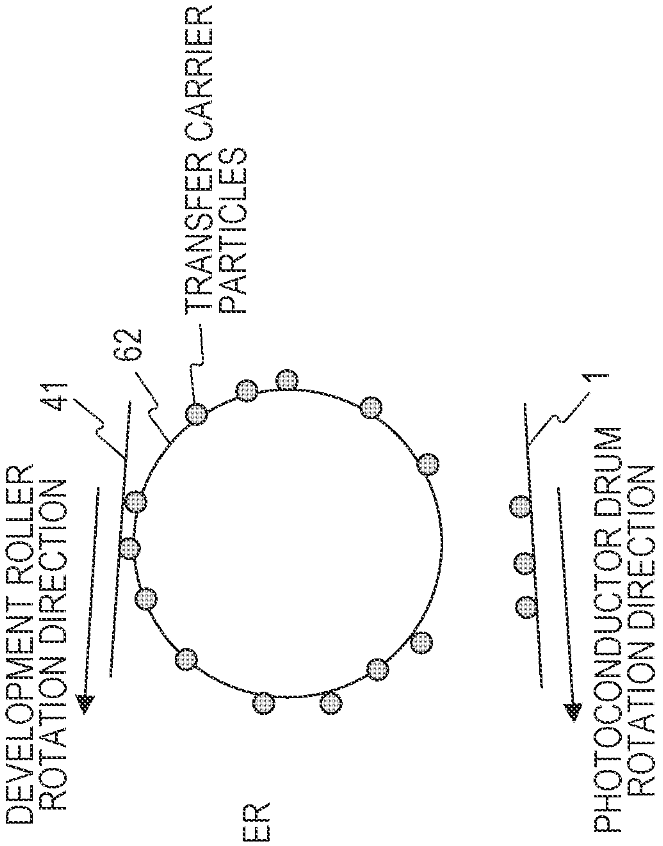
FIG. 8A and FIG. 8B are schematic diagrams at the time of supply of transfer carrier particles in the first embodiment.
Figure 8A:
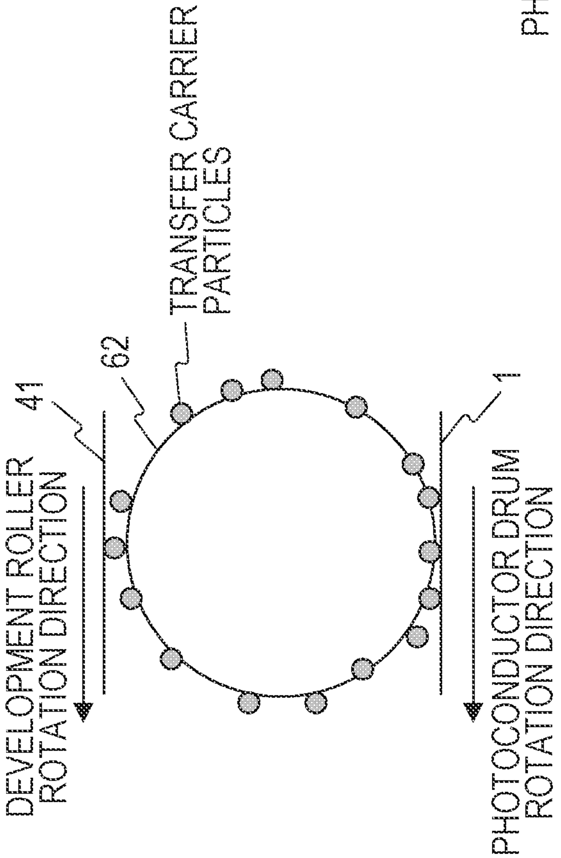

FIG. 8A is a schematic diagram of the developing nip portion when the development roller 41 and the photoconductor drum 1 contact with each other. As shown in FIG. 8A, toner particles carried on the development roller 41 and the photoconductor drum 1 are in contact with each other via the transfer carrier particles in the developing nip portion. FIG. 8B is a schematic diagram showing a state after toner carried on the development roller 41 and the photoconductor drum 1 pass through the developing nip portion. As shown in FIG. 8B, transfer carrier particles interposed between toner and the photoconductor drum 1 in the developing nip portion are supplied by transferring from the surface of toner carried on the development roller 41 to the surface of the photoconductor drum 1 after passing through the developing nip portion.

As shown in FIG. 8A, when the adhesion Ft between toner and transfer carrier particles interposed between the toner and the photoconductor drum 1 in the developing nip portion is greater than the adhesion Fdr between transfer carrier particles and the photoconductor drum 1, the transfer carrier particles are difficult to be transferred to the photoconductor drum 1. For this reason, Ft can be less than Fdr.

Figure 9B:
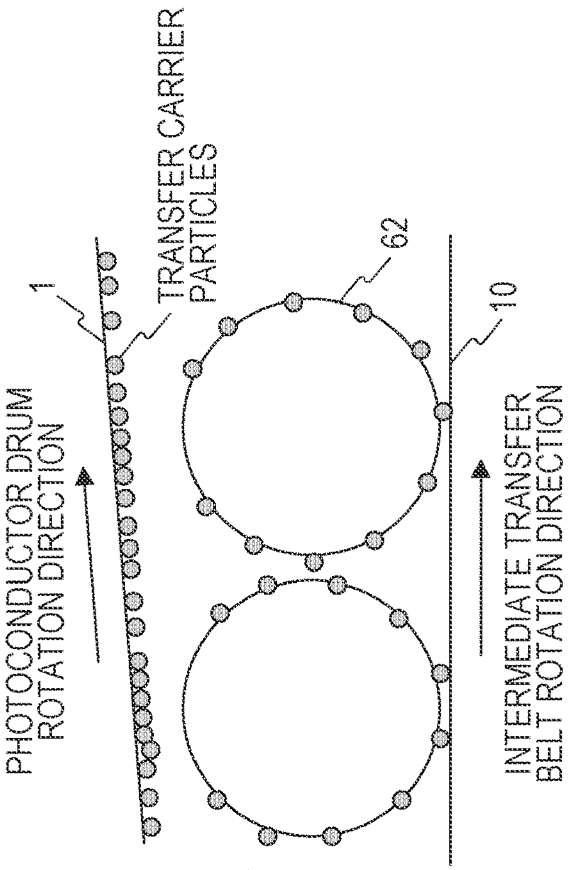
FIG. 9A and FIG. 9B are schematic diagrams at the time of primary transfer in the first embodiment.
Figure 9A:
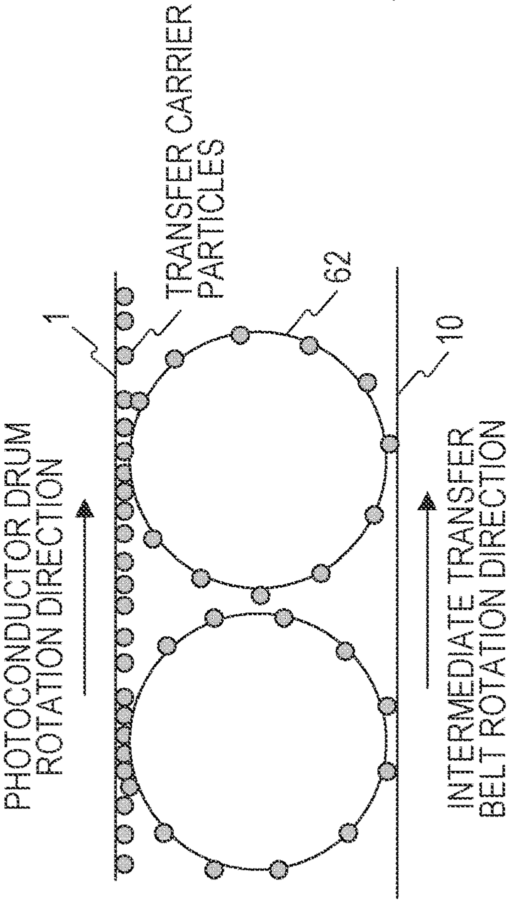

FIG. 9A is a schematic diagram of the primary transfer portion when a toner image is formed on the surface of the photoconductor drum 1. FIG. 9B is a schematic diagram of a state where primary transfer of the toner image shown in FIG. 9A ends and the photoconductor drum 1 and the intermediate transfer belt 10 are separate from each other. In the case where Ft is less than Fdr, when a toner image is primarily transferred from the photoconductor drum 1 to the surface of the intermediate transfer belt 10, only the toner image is transferred to the intermediate transfer belt 10, and the transfer carrier particles interposed between the toner image and the photoconductor drum 1 remain on the photoconductor drum 1.

Assuming the case where transfer carrier particles interposed between a toner image and the photoconductor drum 1 are primarily transferred to the intermediate transfer belt 10 together with the toner image and the transfer carrier particles are lost from the surface of the photoconductor drum 1. In this case, no transfer carrier particles are interposed between the photoconductor drum 1 and a toner image to be subsequently developed on the surface of the photoconductor drum 1 and the adhesion between the toner image and the photoconductor drum 1 is large, so primary transferability decreases.

Therefore, from the viewpoint of not only easily supplying transfer carrier particles from toner carried on the development roller 41 to the photoconductor drum 1 but also maintaining transfer carrier particles coated on the photoconductor drum 1, Ft can be less than Fdr.

Figure 10:
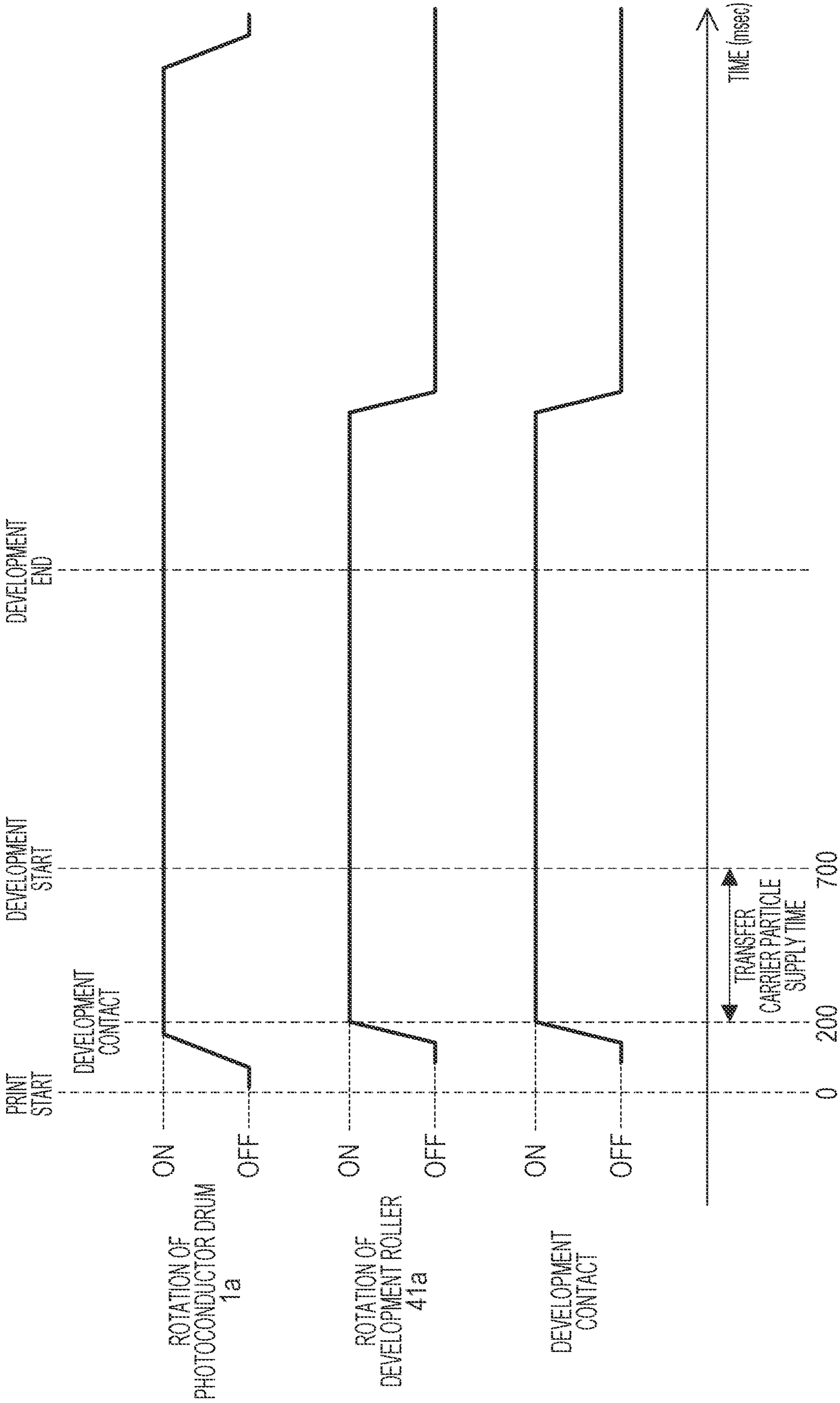
FIG. 10 is a timing chart of an image forming operation in the first embodiment.

FIG. 10 is a timing chart of a print operation of the image forming apparatus 100 used in the first embodiment. As shown in FIG. 10, during image forming operation, before the image forming apparatus 100 of the first embodiment starts development of toner from the development roller 41 to the photoconductor drum 1, the development roller 41 and the photoconductor drum 1 are driven for rotation in a contact state. Thus, a time to supply transfer carrier particles from the development roller 41 to the photoconductor drum 1 (transfer carrier particle supply mode) is provided.

To improve the primary transfer efficiency of a toner image over the entire surface of the photoconductor drum 1, the entire surface of the photoconductor drum 1 is coated with transfer carrier particles before development of a toner image is started. For this reason, a time to supply transfer carrier particles can be set to a time to rotate the photoconductor drum 1 one or more times. Therefore, in the first embodiment, to make it possible to coat transfer carrier particles over the entire surface of the photoconductor drum 1, the length of transfer carrier particle supply time, shown in FIG. 10, is set to 500 msec substantially equal to a time taken by the photoconductor drum 1 to rotate once.

In addition, in the first embodiment, in the transfer carrier particle supply time shown in FIG. 10, the surface potential of the photoconductor drum 1 is set to a non-image forming potential Vd=−500 V at which toner charged with a normal polarity is not developed. Therefore, in the transfer carrier particle supply time of the first embodiment, toner of which the normal polarity is a negative polarity is not developed from the development roller 41 to the surface of the photoconductor drum 1, and only transfer carrier particles are supplied from the development roller 41 to the photoconductor drum 1.

As in the case of the first embodiment, when transfer carrier particles are supplied from toner on the development roller 41 to the photoconductor drum 1 in a state where there is a potential difference between the development roller 41 and the photoconductor drum 1, there is the following inconvenience. When the particle diameter of transfer carrier particles is too large, the transfer carrier particles are susceptible to electrostatic force generated by a potential difference between the development roller 41 and the photoconductor drum 1. Therefore, it is difficult to control supply of transfer carrier particles from toner on the development roller 41 to the photoconductor drum 1. For example, as in the case of the first embodiment, in a configuration in which transfer carrier particles are supplied at a non-image forming potential, when transfer carrier particles are charged with a negative polarity, the transfer carrier particles are attracted by electrostatic force toward the development roller 41. Therefore, it is difficult to supply transfer carrier particles from toner on the development roller 41 to the photoconductor drum 1. Here, the particle diameter of transfer carrier particles is preferably set to less than or equal to 1000 nm at or below which the transfer carrier particles are less likely to be susceptible to electrostatic force. In the first embodiment, to stably supply transfer carrier particles from toner on the development roller 41 to the surface of the photoconductor drum 1 regardless of a potential difference between the development roller 41 and the photoconductor drum 1, particles with a particle diameter of 100 nm are used as transfer carrier particles.

The developer used in the first embodiment is a mixture of the above-described toner and transfer carrier particles. FIG. 7 is an enlarged view of the developer used in the first embodiment. As shown in FIG. 7, the developer of the first embodiment is such that transfer carrier particles are disposed on a toner surface on which a large number of protruded portions made of organic silicon polymer are formed. The protrusion gap G and the protrusion height H on the toner surface shown in FIG. 7 can be measured with a scanning probe microscope (hereinafter, SPM). A scanning probe microscope (hereinafter, SPM) includes a probe, a cantilever that supports the probe, and a displacement measurement system that detects the deflection of the cantilever. The scanning probe microscope observes the shape of a sample surface by detecting atomic force (attraction or repulsion) between the probe and the sample.

When the protrusion gap G is greater than the particle diameter of transfer carrier particles, transfer carrier particles contact with toner bases when disposed between protruded portions, and the adhesion Ft between transfer carrier particles and toner increases, with the result that transfer carrier particles are difficult to be transferred from toner to the photoconductor drum 1. For this reason, the protrusion gap G can be narrower than the particle diameter of transfer carrier particles. Therefore, when a closest distance between adjacent two of the protruded portions is a protrusion gap G, the average protrusion gap of the protrusion gaps G can be less than the average particle diameter of transfer carrier particles.

When the protrusion height H is greater than the particle diameter of transfer carrier particles, the protruded portions contact with the photoconductor drum 1 in advance of the transfer carrier particles, with the result that the transfer carrier particles are difficult to contact with the photoconductor drum 1. For this reason, the transfer carrier particles are difficult to be transferred from toner to the photoconductor drum 1, so the protrusion height H can be less than the particle diameter of transfer carrier particles. Therefore, when the height of each protruded portion from the surface of a toner particle is a protrusion height H, the average protrusion height of the protrusion heights H can be less than or equal to the average particle diameter of transfer carrier particles.

The protruded portions on the toner surface of the first embodiment were measured. The average protrusion gap of the protrusion gaps G on the toner surface was about 30 nm, and the average protrusion height of the protrusion heights H was 50 nm, and both the protrusion gap G and the protrusion height H were less than the particle diameter 100 nm of the transfer carrier particles.

The transfer carrier particles used in the first embodiment are silica particles with a particle diameter of 100 nm, manufactured by a sol-gel process. Silica is used as transfer carrier particles in the first embodiment; however, the material of transfer carrier particles is not limited to silica and may be various organic or inorganic fine particles. As described above, the adhesion Ft between transfer carrier particles and toner can be less than the adhesion Fdr between transfer carrier particles and the photoconductor drum 1. For this reason, the material of the transfer carrier particles can be selected so as to reduce the adhesion Ft of the transfer carrier particles to toner. For example, as in the case of the first embodiment, when the protruded portions on the toner surface are made of a silica-based material, such as an organic silica polymer, a silica-based material having a material composition similar to the material composition of the protruded portions can be selected as the material of transfer carrier particles. A silica-based material having a material composition similar to the material composition of the protruded portions can be selected from the viewpoint of reducing the adhesion between the protruded portions and the transfer carrier particles.

In addition, in the first embodiment, the additive amount of transfer carrier particles was adjusted such that the number of coating transfer carrier particles per toner particle was about 500. As the number of transfer carrier particles coating a toner particle increases, transfer carrier particles can be more supplied from the development roller 41 to the surface of the photoconductor drum 1. However, when the additive amount of transfer carrier particles is too much, the risk of contamination of members in the image forming apparatus 100 increases, so the additive amount of transfer carrier particles can be adjusted according to desired primary transferability.

In addition, primary transferability improves to some extent with an increase in the coverage of transfer carrier particles coating the surface of the photoconductor drum 1. However, with an increase in the coverage of transfer carrier particles coating the surface of the photoconductor drum 1, the degree of improvement in primary transferability slows down, and the risk of contamination of various members in the image forming apparatus due to transfer carrier particles increases. For this reason, the coverage of transfer carrier particles coating the surface of the photoconductor drum 1 is preferably lower than or equal to 80%.

6. Effects of Transfer Carrier Particles

Next, an effect confirmation test conducted to confirm the effect of the manner of supplying transfer carrier particles to the photoconductor drum 1 in the first embodiment will be described.

Initially, a patch image with a yellow density of 100% was formed by using the image forming apparatus 100 in which a new photoconductor drum 1 not coated with transfer carrier particles was set. Immediately after primary transfer of the formed yellow patch image ended, the image forming apparatus 100 was stopped. At this time, the residual toner density on a patch image part, remaining on the surface of the photoconductor drum 1*a* of the yellow station, was checked.

Measurement of the residual toner density was performed by the following technique. Initially, a transparent tape (polyester tape 5511 Nichiban Co., Ltd.) was stuck to the residual toner part of the yellow patch image on the surface of the photoconductor drum 1*a*, and the residual toner was trapped by the transparent tape. After that, the transparent tape trapping the residual toner and peeled from the surface of the photoconductor drum 1*a* and a new transparent tape were stuck on high-brightness paper (GFC081 Canon, Inc.). Then, the density D1 of the transparent tape of the residual toner trapping part and the density D0 of the new transparent tape part each were measured with a reflection densitometer (Reflectometer model TC-6DS, produced by TokyoDenshoku Co., Ltd.). The difference "D0–D1" obtained through the measurement was determined as a residual toner density. A residual toner density means that residual toner reduces as the numeric value reduces. When the value is less than or equal to 1.0, it may be determined that there is almost no residual toner, and an adverse effect in an image that occurs due to adhesion to the charging roller 2*a* or the like does not occur.

The surface of the photoconductor drum 1*a*, of which the residual toner density was measured, was observed with a microscope, and the coverage of transfer carrier particles coating the surface of the photoconductor drum 1*a* was calculated. Specifically, the coverage was calculated in the following procedure from an observed image at a magnification of 3000 times with a laser microscope (VK-X200 Keyence Corporation) on the surface of the photoconductor drum 1*a*. A transfer carrier particle part and the other part were binarized, and the total area ratio of transfer carrier particles to the surface of the photoconductor drum 1*a* was calculated as the coverage of transfer carrier particles on the surface of the photoconductor drum 1*a*.

The adhesion between transfer carrier particles and toner, used in the first embodiment, was measured with an SPM. Specifically, transfer carrier particles were fixed to the lever tip end of a cantilever, and the cantilever was pressed against toner with a predetermined pressing force. After that, the force needed to separate the cantilever from the toner was measured as the adhesion Ft between the transfer carrier particles and the toner.

The predetermined pressing force to press the cantilever against the toner in measuring the adhesion can be set to a force with which the transfer carrier particles interposed between the toner and the photoconductor drum 1 is pressed against the toner in the developing nip portion. The pressing force was calculated with a calculation method described below. Here, the phrase "the transfer carrier particles are interposed between the toner and the photoconductor drum 1 in the developing nip portion" means a state where the transfer carrier particles are in contact with both the toner and the photoconductor drum 1 at the same time.

Figure 11A:
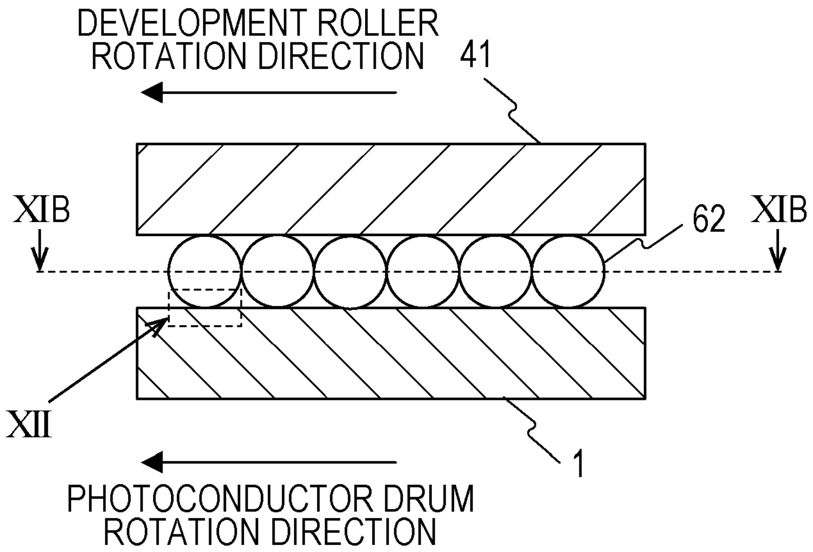
FIG. 11A and FIG. 11B are diagrams showing a contact state of toner in a developing portion in the first embodiment.
Figure 11B:
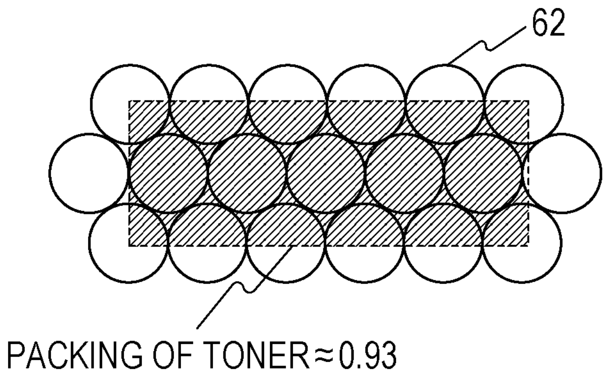
Figure 12:
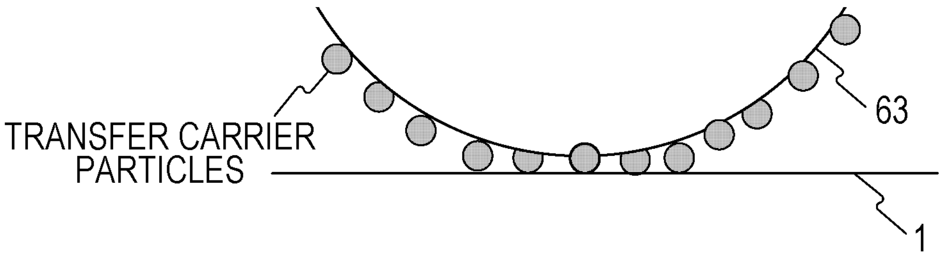
FIG. 12 is a diagram showing a state where a toner particle and transfer carrier particles are present in the developing portion in the first embodiment.

Initially, to calculate the pressing force, an assumption will be described with reference to FIG. 11A, FIG. 11B, and FIG. 12. FIG. 11A is a schematic diagram of the developing nip portion. It was assumed that the development roller 41 and the photoconductor drum 1 were in contact with each other via toner in the developing nip portion. FIG. 11B is a cross-sectional view taken parallel to the surface of the photoconductor drum 1 along the dashed line XIB-XIB in FIG. 11A. It was assumed that toner in contact with the photoconductor drum 1 were in closest packing as indicated in the shaded part. FIG. 12 is an enlarged schematic diagram of the contact portion between toner and the photoconductor drum 1, surrounded by the dashed line XII in FIG. 11A. As shown in FIG. 12, it was assumed that toner and the photoconductor drum 1 were in contact with each other via transfer carrier particles. In addition, it was assumed that transfer carrier particles were yet to be supplied to the surface of the photoconductor drum 1 and transfer carrier particles were not present in advance on the surface of the photoconductor drum 1.

On the above-described assumption, the total number N of transfer carrier particles interposed between toner and the photoconductor drum 1 in the developing nip portion was calculated as follows. By using the calculated number N and the contact force F between the development roller 41 and the photoconductor drum 1, F/N that is a pressing force per transfer carrier particle against toner in the developing portion was calculated, and the calculated F/N was used as the predetermined pressing force of the cantilever against toner in measuring the adhesion.

Initially, a method of calculating the total number N of transfer carrier particles interposed between toner and the photoconductor drum 1 in the developing nip portion will be described.

Figure 13A:
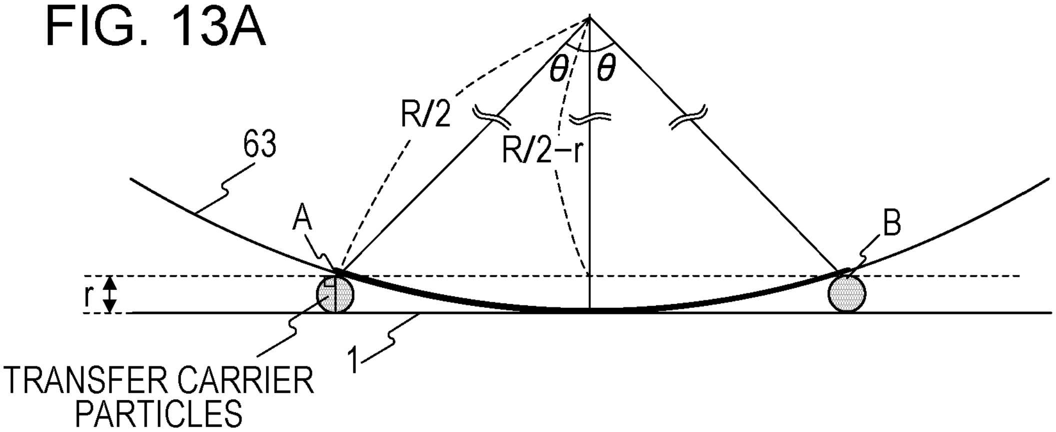
FIG. 13A and FIG. 13B are diagrams showing a state of transfer carrier particles in the developing portion in the first embodiment.
Figure 13B:
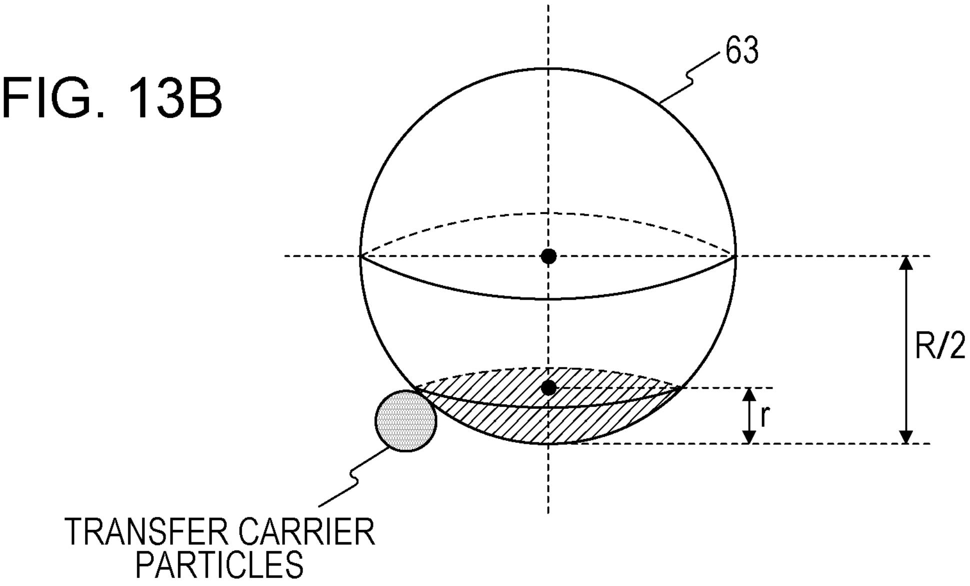

FIG. 13A is a two-dimensional schematic diagram of a contact state among a toner particle, transfer carrier particles, and the photoconductor drum 1 in the developing portion. As shown in FIG. 13B, where the particle diameter of a transfer carrier particle is r, the transfer carrier particle on a toner particle almost does not contact with the photoconductor drum 1 when the distance between the photoconductor drum 1 and the toner particle surface exceeds r. Therefore, a toner circumferential part on which transfer carrier particles disposed on a toner circumference can contact with the photoconductor drum 1 is a circular arc connecting A and B. Actually, a toner particle needs to be considered as a sphere as shown in FIG. 13B, and the ratio of a surface area (shaded part in FIG. 13B) obtained by integrating the circular arc AB in the circumferential direction to a toner particle surface area needs to be obtained. The surface area of the shaded part can be generally calculated as the surface area of a spherical crown and expressed as the expression 2. Therefore, the ratio to the toner particle surface area is expressed as the expression 3. An actual value can be calculated from the average particle diameter R of toner and the particle diameter r of transfer carrier particles.

$$\text{SHADED TONER SURFACE AREA IN WHICH TRANSFER CARRIER PARTICLE CAN CONTACT WITH PHOTOSENSITIVE DRUM 1} = 2\pi\left(\frac{R}{2}\right)r \quad (2)$$

$$\text{RATIO OF SHADED AREA TO TONER SURFACE AREA} = 2\pi\left(\frac{R}{2}\right)r/4\pi\left(\frac{R}{2}\right)^2 \quad (3)$$

AVERAGE PARTICLE DIAMETER *R* OF TONER = 7.0 μm = 7000 nm

PARTICLE DIAMETER *r* OF TRANSFER CARRIER PARTICLES = 100 nm

Through the above calculation, the ratio of the circular arc AB to the toner circumferential part in the configuration of the first embodiment is calculated as about 1.43%.

Therefore, it is presumable that the region in which transfer carrier particles are interposed between a toner particle and the photoconductor drum 1 in the developing nip portion is about 1.43% of the entire toner particle surface. Since the number of coating transfer carrier particles per toner particle is 500, the number M of transfer carrier particles interposed between toner and the photoconductor drum 1 per toner particle is calculated by 500×1.43% and is about 7.2.

The total number of toner particles in contact with the photoconductor drum 1 in the developing portion is multiplied by 7.2 that is the number of transfer carrier particles interposed between toner and the photoconductor drum 1 per toner particle. As a result, the total number N of transfer carrier particles interposed between toner and the photoconductor drum 1 in the developing nip portion can be calculated.

The total number L of toner particles in contact with the photoconductor drum 1 in the developing nip portion can be calculated by (Area of the developing nip portion)×(Packing of toner)/(Maximum cross-section area of a toner particle).

(Total number of toner particles in contact with the photoconductor drum 1 in the developing nip portion)=(220 [mm]×2.0 [mm]×π/√12)/(π×(7.0/2)$^2$)=About 10.37×10$^6$ (π/√12≈0.9069 that is the closest packing of a two-dimensional circle is used.)

Therefore, the total number N of transfer carrier particles interposed between toner and the photoconductor drum 1 in the developing nip portion is calculated as follows. The total number N is calculated by multiplying "the total number of toner particles in contact with the photoconductor drum 1 in the developing nip portion" by "the number of transfer carrier particles interposed between toner and the photoconductor drum 1 per toner particle" and is calculated as about 7.47×10$^7$.

Since the pressing force of the developing portion 41 against the photoconductor drum 1 in the first embodiment is F=200 gf, F/N that is the pressing force per transfer carrier particle against toner in the developing portion is determined as 26.3 nN. The thus determined value of F/N was used as the predetermined pressing force with which the cantilever was pressed against toner in measuring the adhesion with the SPM. Similar adhesion measurement was also performed for the photoconductor drum 1, and the adhesion Fdr between transfer carrier particles, fixed at the tip end of the cantilever, and the photoconductor drum 1 was measured.

The results of effect confirmation test for the first embodiment will be described. As shown in FIG. 14, in the configuration of the first embodiment, the residual toner density was 0.8%, and almost no residual toner was present, and it was confirmed that high transferability was obtained. In addition, the transfer carrier coverage on the surface of the photoconductor drum 1 of the first embodiment was 61.7%, and it was confirmed that the photoconductor drum 1 was sufficiently coated with transfer carrier particles. In addition, in the first embodiment, as shown in FIG. 15, the adhesion between transfer carrier particles and toner was 32.8 (nN), and the adhesion between transfer carrier particles and the photoconductor drum 1 was 210.1 (nN). In other words, it was confirmed that, in the first embodiment, the adhesion between transfer carrier particles and toner was less than the adhesion between transfer carrier particles and the photoconductor drum 1.

On the other hand, in Comparative Example 1, the configuration of developer in which the adhesion between transfer carrier particles and the photoconductor drum 1 was greater than the adhesion between transfer carrier particles and toner was adopted. Specifically, the developer was such that toner particle surfaces were not coated with organic silica polymer or the like unlike the configuration of the first embodiment and transfer carrier particles were directly externally added to toner particle surfaces. When the developer of Comparative Example 1 was used, the residual toner density was 4.1%. As residual toner increases, an adverse effect in an image due to charging failure or the like resulting from contamination of the charging roller 2 can occur. In addition, in Comparative Example 1, as shown in FIG. 15, the adhesion between transfer carrier particles and toner was 304.6 (nN), and the adhesion between transfer carrier particles and the photoconductor drum 1 was 210.1 (nN). In other words, it was confirmed that, in Comparative Example 1, the adhesion between transfer carrier particles and toner was greater than the adhesion between transfer carrier particles and the photoconductor drum 1.

From the above results, the first embodiment has the following configuration.

The image forming apparatus 100 includes the rotatable photoconductor drum 1, and the rotatable development roller 41 that carries developer made up of toner particles and transfer carrier particles adhered to the surfaces of the toner particles. The development roller 41 contacts with the photoconductor drum 1 to form the developing nip portion and supplies the developer to the surface of the photoconductor drum 1 in the developing nip portion. The image forming apparatus 100 includes the developer containing portion 4 that contains the developer. The image forming apparatus 100 includes the transfer roller 14 that transfers the developer, supplied to the surface of the photoconductor drum 1, to the intermediate transfer belt 10 serving as a transfer-receiving member, the photoconductor drum drive 110 that drives the photoconductor drum 1, and the control section 200 that controls the photoconductor drum drive 110. In the configuration of the first embodiment, in a state where the photoconductor drum 1 is rotating, transfer carrier particles carried on the surface of the development roller 41 can be supplied to the surface of the photoconductor drum 1 in the developing nip portion. Here, the pressing force pressing the development roller 41 against the photoconductor drum 1 is defined as F, and the total number of transfer carrier particles interposed between toner particles and the photoconductor drum 1 is defined as N. The adhesion between a transfer carrier particle and a toner particle, measured when the transfer carrier particle is pressed against the toner particle with F/N that is the pressing force per unit carrier particle, is defined as Ft. The adhesion between a transfer carrier particle and the photoconductor drum 1, measured when the transfer carrier particle is pressed against the photoconductor drum 1 with F/N, is defined as Fdr. The adhesion Ft and the adhesion Fdr satisfy Ft≤Fdr. The image forming apparatus 100 is capable of executing the image forming mode in which the developer is developed on an electrostatic latent image and the supply mode in which transfer carrier particles are supplied from the development roller 41 to the photoconductor drum 1.

As described above, in the configuration of the first embodiment, by effectively supplying transfer carrier particles to the surface of the photoconductor drum 1, transfer efficiency is improved.

In the first embodiment, the development roller 41 is driven for rotation in the forward direction relative to the surface moving direction of the photoconductor drum 1 such that the peripheral speed of the development roller 41 is equal to the peripheral speed of the photoconductor drum 1 in the developing nip portion. In a second embodiment, a peripheral speed difference is provided between the development roller 41 and the photoconductor drum 1 by rotating the development roller 41 at a peripheral speed higher by 40% than the photoconductor drum 1 in the developing nip portion.

Figure 16:
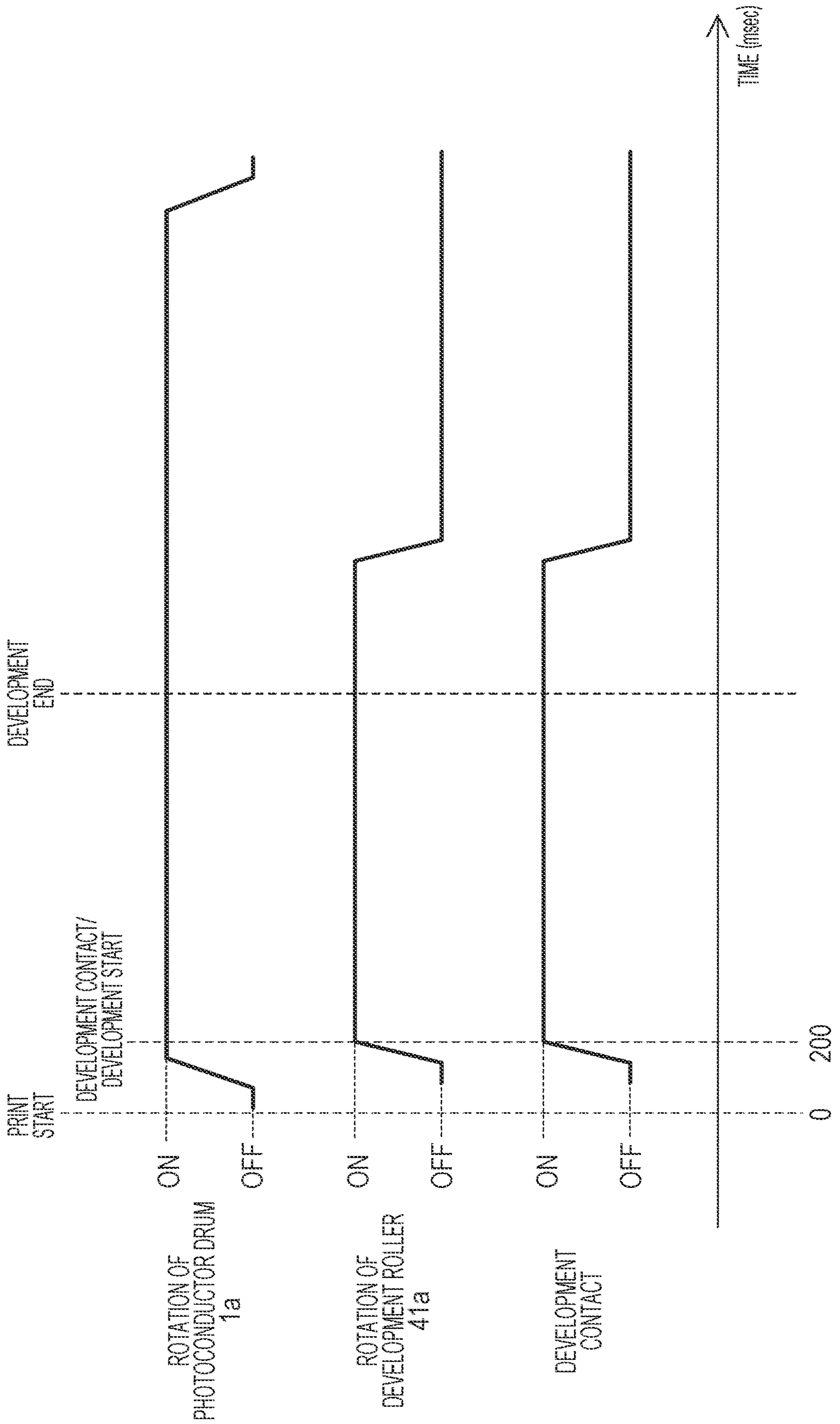
FIG. 16 is a timing chart of an image forming operation in a second embodiment.

In addition, in the second embodiment, as shown in FIG. 16, a developing operation is configured to be started immediately after development contact in an image forming operation, and no time to supply transfer carrier particles is set before development start. The other configuration is similar to that of the first embodiment, so the description is omitted.

Hereinafter, the operation of the second embodiment will be described.

Figure 17A:
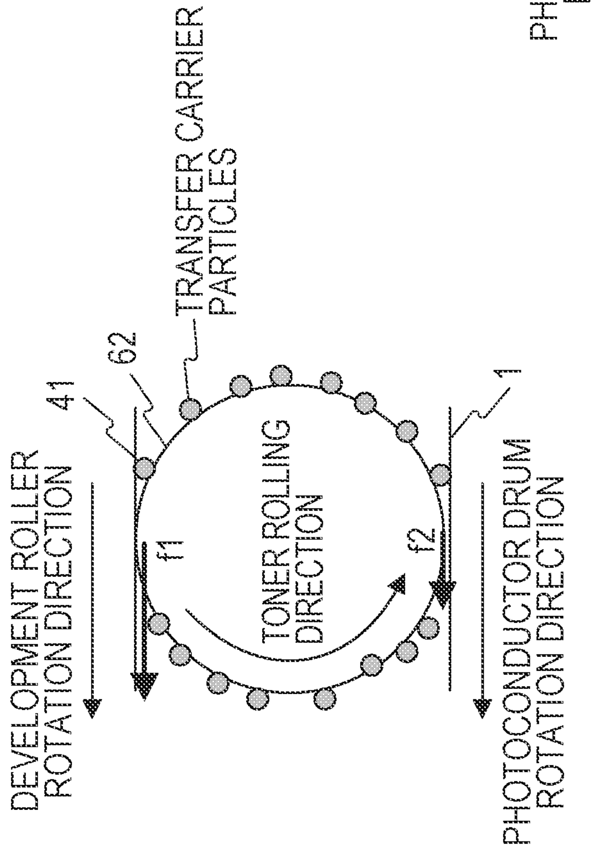
FIG. 17A and FIG. 17B are diagrams illustrating the mechanism of supply of transfer carrier particles in a non-image forming operation in a developing portion in the second embodiment.

FIG. 17A is a schematic diagram showing the behavior of toner and transfer carrier particles in the developing nip portion when the development roller 41 and the photoconductor drum 1 are set in a non-image forming potential relation. As shown in FIG. 17A, because of the peripheral speed difference between the development roller 41 and the photoconductor drum 1, the following phenomenon occurs.

Figure 17B:
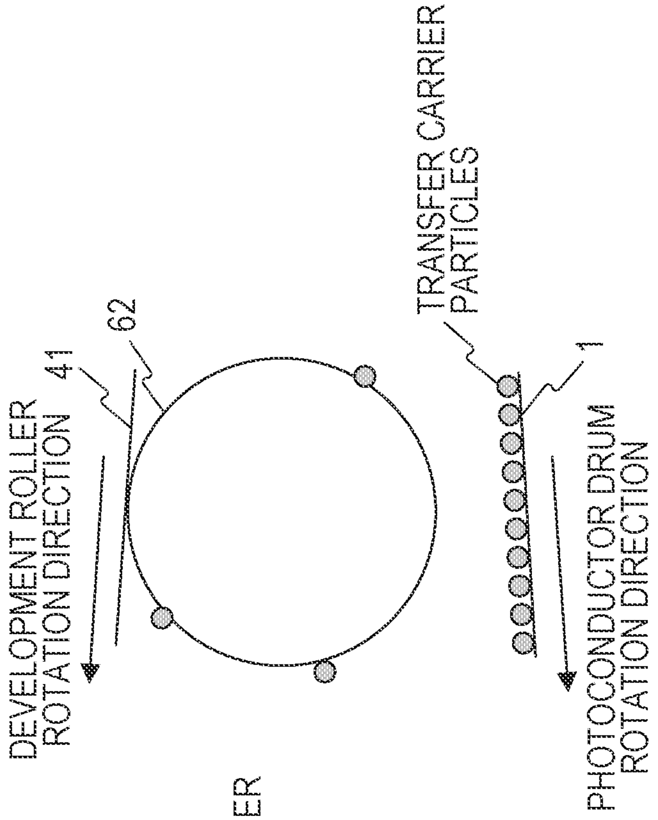

A force parallel to the rotation direction of the development roller 41, which the toner interposed between the development roller 41 and the photoconductor drum 1 receives from the development roller 41, is defined as f1. A force parallel to the rotation direction of the photoconductor drum 1, which the toner interposed between the development roller 41 and the photoconductor drum 1 receives from the photoconductor drum 1, is defined as f2. Under the conditions described in the first embodiment, f1 and f2 balance each other; whereas, in the configuration of the second embodiment, f1 and f2 do not balance each other, and the toner rolls in the developing nip portion. As the toner rolls, transfer carrier particles on the toner, not in contact with the photoconductor drum 1, also move with the rolling of the toner. For this reason, transfer carrier particles can contact with the photoconductor drum 1, so the opportunity to supply transfer carrier particles from toner to the surface of the photoconductor drum 1 increases. Therefore, as shown in FIG. 17B, transfer carrier particles greater in number than those of the first embodiment can be supplied from toner on the development roller 41 to the surface of the photoconductor drum 1 after passage of the developing nip.

Figure 18A:
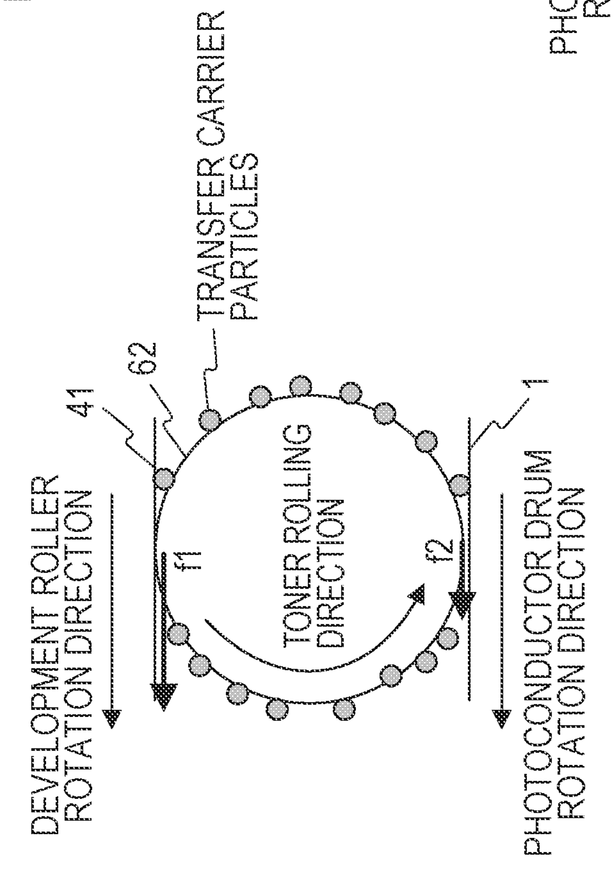
FIG. 18A and FIG. 18B are diagrams illustrating the mechanism of supply of transfer carrier particles in an image forming operation in the developing portion in the second embodiment.
Figure 18B:
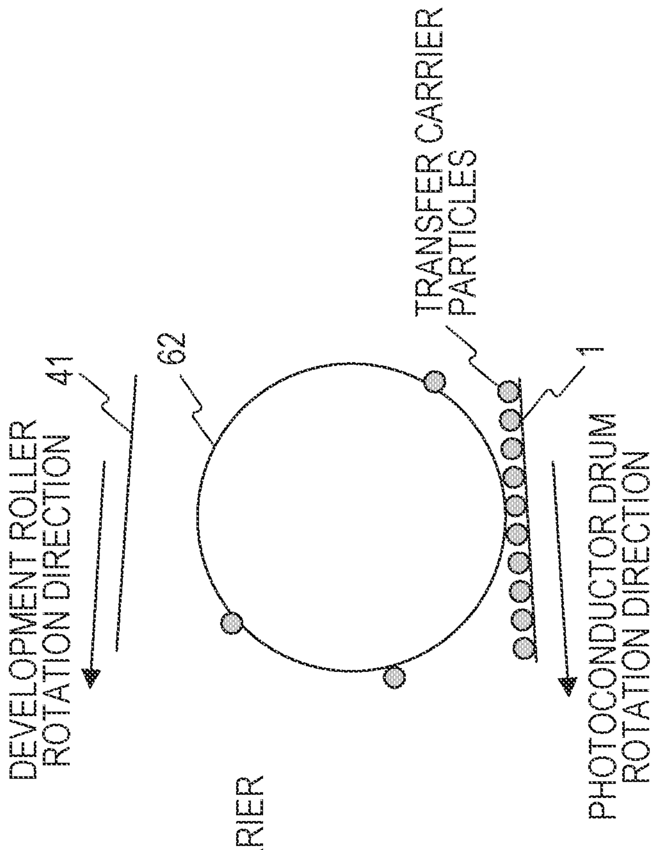

FIG. 18A is a schematic diagram showing the behavior of toner and transfer carrier particles in the developing nip portion when the development roller 41 and the photoconductor drum 1 are set in an image forming potential relation. As shown in FIG. 18A, when the development roller 41 and the photoconductor drum 1 are set in an image forming potential relation as well, the following phenomenon occurs because of the peripheral speed difference between the development roller 41 and the photoconductor drum 1. Toner rolls in the developing nip portion, and the efficiency of supplying transfer carrier particles from the surface of toner to the surface of the photoconductor drum 1 in the developing nip portion improves. As shown in FIG. 18B, the development roller 41 and the photoconductor drum 1 is set in an image forming potential relation, so, after passage of the developing nip portion, toner is developed from the development roller 41 on the surface of the photoconductor drum 1. Because the efficiency of supplying transfer carrier particles from the surface of toner to the surface of the photoconductor drum 1 at the time of passage of the developing nip portion is improved, a large amount of transfer carrier particles can be interposed between the photoconductor drum 1 and toner developed on the surface of the photoconductor drum 1.

Therefore, in the second embodiment, even when the transfer carrier particle supply time is not set before an image forming operation unlike the first embodiment, transfer carrier particles can coat the surface of the photoconductor drum 1 simultaneously with development, and transfer carrier particles can be interposed between a toner image and the photoconductor drum 1.

In addition, in the second embodiment, no cleaning member is provided on the surface of the photoconductor drum 1. However, because transfer carrier particles can be supplied simultaneously with development, transfer efficiency is suitably improved even when a cleaning member is provided on the surface of the photoconductor drum 1. Even with a configuration in which transfer carrier particles coating the surface of the photoconductor drum 1 are collected by the cleaning member every rotation of the photoconductor drum 1, the effect of improving primary transfer efficiency with transfer carrier particles is obtained. Of course, even a configuration in which a cleaning member is provided in the case of driven rotation where no peripheral speed difference occurs between the development roller 41 and the photoconductor drum 1 as in the case of the first embodiment is not excluded as long as transfer carrier particles are sufficiently supplied.

Next, the results obtained by confirming the effects of the second embodiment by performing measurement of the residual toner density of a yellow patch image and measurement of the coverage of transfer carrier particles on the surface of the photoconductor drum 1 with a similar method to that of the first embodiment in the configuration of the second embodiment will be described.

As shown in FIG. 14, in the configuration of the second embodiment as well, the residual toner density was 0.7%, and almost no residual toner was present, and it was confirmed that high transferability was obtained. In addition, as shown in FIG. 14, the transfer carrier coverage on the surface of the photoconductor drum 1 of the second embodiment was 62.2%, and it was confirmed that the photoconductor drum 1 was sufficiently coated with transfer carrier particles.

From the above results, the second embodiment provides the image forming apparatus having the following configuration.

When the photoconductor drum drive 110 is a first drive, the development roller drive 130 that drives the development roller 41 is a second drive. The control section 200 controls the second drive such that, in the developing nip portion, the surface moving speed of the development roller 41 is different from the surface moving speed of the photoconductor drum 1.

As described above, in the configuration of the second embodiment, by further effectively supplying transfer carrier particles to the surface of the photoconductor drum 1, transfer efficiency is improved.

In the configuration of the second embodiment, the intermediate transfer system that uses the intermediate transfer belt 10 is adopted; however, a direct transfer system that directly transfers a toner image to a recording medium P may be adopted. For example, a recording medium P may be placed on a transfer belt and a toner image may be directly transferred from the photoconductor drum 1 to the recording medium P, or the belt configuration does not need to be used.

As described above, according to the present disclosure, by effectively supplying fine particles from the developing device to the surface of the photoconductor drum, transfer efficiency is improved.

1. Image Forming Apparatus

Figure 20:
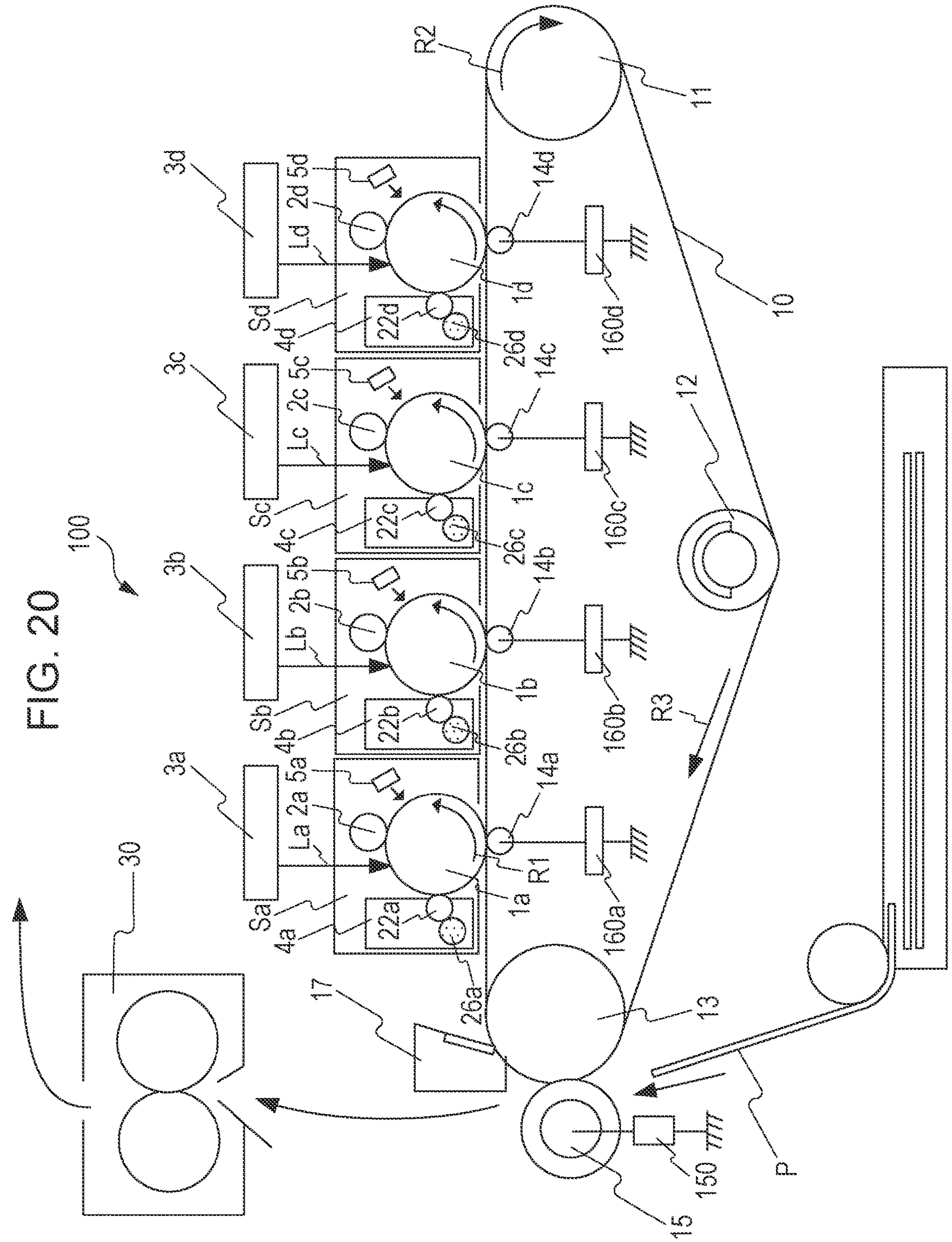
FIG. 20 is a schematic diagram of an image forming apparatus in the third embodiment.
Figure 21:
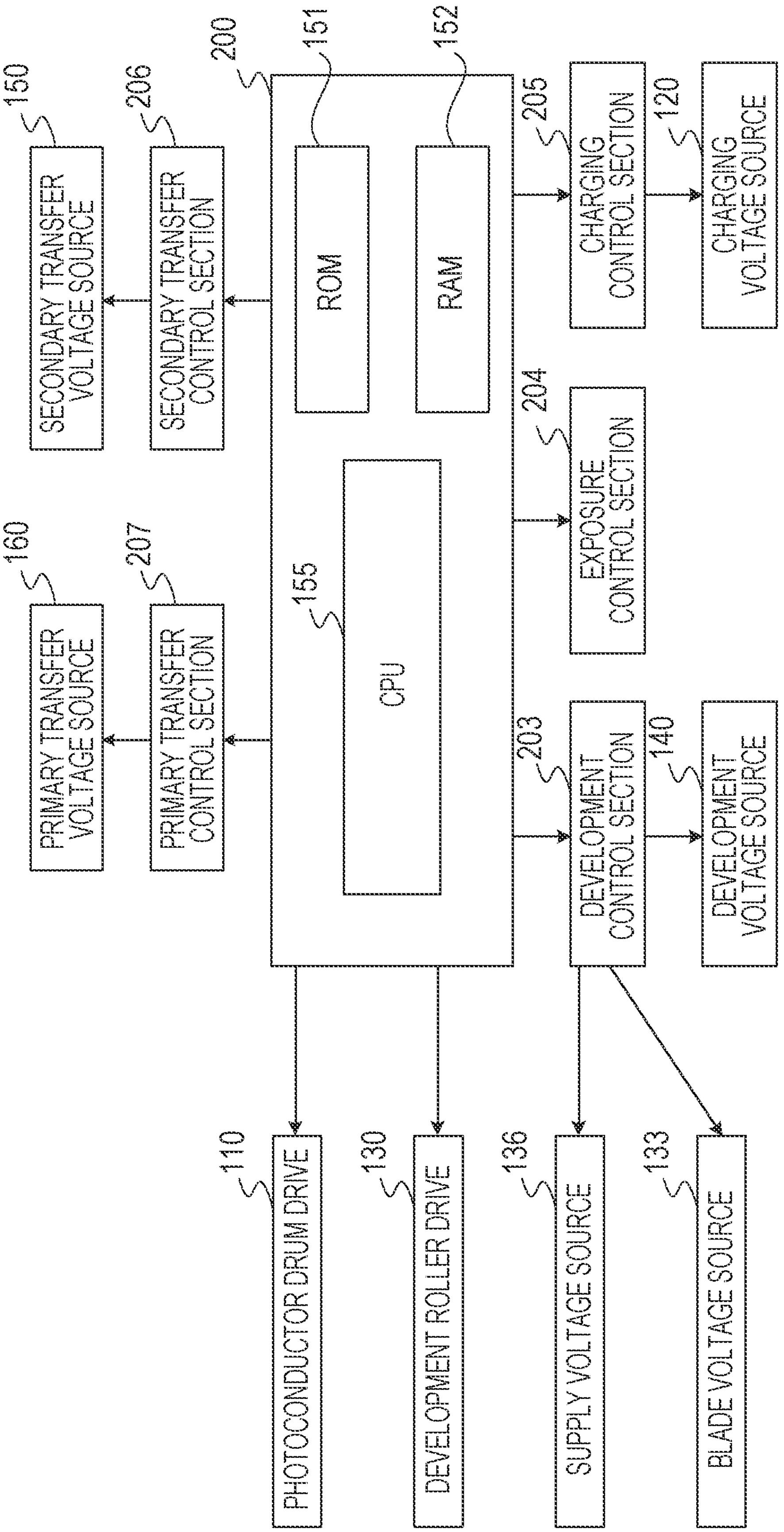
FIG. 21 is a control block diagram in the third embodiment.

The overall configuration of an electrophotographic image forming apparatus (hereinafter, image forming apparatus) according to a third embodiment will be described. FIG. 20 is a schematic cross-sectional view of the image forming apparatus 100 of the present embodiment. FIG. 21 is a diagram showing the configuration of the control section 200 that controls the image forming apparatus 100. The configuration, operation, and control of the image forming apparatus 100 of the present embodiment will be described with reference to FIG. 20 and FIG. 21.

The image forming apparatus 100 of the present embodiment is a full-color laser printer that adopts an in-line system and an intermediate transfer system. The third embodiment particularly relates to an image forming apparatus using a so-called drum cleanerless system having no cleaner for an image bearing member.

The image forming apparatus 100 is capable of forming a full-color image on a recording medium P (for example, a recording sheet or a plastic sheet) in accordance with image information. Image information is input from an image reading device or a host apparatus, such as a personal computer connected to the image forming apparatus 100 so as to communicate with the image forming apparatus 100, to the image forming apparatus 100.

The image forming apparatus 100 includes first, second, third, and fourth process cartridges Sa, Sb, Sc, Sd for forming images of colors that are yellow (Y), magenta (M), cyan (C), and black (K) as a plurality of image forming units. In the present embodiment, the first to fourth process cartridges Sa, Sb, Sc, Sd are arranged in line in a direction that intersects with a vertical direction. In the present embodiment, the configurations and operations of the first to fourth process cartridges Sa, Sb, Sc, Sd are substantially the same except for images of different colors to be formed. Therefore, unless otherwise specifically distinguished from one another, suffixes a, b, c, d assigned to reference signs to indicate elements intended for associated colors are omitted, and the description will be made generally.

In the present embodiment, the image forming apparatus 100 includes four drum-shaped electrophotographic photoconductor members, that is, the photoconductor drums 1 (1*a*, 1*b*, 1*c*, 1*d*), arranged in the direction that intersects with the vertical direction, as a plurality of image bearing members. The photoconductor drums 1 are driven for rotation by the photoconductor drum drive (driving source) 110. The charging rollers 2 (2*a*, 2*b*, 2*c*, 2*d*), scanner units (exposure units) 3 (3*a*, 3*b*, 3*c*, 3*d*), the developing units (developing devices) 4 (4*a*, 4*b*, 4*c*, 4*d*), and the pre-charging exposure units 5 (5*a*, 5*b*, 5*c*, 5*d*) are respectively disposed around the associated photoconductor drums 1. The charging roller 2 is a charging device that uniformly charges the surface of the photoconductor drum 1. The scanner unit 3 is an exposure device that forms an electrostatic image (electrostatic latent image) on the photoconductor drum 1 by irradiating laser in accordance with output power computed by a CPU 155 from image information input from the host apparatus, such as a personal computer. The developing unit 4 is a developing device that develops an electrostatic image as a toner image. The pre-charging exposure unit 5 is an exposure device for eliminating a nonuniform surface potential of the photoconductor drum 1 after primary transfer. The photoconductor drum 1, the charging roller 2 serving as a process device that affects the photoconductor drum 1, and the developing unit 4 are combined to form the process cartridge S. The process cartridge S is detachable from the image forming apparatus 100 via an attachment device such as an attachment guide and a positioning member provided in the image forming apparatus 100.

The intermediate transfer belt 10 serving as an intermediate transfer member for transferring toner images on the photoconductor drums 1 to a recording medium P is disposed opposite the four photoconductor drums 1. The intermediate transfer belt 10 made up of an endless belt is in contact with the photoconductor drums 1 and moves in circulation (rotates) in the direction indicated by the arrow R3 (clockwise direction) in the drawing. The intermediate transfer belt 10 is looped over a secondary transfer opposing roller 13, a drive roller 11, and a tension roller 12 as a plurality of supporting members. To move the surface of the intermediate transfer belt 10, the drive roller 11 is driven for rotation in the direction indicated by the arrow R2 in the drawing.

On the inner peripheral surface side of the intermediate transfer belt 10, the four primary transfer rollers 14 (14*a*, 14*b*, 14*c*, 14*d*) are arranged opposite the associated photoconductor drums 1 as primary transfer devices. Each of the primary transfer rollers 14 presses the intermediate transfer belt 10 against the photoconductor drum 1 to form a primary transfer portion at which the intermediate transfer belt 10 and the photoconductor drum 1 contact with each other.

On the outer peripheral surface side of the intermediate transfer belt 10, a secondary transfer roller 15 serving as a secondary transfer device is disposed opposite the secondary transfer opposing roller 13. The secondary transfer roller 15 is in pressure contact with the secondary transfer opposing roller 13 via the intermediate transfer belt 10 to form a secondary transfer portion at which the intermediate transfer belt 10 and the secondary transfer roller 20 contact with each other.

A recording medium P having a transferred toner image is conveyed to the fixing unit 30 serving as a fixing device. The toner image is fixed to the recording medium P by applying heat and pressure to the recording medium P in the fixing unit 30.

The image forming apparatus 100 is also capable of forming a monochromic or multi-color image by using only a desired one of the image forming units or using only some (not all) of the image forming units.

The image forming apparatus 100 in the present embodiment is a printer having a process speed of 148 mm/sec and compatible with A4-size paper.

The configuration of the control section 200 that generally controls the image forming apparatus will be described with reference to FIG. 21. As shown in FIG. 21, the control section 200 incorporates the CPU 155, a ROM 151, and a RAM 152. The CPU 155 generally controls a primary transfer control section 207, a secondary transfer control section 206, a development control section 203, an exposure control section 204, and a charging control section 205 in accordance with a control program stored in the ROM 151. An environment table and a paper thickness correspondence table are stored in the ROM 151. The CPU 155 calls the tables and reflects information in the tables. The RAM 152 temporarily holds control data or is used as a work area for computation associated with control. The primary transfer control section 207 controls a primary transfer voltage source 160 and controls a voltage to be output from the primary transfer voltage source 160 in accordance with a current value detected by a current detection circuit (not shown). The secondary transfer control section 206 controls a secondary transfer voltage source 150 and controls a voltage to be output from the secondary transfer voltage source 150 in accordance with a current value detected by the current detection circuit (not shown). When the control section 200 receives image information and a printing instruction from a host computer (not shown), the control section 200 executes an image forming operation needed for printing operation by controlling the control sections (the primary transfer control section 207, the secondary transfer control section 206, the development control section 203, the exposure control section 204, and the charging control section 205).

(2) Image Forming Process

Next, an image forming process in the third embodiment will be described. During an image-forming period, initially, the surface of the photoconductor drum 1 is uniformly charged by the charging roller 2 applied with a charging voltage of 1000 V from the charging voltage source 120. Subsequently, the surfaces of the charged photoconductor drums 1 are respectively subjected to scanning exposure by laser beams (La, Lb, Lc, Ld) emitted from the scanner units 3 in accordance with output powers computed by the CPU 155 from the image information input from the host apparatus. Thus, an electrostatic image along with the image information is formed on each photoconductor drum 1.

Subsequently, the electrostatic image formed on each of the photoconductor drums 1 is developed as a toner image by the developing unit 4. Then, a voltage in an opposite polarity from the normal charging polarity of toner is applied from the primary transfer voltage source 160 (high-voltage power source) serving as a primary transfer voltage application device to the primary transfer roller 14. Thus, the toner image on the photoconductor drum 1 is primarily transferred to the intermediate transfer belt 10. During a period of forming a full-color image, the above-described process is sequentially performed in the first to fourth process cartridges Sa, Sb, Sc, Sd, and the toner images of the respective colors are successively primarily transferred to the intermediate transfer belt 10 on top of one another.

The primary transfer roller 14*a* is a cylindrical metal roller with an outside diameter of 6 mm and is made of a nickel-plated SUS. The primary transfer roller 14 is disposed at a position offset 8 mm downstream in the moving direction of the intermediate transfer belt 10 with respect to the center position of the photoconductor drum 1. The intermediate transfer belt 10 is configured so as to wrap around the photoconductor drum 1. The primary transfer roller 14 is disposed at a position lifted 1 mm from a horizontal surface formed by the photoconductor drum 1 and the intermediate transfer belt 10 so that the wrapping amount of the intermediate transfer belt 10 around the photoconductor drum 1 can be ensured. The primary transfer roller 14 presses the intermediate transfer belt 10 with a force of about 200 gf. The primary transfer roller 14 is rotated by the rotation of the intermediate transfer belt 10.

After that, in synchronization with movement of the intermediate transfer belt 10, the recording medium P is conveyed to the secondary transfer portion. Then, a voltage in an opposite polarity from the normal charging polarity of toner is applied from the secondary transfer voltage source 150 (high-voltage power source) serving as a secondary transfer voltage application device to the secondary transfer roller 15. Thus, the four-color toner image on the intermediate transfer belt 10 is secondarily transferred to the recording medium P conveyed by a sheet feeding device by the action of the secondary transfer roller 15 in contact with the intermediate transfer belt 10 via the recording medium P.

The secondary transfer roller 15 serving as a secondary transfer member contacts with the intermediate transfer belt 10 with a pressure of 50 N to form the secondary transfer portion (secondary transfer nip). The secondary transfer roller 15 is rotated by the intermediate transfer belt 10. The secondary transfer roller 15 is applied with a voltage of 1500 V from the secondary transfer voltage source 150 when secondarily transferring toner on the intermediate transfer belt 10 to a recording medium P, such as paper.

A recording medium P having a transferred toner image is conveyed to the fixing unit 30 serving as a fixing device. The transferred toner image is fixed to the recording medium P by applying heat and pressure to the recording medium P in the fixing unit 30, and the recording medium P is discharged from the image forming apparatus 100.

Primary-transfer residual toner on the surface of the photoconductor drum 1 in a primary transfer step is collected by the development roller 22 (described later) and reused. Residual toner on the surface of the photoconductor drum 1 in the primary transfer step is charged with a negative polarity that is the normal charge polarity when being passed through the charging roller 2. After that, the primary-transfer residual toner is collected by the development roller 22 under an electric field caused by a potential difference between the potential of the photoconductor drum 1 formed by the charging roller 2 and the potential of the development roller 22 (described later) formed by application of a direct current voltage to the development roller 22, and reused.

Secondary-transfer residual toner on the surface of the intermediate transfer belt 10 in a secondary transfer step is cleaned and removed by the intermediate transfer belt cleaning device 17.

3. Configuration of Process Cartridge

Next, the overall configuration of each process cartridge S to be attached to the image forming apparatus 100 of the third embodiment will be described. The process cartridges S for respective colors have the same shape except for an identification part (not shown) or the like. Toner of each of colors that are yellow (Y), magenta (M), cyan (C), and black (K) is contained in an associated one of the developing units (developing devices) 4 of the process cartridges S for respective colors. A negative-polarity nonmagnetic one-component developer (toner) manufactured through a suspension polymerization method is contained in the developing unit 4 that is a developer containing portion.

The process cartridge S is formed by combining a photoconductor unit including the photoconductor drum 1 and the rotatable charging roller 2 with the developing unit 4 including the rotatable development roller 22 and the like.

The photoconductor drum 1 is rotatably supported via bearings (not shown). The photoconductor drum 1 is configured to be driven for rotation in the direction indicated by the arrow R1 (counterclockwise direction) in the drawing in accordance with an image forming operation when the driving force of a photoconductor drum driving device 110 (driving source) serving as a photoconductor drum drive is transmitted to the photoconductor unit.

The photoconductor drum 1 is made up of an aluminum pipe and a photoconductor layer and a surface layer provided on the aluminum pipe. The aluminum pipe has an outside diameter of 20 mm. The surface layer is a thin film layer made of polyallylate with a film thickness of 20 μm.

The charging roller 2 includes a roller portion made up of a metal shaft with a diameter of 5.5 mm and an elastic layer made of an electrically conductive rubber with a thickness of 1.5 mm and a volume resistivity of about 1×10 6 f2 cm. The roller portion is in pressure contact with the photoconductor drum 1 and is configured to be rotated by the photoconductor drum 1. A large number of protruded portions are provided on the surface layer of the charging roller 2. An average height of the protruded portions is about 10 μm. The protruded portions provided on the surface layer of the charging roller 2 play a role as a spacer between the charging roller 2 and the photoconductor drum 1 in the charging portion. When primary-transfer residual toner on the photoconductor drum 1 enters the charging portion, contamination of the charging roller 2 with residual toner due to contact of portions other than the protruded portions with the primary-transfer residual toner is prevented.

Figure 22:
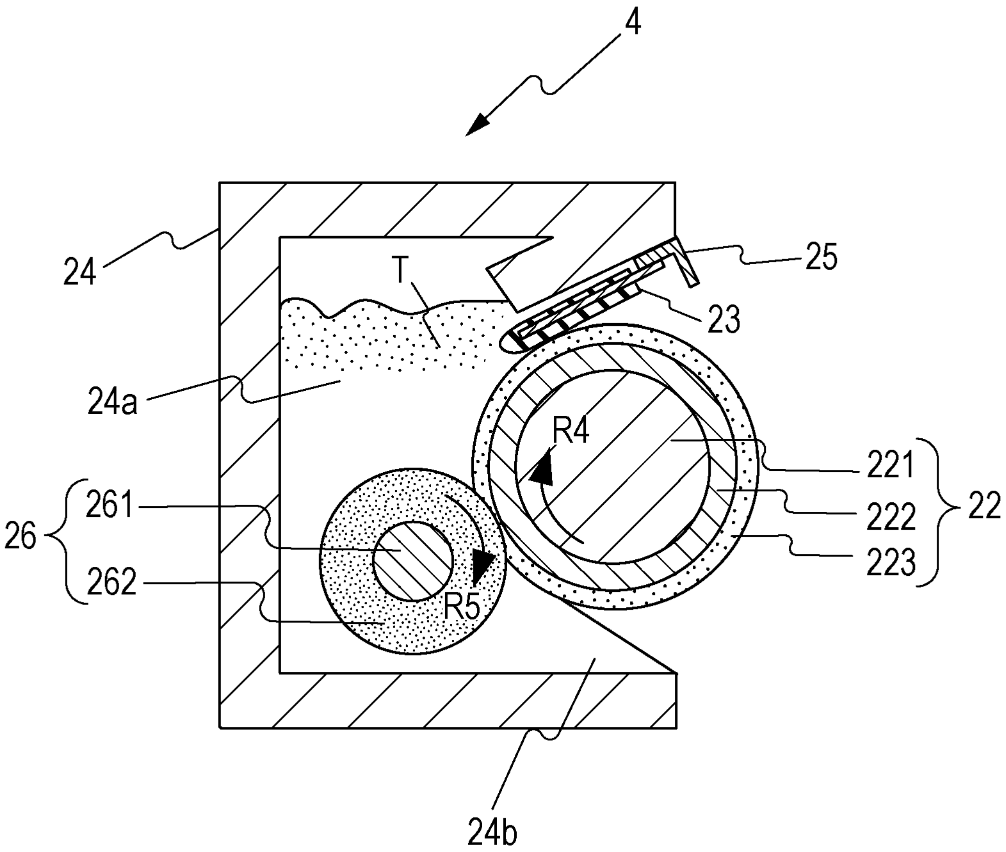
FIG. 22 is a view illustrating a developing cartridge in the third embodiment.

On the other hand, as shown in FIG. 22, the developing unit 4 includes the development roller 22 that carries toner T, a developing blade 23 (toner regulating member), a supply roller 26 that supplies toner T, and a developing frame 24 that fixes these components. The developing frame 24 includes a developing chamber 24*a* in which the development roller 22 is disposed, and a blowout prevention sheet 24*b* that seals a development opening (opening portion) communicating the developing chamber 24*a* with the outside.

Toner is supplied to the development roller 22 by the supply roller 26 that contacts with the development roller 22.

The supply roller 26 is rotating (in the direction indicated by the arrow R5 in the drawing) in contact with the development roller 22 (which rotates in the direction indicated by the arrow R4 in the drawing). The supply roller 26 functions to convey toner T from the developing chamber 24*a* and adhere the toner T to the development roller 22 and to once remove toner T remaining on the development roller 22. Furthermore, toner T adhered to the supply roller 26 rubs and slides on the development roller 22 to be imparted with a preliminary triboelectric charge.

One end of the developing blade 23 is fixed to a fixing member 25 fixed to the developing frame 24, and the other end of the developing blade 23 is brought into contact with the development roller 22. Thus, the developing blade 23 is configured to be capable of regulating a toner coat amount on the development roller 22 and applying electric charge. The development roller 22 is disposed at the development opening portion and is able to contact with the photoconductor drum 1.

As shown in FIG. 22, the development roller 22 is a roller formed by, for example, sequentially laminating a base layer 222 made of silicon and a surface layer 223 made of urethane on a metal core 221. The development roller 22 is disposed so as to be driven for rotation in the direction indicated by the arrow R4 in the drawing by a driving force of the development roller driving device 130 (driving source) serving as the development roller drive.

In the third embodiment, a predetermined direct current voltage (development voltage Vdc) is applied to the development roller 22 by the development voltage source 140, and toner charged with minus through triboelectric charging visualizes an electrostatic latent image in the developing portion that contacts with the photoconductor drum 1 to form a toner image.

The supply roller 26 is made up of a metal core electrode 261 with an outside diameter of 5.5 (mm), which is an electrically conductive supporting member, and a urethane foam layer 262 provided around the metal core electrode 261. The outside diameter of the overall supply roller 26 including the urethane foam layer 262 is 11 (mm). The inroad amount of the development roller 22 to the supply roller 26 is 1.2 mm. The supply roller 26 rotates (in the direction indicated by the arrow R5 in the drawing) in the contact portion with the development roller 22 in a direction in which both have speeds in opposite directions. A particle pressure of toner T present around the urethane foam layer 262 is applied to the urethane foam layer 262. When the supply roller 26 rotates, toner T is further taken into the urethane foam layer 262. A predetermined direct current voltage (supply voltage Vrs) is applied to the supply roller 26 by a supply voltage source 136. By controlling a potential difference (supply roller contrast ΔVrs=Vrs−Vdc) from a voltage to be applied to the development roller 22 (development voltage Vdc), a toner supply amount and a preliminary triboelectric charging amount are controlled.

In the third embodiment, the supply voltage Vrs=−500 V is applied to the supply roller 26 from the supply voltage source 136, and the development voltage Vdc=−300 V is applied to the development roller 22 from the development voltage source 140. Thus, the control section 200 controls the supply voltage source 136 and the development voltage source 131 such that the supply roller 26 has a potential difference of −200 V from the development roller 22, thus stabilizing a toner supply amount and a preliminary triboelectric charging amount.

In the following description, regarding potentials and applied voltages, the potential is high when the absolute value is greater toward a negative polarity side (for example, −1000 V as compared to −500 V), and the potential is low when the absolute value is less toward the negative polarity side (for example, −300 V as compared to −500 V). This is because toner having a negative chargeability is considered as a reference in the present embodiment.

A voltage in the present embodiment is expressed as a potential difference from earth potential (0 V). Therefore, the development voltage Vdc=−300 V is interpreted that a potential difference of −300 V from the earth potential is provided by the development voltage applied to the metal core of the development roller 22. This also applies to a charging voltage, a transfer voltage, and the like.

As shown in FIG. 22, the developing blade 23 is in contact with the development roller 22 so as to face in a counter direction and regulates a toner coat amount and applies electric charge.

Figure 23:
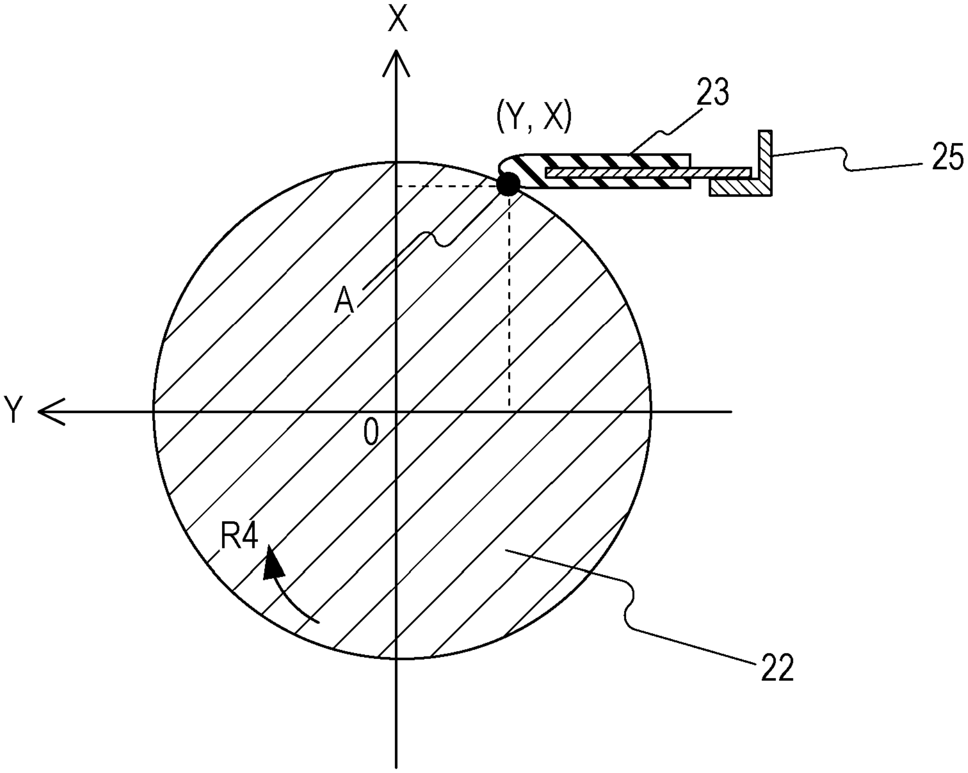
FIG. 23 is a diagram illustrating the setting of a developing blade in the third embodiment.

In the third embodiment, a supporting member of a leaf spring-shaped SUS plate with a thickness of 50 to 120 μm is used as the developing blade 23 serving as a toner regulating member, and the surface of the blade part is brought into contact with the development roller 22 by utilizing the spring elasticity of the supporting member. Specifically, the surface of the blade part is in contact as shown in FIG. 23. When the center in the cross section of the development roller 22 is assumed as zero point and XY coordinate axes are set as shown in FIG. 23, a contact position defined as XY coordinates (x,y) is x=3.86 mm and y=−0.60 mm in the present embodiment. The blade part of the developing blade 23 is configured such that, in the transverse direction, the blade part is formed at one end and the other end is fixed to the developing frame 24 and supported. On the other hand, the blade part is formed by coating the surface of the supporting member with an electrically conductive thin film made of urethane resin. Furthermore, a predetermined direct current voltage is applied from a developing blade voltage source 133 to the developing blade 23 (developing blade voltage Vb) to control a potential difference (developing blade contrast ΔVb=Vb−Vdc) from a voltage to be applied to the development roller 22 (development voltage Vdc). Thus, a toner charge amount and a toner coat amount are controlled.

In the third embodiment, the developing blade voltage Vb=−500 V is applied to the developing blade 23, and the development voltage Vdc=−300 V is applied to the development roller 22. A potential difference (developing blade contrast) of −200 V from the development roller 22 is set for the developing blade 23 to stabilize a toner charge amount and a toner coat amount.

Figure 24:
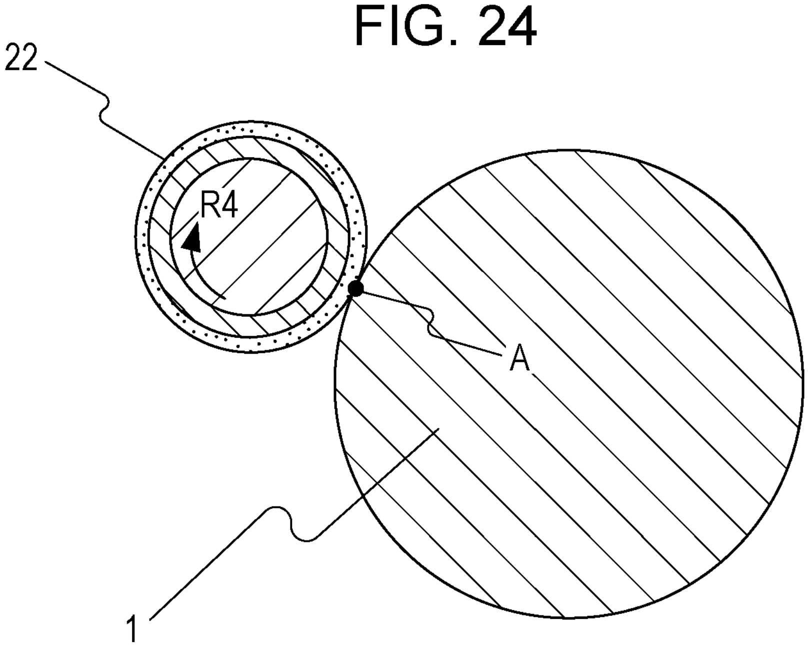
FIG. 24 is a diagram illustrating a contact portion between a development roller and a photoconductor drum in the third embodiment.

A toner layer formed on the development roller 22 by the developing blade 23 is conveyed to the developing portion that contacts with the photoconductor drum 1 and subjected to reversal development in the developing portion. At a contact position A shown in FIG. 24, the inroad amount of the development roller 22 to the photoconductor drum 1 is set to 40 μm by a roller (not shown) at an end portion of the development roller 22. The surface of the development roller 22 deforms by being pressed against the photoconductor drum 1. Thus, a developing nip is formed, and development can be performed in a stable contact state. The pressing force of the development roller 22 against the photoconductor drum 1 in the present embodiment is 200 gf. The width of the developing portion (hereinafter, developing nip portion) that is the contact portion between the development roller 22 and the photoconductor drum 1 is such that the width of the photoconductor drum 1 in the rotation direction is 2.0 mm and the width of the photoconductor drum 1 in the longitudinal direction is 220 mm.

Toner in the third embodiment is a nonmagnetic toner having a negative chargeability and manufactured by a suspension polymerization method. The toner has a volume average particle diameter of 7.0 μm. The toner is charged with a negative polarity when carried on the development roller 22. The volume average particle diameter of toner was measured with a laser diffraction particle size analyzer LS230 produced by Beckman Coulter, Inc. Toner will be described later.

4. Primary Transfer

The primary transfer step described in the section Image Forming Process will be described in detail.

Initially, the surface of the photoconductor drum 1 is uniformly charged with a charging potential Vd that is a predetermined potential by the charging roller 2. Subsequently, the surface of the charged photoconductor drum 1 is subjected to scanning exposure by a laser beam emitted from the scanner unit 3 in accordance with output power computed by the CPU 155 from image information input from the host apparatus, with the result that an electrostatic image according to the image information is formed on the photoconductor drum 1. At this time, a post-exposure potential V1 that is a potential at which an electrostatic image is formed is formed. Subsequently, the electrostatic image formed on the photoconductor drum 1 is developed as a toner image by a potential difference (development contrast $\Delta Vcont=V1-Vdc$) between the development voltage Vdc and the post-exposure potential V1. Then, a primary transfer voltage Vtr that is a predetermined direct current voltage in an opposite polarity from the normal charging polarity of toner is applied from the primary transfer voltage source 160 (high-voltage power source) serving as a primary transfer voltage application device to the primary transfer roller 14. At this time, the potential difference between Vtr and V1 (primary transfer contrast $\Delta Vtr=Vtr-V1$) becomes a primary transfer electric field, and the toner image on the photoconductor drum 1 is primarily transferred to the intermediate transfer belt 10.

In the third embodiment, voltage settings during an image forming operation are such that the charging potential Vd=−500 V, the development voltage Vdc=−300 V, the post-exposure potential V1=−100 V, and the primary transfer voltage Vtr=200 V.

The surface potential of the photoconductor drum 1 was measured with a surface electrometer Model 344 produced by TREK, Inc.

3. Characteristics and Operational Effects

Next, the characteristics of the third embodiment will be described below. Where the adhesion between transfer carrier particles and toner is Ft and the adhesion between transfer carrier particles and the photoconductor drum 1 is Fdr, Ft<Fdr is satisfied. The amount of supply of transfer carrier particles to the photoconductor drum 1 based on the above relationship is controlled as follows. Between at least two of the process cartridges, the amount of supply of transfer carrier particles in a downstream one of the process cartridges is increased as compared to the amount of supply of transfer carrier particles in an upstream one of the process cartridges in the conveyance direction of the intermediate transfer belt 10. In the third embodiment, changing for each process cartridge a contact time between the development roller 22 and the photoconductor drum 1 during a preparation operation accompanying activation of the image forming apparatus 100. The operation to supply transfer carrier particles to the surface of the photoconductor drum 1 is referred to as transfer carrier particle supply operation.

As the number of transfer carrier particles coating the photoconductor drum 1 increases, the number of toner particles that directly contact with the photoconductor drum 1 reduces, so primary transferability is improved. Particularly, to improve the primary transfer efficiency of multi-color high-resolution printing, a large amount of transfer carrier particles can be adhered to the photoconductor drum 1. By using the developer of the third embodiment, most of transfer carrier particles substantially remain on the photoconductor drum 1 due to the relationship Ft<Fdr in the primary transfer step. However, when a further large amount of transfer carrier particles is adhering to the surface of the photoconductor drum 1, the destination of transfer carrier particles depends on not the relationship in adhesion with the photoconductor drum 1 but the adhesion among the transfer carrier particles. In other words, for some of transfer carrier particles, the relationship between Ft and Fdr becomes apparently Ft≥Fdr, and the transfer carrier particles can be primarily transferred or secondarily transferred to a recording medium P together with toner. When toner bases between protruded portions containing organic silicon polymer having a partial structure expressed by the formula (1) contact with transfer carrier particles, the relationship can be Ft≥Fdr. As a result, some of transfer carrier particles are primarily transferred and secondarily transferred together with toner and then transferred to a recording medium P. Particularly, when the amount of transfer carrier particles on the photoconductor drum 1 is large, the opportunity to contact with toner bases increases, so a larger amount of transfer carrier particles is transferred to a recording medium P. As a result, there is an inconvenience that, in fixing a high-resolution multi-color toner on a recording medium, transfer carrier particles impede transfer of heat to toner and decrease fixability.

In the third embodiment, the amount of supply (that is, the amount of adhesion) of transfer carrier particles to the photoconductor drum 1 is increased in a downstream one of the process cartridges than an upstream one of the process cartridges in the conveyance direction of the intermediate transfer belt 10 among the process cartridges. Thus, influences on fixability can be reduced by reducing the amount of transfer carrier particles to be transferred to a recording medium P, and primary transferability needed for each process cartridge can be satisfied. Since the downstream process cartridge transfers toner to a toner layer on the intermediate transfer belt 10, printed in the upstream process cartridge, the downstream process cartridge is difficult to transfer toner as compared to the upstream process cartridge. Therefore, the downstream process cartridge needs more transfer carrier particles to improve primary transferability. When transfer carrier particles are supplied according to the necessary transferability, both primary transferability and fixability are achieved.

In the third embodiment, to achieve the surface condition of the photoconductor drum 1, the following control is executed. During a pre-rotation operation that is a preparation operation at the time of activation of the image forming apparatus 100, a contact time during which the development roller 22 contacts with the photoconductor drum 1 in the downstream process cartridge in the conveyance direction of the intermediate transfer belt 10 is set so as to be longer than that in the upstream process cartridge. The details will be described with reference to FIG. 19.

Figure 19:
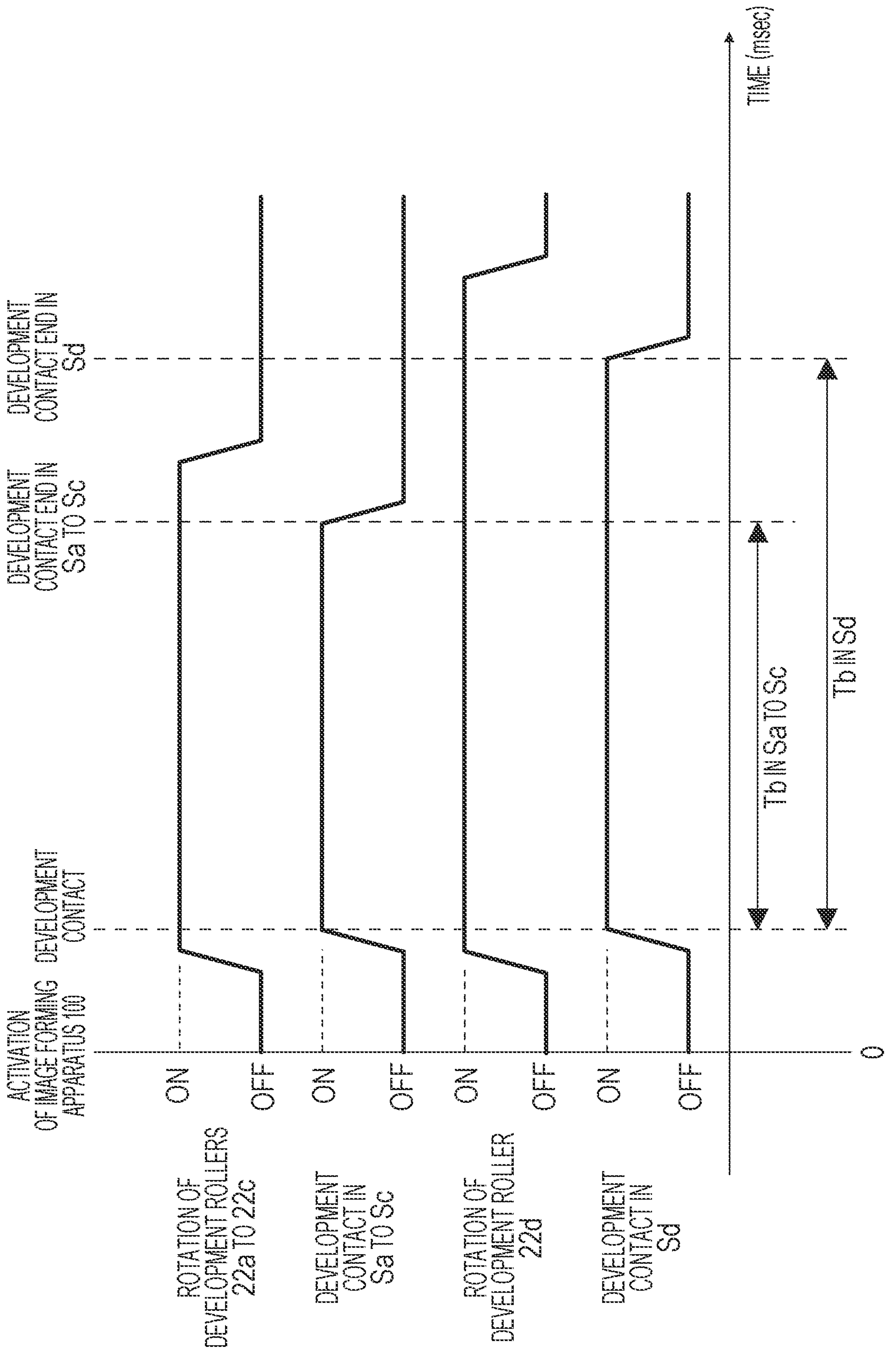
FIG. 19 is a timing chart of a transfer carrier particle supply operation in a third embodiment.

FIG. 19 is a timing chart of rotation and development contact of the development roller 22 of each process cartridge during a preparation operation accompanying activation of the image forming apparatus 100, and a contact time of the development roller 22 is indicated by Tb.

Initially, a configuration common to the process cartridges will be described. In any of the process cartridges, rotation of the development roller 22 starts after activation of the image forming apparatus 100. During spin-up of rotation, the rotation speeds of motors of the photoconductor drum drive 110 and the development roller drive 130 are instable, so, after the rotations of the motors and the rotation of the development roller 22 become stable, the development roller 22 is brought into contact with the photoconductor drum 1. During the development contact time Tb, a toner layer on the development roller 22 is stabilized. After that, the development roller 22 is separated from the photoconductor drum 1, and the rotation of the development roller 22 is ended.

For the contact time Tb of the development roller 22, the contact time of the development roller 22 of Sd is set so as to be longer than the contact time of any of the development rollers 22 of Sa, Sb, and Sc. Thus, the area (amount) of adhesion of transfer carrier particles on the photoconductor drum 1 can be increased on the downstream side than on the upstream side in the conveyance direction of the intermediate transfer belt 10. The transfer carrier particle supply time can be set to a time to rotate the photoconductor drum 1 one or more times. In the present embodiment, transfer carrier particles are supplied by bringing the development roller 22 into contact with the photoconductor drum 1 for Tb=500 ms (the photoconductor drum 1 rotates one or more times) in Sa, Sb, and Sc and for Tb=1000 ms (the photoconductor drum 1 rotates two or more times) in Sd.

In the third embodiment, during a pre-rotation operation of the image forming apparatus 100, which is a transfer carrier particle supply time, the surface potential of the photoconductor drum 1 is adjusted so that toner charged with the normal charge polarity is not developed in the development contact time Tb. The surface potential of the photoconductor drum 1 during a transfer carrier particle supply operation is set to a non-image forming potential Vd=−500 V, and the development voltage Vdc to be applied to the development roller 22 is set to −300 V. Therefore, during a transfer carrier particle supply operation of the present embodiment, toner is not developed from the development roller 22 on the photoconductor drum 1, and only transfer carrier particles are supplied from the development roller 22 to the photoconductor drum 1.

In the third embodiment, where the state where transfer carrier particles are adhering to all around the surface of the photoconductor drum 1 is 100%, the adhesion area ratio is set as follows. Through the transfer carrier particle supply operation, the adhesion area ratio of transfer carrier particles on the photoconductor drum 1 in each of Sa, Sb, and Sc is controlled to 15% to 25%, and the adhesion area ratio in Sd is controlled to about 45%.

The adhesion area ratio of transfer carrier particles on the photoconductor drum 1 is described above. Here, it is desirable that transfer carrier particles be substantially uniformly adhering on the photoconductor drum 1. Even if the adhesion area ratio of transfer carrier particles falls within the above-described range, but when, for example, transfer carrier particles are locally adhering, some parts do not satisfy desired primary transferability, so the adhesion state needs to be substantially uniform. In the present embodiment, evaluations are made by using Clark and Evans Index (CEI) as a numeric value of the adhesion state. Clark and Evans Index in the present embodiment fell within the range of 0.80 to 1.30 in any station.

When CEI is less than 1, the distribution is a leptokurtic distribution (cohesion degree is high). When CEI is equal to 1, the distribution is a Poisson distribution (Random distribution). When CEI is greater than 1, the distribution is a regular distribution (distributed at regular intervals). A limit value of CEI is about 2.1.

To satisfy desired primary transferability in any point on the photoconductor drum 1, Clark and Evans Index is preferably greater than or equal to 0.60. When Clark and Evans Index is less than or equal to that value, it is a local adhesion state, and primary transferability partially decreases.

Adhesion area ratio, adhesion state (Clark and Evans Index), a method of measuring adhesion, and verification results of adhesion will be described later.

4. Method of Measuring and Verifying Various Parameters

Next, a method of measuring and verifying parameters will be described.

(1) Adhesion Area Ratio of Transfer Carrier Particles on Photoconductor Drum 1

The surface of the photoconductor drum 1 was observed with a microscope, and the coverage of transfer carrier particles on the surface of the photoconductor drum 1 was calculated. Specifically, the surface of the photoconductor drum 1 was observed at a magnification of 3000 times with a laser microscope (VK-X200 Keyence Corporation). The image to be observed was binarized at a contrast at which there is a clear difference between a part of transfer carrier particles and the other part, and the total area ratio of transfer carrier particles to the surface of the photoconductor drum 1 was calculated as the coverage of transfer carrier particles on the surface of the photoconductor drum 1.

(2) Adhesion State (Clark and Evans Index) of Transfer Carrier Particles on Photoconductor Drum 1

The surface of the photoconductor drum 1 was observed with a microscope, and the adhesion state (Clark and Evans Index) of transfer carrier particles on the surface of the photoconductor drum 1 was calculated. Specifically, as in the case of (1), the surface of the photoconductor drum 1 was observed at a magnification of 3000 times with a laser microscope (VK-X200 Keyence Corporation). The image to be observed was binarized at a contrast at which there is a clear difference between a part of transfer carrier particles and the other part. The coordinates of each of the particles in the binarized image were calculated, and then the average r of the shortest distance between centroids of all the particles was calculated. Where an expectation value of the shortest distance between centroids of particles of which the distribution is a Poisson distribution was E(r), the Clark and Evans Index (CEI) was defined by CEI=r/E(r), and the value was calculated as Clark and Evans Index.

5. Effect Confirmation Test

For the purpose of confirming the effects of the third embodiment, primary transferability and fixability of the configuration of the third embodiment and the configuration of Comparative Example 2 were verified under the following conditions. HP Color LaserJet Pro M452dw (HP, Inc. product name) was used as the image forming apparatus 100, and CS-680 (Canon Marketing Japan, Inc. product name) was used as the recording medium P.

Verification of primary transferability was performed while the cleaning blades of the process cartridges packaged with HP Color LaserJet Pro M452dw were removed. This is to perform evaluations in accordance with whether there occurs an image defect in which primary-transfer residual toner is not sufficiently collected when passing through the development roller 22 and appears as a ghost image after one rotation of the photoconductor drum 1 (hereinafter, referred to as cleanerless ghost). Verification of fixability was evaluated in accordance with whether there occurred an image defect in which toner was not completely fixed to a recording medium P and was offset (hereinafter, referred to as cold offset). To simplify verification in each case, evaluations were performed by using a solid black image of a secondary color using the cyan (Sc) station and the black (Sd) station.

As described above, the configuration of the third embodiment was such that the adhesion area ratio of transfer carrier particles on the photoconductor drum 1 of the relatively upstream process cartridge Sc in the conveyance direction of the intermediate transfer belt 10 was 20%. The adhesion area ratio of transfer carrier particles on the photoconductor drum 1 of the downstream process cartridge Sd was 45%.

On the other hand, the configuration of Comparative Example 2 was such that the adhesion area ratio of transfer carrier particles on the photoconductor drum 1 of the upstream process cartridge Sc was 45% and the adhesion area ratio of transfer carrier particles on the photoconductor drum 1 of the downstream process cartridge Sd was 20%. In Comparative Example 2, the adhesion area ratio of transfer carrier particles on the photoconductor drum 1 of each of Sc and Sd was 45%.

Table 2 shows the presence or absence of cleanerless ghost (primary transferability) and the presence or absence of cold offset (fixability) in each of the third embodiment and Comparative Example 2. In the table, OK indicates that there is no image defect, and NG indicates that there is an image defect.

TABLE 2

| | Sc | Sd | PRIMARY TRANSFERABILITY Sc STATION | PRIMARY TRANSFERABILITY Sd STATION | FIXABILITY |
|---|---|---|---|---|---|
| THIRD EMBODIMENT | 20% | 45% | OK | OK | OK |
| COMPARATIVE EXAMPLE 2 | 45% | 20% | OK | NG | OK |
| COMPARATIVE EXAMPLE 3 | 45% | 45% | OK | OK | NG |

As shown in Table 2, in the third embodiment, the adhesion area ratio of transfer carrier particles on the photoconductor drum 1 of the downstream Sd was set so as to be higher than the adhesion area ratio of transfer carrier particles on the photoconductor drum 1 of the upstream Sc in the conveyance direction of the intermediate transfer belt 10. The upstream process cartridge Sc just needs to be able to primarily transfer a print amount of 100% cyan. Thus, even when the adhesion area ratio was lower than that of the downstream process cartridge, no cleanerless ghost occurred, and primary transferability was good. On the other hand, the downstream process cartridge Sd needs to transfer black toner onto a cyan solid image already formed on the intermediate transfer belt 10. For this reason, the adhesion area ratio of the downstream process cartridge was set so as to be higher than the adhesion area ratio of the upstream process cartridge Sc. Thus, as in the case of Sc, no cleanerless ghost occurred, and primary transferability was good. In addition, as for fixability, the third embodiment had a configuration to suppress transfer of transfer carrier particles, so no cold offset occurred.

On the other hand, in the configuration of Comparative Example 2, the adhesion area ratio of transfer carrier particles on the photoconductor drum 1 of the downstream Sd was set so as to be lower than the adhesion area ratio of transfer carrier particles on the photoconductor drum 1 of the upstream Sc in the conveyance direction of the intermediate transfer belt 10. Initially, for fixability, the total adhesion amount was similar to that of the third embodiment, so no cold offset occurred. Sc having a high adhesion area ratio of transfer carrier particles had a higher adhesion area ratio than that of the third embodiment, so no cleanerless ghost occurred, and primary transferability was good. However, Sd had a lower adhesion area ratio than that of the third embodiment, so sufficient primary transferability was not exhibited, and a cleanerless ghost occurred.

In the configuration of Comparative Example 3, the adhesion area ratio of transfer carrier particles on the photoconductor drum 1 of the upstream Sc and the adhesion area ratio of transfer carrier particles on the photoconductor drum 1 of the downstream Sd were the same in the conveyance direction of the intermediate transfer belt 10. Furthermore, both the adhesion area ratios were set to 45%, so the configuration may be regarded as enhancing transferability. From the results of Table 2, Comparative Example 3 had no issue in transferability but cold offset occurred for fixability. This is presumably because greater than or equal to a permissible amount of transfer carrier particles were transferred to a recording medium P to impede fixing.

The third embodiment has the following configuration.

The yellow station that is the first image forming unit includes the rotatable first photoconductor drum 1*a* and the rotatable first development roller 22*a* that carries a first developer made up of first toner particles and carrier particles adhered to the surfaces of the first toner particles. The development roller 22*a* contacts with the first photoconductor drum 1*a* to form a first developing portion and supplies the first developer to form a first developer image on the surface of the first photoconductor drum 1*a* in the first developing portion.

The magenta station that is the second image forming unit includes the rotatable second photoconductor drum 1*b* and the rotatable second development roller 22*b* that carries a second developer made up of second toner particles and carrier particles adhered to the surfaces of the second toner particles. The development roller 22*b* contacts with the second photoconductor drum 1*b* to form a second developing portion and supplies the second developer to form a second developer image on the surface of the second photoconductor drum 1*b* in the second developing portion.

The intermediate transfer belt 10 is provided. The intermediate transfer belt 10 contacts with the first photoconductor drum 1*a* to form a primary transfer portion that is a first contact portion, and contacts with the second photoconductor drum 1*b* to form a primary transfer portion that is a second contact portion. In the intermediate transfer belt 10, a first developer image is transferred in the first contact portion, and a second developer image is transferred in the second contact portion.

The second transfer roller 15 is provided. The second transfer roller 15 contacts with the intermediate transfer belt 10 to form a secondary transfer portion, and transfers the first developer image and the second developer image, formed on the surface of the intermediate transfer belt 10, to a recording medium in the secondary transfer portion.

In a state where the first photoconductor drum 1*a* is rotating, carrier particles carried on the surface of the first development roller 22*a* can be supplied to the surface of the first photoconductor drum 1*a* in the first developing portion. In a state where the second photoconductor drum 1*b* is rotating, carrier particles carried on the surface of the second development roller 22*b* can be supplied to the surface of the second photoconductor drum 1*b* in the second developing portion.

The surface of the intermediate transfer belt 10 is movable, and the first image forming unit and the second image forming unit are disposed such that the first contact portion is formed downstream of the secondary transfer portion and upstream of the second contact portion in the moving direction of the intermediate transfer belt 10.

The pressing force pressing the development roller 22 against the photoconductor drum 1 is defined as F, and the total number of carrier particles interposed between toner particles and the photoconductor drum 1 is defined as N.

The adhesion between a carrier particle and a toner particle, measured when the carrier particle is pressed against the toner particle with F/N that is the pressing force per unit carrier particle, is defined as Ft. The adhesion between a carrier particle and the photoconductor drum 1, measured when the carrier particle is pressed against the photoconductor drum 1 with F/N, is defined as Fdr. Ft and Fdr in the present embodiment satisfy Ft≤Fdr.

After the photoconductor drums 1 rotate in a state where the photoconductor drums 1 and the development rollers 22 are respectively in contact with each other, the adhesion area of carrier particles adhered to the surface of the second photoconductor drum 1*b* is greater than the adhesion area of carrier particles adhered to the surface of the first photoconductor drum 1*a*.

In addition, after the photoconductor drums 1 rotate in a state where the photoconductor drums 1 and the development rollers 22 are respectively in contact with each other, the state of distribution of carrier particles is uniform and is higher than or equal to 0.6 in Clark and Evans Index.

Therefore, as described above, with the configuration of the third embodiment, while a sufficient amount of fine particles is supplied to the surface of the photoconductor drum 1 to improve transfer efficiency, inhibition of fixing by fine particles is suppressed.

In the third embodiment, during a preparation operation accompanying activation of the image forming apparatus, a contact time during which the development roller 22 contacts with the photoconductor drum 1 is set so as to be longer on the downstream side than on the upstream side in the conveyance direction of the intermediate transfer belt 10; however, the configuration is not limited to this embodiment. Specifically, not limited to 1) during a preparation operation accompanying activation of the image forming apparatus (pre-rotation operation) of the present embodiment, a development contact time may be controlled 2) during a rotation operation before image formation in a print operation, and 3) during a rotation operation after image formation in a print operation (post-rotation operation). Alternatively, a development contact time may be controlled during all of 1), 2), and 3), or during a combination of any two of 1), 2), and 3).

Figure 25:
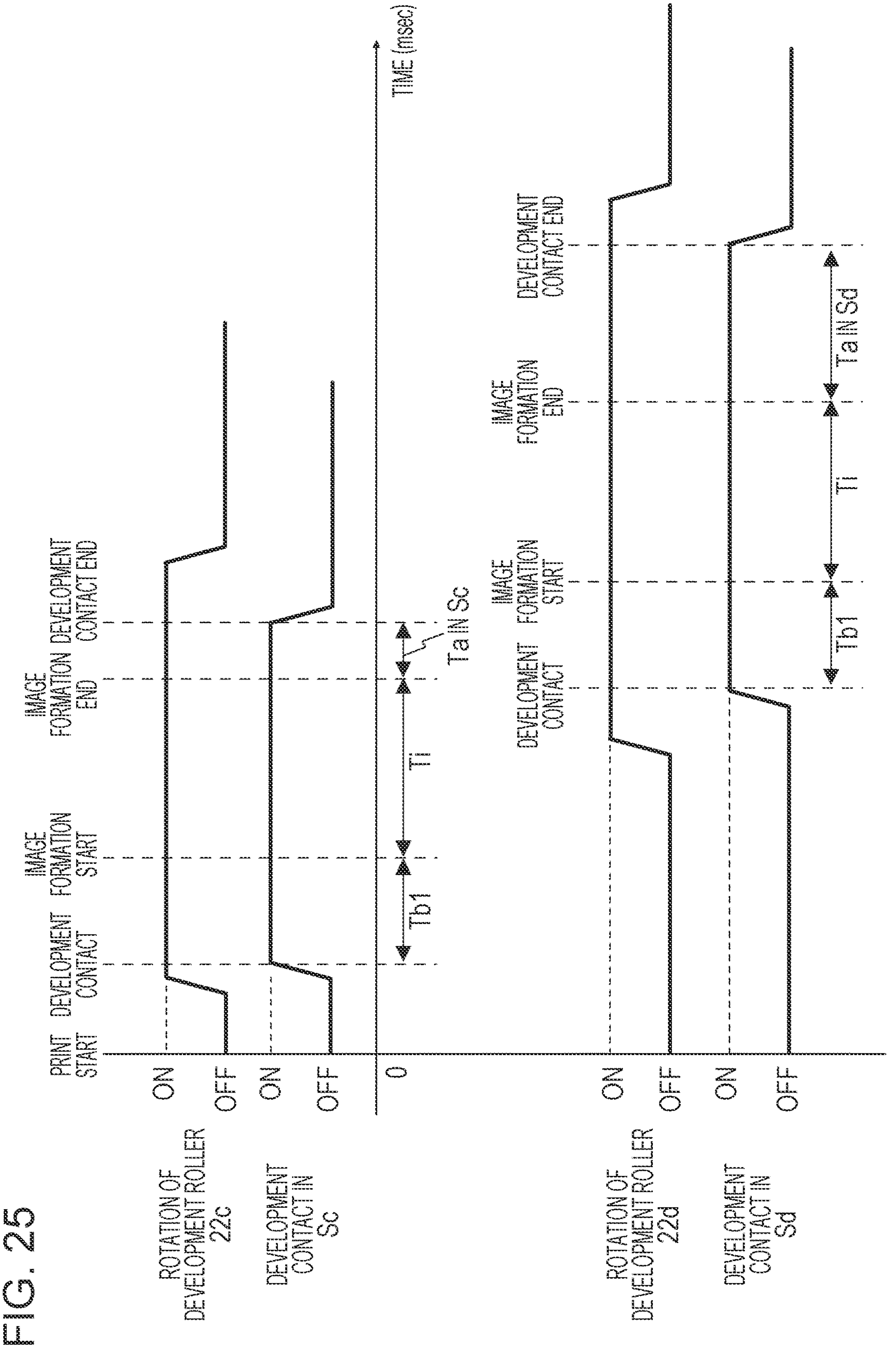
FIG. 25 is a timing chart illustrating a transfer carrier particle supply operation in the third embodiment.

For example, FIG. 25 is a timing chart of rotation and development contact in the case where the development contact time is controlled 3) during a rotation operation after image formation in a print operation. Specifically, FIG. 25 is a timing chart of rotation and development contact of the development rollers 22 of the Sc station and the Sd station in a print operation. In any of the stations, rotation of the development roller 22 is started after a certain time from when a print signal is received. Development contact is started after rotation of the motor becomes stable, and a toner layer on the development roller 22 is stabilized by the time image formation is started (Tb1). After that, image formation is started and image formation is ended (Ti). The state of a toner layer, that is, both a charge amount and a coat amount, on the development roller 22 after image formation depends on image pattern, so the development roller 22 is rotated for a certain time even after the end of image formation to return the state of a toner layer to a uniform state (Ta). The adhesion state of transfer carrier particles on the photoconductor drum 1 is controlled by changing the time of rotation operation after image formation. In FIG. 25, Ta of Sc is set to 500 ms (the photoconductor drum 1 rotates one or more times), and Ta of Sd is set to 1000 ms (the photoconductor drum 1 rotates two or more times). Thus, the amount of transfer carrier particles on the photoconductor drum 1 is greater on the downstream side than on the upstream side in the conveyance direction of the intermediate transfer belt 10. In this way, similar operational effects to those of the third embodiment are obtained.

In the third embodiment, the adhesion area ratio of transfer carrier particles in Sd is increased as compared to Sa, Sb, and Sc; however, the configuration is not limited to the configuration of this embodiment. According to the transferability of each individual color toner, the relationship (Adhesion area ratio of transfer carrier particles in the upstream process cartridge)<(Adhesion area ratio of transfer carrier particles in the downstream process cartridge) just needs to be satisfied between at least two process cartridges of Sa to Sd. The adhesion area ratio of transfer carrier particles may be gradually increased from the upstream side to the downstream side or may be set such that Sa<Sb<Sc<Sd.

For the configuration of a fourth embodiment, like reference signs are assigned to members and portions common to those of the third embodiment, and the description will not be repeated.

In the fourth embodiment, the amount of transfer carrier particles adhered to toner is varied among the stations. A manner of supplying transfer carrier particles by varying the amount of transfer carrier particles adhered to toner among the stations, which is one of the characteristics of the fourth embodiment, and the particular operational effects of the fourth embodiment will be described in detail below.

1. Characteristics and Operational Effects

The characteristics and operational effects of the fourth embodiment are the following three points.

The first characteristic is, as in the case of the third embodiment, to supply transfer carrier particles to the surface of the photoconductor drum 1 in accordance with the relationship Ft<Fdr where the adhesion between a transfer carrier particle and toner is Ft and the adhesion between a transfer carrier particle and the photoconductor drum 1 is Fdr. With this configuration, transfer carrier particles can be interposed between the surface of the photoconductor drum 1 and toner, and the adhesion of toner is reduced by not bringing the toner into contact with the photoconductor drum 1. As a result, the operational effect to improve primary transferability in the primary transfer step is obtained.

The second characteristic is to adjust the supply amount (adhesion amount) of transfer carrier particles such that the supply amount is greater in the downstream station than in the upstream station in the conveyance direction of the intermediate transfer belt 10. In the downstream station for which higher primary transferability is needed, primary transferability is improved by supplying a larger amount of transfer carrier particles as compared to the upstream station. On the other hand, in the upstream station for which not so high primary transferability is needed, the supply amount of transfer carrier particles is reduced. As a result, the total amount of transfer carrier particles in toner on a recording medium P can be minimized, with the result that the operational effect to reduce influences on fixability is obtained.

The above two characteristics and their operational effects are similar to those of the third embodiment, so the detailed description is omitted.

The third characteristic is for the manner of varying the supply amount of transfer carrier particles among the stations to vary the amount of transfer carrier particles adhered to toner among the stations. In the third embodiment, regardless of which station, the additive amount of transfer carrier particles is adjusted such that the number of coating transfer carrier particles on a toner particle becomes about 500. In the fourth embodiment, as shown in Table 3, the additive amount of transfer carrier particles per toner particle is adjusted station by station such that the additive amount is about 300 in the Sa station, the additive amount is about 400 in the Sb station, the additive amount is about 500 in the Sc station, and the additive amount is about 600 in the Sd station. At this time, as described in the first embodiment, the region in which transfer carrier particles are interposed between a toner particle and the photoconductor drum 1 in the developing nip portion is about 1.43% of the entire toner particle surface. For this reason, the total number M of transfer carrier particles interposed between toner and the photoconductor drum 1 per toner particle is also as shown in Table 3. Thus, the supply amount of transfer carrier particles to the photoconductor drum 1 is increased in the downstream station as compared to the upstream station in the conveyance direction of the intermediate transfer belt 10.

Figure 26:
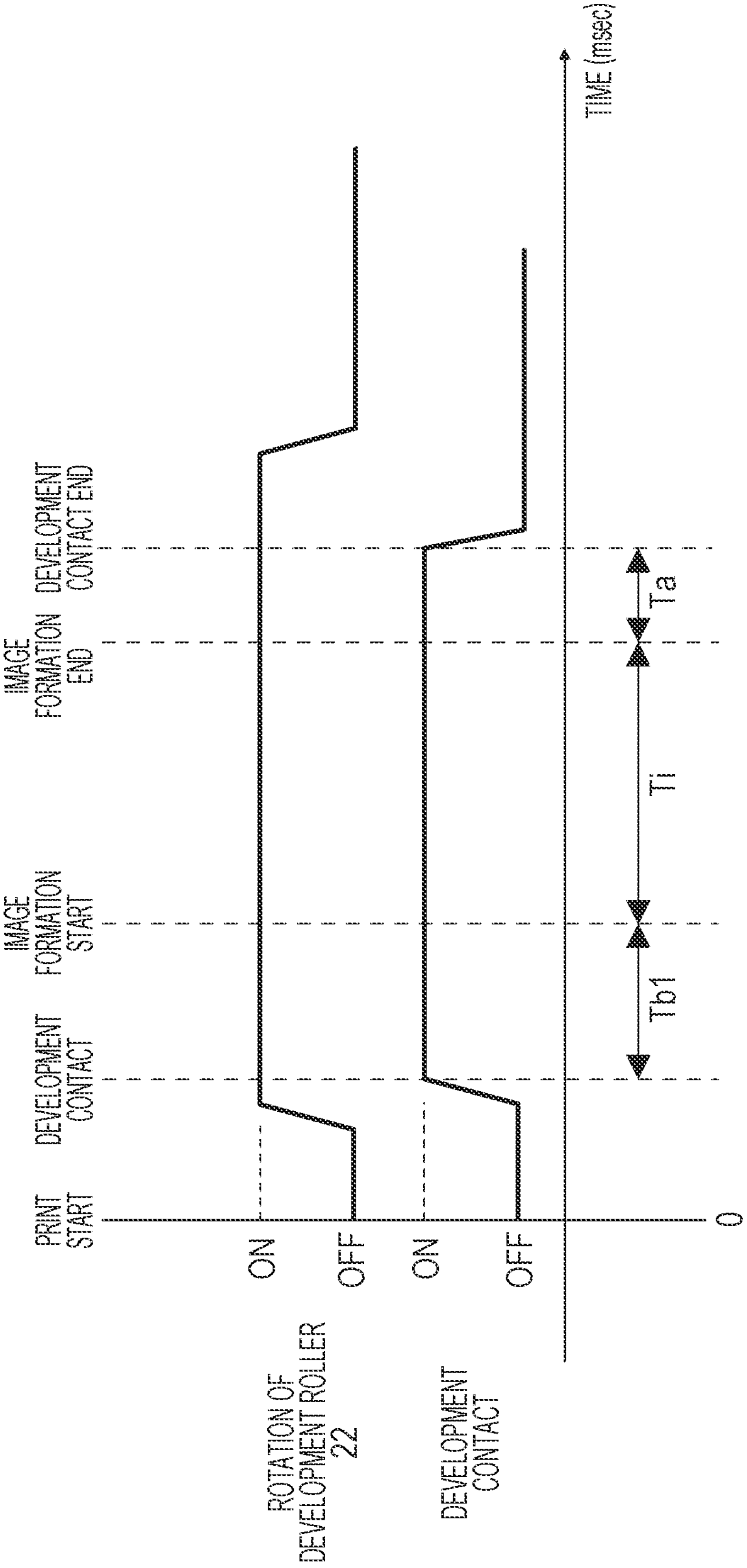
FIG. 26 is a timing chart illustrating a transfer carrier particle supply operation in a fourth embodiment.

In the fourth embodiment, a time to execute the transfer carrier particle supply operation is a development contact time during a print operation as shown in FIG. 26, and is common among the stations.

The operational effect regarding the third characteristic of the fourth embodiment will be described.

In the fourth embodiment, without varying a time to supply transfer carrier particles among the stations, the supply amount of transfer carrier particles to the photoconductor drum 1 is increased in the downstream station as compared to the upstream station in the conveyance direction of the intermediate transfer belt 10. Therefore, a time taken for a transfer carrier particle supply operation in one print operation can be minimized. As a result, a time taken for one print operation is reduced, so productivity is improved.

TABLE 3

| STATION | ADDITIVE AMOUNT OF TRANSFER CARRIER PARTICLES PER TONER PARTICLE | NUMBER OF TRANSFER CARRIER PARTICLES THAT CONTACT WITH PHOTOCONDUCTOR DRUM 1 PER TONER PARTICLE | ADHESION AREA RATIO OF TRANSFER CARRIER PARTICLES |
|---|---|---|---|
| Sa | 300 | ABOUT 4.3 | 20% |
| Sb | 400 | ABOUT 5.8 | 27% |
| Sc | 500 | ABOUT 7.2 | 36% |
| Sd | 600 | ABOUT 8.6 | 41% |

As described above, while a sufficient amount of fine particles is supplied to the surface of the photoconductor drum 1 to improve transfer efficiency, inhibition of fixing by fine particles is suppressed.

In the third and fourth embodiments, no peripheral speed difference is provided in rotation during contact between the development roller 22 and the photoconductor drum 1; however, the configuration is not limited to these embodiments. A peripheral speed difference may be provided in the rotation of the development roller 22 relative to the rotation of the photoconductor drum 1. Such a peripheral speed difference plays a role in stabilizing a toner amount to be developed and a role in, on the photoconductor drum 1, making it difficult to see small unevenness of coat on the development roller 22. The present embodiment has the following operation in supplying transfer carrier particles.

FIG. 17A is a schematic diagram showing the behavior of toner and transfer carrier particles in the developing nip portion when the development roller 22 and the photoconductor drum 1 are set in a non-image forming potential relation. As shown in FIG. 17A, because of a peripheral speed difference between the development roller 22 and the photoconductor drum 1, the following phenomenon occurs. A force parallel to the rotation direction of the development roller 22, which the toner interposed between the development roller 22 and the photoconductor drum 1 receives from the development roller 22, is defined as f1. A force parallel to the rotation direction of the photoconductor drum 1, which the toner interposed between the development roller 22 and the photoconductor drum 1 receives from the photoconductor drum 1, is defined as f2. Under the conditions described in the third and fourth embodiments, f1 and f2 balance each other; whereas, when a peripheral speed difference is provided in the configuration of the third and fourth embodiments, f1 and f2 do not balance each other, and the toner rolls in the developing nip portion. As the toner rolls, transfer carrier particles on the toner, not in contact with the photoconductor drum 1, also move with the rolling of the toner. For this reason, transfer carrier particles can contact with the photoconductor drum 1, so the opportunity to supply transfer carrier particles from toner to the surface of the photoconductor drum 1 increases. Therefore, as shown in FIG. 17B, transfer carrier particles greater in number than those of the third and fourth embodiments can be supplied from toner on the development roller 22 to the surface of the photoconductor drum 1 after passage of the developing nip.

FIG. 18A is a schematic diagram showing the behavior of toner and transfer carrier particles in the developing nip portion when the development roller 22 and the photoconductor drum 1 are set in an image forming potential relation. As shown in FIG. 18A, when the development roller 22 and the photoconductor drum 1 are set in an image forming potential relation as well, the following phenomenon occurs because of the peripheral speed difference between the development roller 22 and the photoconductor drum 1. Toner rolls in the developing nip portion, and the efficiency of supplying transfer carrier particles from the surface of toner to the surface of the photoconductor drum 1 in the developing nip portion improves. As shown in FIG. 18B, the development roller 22 and the photoconductor drum 1 is set in an image forming potential relation, so, after passage of the developing nip portion, toner is developed from the development roller 22 on the surface of the photoconductor drum 1. Because the efficiency of supplying transfer carrier particles from the surface of toner to the surface of the photoconductor drum 1 at the time of passage of the developing nip portion is improved, a large amount of transfer carrier particles can be interposed between the photoconductor drum 1 and toner developed on the surface of the photoconductor drum 1.

From above, in the fourth embodiment, the first drive 110 that drives the photoconductor drum 1, the second drive 130 that drives the development roller 22, and the control section 200 that controls the first drive 110 and the second drive 130 are provided. The control section 200 controls the first drive 110 and the second drive 130 such that the surface moving speed of the development roller 22 is different from the surface moving speed of the photoconductor drum 1 in the developing portion.

For the configuration of a fifth embodiment, like reference signs are assigned to members and portions common to those of the third and fourth embodiments, and the description will not be repeated.

In the fifth embodiment, a toner amount coated on the development roller 22 after passage of the developing blade 23 is varied among the stations while a development peripheral speed difference is provided. A mechanism capable of controlling the supply amount of transfer carrier particles in the fifth embodiment and the operational effects of the fifth embodiment will be described in detail below.

1. Characteristics and Operational Effects

The characteristics and operational effects of the fifth embodiment are the following three points.

The first characteristic is, as in the case of the third embodiment, to supply transfer carrier particles to the surface of the photoconductor drum 1 in accordance with the relationship Ft<Fdr where the adhesion between a transfer carrier particle and toner is Ft and the adhesion between a transfer carrier particle and the photoconductor drum 1 is Fdr. With this configuration, transfer carrier particles can be interposed between the surface of the photoconductor drum 1 and toner, and the adhesion of toner is reduced by not bringing the toner into contact with the photoconductor drum 1. As a result, the operational effect to improve primary transferability in the primary transfer step is obtained.

The second characteristic is to adjust the supply amount (adhesion amount) of transfer carrier particles such that the supply amount is greater in the downstream station than in the upstream station in the conveyance direction of the intermediate transfer belt 10. In the downstream station for which higher primary transferability is needed, primary transferability is improved by supplying a larger amount of transfer carrier particles as compared to the upstream station. On the other hand, in the upstream station for which not so high primary transferability is needed, the supply amount of transfer carrier particles is reduced. As a result, the total amount of transfer carrier particles in toner on a recording medium P can be minimized, with the result that the operational effect to reduce influences on fixability is obtained.

The above two characteristics and their operational effects are similar to those of the third and fourth embodiments, so the detailed description is omitted.

The third characteristic is to vary the amount of toner on the surface of the development roller 22 after passage of the developing blade 23 among the stations while a development peripheral speed difference is provided. The amount of toner on the surface of the development roller 22 is increased in the downstream station than in the upstream station in the conveyance direction of the intermediate transfer belt 10. At this time, the supply amount (adhesion amount) of transfer carrier particles can be increased in the downstream station than in the upstream station in the conveyance direction of the intermediate transfer belt 10.

As described in the third embodiment, because of a peripheral speed difference between the development roller 22 and the photoconductor drum 1, the following phenomenon occurs. A force parallel to the rotation direction of the development roller 22, which the toner interposed between the development roller 22 and the photoconductor drum 1 receives from the development roller 22, is defined as f1. A force parallel to the rotation direction of the photoconductor drum 1, which the toner interposed between the development roller 22 and the photoconductor drum 1 receives from the photoconductor drum 1, is defined as f2. Due to the development peripheral speed difference, f1 and f2 do not balance each other, and the toner rolls in the developing nip portion. When the toner rolls, transfer carrier particles on the toner, not in contact with the photoconductor drum 1, move with the rolling of the toner and are able to contact with the photoconductor drum 1. Therefore, the opportunity to supply transfer carrier particles from toner to the photoconductor drum 1 increases. Movement of transfer carrier particles on toner, not in contact with the photoconductor drum 1, increases with the amount of toner on the development roller 22 due to the rolling. Thus, while toner is caused to roll by providing a peripheral speed difference between the development roller 22 and the photoconductor drum 1, the amount of toner on the development roller 22 is controlled. With the result that, the supply amount of transfer carrier particles can be controlled.

In the fifth embodiment, as shown in Table 4, the amounts of toner on the development rollers 22 in Sa to Sd were respectively adjusted to Sa: 0.28, Sb: 0.30, Sc: 0.32, Sd: 0.34 [mg/$cm^2$]. A force regulating toner with the developing blade 23 was adjusted by changing a contact position between the developing blade 23 and the development roller 22. Specifically, as shown in Table 4, the contact positions were adjusted such that the distal ends of the developing blades 23 were respectively placed at positions Sa: 0.70, Sb: 0.60, Sc: 0.50, Sd: 0.40 [mm] from the centers of the development rollers 22.

In the fifth embodiment, the development roller 22 rotates in the same direction at a peripheral speed ratio of 140% to the photoconductor drum 1 in the developing nip portion with the photoconductor drum 1. In other words, the moving speed of the surface of the development roller 22 is 1.4 times as high as the moving speed of the surface of the photoconductor drum 1.

TABLE 4

| | TONER AMOUNT ON DEVELOPMENT ROLLER [mg/cm$^2$] | DISTAL END POSITION OF DEVELOPING BLADE [mm] | ADHESION AREA RATIO [%] |
|---|---|---|---|
| Sa | 0.28 | 0.70 | 15 |
| Sb | 0.30 | 0.60 | 20 |
| Sc | 0.32 | 0.50 | 25 |
| Sd | 0.34 | 0.40 | 30 |

In the fifth embodiment, a time to execute the transfer carrier particle supply operation is a development contact time in a print operation as shown in FIG. 14, and is common among the stations. In addition, regardless of which station, the additive amount of transfer carrier particles is adjusted such that the number of coating transfer carrier particles on a toner particle becomes about 500.

Next, the operational effects of the fifth embodiment will be described.

In the fifth embodiment, without varying a time to supply transfer carrier particles among the stations, the supply amount of transfer carrier particles to the photoconductor drum 1 can be increased in the downstream station as compared to the upstream station in the conveyance direction of the intermediate transfer belt 10. Therefore, a time taken for a transfer carrier particle supply operation in one print operation can be minimized. As a result, a time taken for one print operation is reduced, so productivity is improved. In addition, the additive amount of transfer carrier particles is reduced, so the risk of contamination due to movement of transfer carrier particles to components (for example, the developing blade 23 and the supply roller 26) in the developing unit is reduced.

As described above, while a sufficient amount of fine particles is supplied to the surface of the photoconductor drum to improve transfer efficiency, inhibition of fixing by fine particles is suppressed.

In the third, fourth, and fifth embodiments, the case of four colors that are yellow (Y), magenta (M), cyan (C), and black (K) is described; however, the configuration is not limited to these embodiments. For example, four or more stations further including white toner, metallic-color toner, or the like may be adopted. In this case as well, an effect is obtained when the relationship (Adhesion area ratio of transfer carrier particles in the upstream process cartridge) <(Adhesion area ratio of transfer carrier particles in the downstream process cartridge) is satisfied between at least two process cartridges.

In the third, fourth, and fifth embodiments, the characteristics are described by using the adhesion area ratio of transfer carrier particles; however, when the adhesion Fc between transfer carrier particles is less than the adhesion Ft between toner and a transfer carrier particle (Fc<Ft), the adhesion amount may be used. In other words, the relationship (Adhesion amount of transfer carrier particles in the upstream process cartridge)<(Adhesion amount of transfer carrier particles in the downstream process cartridge) may be satisfied. In the case of Fc<Ft, transfer carrier particles are not further supplied to transfer carrier particles supplied to the photoconductor drum 1. For this reason, transfer carrier particles on the photoconductor drum 1 form a single layer, and the magnitude relationship in adhesion area ratio is synonymous with the magnitude relationship in adhesion amount.

Therefore, after the photoconductor drums 1 rotate in a state where the photoconductor drums 1 and the development rollers 22 are respectively in contact with each other, the adhesion amount of carrier particles adhered to the surface of the second photoconductor drum 1*b* is greater than the adhesion amount of carrier particles adhered to the surface of the first photoconductor drum 1*a*.

In the third, fourth, and fifth embodiments, no cleaning member is provided on the photoconductor drum 1; however, the configuration is not limited to these embodiments. A photoconductor drum cleaning member may be provided. When a cleaning member is provided on the photoconductor drum 1, transfer carrier particles coating the photoconductor drum 1 is collected by the cleaning member every rotation of the photoconductor drum 1. However, transfer carrier particles can be supplied simultaneously with development, the adhesion area (or amount) of transfer carrier particles on the photoconductor drum 1 during a period from development start to primary transfer just needs to be controlled. For example, the peripheral speed difference of the rotation of the development roller 22 to the rotation of the photoconductor drum 1 is increased in the downstream process cartridge as compared to the upstream process cartridge in the conveyance direction of the intermediate transfer belt 10. As a result, the downstream process cartridge is able to cause a larger amount of toner to roll than the upstream process cartridge. As a result, the opportunity to supply transfer carrier particles to the downstream photoconductor drum 1 in the conveyance direction of the intermediate transfer belt 10 increases as compared to the upstream process cartridge, so a similar condition to those of the third, fourth, and fifth embodiments can be established, and operational effects similar to those of the third, fourth, and fifth embodiments are obtained.

Figure 27:
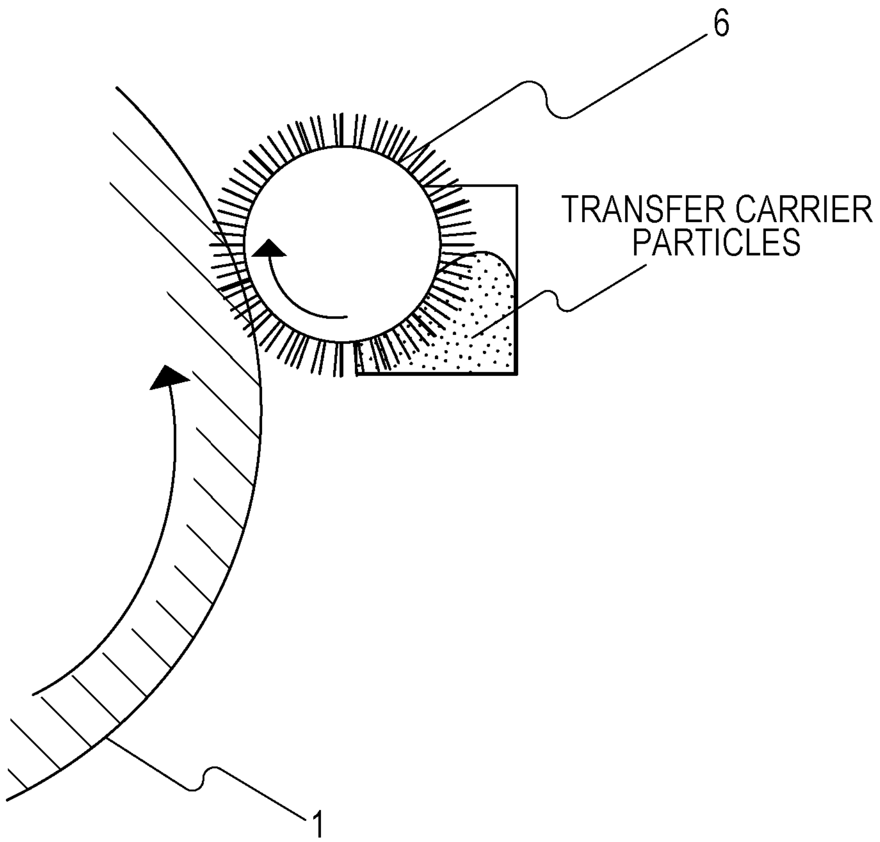
FIG. 27 is a diagram illustrating a transfer carrier particle supply member in another embodiment.

In the third, fourth, and fifth embodiments, transfer carrier particles are supplied to the photoconductor drum 1 via toner in accordance with the relationship Ft<Fdr; however, the configuration is not limited to these embodiments. A transfer carrier particle supply member may be provided separately from the developing unit 4. In this case, the adhesion Fs between a transfer carrier particle and the transfer carrier particle supply member and Fdr can be set to the relationship Fs<Fdr to supply transfer carrier particles to the photoconductor drum 1. The transfer carrier particle supply member just needs to satisfy the relationship in adhesion. For example, as shown in FIG. 27, transfer carrier particles may be supplied to the photoconductor drum 1 with a brush member as the transfer carrier particle supply member. In FIG. 27, transfer carrier particles are supplied via a transfer carrier particle supply roller 6. The transfer carrier particle supply roller 6 is a brush roller that plays a role in supplying transfer carrier particles to the photoconductor drum 1 and that has a brush layer at its surface. The transfer carrier particle supply roller 6 is driven for rotation in a reverse direction to the rotation direction of the photoconductor drum 1 and is supplied with transfer carrier particles from a transfer carrier particle container containing transfer carrier particles to the brush. Transfer carrier particles are supplied from the brush to the photoconductor drum 1 at a contact portion between the transfer carrier particle supply roller 6 and the photoconductor drum 1.

In the third, fourth, and fifth embodiments, the SUS plate is used for the developing blade 23 as a supporting member; however, the configuration is not limited to these embodiments. For example, a metal thin film, such as phosphor bronze and aluminum, may be used. In these embodiments, the thin film made of electrically conductive urethane resin is used to coat the surface of the supporting member; however, the configuration is not limited to these embodiments. A thin film made of an electrically conductive resin made of polyamide elastomer or urethan rubber may be used to coat the surface of the supporting member. Alternatively, an electrically conductive supporting member itself may be brought into contact with the development roller 22 as the developing blade 23.

In the third, fourth, and fifth embodiments, toner charge amount, toner supply amount, and toner coat amount are stabilized by applying a potential difference of −200 V to the supply roller 26 and the developing blade 23 with respect to the development roller 22; however, the configuration is not limited to these embodiments. When toner charge amount, toner supply amount, and toner coat amount are stable regardless of voltage, no potential difference needs to be provided. In this case, by setting the same potential to the development roller 22, the high-voltage power source can be reduced, so a reduction in the size and cost of the apparatus is achieved.

In the third, fourth, and fifth embodiments, the primary transferability of each station can be controlled with the adhesion state of transfer carrier particles. Therefore, a primary transfer voltage does not need to be varied among the stations, the primary transfer voltage source to apply a primary transfer voltage can be made common to the stations, so a reduction in the size and cost of the apparatus is achieved.

Even when the primary transfer voltage source is provided individually in each station, an optimal primary transfer voltage can be set according to primary transferability needed for each station. Therefore, a scattering, retransfer, and the like of an image can be reduced in the primary transfer portion. Retransfer means a phenomenon in which an image formed in the upstream station is transferred to the intermediate transfer belt 10, the image receives discharge by passing through the primary transfer portion of the downstream station, and is transferred again to the photoconductor drum 1 of the downstream station.

Figure 28:
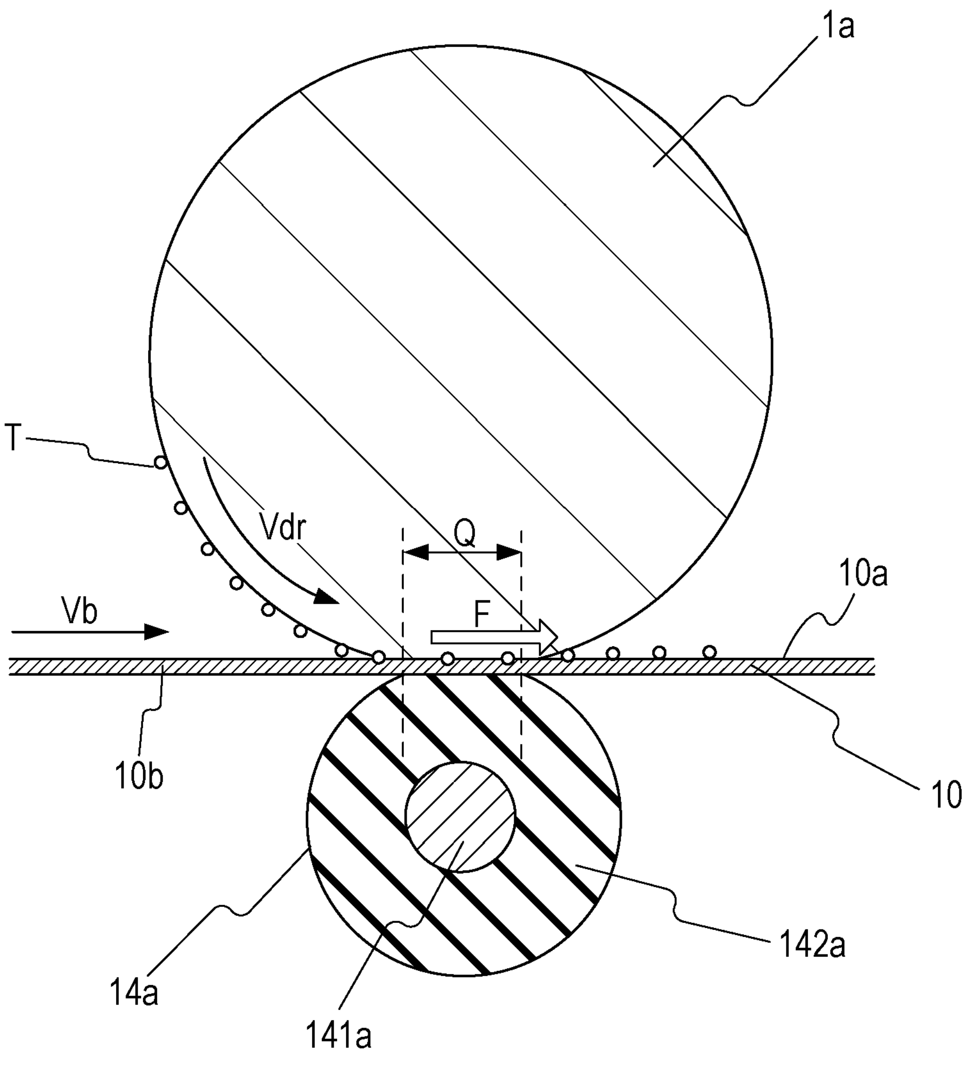
FIG. 28 is a diagram illustrating a primary transfer portion in a sixth embodiment.

Next, a sixth embodiment will be described. The intermediate transfer belt 10 according to the sixth embodiment is stretched by a plurality of stretching members 11, 12, 13 and is driven for rotation at a certain peripheral speed difference relative to the photoconductor drum 1*a* in a direction to move in a circumferential direction in an area that is opposite and that contacts with the photoconductor drum 1*a*. As shown in FIG. 28, the intermediate transfer belt 10 has a two-layer configuration made up of a coat layer 10*a* and a base layer 10*b* and has a perimeter of 700 mm. The coat layer 10*a* has a high-smoothness by applying an acrylic resin coating solution with a thickness of 2 μm to the surface.

On the other hand, the base layer 10*b* is made of a material containing polyester as a principal component and has a thickness of 100 μm. The coat layer 10*a* has a film thickness less than that of the base layer 10*b*, so the influence on the resistance value of the intermediate transfer belt 10 is small; however, where necessary, the resistance may be adjusted by adding a conductive agent, such as carbon black. The thickness of the coat layer 10*a* is preferably in a range of 0.5 to 4.0 μm from the viewpoint of smoothness and production.

The resin material to be applied to the coat layer 10*a* is not limited and may be, for example, a material, such as polyester, polyether, polycarbonate, polyallylate, urethane, silicone, and fluororesin. The material of the base layer 10*b* may be another material as long as the material is a thermoplastic resin. For example, a material, such as polyimide, polycarbonate, polyallylate, acrylonitrile butadiene styrene copolymer (ABS), polyphenylene sulfide (PPS), and polyvinylidene fluoride (PVdF), or a blended resin of some of these resins.

Figure 29:
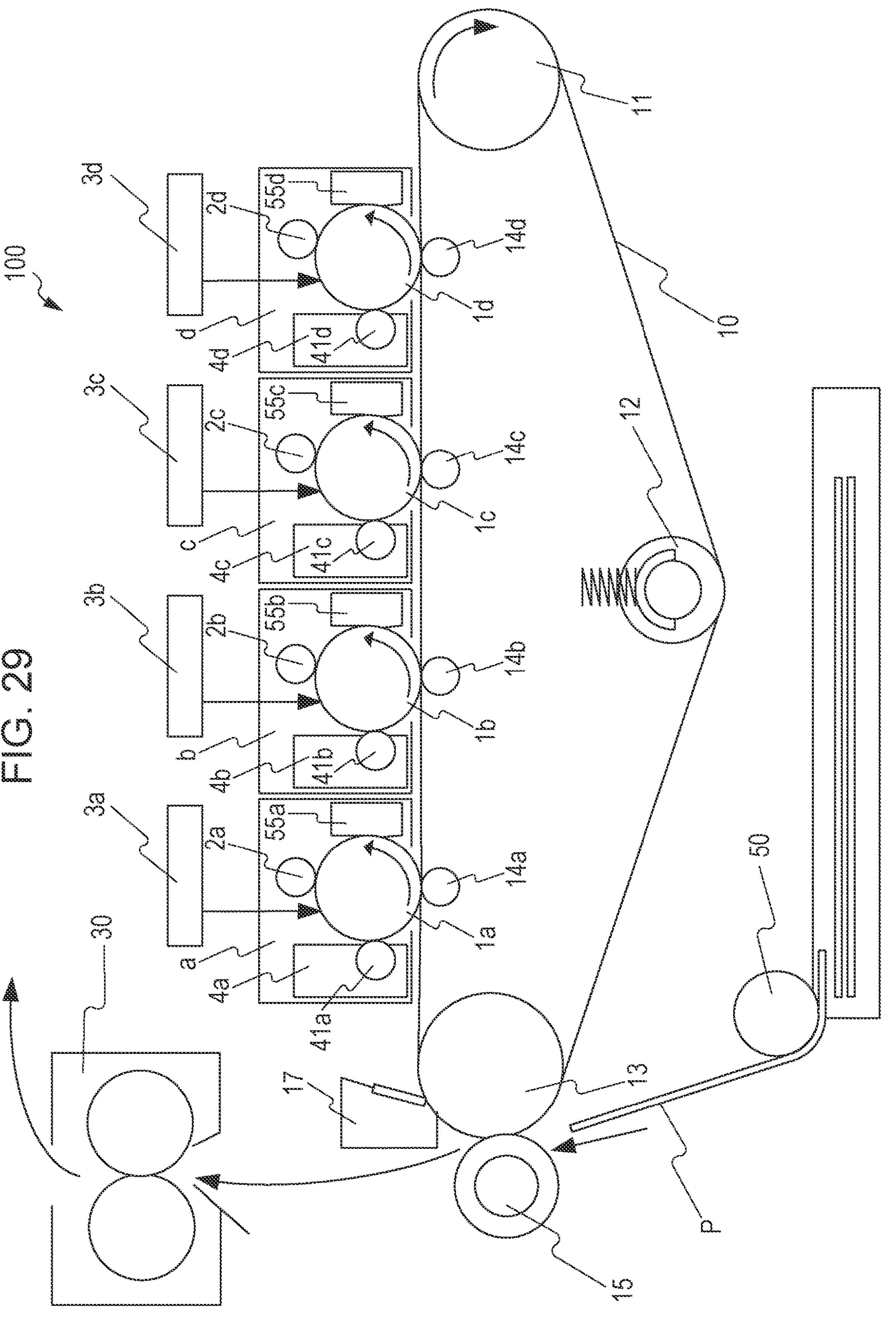
FIG. 29 is a schematic diagram of an image forming apparatus in the sixth embodiment.

A yellow toner image formed on the photoconductor drum 1*a* is electrostatically transferred to the intermediate transfer belt 10 in process of passing through the primary transfer portion that is the contact portion between the primary transfer roller 14*a* and the photoconductor drum 1*a* via the intermediate transfer belt 10 serving as an intermediate transfer member. A direct current voltage of 500 V is applied from the primary transfer voltage source 160 to the primary transfer roller 14*a* serving as a primary transfer member during an image forming operation. Primary-transfer residual toner remaining on the surface of the photoconductor drum 1*a* is cleaned and removed by a cleaning unit 55*a* as shown in FIG. 29 and subjected to a process following the charging in the image forming process.

Hereinafter, similarly, a second-color magenta toner image, a third-color cyan toner image, and a fourth-color black toner image are respectively formed by the second, third, and fourth image forming stations b, c, d. The yellow toner image, the magenta toner image, the cyan toner image, and the black toner image are sequentially transferred to the intermediate transfer belt 10 in layers. Thus, a combined color image corresponding to an intended color image is obtained.

Subsequently, a four-color toner image on the intermediate transfer belt 10 as described above is transferred at a time to the surface of a recording medium P fed by the sheet feeding device 50 in process of passing through the secondary transfer nip portion formed by the intermediate transfer belt 10 and the secondary transfer roller 15 serving as a secondary transfer member (secondary transfer). The secondary transfer roller 15 contacts with the intermediate transfer belt 10 with a pressure of 5 kgf to form the secondary transfer nip portion in the secondary transfer portion. The second transfer roller 15 is rotated by the intermediate transfer belt 10 to rotate. The secondary transfer roller 15 is applied with a voltage of 2500 V from the secondary transfer voltage source 150 when secondarily transferring toner on the intermediate transfer belt 20 to a recording medium P, such as paper. The intermediate transfer belt 10 of the sixth embodiment can reduce a small space from a recording medium P by the high-smoothness coat layer 10*a*, so a disturbance of electric field in the secondary transfer nip portion is suppressed, with the result that secondary transfer efficiency is improved.

After that, the recording medium P carrying the four-color toner image is introduced into the fixing unit 30 and subjected to heating and pressurization. Thus, the four-color toner is fused and mixed and fixed to the recording medium P. Toner remaining on the intermediate transfer belt 10 after secondary transfer is cleaned and removed by the cleaning unit 17.

Through the above operation, a full-color print image is formed.

FIG. 28 is an enlarged view of the primary transfer portion in the first image forming station a.

The primary transfer roller 14*a* is made up of a metal core 141*a* with an outside diameter of 6 mm and an elastic member 142*a* having rubber elasticity with a thickness of 3 mm. The elastic member 142*a* is wound around the metal core 141*a*. In the primary transfer portion, the primary transfer roller 14*a* is disposed opposite the photoconductor drum 1*a* via the intermediate transfer belt 10 and clamps the intermediate transfer belt 10 with the photoconductor drum 1*a* by pressing the intermediate transfer belt 10 against the photoconductor drum 1*a* with 500 gf. The intermediate transfer belt 10 is wound around the photoconductor drum 1*a* by a predetermined length to be in contact with the photoconductor drum 1*a*. The contact area forms a drum nip portion in the transfer portion. At this time, a drum nip width that is the contact width of the drum nip portion is defined as Q.

The photoconductor drum 1*a* is driven for rotation at a surface moving speed Vdr that is a predetermined peripheral speed. The intermediate transfer belt 10 is rotated at a moving speed Vb that is a predetermined peripheral speed. In this state, in the drum nip portion, toner T is sequentially transferred to the intermediate transfer belt 10. The primary transfer roller 14*a* is rotating together with the intermediate transfer belt 10. The peripheral speed Vdr of the photoconductor drum 1*a* is a moving speed of the surface of the photoconductor drum 1*a*. The peripheral speed Vb of the intermediate transfer belt 10 is a moving speed of the surface of the intermediate transfer belt 10. Here, in the configuration of the sixth embodiment, the surface of the intermediate transfer belt 10 is moved by the photoconductor drum drive 110 to provide a surface moving speed difference between the photoconductor drum 1*a* and the intermediate transfer belt 10. Alternatively, a drive that drives the intermediate transfer belt 10 may be provided separately from the photoconductor drum drive 110 or the intermediate transfer belt 10 may be driven another drive.

Next, the mechanism of improving primary transfer efficiency by applying a peripheral speed difference to the drum nip portion will be described with reference to FIG. 30.

Figure 30:
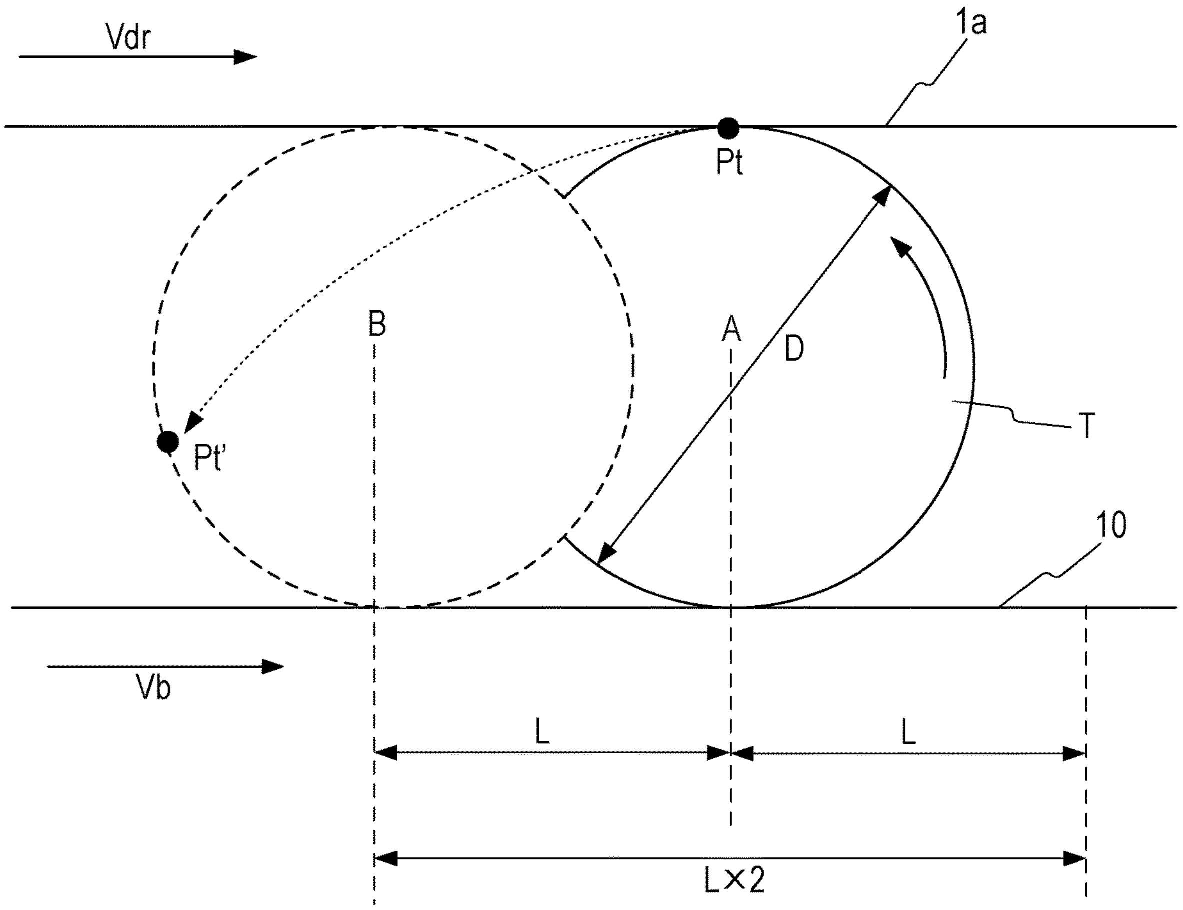
FIG. 30 is a diagram illustrating the behavior of a toner particle in a drum nip portion in the sixth embodiment.

FIG. 30 schematically shows the drum nip portion and is a diagram illustrating the behavior of toner T when a peripheral speed difference is applied between the photoconductor drum 1*a* and the intermediate transfer belt 10.

In the drum nip portion, the photoconductor drum 1*a* rotates at a peripheral speed of Vdr, and the intermediate transfer belt 10 rotates at a peripheral speed Vb, so a peripheral speed difference Vdr−Vb is applied. In the sixth embodiment, Vdr and Vb are in the relationship Vdr<Vb, and the primary transfer configuration is such that the peripheral speed Vb of the intermediate transfer belt 10 is higher than the peripheral speed Vdr of the photoconductor drum 1*a*.

The lowermost-layer toner particles T adhering to a latent image forming portion on the photoconductor drum 1*a* through a development process each have a contact point with the photoconductor drum 1*a*. Toner particles T each having a contact point with the photoconductor drum 1*a* mostly have contact points at which the adhesion to the photoconductor drum 1*a* is large and are in a stable state. Toner particles T tend to adhere at points where the adhesion that varies depending on the surface profile and the surface charge state is large. Toner particles T adhering at points where the adhesion is large are difficult to be transferred, and, to increase primary transfer efficiency, transfer conditions to manifest a force greater than or equal to the adhesion is needed.

Initially, when a toner particle T comes into the drum nip portion, the toner particle T rotates like a bearing due to the peripheral speed difference and moves from state A to state B. With this movement, a contact point Pt between the toner particle T and the photoconductor drum 1*a* shifts to point Pt'. Thus, before entering the drum nip portion, the toner particle T separates from the contact point Pt where the toner particle T has been in contact with the photoconductor drum 1*a* and the adhesion is relatively large, with the result that the adhesion between the toner particle T and the photoconductor drum 1*a* decreases. Since the adhesion surface of the toner particle T separates from the photoconductor drum 1*a* at the contact point Pt due to a peripheral speed difference, the magnitude relationship between the peripheral speed Vdr of the photoconductor drum 1*a* and the peripheral speed Vb of the intermediate transfer belt 10 does not need to conform to the relationship Vdr<Vb, and the effect is also obtained even when the magnitude relationship is inverted.

As described above, by applying a peripheral speed difference between the photoconductor drum 1*a* and the intermediate transfer belt 10, the adhesion between toner T and the photoconductor drum 1*a* decreases, and toner T can be easily stripped off from the photoconductor drum 1*a*. Thus, the effect of improving primary transfer efficiency is manifested.

Next, the range of peripheral speed difference to achieve the improvement in primary transfer efficiency will be described. First, a relative amount of movement between the photoconductor drum 1*a* and the intermediate transfer belt 10 in the drum nip portion is defined as a rolling amount of toner T due to the peripheral speed difference. The nip width Q of the drum nip portion and a peripheral speed difference ratio are set such that the rolling amount falls within a preset range to optimize the balance between transfer efficiency and image quality degradation.

Hereinafter, the rolling amount of toner T, which is a particular parameter to be defined in the sixth embodiment, will be described.

The rolling amount of toner T is a relative amount of movement between the photoconductor drum 1*a* and the intermediate transfer belt 10 in the drum nip portion due to a peripheral speed difference and is defined as follows in the present embodiment.

$$\text{Rolling amount } (R)=\text{Peripheral speed difference ratio } (Vr)\times\text{Drum } nip \text{ width } (Q) \quad (4)$$

$$\text{Peripheral speed difference ratio } (Vr)=|Vdr-Vb|/Vdr\times 100 \quad (5)$$

Here, in the expression 4, the peripheral speed difference ratio (peripheral speed ratio or speed ratio) Vr is defined as a percentage of a peripheral speed difference |Vdr−Vb| between the peripheral speed Vdr of the photoconductor drum 1*a* and the peripheral speed Vb of the intermediate transfer belt 10 to the peripheral speed Vdr.

Table 5 shows the rolling amount R when the drum nip portion and the peripheral speed difference ratio Vr are changed. As shown in Table 5, the rolling amount R is a parameter that increases as the peripheral speed difference ratio Vr increases or as the drum nip width Q increases.

TABLE 5

| ROLLING AMOUNT | | PERIPHERAL SPEED DIFFERENCE RATIO (%) | | | | | | | | |
|---|---|---|---|---|---|---|---|---|---|---|
| R (μm) | | 0.5 | 0.75 | 1 | 1.5 | 2 | 2.5 | 3 | 4 | 5 |
| DRUM | 1000 | 5.0 | 7.50 | 10 | 15.0 | 20 | 25.0 | 30 | 40 | 50 |
| NIP | 1500 | 7.5 | 11.25 | 15 | 22.5 | 30 | 37.5 | 45 | 60 | 75 |
| WIDTH | 2000 | 10.0 | 15.00 | 20 | 30.0 | 40 | 50.0 | 60 | 80 | 100 |
| N (μm) | 2500 | 12.5 | 18.75 | 25 | 37.5 | 50 | 62.5 | 75 | 100 | 125 |
| | 3000 | 15.0 | 22.50 | 30 | 45.0 | 60 | 75.0 | 90 | 120 | 150 |

Figure 31:
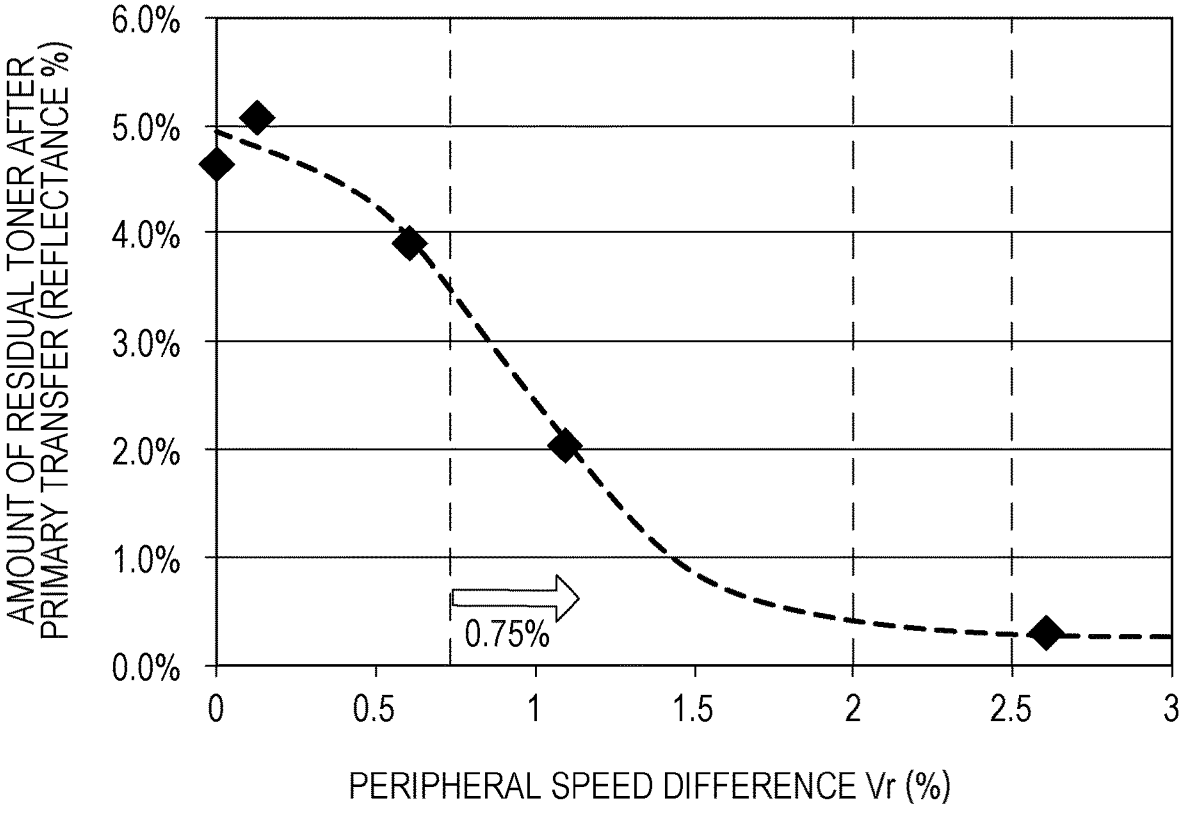
FIG. 31 is a graph illustrating the relationship between peripheral speed difference and primary-transfer residual toner amount in the sixth embodiment.

FIG. 31 shows measured results of residual toner amount after primary transfer, remaining on the surface of the photoconductor drum 1 by varying the peripheral speed difference ratio Vr, in the case where the drum nip width Q is 1500 μm. The vertical axis in the graph represents measured results of residual toner amount after primary transfer in accordance with a reflectance corresponding to a reflection density. A solid image was printed in the M-color station, and a residual toner image after transfer on the surface of the C-color photoconductor drum 1*c* after a solid image was printed (transferred) in the downstream C-color station was taped. A reflectance of the taped result was measured with the reflection densitometer (model TC-6DS, produced by TokyoDenshoku Co., Ltd.). As a result, it demonstrated that the amount of residual toner after primary transfer reduced as the peripheral speed difference ratio Vr increased, and primary transfer efficiency was improved. As for the effect of improving primary transfer efficiency due to the peripheral speed difference ratio Vr, the effect was steeply manifested from around 0.75% of the peripheral speed difference ratio Vr and almost no residual toner after primary transfer was present in the range higher than or equal to 2% of the peripheral speed difference ratio Vr. This indicates that the effect of a peripheral speed difference is sufficiently exhibited. The drum nip width Q in the configuration of the sixth embodiment is 1500 μm, so the rolling amount (R) of toner T at a peripheral speed difference ratio (Vr) of 0.75% at which the effect of improving primary transfer efficiency begins to be manifested is 11.25 μm.

As described above, in the sixth embodiment, toner particles T having a weight average particle diameter (D) of 7.0 μm are used, and, when toner particles T are assumed as spheres, the circumference of each toner particle T is 21.98 μm. Here, the rolling amount R around which the effect of improving primary transfer efficiency begins to be manifested is 11.25 μm. This is the circular arc length of about a half of the circumference of each toner particle T. In other words, when toner particles T roll about half the circumference, initial contacts of toner particles T with the photoconductor drum 1*a* shift toward the intermediate transfer belt 10 and ensure a sufficient distance from the photoconductor drum 1*a* to reduce the adhesion, so it is presumable that primary transfer efficiency improves. From above, in the sixth embodiment, the value of a half of the average circumference calculated from the weight average particle diameter of toner T to be used is set as a lower limit of the rolling amount R.

Next, an upper limit of the rolling amount R will be described. The upper limit of the rolling amount R is based on an amount of movement of toner in the drum nip portion from the viewpoint of image quality degradation. As shown in FIG. 30, when a toner particle T is rotated and moved by a distance L from state A to state B, since the toner particle T moves the distance L, a relative moving distance between the photoconductor drum 1*a* and the intermediate transfer belt 10 is L×2. In other words, with respect to a relative moving distance between the photoconductor drum 1*a* and the intermediate transfer belt 10, that is, the rolling amount R, toner particles T slip in the drum nip portion by a half of the circumference of a toner particle T. If toner T slips, there occurs variations in the height and width of a toner image, with the result that roughness deteriorates.

For this reason, an allowable range of an amount of slip of toner T in the range of about 50 μm corresponding to the size of about 1 Dot of 600 DPI that is the resolution of a general image forming apparatus, so the upper limit of the rolling amount R is 100 μm.

From above, the range of the rolling amount R taking the balance between primary transfer efficiency and image quality degradation is a range from the length of a circular arc of a half of the circumference of a toner particle T to 100 μm. When toner weight average particle diameter D, drum nip width Q, and peripheral speed difference ratio Vr are used, a configuration that satisfies the range shown in the expression 6 is desired.

$$\tfrac{1}{2}\times D(\mu m)\times\pi \leq Vr(\%)\times Q(\mu m)/100 \leq 100\ \mu m \quad (6)$$

In the configuration of the sixth embodiment, the drum nip width Q=1500 μm and the peripheral speed difference ratio Vr=2.5% are used.

In the sixth embodiment, toner particles are assumed as spheres; however, toner particles are not limited to spheres. As long as toner particles have a shape such that the toner particles can roll due to a peripheral speed difference, the effect of improving primary transferability is obtained.

3. Image Blur Mechanism

In the image forming apparatus 100 that applies the above-described peripheral speed difference between the photoconductor drum 1 and the intermediate transfer belt 10, when a toner image formed on the surface of the photoconductor drum 1 is primarily transferred to the intermediate transfer belt 10, rapid fluctuations in the rotation of the photoconductor drum 1 can occur. It is found that, uneven exposure occurs in laser exposure due to fluctuations in rotation, subsequently image streaks occur in a toner image formed on the surface of the photoconductor drum 1, and this causes degradation of image quality of a final image.

Hereinafter, the detailed description will be described with reference to FIG. 28 showing an enlarged view of the primary transfer portion in the first image forming station a.

During a print operation, the intermediate transfer belt 10 is driven for rotation at a surface peripheral speed higher by about 2.5% than the photoconductor drum 1*a* to be driven for rotation. This is because, by applying a peripheral speed difference between the photoconductor drum 1*a* and the intermediate transfer belt 10 as described above, the adhesion between toner T and the photoconductor drum 1*a* decreases, the toner T can be easily stripped from the photoconductor drum 1*a*, and, as a result, primary transfer efficiency improves.

In such a situation, in a state where no toner T is present in the drum nip portion, a frictional force F acts on the surface of the photoconductor drum 1*a* from the surface of the intermediate transfer belt 10 toward a downstream side in a tangential direction (sub-scanning direction). When the leading edge of a toner image developed on the surface of the photoconductor drum 1*a* enters the drum nip portion, the frictional force F steeply reduces (F→F≈0). This is because, when toner T is supplied into the drum nip portion, the surface of the photoconductor drum 1*a* and the surface of the intermediate transfer belt 10 become easy to slip relative to each other. For this reason, spontaneous fluctuations in rotation occur in the photoconductor drum 1*a* and, as a result, uneven writing occurs in laser exposure to the surface of the photoconductor drum 1*a*. This subsequently becomes image streaks in a main scanning direction on a toner image formed on the surface of the photoconductor drum 1*a*, and the image streaks also appear in a final image.

Image streaks in a final image on a recording medium P appear on a toner image at a position shifted by the distance between the laser exposure unit and the drum nip (in the sixth embodiment, for example, 30 mm) toward the downstream side in the sub-scanning direction from a leading part in the sub-scanning direction of the toner image placed in an image pattern. Particularly, when a halftone toner image part, which is susceptible to uneven exposure of laser, is present at that position, remarkable image streaks appear.

As described above, as a result of intermittent temporal fluctuations in the frictional force F according to an image pattern intended by a user, image streaks due to fluctuations in the rotation of the photoconductor drum 1*a* occur on a final image.

As measures for image streaks, a method of reducing fluctuations in the rotation of the photoconductor drum 1*a* or the intermediate transfer belt 10 by additionally forming small dot toner images on the photoconductor drum with toner, such as yellow, in addition to a toner image of an image pattern intended by a user is known. It is generally known that various image defects can be prevented; however, added dot toner images may take on a yellow tint on a recording medium P and may be prominent.

From above, by reducing the frictional force F between the photoconductor drum 1*a* and the intermediate transfer belt 10 in the drum nip portion with a manner other than dot toner images, image streaks due to fluctuations in the rotation of the photoconductor drum 1 are reduced even when the leading edge of a toner image enters the drum nip portion. Moreover, color variation on a recording medium P can be reduced.

Operation of Sixth Embodiment

Next, the operation of the sixth embodiment will be described by using Comparative Examples.

In the sixth embodiment, fine particles are supplied in advance from toner carried on the development roller 41 to the photoconductor drum 1 before a toner image is developed, and the fine particles are adhered to the photoconductor drum 1. For this purpose, the adhesion Ft between fine particles and toner is set so as to be less than the adhesion Fdr between the fine particles and the photoconductor drum 1. Thus, by reducing the frictional force F between the photoconductor drum 1 and the intermediate transfer belt 10, color variation on a recording medium P can be reduced while image streaks due to fluctuations in the rotation of the photoconductor drum 1 are reduced.

Hereinafter, the description will be made by using the configuration of the first image forming station a.

Initially, to demonstrate the effect of coating a certain amount or more of fine particles on the photoconductor drum 1*a* of the sixth embodiment, the adhesion Ft between fine particles and toner and the adhesion Fdr between the fine particles and the photoconductor drum 1*a* were measured.

Specifically, measurement of adhesion was performed with an SPM, fine particles were fixed to a lever tip end of a cantilever, and the cantilever was pressed against toner with a predetermined pressing force. After that, a force used to separate the cantilever from the toner was measured as the adhesion Ft between fine particles and toner.

The predetermined pressing force to press the cantilever against toner in measuring the adhesion can be set to a force with which fine particles interposed between toner and the photoconductor drum 1*a* in the developing nip portion are pressed against toner. The predetermined pressing force was calculated by a calculation method described below. Here, the state where fine particles are interposed between toner and the photoconductor drum 1*a* in the developing nip portion means a state where fine particles are in contact with both toner and the photoconductor drum 1 at the same time.

Specifically, it was assumed that the development roller 41*a* and the photoconductor drum 1*a* were in contact with each other via toner in the developing nip portion, and it was assumed that toner in contact with the photoconductor drum 1*a* was in closest packing. It was assumed that, at the contact portion between toner and the photoconductor drum 1*a*, toner and the photoconductor drum 1*a* were in contact with each other via fine particles.

On the above-described assumption, the total number N of fine particles interposed between toner and the photoconductor drum 1*a* in the developing nip portion was calculated. By using the calculated number N and the contact force F between the development roller 41*a* and the photoconductor drum 1*a*, F/N that is a pressing force of a fine particle against toner in the developing portion was calculated, and the calculated F/N was adopted as the predetermined pressing force of the cantilever against toner in measuring the adhesion.

Since the pressing force F between the development roller 41*a* and the photoconductor drum 1*a* in the sixth embodiment is 200 gf, (Pressing force of a fine particle against toner in the developing nip portion)=F/N is about 4.5 (nN). In the sixth embodiment, this 4.5 (nN) was adopted as the predetermined pressing force of the cantilever against toner in measuring the adhesion with the SPM.

Similar adhesion measurement was also performed for the photoconductor drum 1*a*, and the adhesion Fdr between fine particles, fixed at the tip end of the cantilever, and the photoconductor drum 1*a* was measured.

As a result, in the sixth embodiment, the adhesion Ft between fine particle and toner was 32.8 (nN), the adhesion Fdr between fine particles and the photoconductor drum 1*a* was 210.1 (nN), and it was confirmed that the adhesion Ft between fine particles and toner was less than the adhesion Fdr between fine particles and the photoconductor drum 1*a*. The magnitude relationship does not change even when measurement is performed within the range of the pressing force of the cantilever from 3.0 (nN) to 50 (nN).

Next, the results of evaluations conducted to confirm the effect of the manner of supplying fine particles to the photoconductor drum 1*a* in the sixth embodiment will be described.

In evaluations, presence or absence of image streaks and measurement of color variation on a recording medium P were performed for the sixth embodiment, other embodiments, Comparative Example 4, Comparative Example 5, and Comparative Example 6.

For image streaks, a halftone toner image part that is susceptible to uneven exposure of laser tends to be prominent, so determination was made by using a 25%-density halftone image. A level at which image streaks were clearly visually recognized even on a halftone image was defined as C rank, a level at which image streaks were slightly visually recognized on a halftone image was defined as B rank, and a level at which image streaks were not visually recognized even on a halftone image was defined as A rank.

For color variation on a recording medium P, the density D1 of a blank part after high-brightness paper (GFC081 Canon, Inc.) was subjected to printing and the density D0 of high-brightness paper not subjected to printing were measured with the reflection densitometer (Reflectometer model TC-6DS, produced by TokyoDenshoku Co., Ltd.). The difference D0–D1 was defined as color variation on a recording medium P. When the differential value D0–D1 of the reflection density was higher than or equal to 3.5%, the level was evaluated as C rank at which color variation on a recording medium P was clearly visually recognized. When the differential value D0–D1 of the reflection density was higher than or equal to 2.5%, the level was evaluated as B rank at which color variation on a recording medium P was slightly visually recognized. When the differential value D0–D1 of the reflection density was lower than 2.5%, the level was evaluated as A rank at which color variation on a recording medium P was not visually recognized.

In the sixth embodiment, as a configuration to coat fine particles on the photoconductor drum 1*a* to reduce the frictional force F between the photoconductor drum 1*a* and the intermediate transfer belt 10, the additive amount of fine particles was adjusted to about 0.5% of toner weight and the number of coating fine particles per toner particle was adjusted to about 500. The coverage of fine particles on the photoconductor drum 1*a* was 30%.

In the other configuration, as a configuration to coat fine particles on the photoconductor drum 1*a* to reduce the frictional force F between the photoconductor drum 1*a* and the intermediate transfer belt 10, the additive amount of fine particles was adjusted to about 0.2% of toner weight and the number of coating fine particles per toner particle was adjusted to about 200. The coverage of fine particles on the photoconductor drum 1*a* was 10%.

In the configuration of Comparative Example 4, as a configuration to coat fine particles on the photoconductor drum 1*a*, the additive amount of fine particles was adjusted to about 0.1% of toner weight and the number of coating fine particles per toner particle was adjusted to about 100. The coverage of fine particles on the photoconductor drum 1*a* was 5%.

In the configuration of Comparative Example 5, fine particles or toner was not used as a manner of reducing the frictional force F between the photoconductor drum 1*a* and the intermediate transfer belt 10.

In the configuration of Comparative Example 6, yellow dot toner images were used as a manner of reducing the frictional force F between the photoconductor drum 1*a* and the intermediate transfer belt 10, and the coverage of toner on the photoconductor drum 1*a* was 5%.

Next, evaluation results will be described with reference to Table 6.

TABLE 6

| | MANNER OF REDUCING FRICTIONAL FORCE | COVERAGE ON DRUM | IMAGE STREAKS | TRANSFER MATERIAL COLOR VARIATION |
|---|---|---|---|---|
| SIXTH EMBODIMENT | FINE PARTICLES | 30% | A | A |
| MODIFICATION | FINE PARTICLES | 10% | A | A |
| COMPARATIVE EXAMPLE 4 | FINE PARTICLES | 5% | B | A |
| COMPARATIVE EXAMPLE 5 | NONE | 0% | C | A |
| COMPARATIVE EXAMPLE 6 | YELLOW TONER | 5% | B | B |

In the configuration of Comparative Example 4, the coverage of fine particle on the photoconductor drum 1*a* for reducing frictional force was 5%, and slight frictional force F acted on the surface of the photoconductor drum 1*a* from the surface of the intermediate transfer belt 10 toward the downstream side in the tangential direction (sub-scanning direction) in a state where no toner was present in the drum nip portion. When the toner image leading edge of a halftone image developed on the photoconductor drum 1*a* entered the drum nip portion, the frictional force F reduced. Thus, spontaneous fluctuations in rotation occasionally occurred in the photoconductor drum 1*a* and, as a result, uneven writing occurred in laser exposure to the surface of the photoconductor drum 1*a*. As a result, streaks were formed in the main scanning direction on a toner image subsequently formed on the surface of the photoconductor drum 1*a*, and image streaks appeared on a halftone image. On the other hand, for color variation on a recording medium P, not toner but fine particles were used as a manner of reducing the frictional force F between the photoconductor drum 1*a* and the intermediate transfer belt 10, so no color variation occurred.

In the configuration of Comparative Example 5, no fine particles or toner for reducing frictional force was present on the photoconductor drum 1*a*, so, when the toner image leading edge of a halftone image developed on the photoconductor drum 1*a* entered the drum nip portion, the frictional force F steeply reduced. For this reason, spontaneous fluctuations in the rotation of the photoconductor drum 1*a* occurred and, as a result, uneven writing occurred in laser exposure to the surface of the photoconductor drum 1*a*. As a result, image streaks that were clearly visually recognized occurred on a halftone image. On the other hand, for color variation on a recording medium P, neither toner nor fine particles were used as a manner of reducing the frictional force F between the photoconductor drum 1*a* and the intermediate transfer belt 10, so no color variation occurred.

In the configuration of Comparative Example 6, 5% of the photoconductor drum 1*a* was coated with yellow dot toner to reduce the frictional force. When the toner image leading edge of a halftone image developed on the photoconductor drum 1*a* entered the drum nip portion, image streaks occurred on the halftone image as in the case of Comparative Example 4. Furthermore, for color variation on a recording medium P, the differential value D0–D1 of the reflection density was higher than or equal to 2.5%, and the level was such that color variation was slightly visually recognized.

When the conditions of Comparative Example 6 are changed in a direction to increase the coverage, that is, a direction to reduce image streaks, color variation further deteriorates; whereas, when the conditions are changed in a direction to reduce the coverage, that is, a direction to reduce color variation, image streaks deteriorate.

In contrast, to reduce the frictional force, in the configurations of the sixth embodiment, 30% of the photoconductor drum 1*a* is coated with fine particles or in the configuration of the other embodiment (modification), 10% of the photoconductor drum 1*a* is coated with fine particles. In any case, even when the toner image leading edge of a halftone image developed on the photoconductor drum 1*a* enters the drum nip portion, spontaneous fluctuations in the rotation of the photoconductor drum 1*a* do not occur, so image streaks do not occur. The coverage of fine particles to be supplied to the photoconductor drum 1*a*, needed to reduce the frictional force, is preferably higher than or equal to 10% additionally in consideration of the result of Comparative Example 4.

On the other hand, for color variation on a recording medium P as well, not toner but fine particles were used as a manner of reducing the frictional force F between the photoconductor drum 1*a* and the intermediate transfer belt 10, so no color variation occurred.

As described above, in the configuration of the sixth embodiment, fine particles are supplied in advance from toner carried on the development roller 41 to the photoconductor drum 1 before a toner image is developed, and fine particles are adhered to the photoconductor drum 1. Thus, the frictional force F of the drum nip portion was reduced by interposing fine particles between the photoconductor drum 1 and the intermediate transfer belt 10. In addition, for supply of fine particles to the photoconductor drum 1, the adhesion Ft between fine particles and toner is set so as to be less than the adhesion Fdr between fine particles and the photoconductor drum 1, and the particle diameter of fine particles is set so as to be less than or equal to 1000 nm. With this configuration, fine particles were supplied to the photoconductor drum 1 without electrostatic influence.

Thus, with a simple configuration, color variation on a recording medium P was reduced while image streaks due to fluctuations in the rotation of the photoconductor drum 1 were reduced.

In the configuration of an image forming apparatus to be applied in a seventh embodiment, like reference signs are assigned to similar components to those of the first and sixth embodiments, and the description is omitted.

In the configuration of the sixth embodiment, to reduce color variation on a recording medium P while reducing image streaks due to fluctuations in the rotation of the photoconductor drum 1, the method of supplying the photoconductor drum 1 with fine particles added to toner is described.

In contrast, in the seventh embodiment, a so-called drum cleanerless configuration in which no cleaning units 55*a*, 55*b*, 55*c*, and 55*d* respectively on the photoconductor drums 1*a*, 1*b*, 1*c*, 1*d* are not provided is employed. With this configuration, fine particles can be maintained on the photoconductor drums 1*a*, 1*b*, 1*c*, and 1*d* over a long period of time.

Hereinafter, the configuration of the seventh embodiment will be described with reference to FIG. 32.

Figure 32:
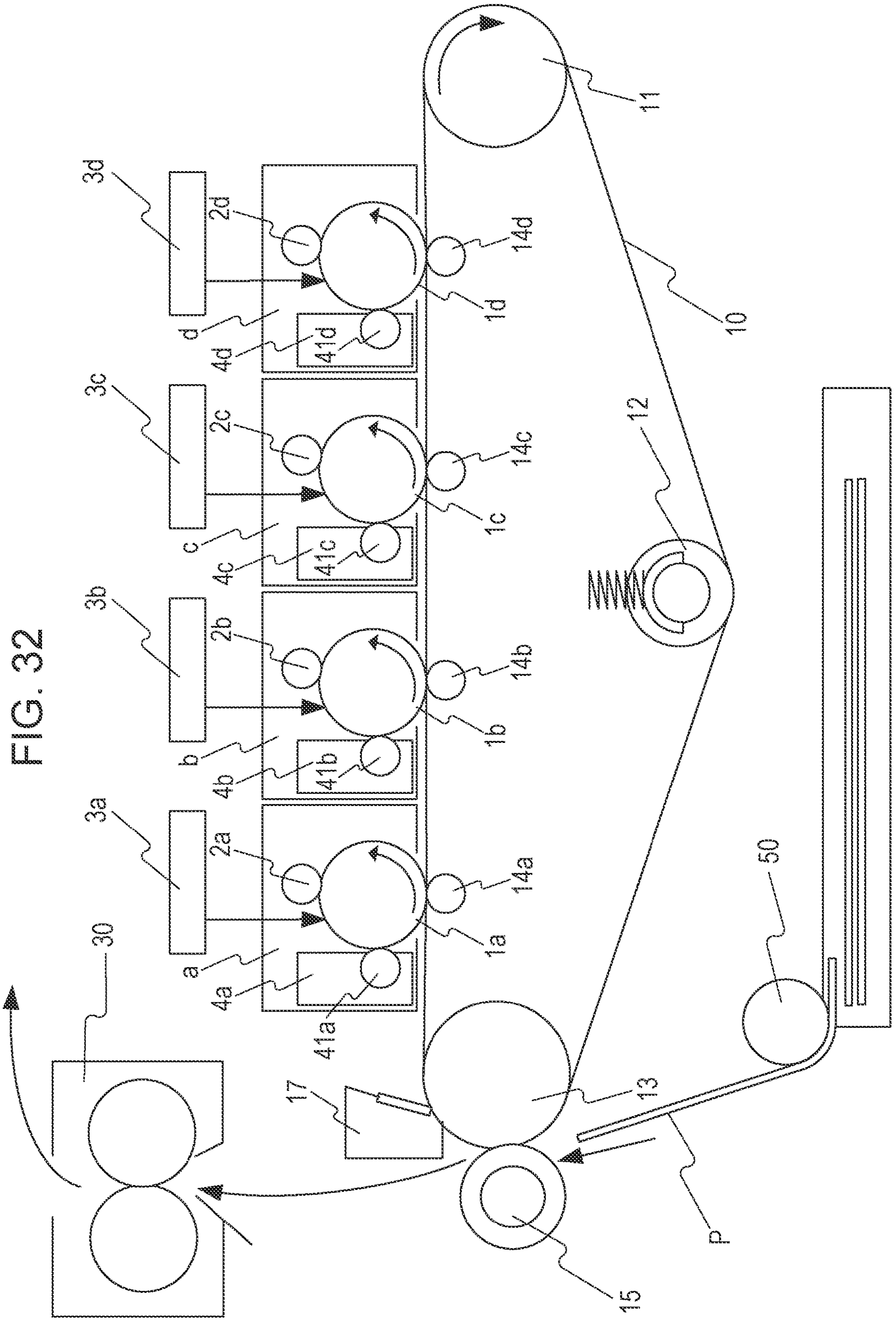
FIG. 32 is a diagram illustrating an image forming apparatus in a seventh embodiment.

In the above-described drum cleanerless system, no cleaning units are provided on the photoconductor drums 1*a*, 1*b*, 1*c*, and 1*d* as shown in FIG. 32. Therefore, toner remaining on the photoconductor drums 1*a*, 1*b*, 1*c*, and 1*d* during primary transfer needs to be collected by the developing units 4*a*, 4*b*, 4*c*, and 4*d*.

Hereinafter, a method of collecting toner remaining on the photoconductor drums 1*a*, 1*b*, 1*c*, and 1*d* will be described by using the fourth image forming station d.

Of toner not primarily transferred to the intermediate transfer belt 10 in the primary transfer portion and remaining on the photoconductor drum 1*d* (primary transfer portion and retransfer residual toner), positive-polarity toner adheres to the charging roller 2*d*. Negative-polarity toner is transferred to an area opposite the developing unit 4*d* through the contact portion with the charging roller 2*d* with rotation of the photoconductor drum 1*d*. At this time, the surface of the photoconductor drum 1*d* is subjected to charging and exposure again, and an electrostatic latent image according to image information is formed. Most of residual toner transferred to the area opposite the developing unit 4*d* has a negative polarity. For this reason, part of residual toner is collected by the developing unit 4*d* with an electric field formed due to a difference between the surface potential of the photoconductor drum 1*d* (−500 V in the non-exposed area, and −100 V in the exposed area) and the voltage (−300 V) applied to the development roller 41*d*. In the non-exposed area, the orientation of the electric field is a direction to move negative-polarity toner from the photoconductor drum 1*d* to the development roller 41*d*, so residual toner on the photoconductor drum 1*d* moves to the development roller 41*d* and is collected into the developing unit 4*d*.

On the other hand, in the exposed area, the orientation of the electric field is a direction to move negative-polarity toner from the development roller 41*d* to the photoconductor drum 1*d*, so negative polarity toner on the development roller 41*d* moves to the photoconductor drum 1*d* and develops the electrostatic latent image on the photoconductor drum 1*d*. At this time, residual toner on the photoconductor drum 1*d* is also used to develop the electrostatic latent image. In this way, the developing unit 4*d* is configured to be capable of developing an electrostatic latent image formed on the photoconductor drum 1*d* to a toner image and collecting toner adhering to the photoconductor drum 1*d*.

Through the above operation, residual toner on the photoconductor drum 1*d* is collected in the drum cleanerless system.

The other configuration is similar to that of the sixth embodiment, so the description is omitted.

Next, the operation of the seventh embodiment will be described.

In the configuration of the seventh embodiment, as in the case of the sixth embodiment, fine particles are supplied in advance from toner carried on the development roller 41 to the photoconductor drum 1 before a toner image is developed. To supply fine particles to the photoconductor drum 1, the adhesion Ft between fine particles and toner is set so as to be less than the adhesion Fdr between fine particle and the photoconductor drum 1. With this configuration, as shown in FIG. 9A and FIG. 9B, when a toner image is primarily transferred from the photoconductor drum 1 to the intermediate transfer belt 10, only the toner image is primarily transferred to the intermediate transfer belt 10. Fine particles interposed between the toner image and the photoconductor drum 1 remain on the photoconductor drum 1. In this case, in the configuration of the sixth embodiment, the cleaning unit 55 disposed on the photoconductor drum 1 collects fine particles remaining on the photoconductor drum 1. For this reason, fine particles need to be supplied from toner carried on the development roller 41 each time the image forming operation. On the other hand, in the configuration of the seventh embodiment, no cleaning unit is provided on the photoconductor drum 1, so fine particles supplied to the photoconductor drum 1 continuously remain on the photoconductor drum 1. Furthermore, this also applies at the time of operation to collect toner to the developing unit 4 in the drum cleanerless system. In other words, since the particle diameter of fine particles is set so as to be less than or equal to 1000 nm, the fine particles are less likely to be susceptible to electrostatic influence, and the fine particles continuously remain on the photoconductor drum 1 without being collected by the developing unit 4. With this configuration, a state where fine particles are adhering to the photoconductor drum 1 can be maintained, and a stable image can be provided over a long period of time.

In the configuration of the sixth embodiment, a time to supply fine particles during an image forming operation needs to be set so as to be longer than or equal to a time taken for a part on the photoconductor drum 1 where the development roller 41 contacts to reach the drum nip portion. In the drum cleanerless configuration of the seventh embodiment, as described above, fine particles supplied to the photoconductor drum 1 can be maintained, so the development roller 41 is able to start development at the time when the development roller 41 contacts with the photoconductor drum 1. Thus, a time taken from when the image forming apparatus receives image data to when the image forming apparatus prints out can be shortened, so this leads to reduction in user stress.

As described above, with a so-called drum cleanerless configuration in which no cleaning unit 55 is provided on the photoconductor drum 1, fine particles can be stably maintained on the photoconductor drum 1. Therefore, a stable image can be provided over a long period of time. In addition, a time taken from when the image forming apparatus receives image data to when the image forming apparatus prints out can also be shortened.

In the configuration of an image forming apparatus to be applied in an eighth embodiment, like reference signs are assigned to similar components to those of the sixth and seventh embodiments, and the description is omitted.

In the configuration of the sixth embodiment, to reduce color variation on a recording medium P while reducing image streaks due to fluctuations in the rotation of the photoconductor drum 6, a method of supplying the photoconductor drum 1 with fine particles added to toner is described.

In contrast, in the eighth embodiment, a metal roller 40 is disposed opposite the photoconductor drum 1 via the intermediate transfer belt 10 by a predetermined amount of offset in the transfer portion. With this configuration, the frictional force F between the photoconductor drum 1 and the intermediate transfer belt 10 is reduced, so image streaks are reduced.

Hereinafter, the configuration of the eighth embodiment will be described with reference to FIG. 33 and FIG. 34.

Figure 33:
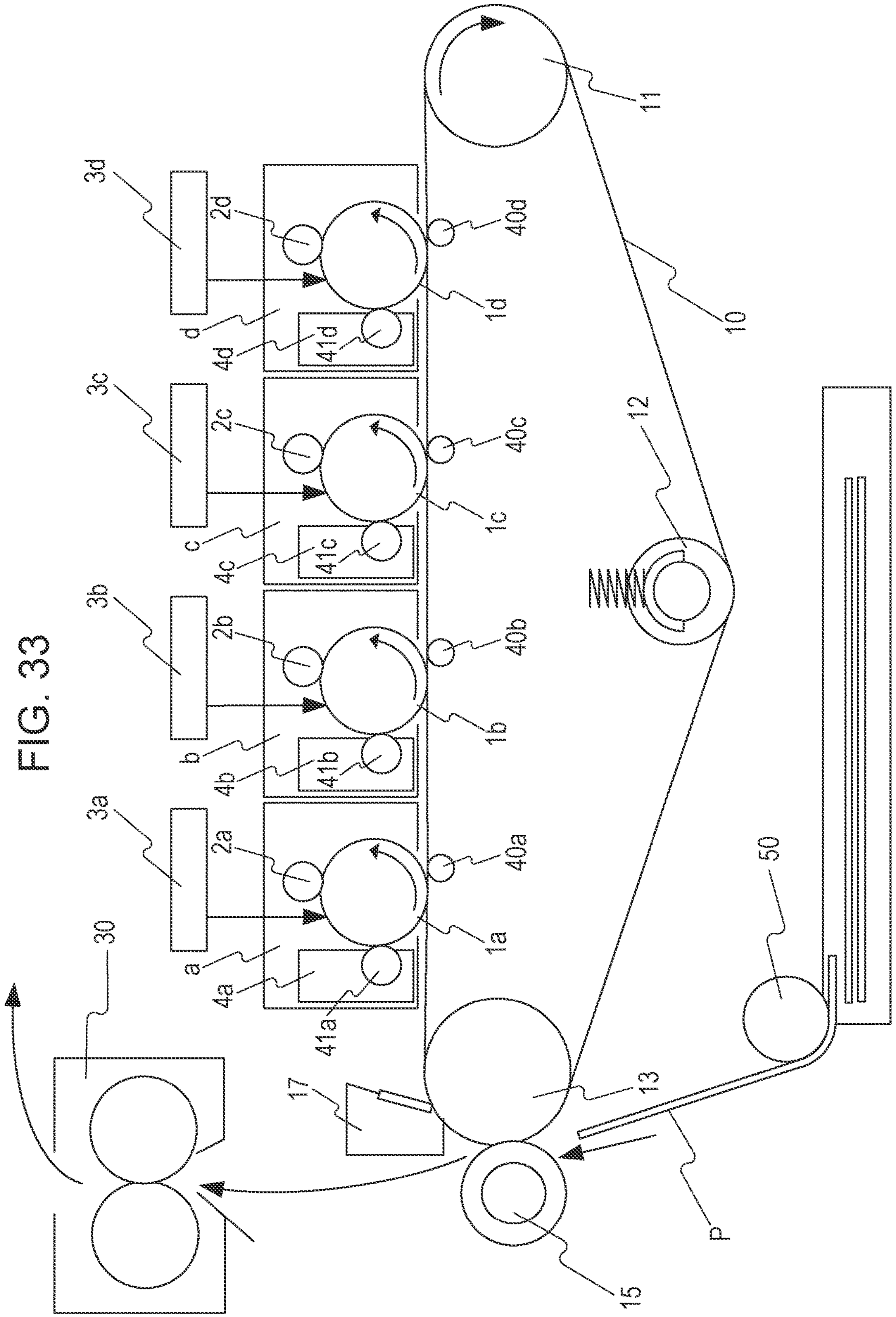
FIG. 33 is a diagram illustrating an image forming apparatus in an eighth embodiment.
Figure 34:
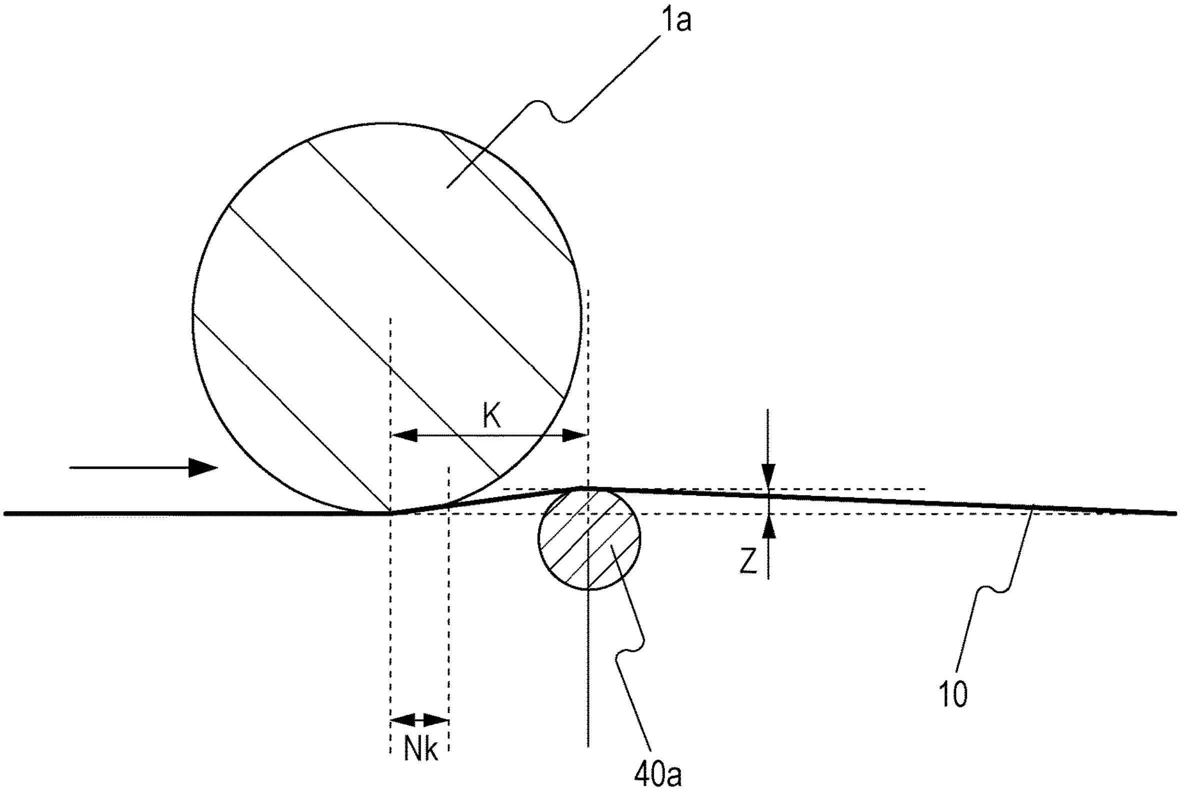
FIG. 34 is a diagram illustrating a primary transfer portion in the eighth embodiment.

FIG. 33 is a diagram of the image forming apparatus according to the eighth embodiment. FIG. 34 is an enlarged view of the configuration of the first image forming station a in FIG. 33. In FIG. 34, the metal roller 40*a* is disposed at a position offset 8 mm downstream in the moving direction of the intermediate transfer belt 10 with respect to the center position of the photoconductor drum 1*a*. The metal roller 40*a* is disposed at a position lifted 1.0 mm from a horizontal surface formed by the photoconductor drum 1*a* and the intermediate transfer belt 10 so that the wrapping amount of the intermediate transfer belt 10 around the photoconductor drum 1*a* can be ensured. The metal roller 40 is disposed close to the photoconductor drum 1 as much as possible within the range not in contact with the photoconductor drum 1 to avoid occurrence of scratch due to contact with the photoconductor drum 1. The disposition of the metal roller 40 on the downstream side in the moving direction of the intermediate transfer belt 10 is advantageous against a phenomenon of scattering that occurs due to formation of a transfer electric field on the upstream side of the primary transfer nip.

Where the offset distance of the metal roller 40*a* is K, the lift height of the metal roller 40*a* with respect to the intermediate transfer belt 10 is Z, and the drum nip width is Nk, K=8 mm, Z=1.0 mm, and Nk=1500 μm in the eighth embodiment. The metal roller 40*a* is made up of a straight nickel-plated SUS round bar with an outside diameter of 6 mm. The metal roller 40*a* is rotated by the rotation of the intermediate transfer belt 10. The metal roller 40*b* disposed in the second image forming station b, the metal roller 40*c* disposed in the third image forming station c, and the metal roller 40*d* disposed in the fourth image forming station d also have a similar configuration to that of the metal roller 40*a*.

The other configuration is similar to that of the seventh embodiment, so the description is omitted.

Next, the operation of the eighth embodiment will be described.

As described above, in the eighth embodiment, the metal roller 40 is disposed opposite the photoconductor drum 1 via the intermediate transfer belt 10 by a predetermined amount of offset in the transfer portion. As described in the sixth embodiment, to achieve the effect of improving primary transfer efficiency due to a peripheral speed difference between the photoconductor drum 1 and the intermediate transfer belt 10, the drum nip width Nk is set to 1500 μm as in the case of the sixth embodiment With this configuration, for the configuration in which the primary transfer roller 14 directly pressurizes the photoconductor drum 1 via the intermediate transfer belt 10 to form the drum nip portion as in the case of the sixth embodiment, a pressure to be applied to the drum nip portion is reduced. In other words, the frictional force F is a product of a normal reaction and a friction coefficient, and a pressure to be applied to the drum nip portion, which corresponds to the normal reaction, also leads to a reduction in the frictional force F of the drum nip portion.

To reduce the frictional force F of the drum nip portion, the adhesion Ft between fine particles and toner is set so as to be less than the adhesion Fdr between fine particles and the photoconductor drum 1. The effect of reducing image streaks due to fluctuations in the rotation of the photoconductor drum 1 and color variation on a recording medium P by supplying fine particles to the photoconductor drum 1 is similar to that of the sixth and seventh embodiments.

As described above, in the eighth embodiment, the metal roller 40 is disposed opposite the photoconductor drum 1 via the intermediate transfer belt 10 by a predetermined amount of offset in the transfer portion. With this configuration, the frictional force F between the photoconductor drum 1 and the intermediate transfer belt 10 is reduced, so image streaks are reduced.

In addition, in the eighth embodiment, the configuration to supply fine particles and adhere the fine particles to the photoconductor drum 1 associated with each image forming station is described. For example, in printing only black color in monochrome mode, even when the primary transfer members of the color (yellow, magenta, and cyan) image forming stations a, b, c are not separated, the state of the low frictional force F between the photoconductor drum 1 and the intermediate transfer belt 10 can be maintained. In other words, no contact and separation mechanism of the primary transfer member needs to be provided, so a further reduction in size and cost of the main body is possible.

As described above, according to the present disclosure, by reducing fluctuations in the rotation of the photoconductor drum or the rotation of the intermediate transfer belt without adding dot toner images, occurrence of an adverse effect in an image is suppressed.

(Relationship between Adhesion of Transfer Carrier Particles to Photoconductor Drum and Adhesion of Transfer Carrier Particles to Intermediate Transfer Belt)

Subsequently, the relationship between the adhesion of transfer carrier particles to the photoconductor drum 1 and the adhesion of transfer carrier particles to the intermediate transfer belt 10, which is one of the characteristics of the ninth embodiment, will be described. In the ninth embodiment, transfer efficiency is improved by executing an image forming operation in a state where transfer carrier particles are adhered to the surface of the photoconductor drum 1. For this purpose, transfer of transfer carrier particles from the photoconductor drum 1 to the surface of the intermediate transfer belt 10 with which the photoconductor drum 1 contacts in the transfer portion needs to be stopped as much as possible. In the configuration of the ninth embodiment, the adhesion Fdr between transfer carrier particles and the photoconductor drum 1 and the adhesion Fi between transfer carrier particles and the intermediate transfer belt 10 are set to the relationship Fdr>Fi.

Next, a method of calculating the adhesion Fdr between transfer carrier particles and the photoconductor drum 1 and the adhesion Fi between transfer carrier particles and the intermediate transfer belt 10 will be described. The adhesion Fdr between transfer carrier particles and the photoconductor drum 1 and the adhesion Fi between transfer carrier particles and the intermediate transfer belt 10 are calculated by the expression 7.

$$F = \left(\frac{A1R}{6Z0^2}\right)\left(1 + \frac{2\alpha}{Z0}\right) \tag{7}$$

where A1 (Hamaker constant): 6.58E−20 (J), ZO (separation distance): 4.00E−10 (m), and R (composite diameter): 5.00E−8 (m). α is a particle deformation amount. The particle deformation amount α can be calculated by using the expression 8.

$$\alpha = \left(\frac{9f^2}{16E^{*2}d}\right)^{\frac{1}{3}} \tag{8}$$

f is a pressing force (N) on a transfer carrier particle. E* is calculated from the relational expression 9 of E (Young's modulus (Pa)) and v (Poisson's ratio).

$$\frac{1}{E^*} = \frac{1 - v_1^2}{E_1} + \frac{1 - v_2^2}{E_1} \tag{9}$$

Therefore, it is found from the expression 8 and the expression 9 that the adhesion Fdr between transfer carrier particles and the photoconductor drum 1 and the adhesion Fi between transfer carrier particles and the intermediate transfer belt 10 depend on a pressing force of a material against a transfer carrier particle, a Young's modulus, and a Poisson's ratio.

Thus, it is found from the expression 7, the expression 8, and the expression 9 that, when the Young's modulus and the Poisson's ratio of the material of the surface of the photoconductor drum 1 are small, the adhesion at the time of pressing the photoconductor drum 1 and the adhesion at the time of pressing the intermediate transfer belt 10 increase. For this reason, to achieve the relationship Fdr>Fi, the Young's modulus and the Poisson's ratio of the material used for the photoconductor drum 1 can be lower than the Young's modulus and the Poisson's ratio of the material used for the intermediate transfer belt 10.

The adhesion at the time of pressing the photoconductor drum 1 and the adhesion at the time of pressing the intermediate transfer belt 10 increase depending on the pressing force. To achieve the relationship Fdr>Fi, a force pressing transfer carrier particles against the photoconductor drum 1 can be increased, and a force pressing transfer carrier particles against the intermediate transfer belt 10 can be reduced.

In the ninth embodiment, polycarbonate of the surface layer of the photoconductor drum 1 has a Young's modulus of 2.20 (GPa) and a Poisson's ratio of 0.37, and acrylic of the surface layer of the intermediate transfer belt 10 has a Young's modulus of 3.00 (GPa) and a Poisson's ratio of 0.38. For this reason, the Young's modulus and the Poisson's ratio of the material used for the photoconductor drum 1 are lower than the Young's modulus and the Poisson's ratio of the material used for the intermediate transfer belt 10.

Figure 35B:
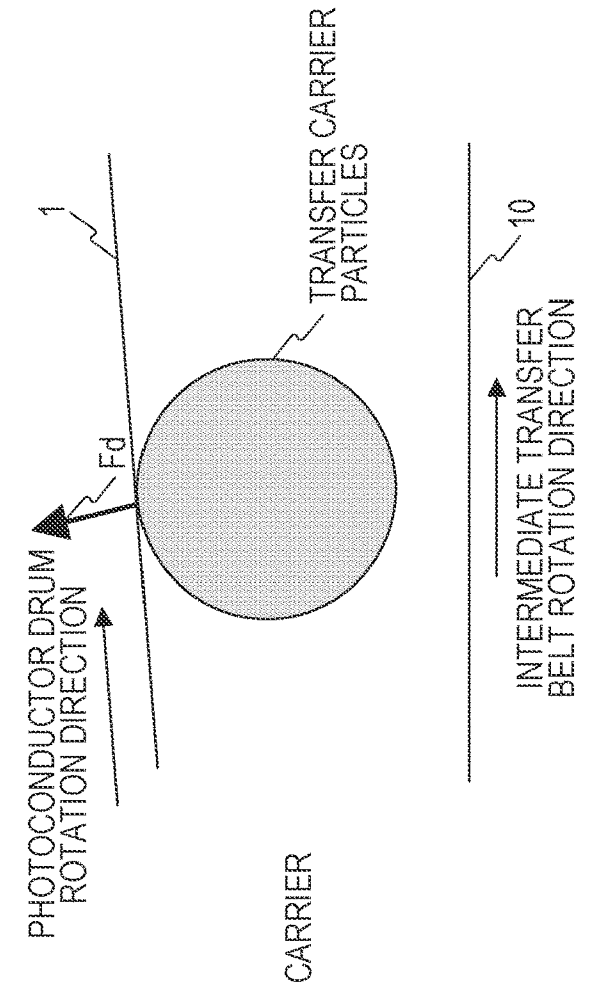
FIG. 35A and FIG. 35B are schematic diagrams showing the relationship of adhesions of a transfer carrier particle in a ninth embodiment.
Figure 35A:
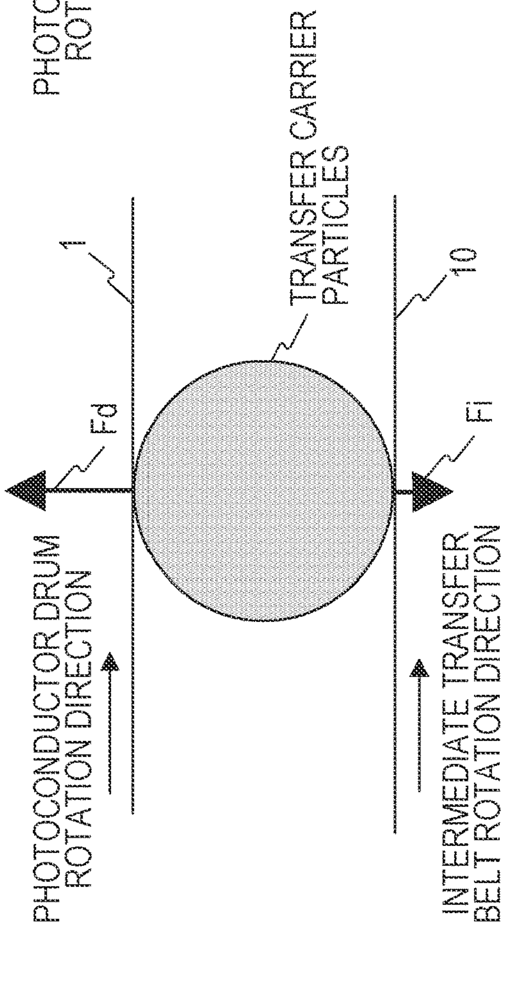

In addition, the pressing force of the intermediate transfer belt 10 against the photoconductor drum 1 in the transfer portion is 220 gf. FIG. 35A is a schematic diagram of the transfer nip portion at the time of contact between the photoconductor drum 1 and the intermediate transfer belt 10. As shown in FIG. 35A, in the transfer nip portion, transfer carrier particles receive the adhesion Fdr from the photoconductor drum 1 and receive the adhesion Fi from the intermediate transfer belt 10. Fir. 35B is a schematic diagram showing a state where transfer carrier particles carried on the photoconductor drum 1 and the intermediate transfer belt 10 have passed through the transfer portion, shown in FIG. 35A. As shown in FIG. 35B, when the relationship Fdr>Fi is satisfied for transfer carrier particles interposed between the photoconductor drum 1 and the intermediate transfer belt 10 in the transfer portion, transfer of transfer carrier particles from the photoconductor drum 1 to the intermediate transfer belt 10 is suppressed.

In addition, another pressing member that is in contact with the photoconductor drum 1 and that presses transfer carrier particles on the surface of the photoconductor drum 1 may be installed. An additional pressing force can be added to the photoconductor drum 1 with the pressing member, so the relationship Fdr>Fi can be further maintained. Here, the relationship between the adhesion of the pressing member to transfer carrier particles and the adhesion of the photoconductor drum 1 to transfer carrier particles is also configured similarly to the relationship between the adhesion of the photoconductor drum 1 to transfer carrier particles and the adhesion of the intermediate transfer belt 10 to transfer carrier particles. With this configuration, the effect of making it possible to adhere transfer carrier particles to the photoconductor drum 1 is suitably obtained.

In the ninth embodiment, the development roller 41 not only supplies transfer carrier particles to the photoconductor drum 1 but also presses transfer carrier particles against the photoconductor drum 1. The development roller 41 presses transfer carrier particles on the surface of the photoconductor drum 1 and increases the pressing force of the photoconductor drum 1, so the relationship Fdr>Fi can be maintained. The development roller 41 may be used as a pressing member. The development roller 41 may be used as a transfer carrier particle supply member.

In the configuration of the ninth embodiment, transfer carrier particles are supplied from the development roller 41 to the photoconductor drum 1; however, another transfer carrier particle supply member that contacts with the photoconductor drum 1 may be provided. When the transfer carrier particle supply member presses transfer carrier particles on the surface of the photoconductor drum 1, the adhesion of transfer carrier particles to the photoconductor drum 1 increases, so the relationship Fdr>Fi can be maintained. The transfer carrier particle supply member may also be used as a pressing member. Furthermore, to maintain the relationship Fdr>Fi, the pressing force of transfer carrier particles on the transfer carrier particle supply member or the pressing member against the photoconductor drum 1 can be greater than the pressing force of the photoconductor drum 1 in the transfer portion. In the ninth embodiment, the photoconductor drum 1 is pressed with 200 gf in the developing portion, and the development nip width is 2 mm. On the other hand, the photoconductor drum 1 is pressed with 220 gf in the transfer portion, and the nip width is 3 mm in the primary transfer portion. Therefore, a pressing force to be applied to transfer carrier particles per unit area is 100 gf/mm in the developing portion and is 73.3 gf/mm in the primary transfer portion. Therefore, in the ninth embodiment, the pressing force of transfer carrier particles in the developing portion is greater than the pressing force of transfer carrier particles in the transfer portion.

In addition, primary transferability improves to some extent with an increase in the coverage of transfer carrier particles on the photoconductor drum 1. To obtain sufficient primary transferability, the coverage of transfer carrier particles on the photoconductor drum 1 is preferably higher than or equal to 10% where the entire surface of the photoconductor drum is 100%. However, with an increase in the coverage of transfer carrier particles on the photoconductor drum 1, the following inconvenience can occur. When transfer carrier particles on the surface of the photoconductor drum 1 are too much, the risk of contamination of members to be brought into contact with the surface of the photoconductor drum 1 due to transfer carrier particles increases. For this reason, the coverage of transfer carrier particles on the photoconductor drum 1 is preferably lower than or equal to 50%. From the results of observation of the surface of the photoconductor drum 1, it was confirmed in the ninth embodiment that the coverage of transfer carrier particles on the surface of the photoconductor drum 1 was higher than or equal to 10%.

(Effect through Setting of Adhesion Fi to Intermediate Transfer Belt)

Next, in the ninth embodiment, to confirm the effect of suppressing transfer of transfer carrier particles from the photoconductor drum 1 to the intermediate transfer belt 10, an effect confirmation test was performed. A test method will be described as follows. Initially, a method of confirming transfer of transfer carrier particles from the photoconductor drum 1 to the intermediate transfer belt 10 will be described.

The image forming apparatus of the ninth embodiment including the photoconductor drum 1 to which transfer carrier particles were added was prepared, and the photoconductor drum 1 and the intermediate transfer belt 10 were pressed against each other with 220 gf that was a primary transfer pressure. The surface of the photoconductor drum 1 after being pressed was observed with a microscope, and the coverage of transfer carrier particles on the surface of the photoconductor drum 1 was calculated. Specifically, initially, the surface of the photoconductor drum 1 was observed at a magnification of 3000 times with a laser microscope (VK-X200 Keyence Corporation), and the observed image was acquired. After that, the surface of the photoconductor drum 1 in the observed image was binarized into a part coated with transfer carrier particles and a part not coated with transfer carrier particles, and the area ratio of transfer carrier particles on the surface of the photoconductor drum 1 was calculated.

To acquire an observed image, the image forming apparatus is stopped in a state where transfer carrier particles are supplied to the surface of the photoconductor drum 1. Observation is performed on both upstream side and downstream side of the transfer nip position where the photoconductor drum 1 and the intermediate transfer belt 10 are in contact with each other on the photoconductor drum 1. Accordingly, the area ratio is calculated for each of the upstream side and downstream side of the transfer nip. A numeral obtained by setting the upstream side area ratio for a denominator and setting an amount of change obtained by subtracting the downstream side area ratio from the upstream side area ratio for a numerator is defined as a rate of change in the coverage of transfer carrier particles on the photoconductor drum 1.

If no transfer carrier particles are newly supplied, transfer carrier particles almost disappear from the surface of the photoconductor drum 1 after the photoconductor drum 1 rotates about 10 times when the rate of change in the coverage of transfer carrier particles on the photoconductor drum 1 is higher than or equal to 50%. The rate of change in the coverage of transfer carrier particles on the photoconductor drum 1 is preferably lower than 20%.

Next, a method of calculating Fdr and Fi will be described. The method of calculating adhesions was performed by using the above-described expression 7, expression 8, and expression 9. In the ninth embodiment, focusing on the elastic forces of the materials, the adhesions of the materials were calculated from the expression 7, the expression 8, and the expression 9, and the materials were screened. Therefore, it was assumed that constants not related to elastic force were not dependent on materials, and measured adhesions (described later) obtained in some combinations from the results obtained by screening through calculation were used as accurate adhesions. In the ninth embodiment, the adhesions were calculated by using the Young's modulus and the Poisson's ratio of each of the materials shown in FIG. 37. In addition, the adhesion between transfer carrier particles and toner, used in the ninth embodiment, was measured with an SPM. Specifically, a cantilever was pressed against toner with a predetermined pressing force, and then a force used to separate the cantilever from the toner was measured as the adhesion Fdr between transfer carrier particles and the photoconductor drum 1 and the adhesion Fi between transfer carrier particles and the intermediate transfer belt 10. The cantilever was made of silicon of which the surface was coated with a silicon oxide film and was a round tip type with a tip diameter of 100 nm. When the surface material of the cantilever is $SiO_2$ that is the same as transfer carrier particles and the tip diameter is set to 100 nm equal to the number average particle diameter of transfer carrier particles, transfer carrier particles and adhesions can be accurately reproduced. A predetermined pressing force to press the photoconductor drum 1 or the intermediate transfer belt 10 in measuring the adhesion can be set to a force with which transfer carrier particles interposed between the photoconductor drum 1 and the intermediate transfer belt 10 are pressed in the transfer portion. The pressing force was calculated with a calculation method described below. Here, the phrase "transfer carrier particles are interposed between the photoconductor drum 1 and the intermediate transfer belt 10" in the transfer portion means a state where the transfer carrier particles are in contact with both the photoconductor drum 1 and the intermediate transfer belt 10 at the same time.

Figure 36A:
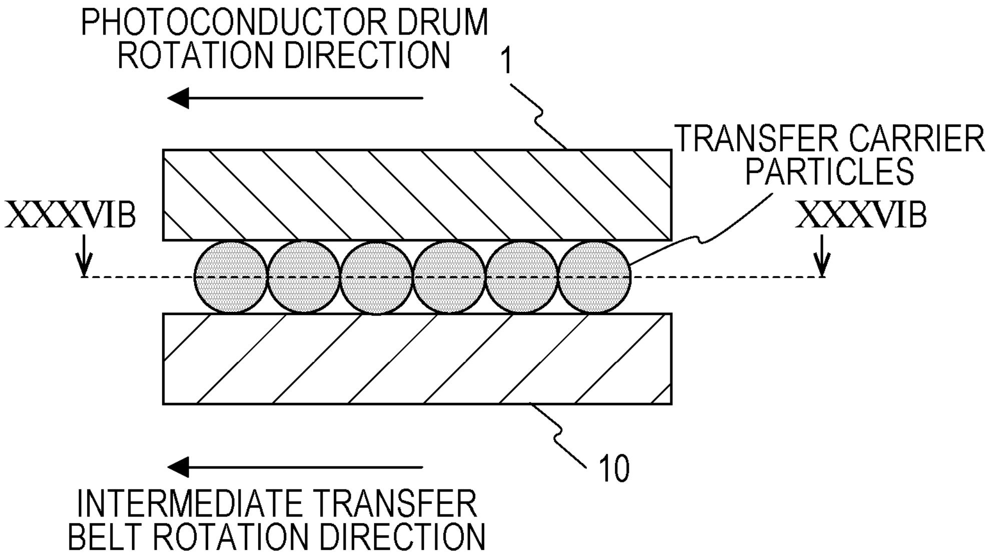
FIG. 36A and FIG. 36B are diagrams showing a state of transfer carrier particles in a transfer portion in the ninth embodiment.
Figure 36B:
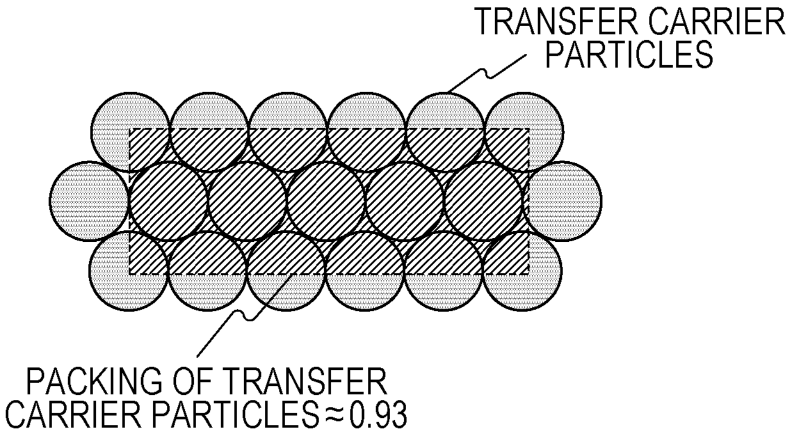

Initially, an assumption for calculation will be described with reference to FIG. 36A and FIG. 36B. FIG. 36A is a schematic diagram of the transfer portion. It was assumed that the photoconductor drum 1 and the intermediate transfer belt 10 were in contact with each other via transfer carrier particles in the transfer portion. FIG. 36B is a cross-sectional view taken parallel to the surface of the photoconductor drum 1 along the dashed line XXXVIB-XXXVIB in FIG. 36A. It was assumed that transfer carrier particles in contact with the intermediate transfer belt 10 were in closest packing as indicated in the shaded part. The total number N of transfer carrier particles interposed between the intermediate transfer belt 10 and the photoconductor drum 1 can be calculated from the area of the nip portion between the intermediate transfer belt 10 and the photoconductor drum 1 in the transfer portion and the maximum cross-section area of a transfer carrier particle.

The total number Nt of transfer carrier particles in contact with the photoconductor drum 1 in the transfer portion can be calculated by (Area of the transfer portion)×(Coverage of transfer carrier particles)/(Maximum cross-section area of a transfer carrier particle) and is about $6.6\times10^9$. From the above calculated result and the fact that the pressing force F of each of the primary transfer roller 14 and the photoconductor drum 1 is 220 gf in the ninth embodiment, (Pressing force of a transfer carrier particle against toner in the transfer portion)=F/Nt is about 0.33 (nN). This 0.33 (nN) was adopted as the predetermined pressing force of the cantilever against toner in the transfer portion in measuring the adhesion with the SPM.

Next, the results of effect confirmation test for the ninth embodiment will be described. First, The materials of the photoconductor drum 1 and the intermediate transfer belt 10 subjected to effect confirmation test will be sequentially described.

In the ninth embodiment, a thin film layer made of polycarbonate with a film thickness of 20 μm was used for the surface layer of the photoconductor drum 1. The Young's modulus was 2.20 (GPa), and the Poisson's ratio was 0.37. The maximum roughness Rz of the intermediate transfer belt 10 was less than or equal to 0.12 μm. An acrylic coat was used as the surface layer, and the film thickness of the surface layer was 2.3 μm. The Young's modulus was 3.00 (GPa), and the Poisson's ratio was 0.38. Hereinafter, Modifications 1 to 5 and Comparative Examples 7 to 10 will be described. The description of components similar to those of the ninth embodiment is omitted.

Modification 1

A thin film layer made of polyallylate with a film thickness of 23 μm was used as the surface layer of the photoconductor drum 1. The Young's modulus was 2.15 (GPa), and the Poisson's ratio was 0.37. Rz was 0.1 μm.

Modification 2

A monolayer belt made of polyimide with a film thickness of 65 μm was used as the intermediate transfer belt 10. The Young's modulus was 2.65 (GPa), and the Poisson's ratio was 0.30.

Modification 3

A thin film layer made of polyallylate with a film thickness of 23 μm was used as the surface layer of the photoconductor drum 1. A monolayer belt made of polyimide with a film thickness of 65 μm was used as the intermediate transfer belt 10. The Young's modulus was 2.65 (GPa), and the Poisson's ratio was 0.30.

Modification 4

A monolayer belt made of polyether ether ketone (PEEK) with a film thickness of 55 μm was used as the intermediate transfer belt 10. The Young's modulus was 3.70 (GPa), and the Poisson's ratio was 0.40.

Modification 5

A thin film layer made of polyallylate with a film thickness of 23 μm was used as the surface layer of the photoconductor drum 1. A monolayer belt made of polyether ether ketone (PEEK) with a film thickness of 55 μm was used as the intermediate transfer belt 10. The Young's modulus was 3.70 (GPa), and the Poisson's ratio was 0.40.

Comparative Example 7

A surface layer made of urethane with a film thickness of about 2 μm was used for the intermediate transfer belt 10. The Young's modulus was 1.50 (GPa), and the Poisson's ratio was 0.48. The material of an elastic layer was silicone rubber with a thickness of about 350 μm, and the material of a base layer was polyimide with a thickness of about 60 μm.

Comparative Example 8

A surface layer made of Si with a film thickness of 1.2 μm was formed on the surface of the photoconductor drum 1. The Young's modulus was 185 (GPa), and the Poisson's ratio was 0.28.

Comparative Example 9

A monolayer belt made of polybutylene terephthalate (PBT) with a thickness of about 80 μm was used as the intermediate transfer belt 10. The Young's modulus was 2.20 (GPa), and the Poisson's ratio was 0.38.

Comparative Example 10

A thin film layer made of polyallylate with a film thickness of 23 μm was used as the surface layer of the photoconductor drum 1. A monolayer belt made of polybutylene terephthalate (PBT) with a thickness of about 80 μm was used as the intermediate transfer belt 10. The Young's modulus was 2.20 (GPa), and the Poisson's ratio was 0.38.

With the configurations of the ninth embodiment, Modifications 1 to 5, and Comparative Examples 7 to 10, the pressing force 220 gf, the adhesion Fdr between transfer carrier particles and the photoconductor drum 1 and the adhesion Fi between transfer carrier particles and the intermediate transfer belt 10 under a pressure of 0.33 nN applied to the transfer carrier particles were shown in FIG. 37. By applying a pressure of 220 gf to the photoconductor drum 1 to which transfer carrier particles were adhering, whether the transfer carrier particles transferred to the intermediate transfer belt 10 was checked. FIG. 37 shows the rate of change in the coverage of transfer carrier particles on the photoconductor drum 1. Other than that, FIG. 37 shows the calculated adhesions Fdr, Fi of the materials and the adhesions Fdr, Fi measured with the SPM.

As shown by the rate of change in the coverage of transfer carrier particles on the photoconductor drum 1 in FIG. 37, in the combinations of the material of the photoconductor drum 1 and the material of the intermediate transfer belt 10 according to the ninth embodiment and Modifications 1 to 5, the rate of change in the coverage of transfer carrier particles on the photoconductor drum 1 was lower than 20%. On the other hand, in Comparative Examples 7, 9, and 10, the rate of change in the coverage of transfer carrier particles on the photoconductor drum 1 was higher than or equal to 20% and lower than 50%. In Comparative Example 8, the rate of change in the coverage of transfer carrier particles on the photoconductor drum 1 was higher than or equal to 50%. When the calculated results of FIG. 37 are compared with one another, in the ninth embodiment and Modifications 1 to 5 in which the relationship between the adhesion of the photoconductor drum 1 and the adhesion of the intermediate transfer belt 10 was Fdr>Fi, transfer of transfer carrier particles was suppressed, and transfer efficiency was maintained. In Comparative Examples 7 to 10 in which the relationship between the adhesion of the photoconductor drum 1 and the adhesion of the intermediate transfer belt 10 was Fdr<Fi, transfer of transfer carrier particles occurred, and transfer efficiency decreased.

Figure 38:
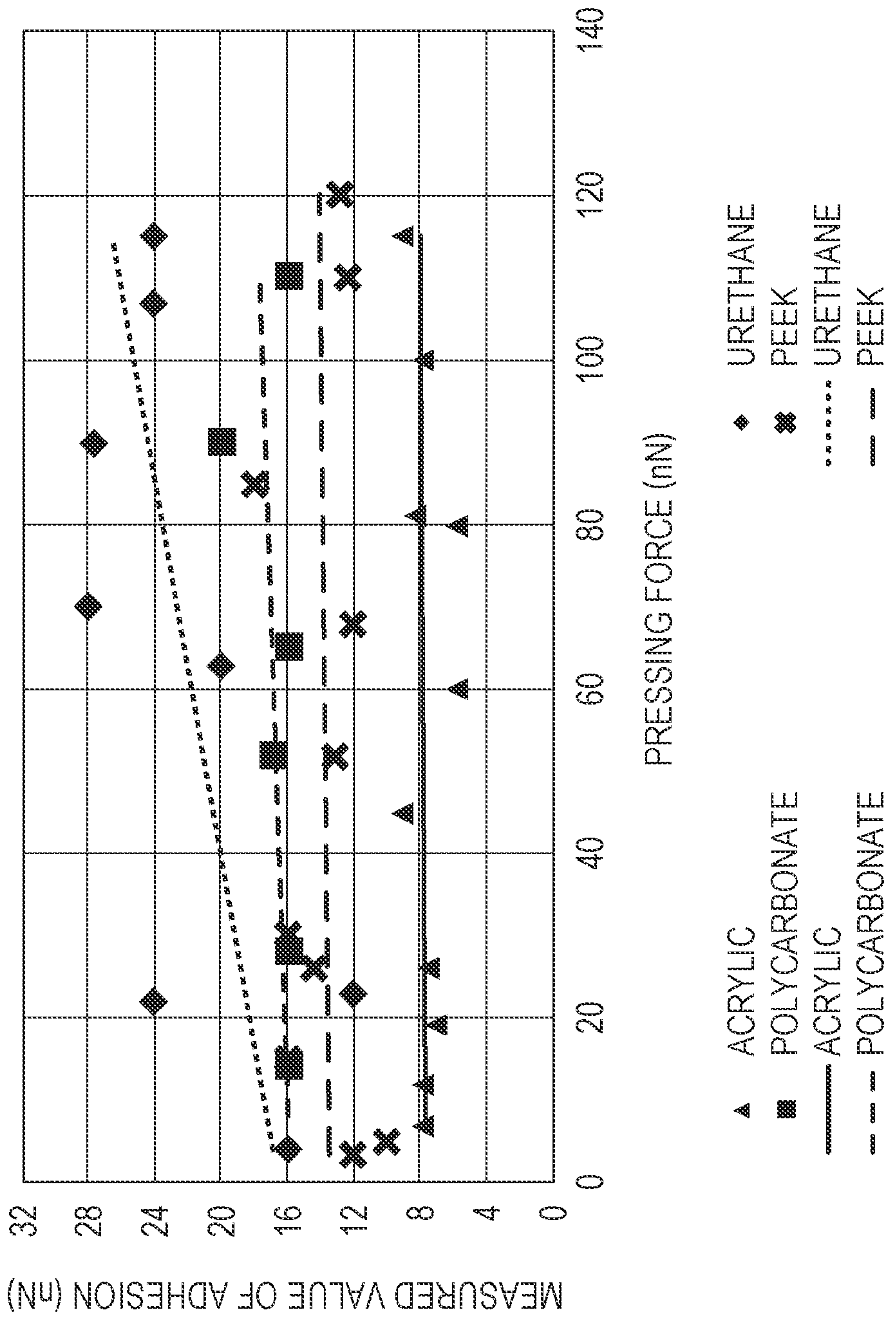
FIG. 38 shows the relationship between the material of the intermediate transfer belt and adhesion in the ninth embodiment and other examples.

FIG. 38 shows the relationship between pressing force and adhesion measured with the SPM. As shown in FIG. 38, in any material, the adhesion depends on the pressing force of transfer carrier particles. Therefore, to reduce Fi, the pressing force can be reduced as much as possible.

From the above results, the ninth embodiment has the following configuration.

It is assumed that the pressing force to press the photoconductor drum 1 against the intermediate transfer belt 10 is F1 and the total number of transfer carrier particles interposed between the photoconductor drum 1 and the intermediate transfer belt 10 in the transfer portion is N1. The adhesion between transfer carrier particles and the intermediate transfer belt 10, measured when transfer carrier particles are pressed against the intermediate transfer belt 10 with F1/N1 that is a pressing force per unit transfer carrier particle, is defined as Fi. The adhesion between transfer carrier particles and the photoconductor drum 1, measured when transfer carrier particle are pressed against the photoconductor drum 1 with F1/N1, is defined as Fdr1. Fi and Fdr1 satisfy Fi<Fdr1.

The image forming apparatus includes the developing unit 4 containing developer made up of toner particles and transfer carrier particles adhered to the surfaces of the toner particles. The development roller 41 carries the developer. The development roller 41 contacts with the photoconductor drum 1 to form the developing portion and supplies the developer in the developing portion. It is assumed that the pressing force pressing the development roller 41 against the photoconductor drum 1 is F2 and the total number of transfer carrier particles interposed between toner particles and the photoconductor drum 1 in the developing portion is N2. The adhesion between transfer carrier particles and toner particles, measured when the transfer carrier particles are pressed against the toner particles with F2/N2 that is the pressing force per unit transfer carrier particle, is defined as Ft. The adhesion between transfer carrier particles and the photoconductor drum 1, measured when the transfer carrier particles are pressed against the photoconductor drum 1 with F2/N2, is defined as Fdr2. Ft and Fdr2 satisfy Ft≤Fdr2.

The image forming apparatus may include a pressing member that presses transfer carrier particles adhered to the surface of the photoconductor drum 1. Here, it is assumed that the pressing force pressing the pressing member against the photoconductor drum 1 is F3 and the total number of transfer carrier particles interposed between the photoconductor drum 1 and the pressing member in a pressing portion is N3. The adhesion between transfer carrier particles and the pressing member, measured when the transfer carrier particles are pressed against the photoconductor drum 1 with F3/N3 that is the pressing force per unit transfer carrier particle, is defined as Fp. The adhesion between transfer carrier particles and the photoconductor drum 1, measured when the transfer carrier particles are pressed against the photoconductor drum 1 with F3/N3, is defined as Fdr3. Fp and Fdr3 satisfy Fp<Fdr3.

The image forming apparatus may include a transfer carrier particle supply member that supplies transfer carrier particles to the surface of the photoconductor drum 1. Here, it is assumed that the pressing force pressing the transfer carrier particle supply member against the photoconductor drum 1 is F4 and the total number of transfer carrier particles interposed between the photoconductor drum 1 and the supply member in a supply portion is N4. The adhesion between transfer carrier particles and the supply member, measured when the transfer carrier particles are pressed against the photoconductor drum 1 with F4/N4 that is the pressing force per unit transfer carrier particle, is defined as Fs. The adhesion between transfer carrier particles and the photoconductor drum 1, measured when the transfer carrier particles are supplied to the photoconductor drum 1 with F4/N4, is defined as Fdr4. Fs and Fdr4 satisfy Fs<Fdr4.

As described above, with the configuration of the ninth embodiment, while a sufficient amount of transfer carrier particles to improve transfer efficiency is supplied to the photoconductor drum 1, transfer carrier particles can be maintained on the surface of the photoconductor drum 1.

A roller may be inserted at an end portion of the primary transfer roller 14. The roller is a rigid body with a greater diameter than the diameter of the primary transfer roller 14. By inserting the roller at the end portion of the primary transfer roller 14, the primary transfer roller 14 does not directly press the photoconductor drum 1, so the pressing force in the transfer portion is reduced.

In the ninth embodiment, the primary transfer roller 14 is adopted as the primary transfer member. Alternatively, a sheet-shaped or brush-shaped primary transfer member may be disposed.

In the configuration of an image forming apparatus to be applied in a tenth embodiment, like reference signs are assigned to the same members as those of the first and ninth embodiments, and the description is omitted.

In the tenth embodiment, different from the first embodiment or the ninth embodiment, a metal roller is used as a primary transfer roller 51, so a contact pressure between the intermediate transfer belt 10 and the photoconductor drum 1 is stable, and the relationship in adhesion can be further maintained over a long period of time.

Figure 39:
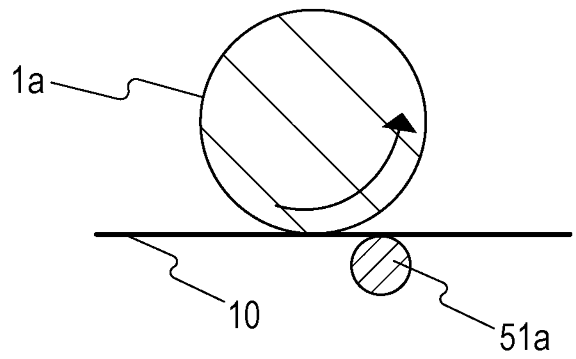
FIG. 39 is an enlarged diagram of a primary transfer portion in a tenth embodiment.

The configuration of the tenth embodiment will be described. FIG. 39 particularly shows a portion changed from the first embodiment in a magnified view in the schematic diagram of the image forming apparatus used in the tenth embodiment. The primary transfer roller 51*a* is a cylindrical metal roller with a diameter of 6 mm and is made of a nickel-plated SUS. The primary transfer roller 51*a* is disposed at a position offset 7 mm downstream in the surface moving direction of the intermediate transfer belt 10 with respect to the center position of the photoconductor drum 1*a*. The intermediate transfer belt 10 is configured so as to wrap around the photoconductor drum 1*a*. The primary transfer roller 51*a* is disposed at a position lifted 0.3 mm from a horizontal surface formed by the photoconductor drum 1*a* and the intermediate transfer belt 10 so that the wrapping amount of the intermediate transfer belt 10 around the photoconductor drum 1*a* can be ensured. At this time, the primary transfer roller 51*a* presses the intermediate transfer belt 10 with a force of about 200 gf. The primary transfer roller 51*a* is rotated with the rotation of the intermediate transfer belt 10. The primary transfer roller 51*b* disposed in the second image forming station b, the primary transfer roller 51*c* disposed in the third image forming station c, and the primary transfer roller 51*d* disposed in the fourth image forming station d have a similar configuration to the primary transfer roller 51*a*.

Hereinafter, the operation of the tenth embodiment will be described.

As shown in FIG. 38, the adhesion Fi between the intermediate transfer belt 10 and transfer carrier particles varies depending on the pressing force of the intermediate transfer belt 10 in the transfer portion. For this reason, to suppress transfer of transfer carrier particles from the photoconductor drum 1 to the intermediate transfer belt 10 by maintaining Fdr>Fi, the pressing force of the intermediate transfer belt 10 in the transfer portion can be reduced. In the tenth embodiment, the photoconductor drum 1 is not directly pressed by the primary transfer roller 51. Therefore, the pressing force of the intermediate transfer belt 10 in the transfer portion can be reduced as compared to the first embodiment. Thus, the relationship in adhesion Fdr>Fi can be maintained for a long period of time.

(Carrier Particle Collecting Member)

Figure 40:
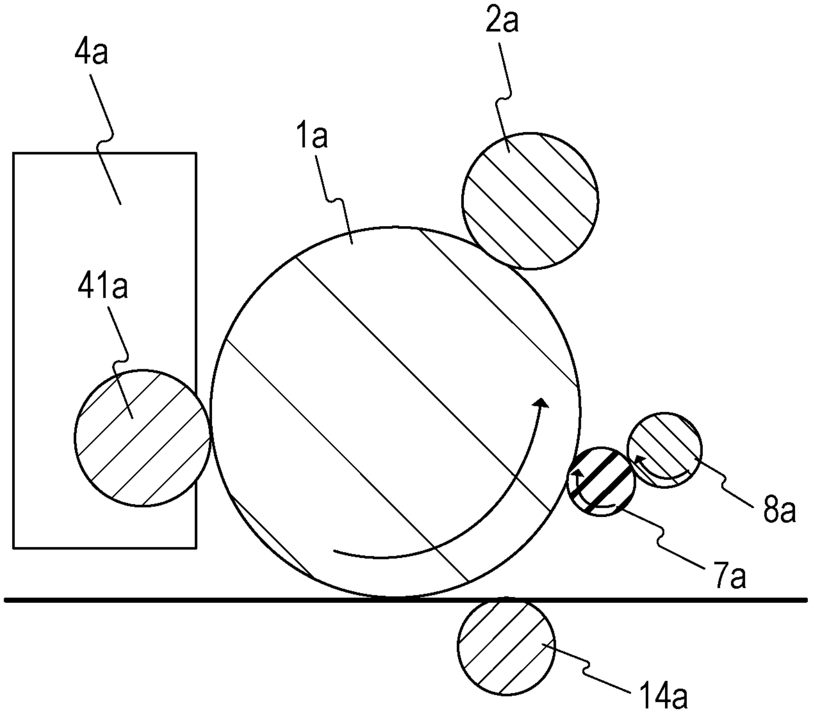
FIG. 40 is a schematic diagram of a collecting member of an image forming apparatus in an eleventh embodiment.

Next, a manner of collecting transfer carrier particles, which is one of the characteristics of an eleventh embodiment, will be described. As shown in FIG. 40, in an image forming apparatus of the eleventh embodiment, a collector roller 7 and a scraper roller 8 are provided downstream of the primary transfer portion in the rotation direction of the photoconductor drum 1. The collector roller 7 has a function to collect transfer carrier particles from the photoconductor drum 1. Before transfer carrier particles on the photoconductor drum 1 are contaminated with toner, external additive, corona product, or the like, transfer carrier particles on the photoconductor drum 1 are collected onto the collector roller 7. Thus, contamination with transfer carrier particles on the photoconductor drum 1 and an accompanying decrease in primary transfer efficiency are suppressed. The scraper roller 8 is a sponge roller having a porous elastic layer. The scraper roller 8 is driven for rotation in a counter direction to the collector roller 7 in a contact portion with the collector roller 7. With this configuration, the scraper roller 8 plays a role in scraping transfer carrier particles collected onto the collector roller 7 while holding the transfer carrier particles in the porous elastic layer. The collector roller 7 is an elastic roller made up of a metal core, a base layer made of silicone rubber on the metal core, and a surface layer made of acrylic, sequentially laminated. The collector roller 7 is pressed against the photoconductor drum 1 with 1000 gf and is driven for rotation at a peripheral speed of 100% relative to the photoconductor drum 1 in the forward direction to the rotation direction of the photoconductor drum 1. The contact portion between the collector roller 7 and the photoconductor drum 1 has a width of about 220 mm in the axial direction of the collector roller 7 and has a width of about 1 mm in the rotation direction of the collector roller 7. Thus, the contact area between the collector roller 7 and the photoconductor drum 1 is about $2.2\times10^{-4}$ ($m^2$).

Figure 41:
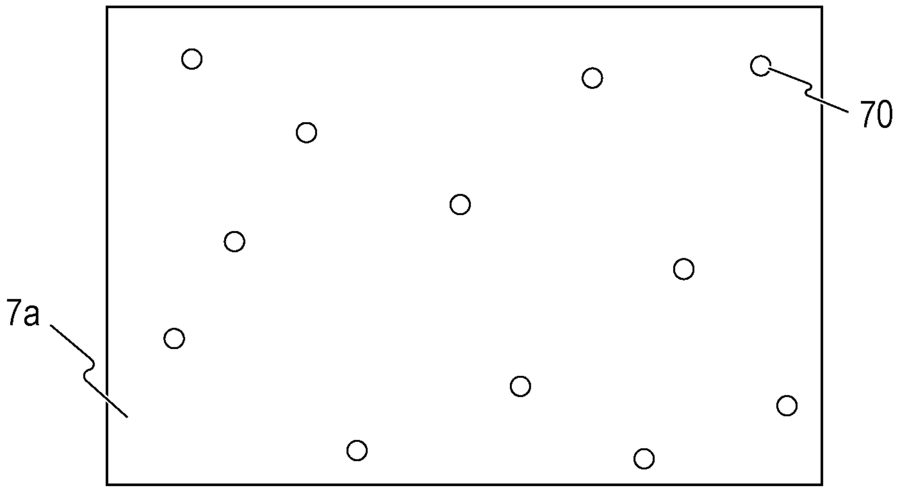
FIG. 41 is a schematic diagram of the collecting member of the image forming apparatus in the eleventh embodiment.

As shown in FIG. 41, a large number of dotted transfer carrier particle collecting portions that are small protruded portions are formed on the surface layer of the collector roller 7. The transfer carrier particle collecting portions are made of urethane resin applied to the acrylic resin of the surface layer of the collector roller 7. The transfer carrier particle collecting portions 70 have a function to, when brought into contact with the photoconductor drum 1, collect transfer carrier particles from the photoconductor drum 1 to the collector roller 7.

Figure 42B:
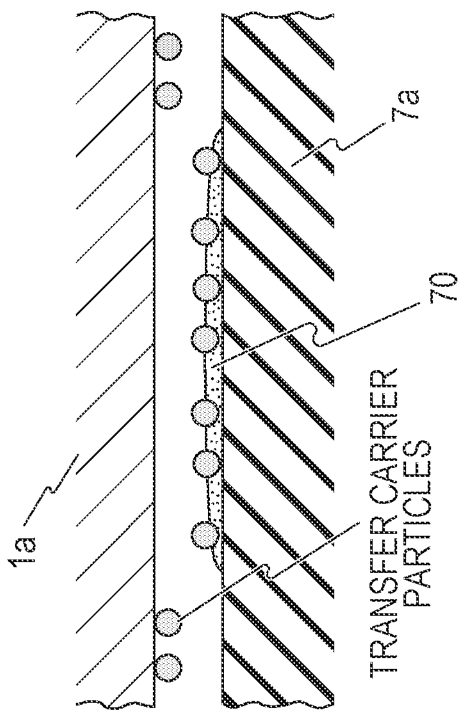
FIG. 42A and FIG. 42B are schematic diagrams at the time of collection of transfer carrier particles in the image forming apparatus in the eleventh embodiment.
Figure 42A:
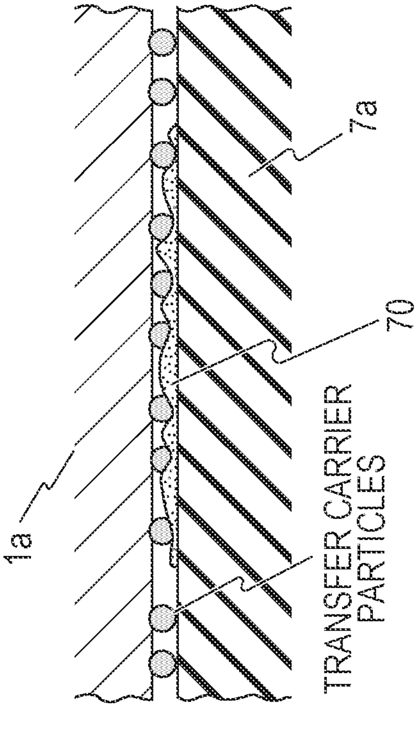

FIG. 42A and FIG. 42B are schematic diagrams showing a state of collecting transfer carrier particles from the photoconductor drum 1 with the transfer carrier particle collecting portions 70 of the collector roller 7. Urethane resin softer than polycarbonate used for the surface layer of the photoconductor drum 1 was used as the material of the transfer carrier particle collecting portions 70. As shown in FIG. 42A, when the transfer carrier particle collecting portions 70 are pressed by transfer carrier particles on the photoconductor drum 1, the transfer carrier particle collecting portions 70 deform more than the surface of the photoconductor drum 1. With this configuration, the contact area between the transfer carrier particle collecting portions 70 and transfer carrier particles increases. When the contact area between the transfer carrier particle collecting portions 70 and transfer carrier particles increases, the adhesion between the transfer carrier particle collecting portions 70 and transfer carrier particles increases, so the transfer carrier particles are easily transferred from the photoconductor drum 1 to the transfer carrier particle collecting portions 70.

The surface other than the transfer carrier particle collecting portions 70 in the surface of the collector roller 7 is made of acrylic resin harder than polycarbonate used for the surface layer of the photoconductor drum 1. For this reason, as shown in FIG. 42A, inversely with the transfer carrier particle collecting portions 70, the adhesion between the collector roller 7 and transfer carrier particles is less than the adhesion between the photoconductor drum 1 and transfer carrier particles. Thus, transfer carrier particles are difficult to be transferred to the surface other than the transfer carrier particle collecting portions 70 of the collector roller 7.

From above, as shown in FIG. 42B, after the collector roller 7 passes through the contact portion with the photoconductor drum 1, transfer carrier particles adhere to the transfer carrier particle collecting portions 70 of the collector roller 7 and collected. On the other hand, transfer carrier particles do not adhere to the surface other than the transfer carrier particle collecting portions 70 of the collector roller 7 and remain on the photoconductor drum 1 without being collected. When each of the transfer carrier particle collecting portions 70 is too large on the surface of the collector roller 7, there are concerns about a decrease in primary transfer efficiency due to uneven collection of transfer carrier particles from the photoconductor drum 1 with the collector roller 7. For this reason, the diameter of each of the transfer carrier particle collecting portions 70 to be provided on the surface of the collector roller 7 preferably substantially falls within a circumference of 200 μm.

When the distribution of the transfer carrier particle collecting portions 70 on the surface of the collector roller 7 is too biased as well, there are concerns about a decrease in primary transfer efficiency due to uneven collection of transfer carrier particles from the photoconductor drum 1 with the collector roller 7. For this reason, a large number of transfer carrier particles can be provided on the surface of the collector roller 7 with high dispersibility.

Next, measured results associated with the collector roller 7 of the eleventh embodiment will be described.

To calculate the area ratio of the transfer carrier particle collecting portions 70 on the surface of the collector roller 7, the surface of the collector roller 7 was observed with a laser microscope (VK-X200 Keyence Corporation). An observed image was acquired by observing the surface of the collector roller 7 at a magnification of 100 times with the laser microscope, the observed image was binarized into the transfer carrier particle collecting portions 70 and a part other than the transfer carrier particle collecting portions 70, and then the area ratio of the transfer carrier particle collecting portions 70 on the surface of the collector roller 7 was calculated. In the eleventh embodiment, the calculated area ratio of the transfer carrier particle collecting portions 70 on the surface of the collector roller 7 was 8.2%.

Figures 43, 44:
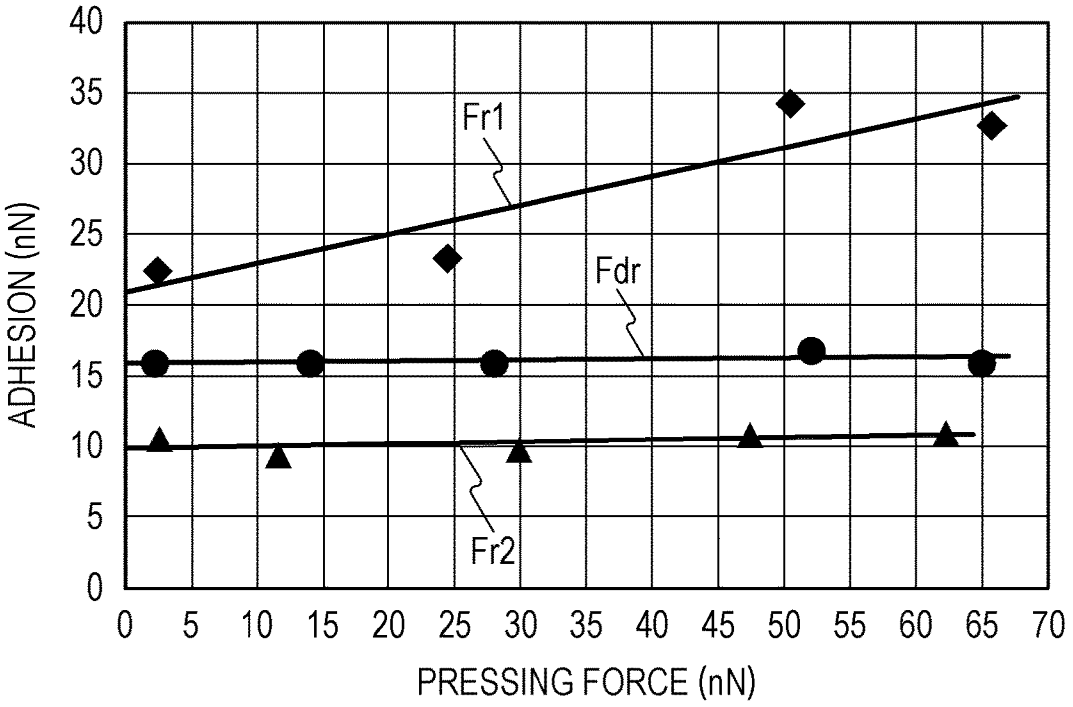
FIG. 43 shows measured results of adhesion for the image forming apparatus in the eleventh embodiment.
FIG. 44 shows effect confirmation test results for the image forming apparatus in the eleventh embodiment.

Subsequently, Fdr2 at the contact portion between the collector roller 7 and the photoconductor drum 1, which is the above-described Fdr, was measured. At the same time, the adhesion Fr1 between the transfer carrier particle collecting portions 70 on the surface of the collector roller 7 and transfer carrier particles and the adhesion Fr2 between the part other than the transfer carrier particle collecting portions 70 on the surface of the collector roller 7 and transfer carrier particles were measured. Measurement was performed with a similar method to the above-described measurement of the adhesion Ft between toner and transfer carrier particles, and each of the adhesions was measured multiple times while changing the pressing force of the cantilever against an associated one of the members. FIG. 43 shows the measured results of the adhesions. As shown in FIG. 43, regardless of the pressing force of the cantilever on the horizontal axis, the adhesions are in the relationship Fr1>Fdr2>Fr2. In other words, (Adhesion between the transfer carrier particle collecting portions 70 on the surface of the collector roller 7 and transfer carrier particles)>(Adhesion between the surface of the photoconductor drum 1 and transfer carrier particles)>(Adhesion between the part other than the transfer carrier particle collecting portions 70 on the surface of the collector roller 7 and transfer carrier particles). This indicates that transfer carrier particles are collected from the photoconductor drum 1 to the transfer carrier particle collecting portions 70 on the collector roller surface and transfer carrier particles are difficult to be collected from the photoconductor drum 1 to the surface other than the transfer carrier particle collecting portions 70 on the collector roller surface.

In measurement of the eleventh embodiment, as described above, the adhesions were in the relationship Fr1>Fdr2>Fr2 regardless of the pressing force of the cantilever on the horizontal axis. However, depending on materials and the like used for the collector roller 7, transfer carrier particles, and the photoconductor drum 1, the magnitude relationship in adhesion can change according to the pressing force of the cantilever on the horizontal axis. For this reason, when the magnitude relationship in adhesion is compared, the adhesions can be compared in the case where the horizontal axis represents a pressing force received by a transfer carrier particle held between the collector roller 7 and the photoconductor drum 1 in an actual contact portion between the collector roller 7 and the photoconductor drum 1.

A pressing force received by a transfer carrier particle held between the collector roller 7 and the photoconductor drum 1 in the contact portion between the collector roller 7 and the photoconductor drum 1 can be calculated as follows. The description will be made with reference to FIG. 36A in which the intermediate transfer belt 10 is replaced with the collector roller 7. Here, as shown in FIG. 36A, it is assumed that collector roller 7 and the photoconductor drum 1 are in contact with each other via transfer carrier particles. A pressing force received by a transfer carrier particle held between the collector roller 7 and the photoconductor drum 1 in the contact portion between the collector roller 7 and the photoconductor drum 1 can be calculated by the following expression 10.

(Pressing force of the collector roller 7 against the photoconductor drum 1)/(Number of transfer carrier particles present in the contact portion between the collector roller 7 and the photoconductor drum 1) (10)

The "Number of transfer carrier particles present in the contact portion between the collector roller 7 and the photoconductor drum 1" in the expression 10 is calculated by the following expression 11.

(Area of the contact portion between the collector roller 7 and the photoconductor drum 1)×(Coverage of transfer carrier particles on the surface of the photoconductor drum 1)/(Cross-section area of a transfer carrier particle) (11)

The pressing force of the collector roller 7 against the photoconductor drum 1 is 1000 (gf). The area of the contact portion between the collector roller 7 and the photoconductor drum 1 is $2.2\times10^{-4}$ ($m^2$). The coverage of transfer carrier particles on the surface of the photoconductor drum 1 is 14.8%. By using these values, the cross-section area of a transfer carrier particle can be calculated from the average particle diameter of transfer carrier particles.

By substituting the above values into the expression 10 and the expression 11, the pressing force received by a transfer carrier particle held between the collector roller 7 and the photoconductor drum 1 in the contact portion between the collector roller 7 and the photoconductor drum 1 is calculated as 2.36 (nN) in the eleventh embodiment.

As shown in FIG. 43, even around 2.36 (nN) on the horizontal axis, the adhesions are in the relationship Fr1>Fdr2>Fr2. This indicates that (Adhesion between the transfer carrier particle collecting portions 70 on the surface of the collector roller 7 and transfer carrier particles)>(Adhesion between the surface of the photoconductor drum 1 and transfer carrier particles)>(Adhesion between the part other than the transfer carrier particle collecting portions 70 on the surface of the collector roller 7 and transfer carrier particles).

To form a state where transfer carrier particles are collected from the photoconductor drum 1 to the transfer carrier particle collecting portions 70 on the surface of the collector roller 7 and are difficult to be collected from the photoconductor drum 1 to the surface other than the transfer carrier particle collecting portions 70 on the surface of the collector roller 7, the following relationship can be set. As described above, the relationship Fr1>Fdr2>Fr2 just needs to be satisfied around the pressing force received by a transfer carrier particle held between the collector roller 7 and the photoconductor drum 1 in the contact portion between the collector roller 7 and the photoconductor drum 1.

Next, a technique to confirm the effect of the transfer carrier particle collecting portions 70 in the configuration of the eleventh embodiment will be described. Initially, the image forming apparatus of the eleventh embodiment was caused to form a patch image with a yellow density of 100%.

Immediately after primary transfer of the formed yellow patch image ended, the image forming apparatus was stopped. The residual toner density on a patch image part, remaining on the photoconductor drum 1*a* of the yellow station, was checked. Measurement of the residual toner density was performed in the following technique. Initially, a transparent tape (polyester tape 5511 Nichiban Co., Ltd.) was stuck to the residual toner part of the yellow patch image on the photoconductor drum 1*a*, and the residual toner was trapped by the transparent tape. After that, the transparent tape trapping the residual toner and peeled from the photoconductor drum 1 and a new transparent tape were stuck on high-brightness paper (GFC081 Canon, Inc.). Then, the density D1 of the transparent tape of the residual toner trapping part and the density D0 of the new transparent tape part each were measured with a reflection densitometer (Reflectometer model TC-6DS, produced by TokyoDenshoku Co., Ltd.). A method using the difference D0−D1 as a residual toner density was used. A residual toner density means that residual toner reduces as the numeric value reduces. When the value is less than or equal to 1.0, it may be determined that there is almost no residual toner. The above-described measurement of a residual toner amount was performed in a state where the image forming apparatus was new, printing at a printing ratio of 1% was performed on 1000 sheets, and then similar measurement was performed again. The surface of the photoconductor drum 1, of which the residual toner density was measured, was observed with an electron microscope, and the presence or absence of melt-adhesion of transfer carrier particles was checked in observing the adhesion state of transfer carrier particles on the surface of the photoconductor drum 1.

An image forming apparatus using the collector roller 7 with no transfer carrier particle collecting portions 70 on the surface of the collector roller 7 was used as Comparative Example 11 and was subjected to similar effect confirmation test to that of the eleventh embodiment. The other configuration is similar to that of the eleventh embodiment, so the description is omitted.

Next, the results of effect confirmation test for the eleventh embodiment will be described. As shown in FIG. 44, in the configuration of the eleventh embodiment, the initial residual toner density was 0.3, and the residual toner density after printing 1000 sheets was 0.5. In both the initial residual toner density and the residual toner density after printing 1000 sheets, the residual toner density was lower than or equal to 1.0, almost no residual toner was present, and primary transferability was good. In addition, melt-adhesion of transfer carrier particles was not observed on the photoconductor drum 1 after printing 1000 sheets.

On the other hand, in the configuration of Comparative Example 11, the initial residual toner density was 0.2; however, the residual toner density after printing 1000 sheets was 4.5, and the presence of residual toner was determined after printing of 1000 sheets. In addition, melt-adhesion of transfer carrier particles was observed on the photoconductor drum 1 after printing 1000 sheets.

As described above, in the eleventh embodiment, the small transfer carrier particle collecting portions 70 that collect transfer carrier particles on the photoconductor drum 1 were provided on the surface of the collector roller 7. In this state, the adhesions were set in the relationship (Adhesion between the transfer carrier particle collecting portions 70 on the surface of the collector roller 7 and transfer carrier particles)>(Adhesion between the surface of the photoconductor drum 1 and transfer carrier particles)>(Adhesion between the part other than the transfer carrier particle collecting portions 70 on the surface of the collector roller 7 and transfer carrier particles). By using the above-described configuration, a decrease in primary transfer efficiency due to contamination with transfer carrier particles supplied to the surface of the photoconductor drum 1 is suppressed.

Therefore, the eleventh embodiment has the following configuration.

It is assumed that the pressing force pressing the development roller 41 against the photoconductor drum 1 is F1 and the total number of transfer carrier particles interposed between toner particles and the photoconductor drum 1 in the developing portion is N1. The adhesion between transfer carrier particles and toner particles, measured when the transfer carrier particles are pressed against the toner particles with F1/N1 that is a pressing force per unit transfer carrier particle, is defined as Ft. The adhesion between transfer carrier particles and the photoconductor drum 1, measured when the transfer carrier particles are pressed against the photoconductor drum 1 with F1/N1, is defined as Fdr1. Ft and Fdr1 are configured to satisfy Ft≤Fdr1.

It is assumed that the pressing force pressing the collector roller 7 against the photoconductor drum 1 is F2 and the total number of transfer carrier particles interposed between toner particles and the photoconductor drum 1 in the contact portion where the collector roller 7 and the photoconductor drum 1 contact with each other is N2. The adhesion between transfer carrier particles and the carrier particle collecting portions 70, measured when the transfer carrier particles are pressed against the transfer carrier particle collecting portions 70 with F2/N2 that is a pressing force per unit transfer carrier particle, is defined as Fr. The adhesion between transfer carrier particles and the photoconductor drum 1, measured when the transfer carrier particles are pressed against the photoconductor drum 1 with F2/N2, is defined as Fdr2. Fr and Fdr2 are configured to satisfy Fr Fdr2.

Next, an image forming apparatus in a twelfth embodiment will be described. In the configuration of the twelfth embodiment, the transfer carrier particle collecting portions 70 on the surface of the collector roller 7 are protruded portions higher than the number average particle diameter of toner in the configurations of the first and eleventh embodiments. The other configuration is similar to those of the first and eleventh embodiments, so the description is omitted.

Figure 45:
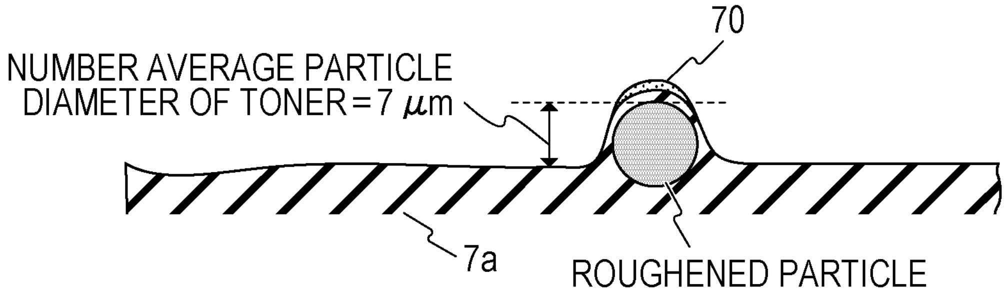
FIG. 45 is a schematic cross-sectional view of a collecting member of an image forming apparatus in a twelfth embodiment.

FIG. 45 is a cross section including the transfer carrier particle collecting portion 70 on the surface of the collector roller 7. As shown in FIG. 45, in the configuration of the transfer carrier particle collecting portion 70, urethane resin is applied and stuck to the surface of the protruded portion made up of a roughened particle included in the surface layer of the collector roller 7. In the twelfth embodiment, the transfer carrier particle collecting portions 70 are formed by sticking urethane resin to the protruded portions each made up of the roughened particle included in the surface layer of the collector roller 7. However, the transfer carrier particle collecting portions 70 may be formed by using particles softer than the material of the surface layer of the photoconductor drum 1 as roughened particles and exposing the roughened particles from the surface layer of the collector roller 7.

By forming the transfer carrier particle collecting portions 70 in a protruded shape and protruding the transfer carrier particle collecting portions 70 to from the surface of the collector roller 7, the transfer carrier particle collecting portions 70 are pressed against transfer carrier particles on the photoconductor drum 1 with a greater force than that of the configuration of the eleventh embodiment. For this reason, the adhesion between the transfer carrier particle collecting portions 70 and transfer carrier particles on the photoconductor drum 1 increases, so transfer carrier particles are more easily collected from the photoconductor drum 1 at the transfer carrier particle collecting portions 70.

Figure 46:
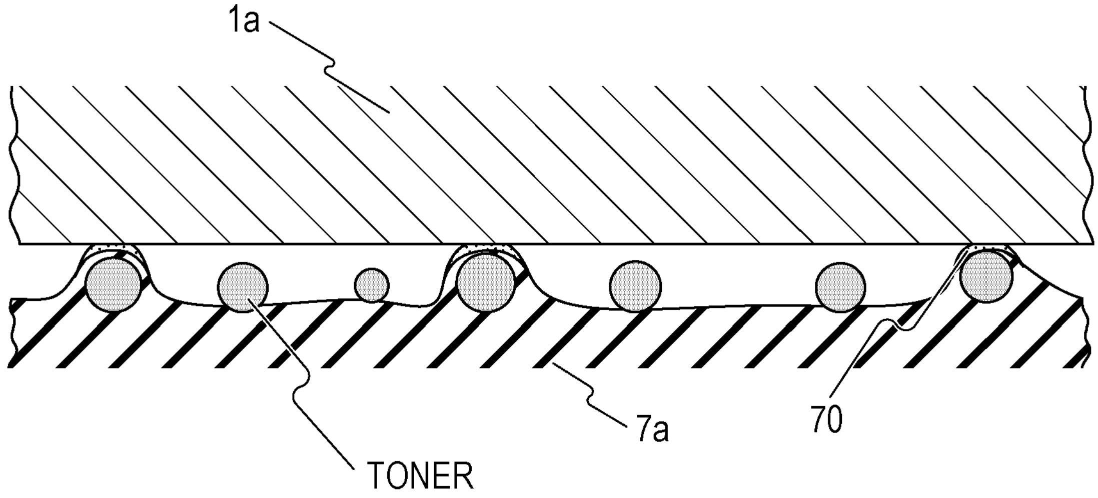
FIG. 46 is a schematic diagram of a contact portion between the collecting member and a photoconductor drum in the image forming apparatus in the twelfth embodiment.

In addition, when the transfer carrier particle collecting portions 70 of the collector roller 7 are configured as protruded portions higher than the number average particle diameter of toner as shown in FIG. 46, the following effect is obtained. Even when toner is interposed in the contact portion between the photoconductor drum 1 and the collector roller 7, the transfer carrier particle collecting portions 70 are protruded relative to the toner, so the transfer carrier particle collecting portions 70 can be stably pressed against transfer carrier particles on the photoconductor drum 1. As a result, transfer carrier particles are more easily collected from the photoconductor drum 1 by the transfer carrier particle collecting portions 70.

To calculate the area ratio of the transfer carrier particle collecting portions 70 on the surface of the collector roller 7, the surface profile of the collector roller 7 was measured with a contact profilometer (SURFCOM 2800G, produced by Nihon Seimitsu Co., Ltd.). Measurement was performed along the axial direction of the collector roller 7 under the conditions shown in the following table, and measurement was performed 12 times in total while changing measurement points.

TABLE 7

| | |
|---|---|
| CALCULATION STANDARD | JIS-'01 STANDARD |
| MEASUREMENT LENGTH | 9.0 mm |
| CUT-OFF WAVELENGTH | 2.5 mm |
| MEASUREMENT SPEED | 0.15 mm/s |
| CUT-OFF TYPE | GAUSSIAN |
| MOVE/RETURN SPEED | 3.0 mm/s |
| PRELIMINARY DRIVE LENGTH | CUT-OFF WAVELENGTH/3 × 2 |
| λs CUT-OFF RATIO | 300 |
| λs CUT-OFF WAVELENGTH | 8.3333 μm |

Figure 47:
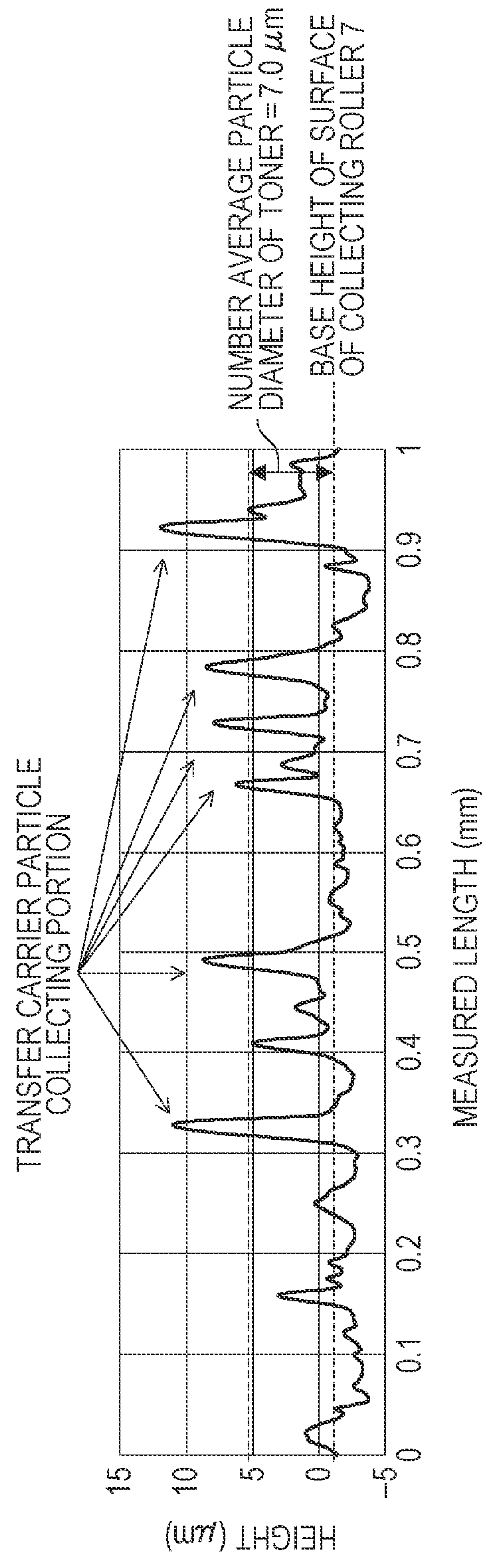
FIG. 47 is a roughness profile at the surface of the collecting member of the image forming apparatus in the twelfth embodiment.

FIG. 47 is part of a roughness profile of the surface of the collector roller 7 in the twelfth embodiment. As shown in FIG. 47, portions higher than the number average particle diameter of toner with respect to the height of the base on the surface of the collector roller 7 are the transfer carrier particle collecting portions 70. The base height of the surface of the collector roller 7 is calculated as follows.

Initially, an amplitude distribution curve of the surface of the collector roller 7 is calculated from roughness profile data of the collector roller 7. An amplitude distribution curve is a curve in which an abundance ratio at each height is plotted by using roughness profile data.

Figure 48:
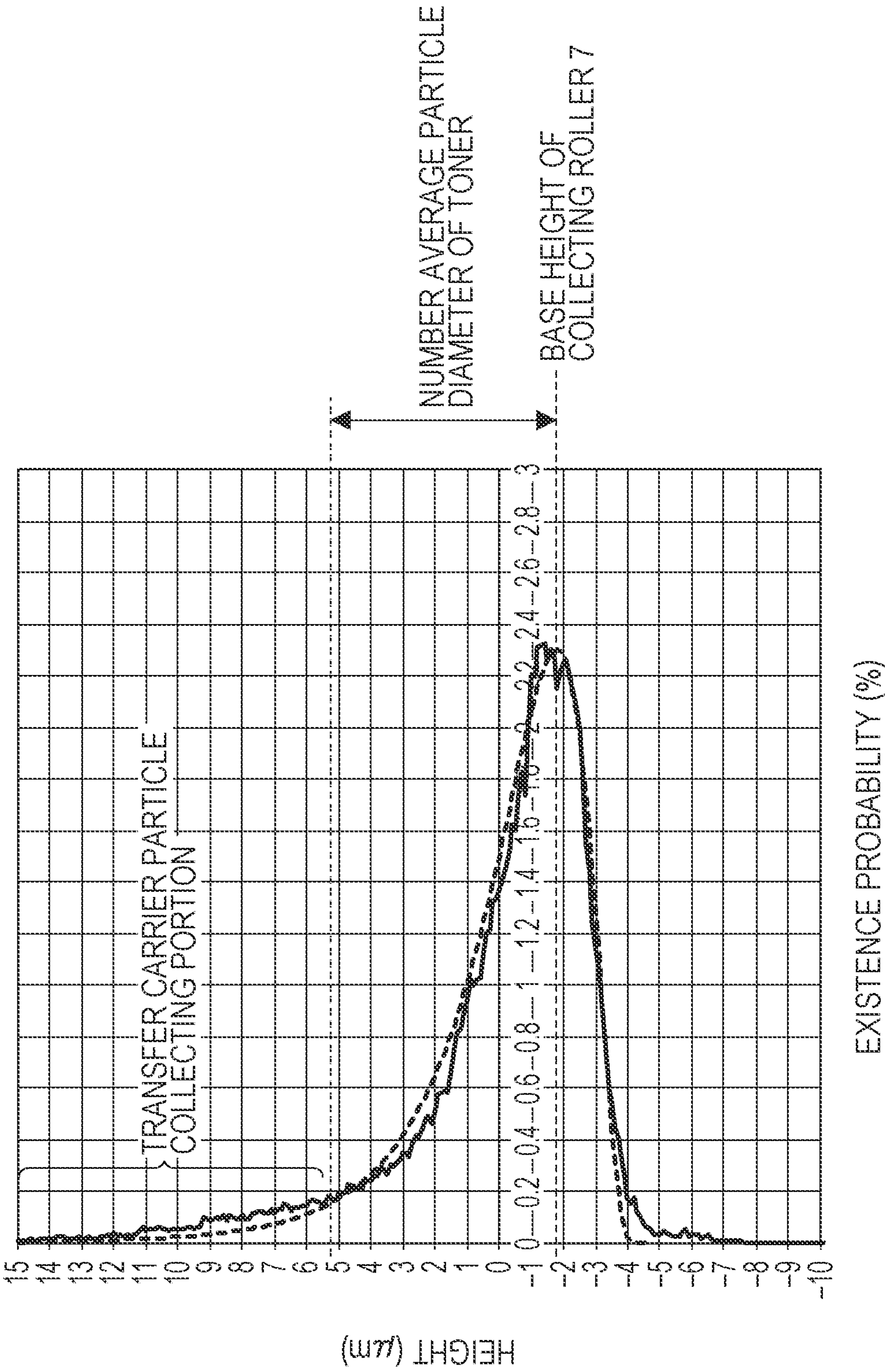
FIG. 48 is an amplitude distribution curve of the surface of the collecting member of the image forming apparatus in the twelfth embodiment.

In the graph of FIG. 48, the continuous line curve is the amplitude distribution curve of the collector roller 7 of the twelfth embodiment, the vertical axis represents height, and the horizontal axis represents abundance ratio at each height. In the amplitude distribution curve, the height at which the abundance ratio is at the peak is calculated as the base height of the surface of the collector roller 7. In the graph of FIG. 48, the dashed line curve is an approximate curve of the amplitude distribution curve, obtained by fitting the amplitude distribution curve with a logarithmic normal distribution. In the approximate curve, the height at which the abundance ratio is at the peak is calculated as the base height of the surface of the collector roller 7. Points higher than or equal to a height obtained by adding the number average particle diameter of toner to the base height of the collector roller 7 correspond to the transfer carrier particle collecting portions 70. Therefore, the total value of the abundance ratios at the points higher than or equal to the height obtained by adding the number average particle diameter of toner to the calculated base height of the collector roller 7 was calculated, and the calculated total value was defined as the area ratio of the transfer carrier particle collecting portions on the surface of the collector roller 7. In the twelfth embodiment, the area ratio of the transfer carrier particle collecting portions of the collector roller 7 was 5.7%.

Next, the results of effect confirmation test for the twelfth embodiment will be described. A confirmation method is similar to that of the eleventh embodiment.

As shown in FIG. 44, in the configuration of the twelfth embodiment, the initial residual toner density was 0.3, the residual toner density after printing 1000 sheets was 0.3, and the residual toner density was lower than or equal to 1.0 in both the initial residual toner density and the residual toner density after printing 1000 sheets, so almost no residual toner was identified. In addition, melt-adhesion of transfer carrier particles was not observed on the photoconductor drum 1 after printing 1000 sheets. Furthermore, in the configuration of the eleventh embodiment, the residual toner density after printing 1000 sheets was 0.5; whereas, in the configuration of the twelfth embodiment, the residual toner density after printing 1000 sheets was 0.3, so transfer efficiency was further improved with the configuration of the twelfth embodiment. This can be estimated as the effect obtained by forming the transfer carrier particle collecting portions 70 on the surface of the collector roller 7 as protruded portions higher than the number average particle diameter of toner.

As described above, by forming the transfer carrier particle collecting portions of the collector roller 7 as protruded portions higher than the number average particle diameter of toner in the configuration of the eleventh embodiment as in the case of the twelfth embodiment, the transfer carrier particle collecting portions can be caused to stably contact with the photoconductor drum 1. Therefore, a decrease in primary transfer efficiency due to contamination with transfer carrier particles supplied to the surface of the photoconductor drum 1 is suppressed.

Figure 49:
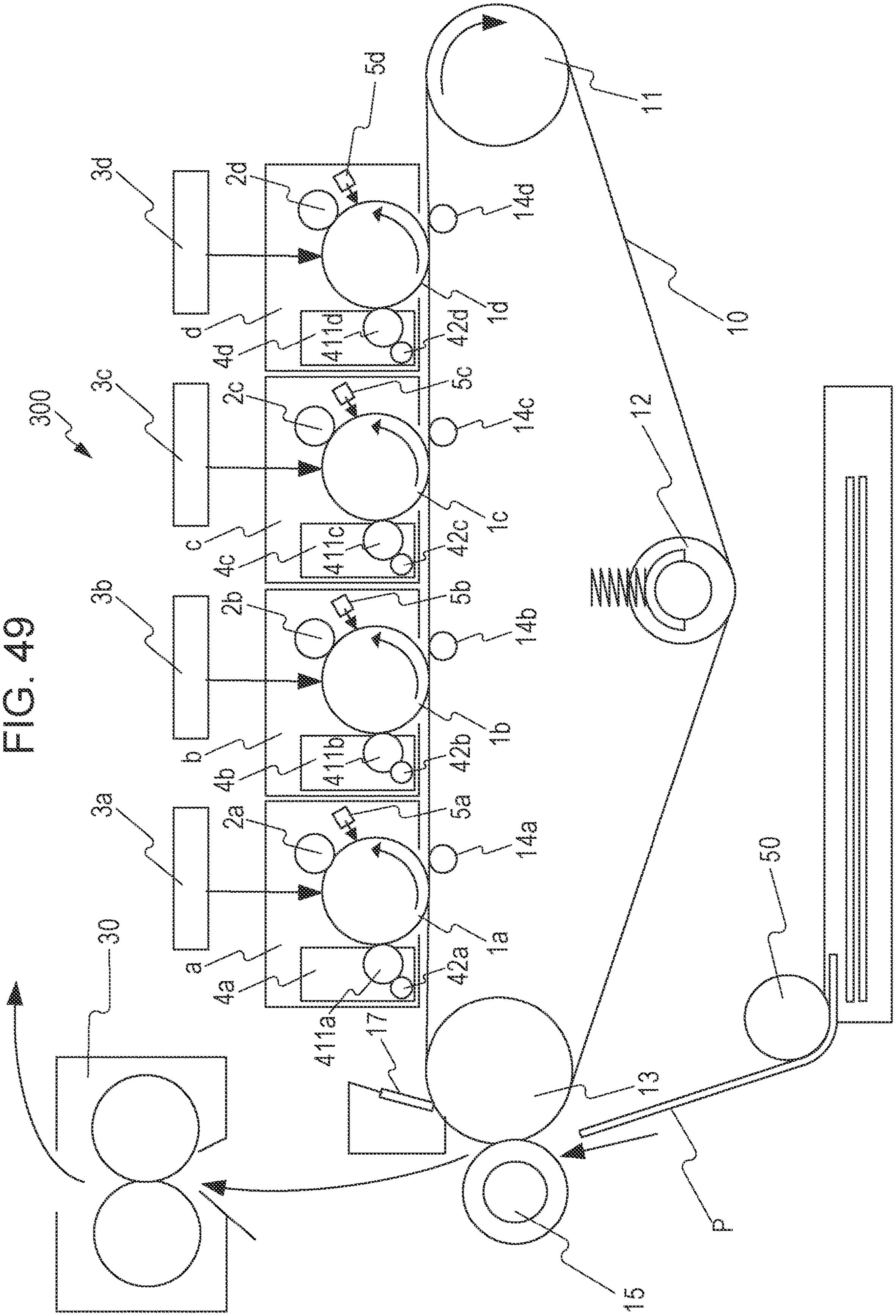
FIG. 49 is a schematic diagram of an image forming apparatus in a thirteenth embodiment.

Next, the configuration of a thirteenth embodiment will be described. As shown in FIG. 49, an image forming apparatus 300 of the thirteenth embodiment includes the transfer carrier particle collecting portions 70 made up of protruded portions higher than the number average particle diameter of toner on the surface of a development roller 411 as provided in the twelfth embodiment without the collector roller 7 or the scraper roller 8. With this configuration, a developing device also serves as a manner of collecting transfer carrier particles. The other configuration is similar to that of the eleventh embodiment, so the description is omitted.

The development roller 411 is an elastic roller made up of a metal core, a base layer made of silicone rubber on the metal core, and a surface layer made of urethane, sequentially laminated. The development roller 411 is pressed against the photoconductor drum 1 with 200 gf and is driven for rotation at a peripheral speed of 100% relative to the photoconductor drum 1 in the forward direction to the rotation direction of the photoconductor drum 1.

Figure 50:
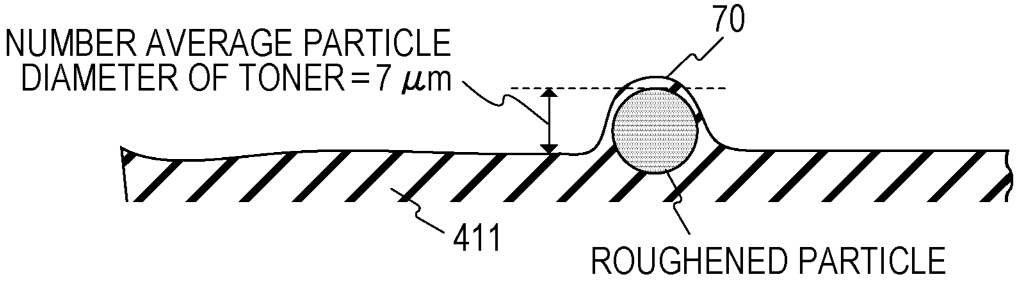
FIG. 50 is a schematic cross-sectional view of a collecting member of the image forming apparatus in the thirteenth embodiment.

FIG. 50 is a cross section including the transfer carrier particle collecting portion 70 on the surface of the development roller 411. As shown in FIG. 50, the transfer carrier particle collecting portions 70 are formed as protruded portions made up of roughened particles included in the surface layer of the development roller 411, and the protruded portions are configured to be higher than the number average particle diameter of toner. The area ratio of the transfer carrier particle collecting portions 70 on the surface of the development roller 411 was calculated with the contact profilometer as in the case of the twelfth embodiment and was 6.8%.

Figure 51:
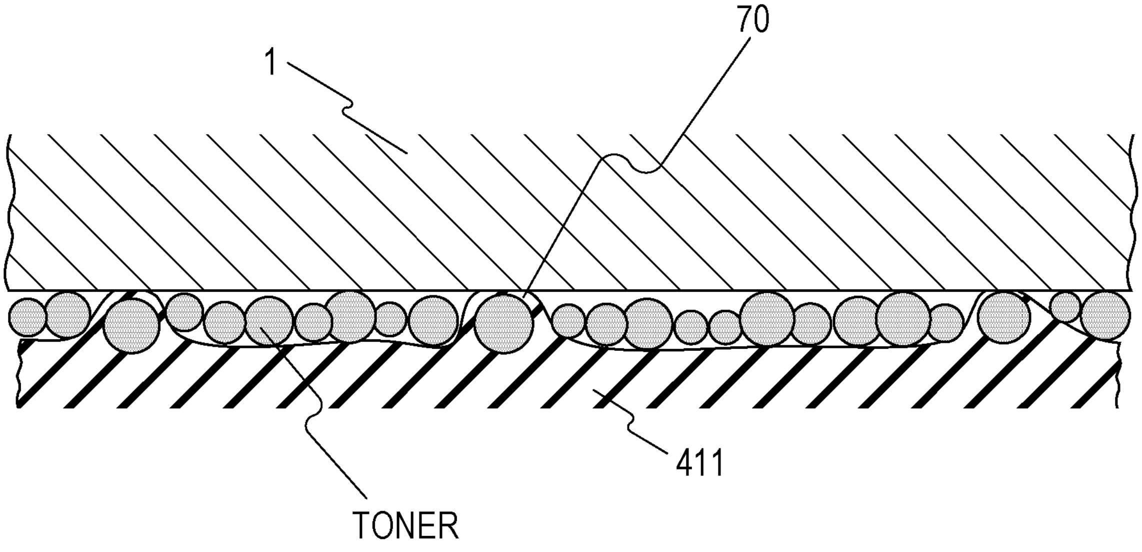
FIG. 51 is a schematic diagram of a contact portion between the collecting member and a photoconductor drum in the image forming apparatus in the thirteenth embodiment.

As shown in FIG. 51, the transfer carrier particle collecting portions 70 were formed as protruded portions higher than or equal to the number average particle diameter of toner with respect to the surface of the development roller 411. Thus, even in a state where the development roller 411 is coated with toner, the transfer carrier particle collecting portions 70 stably contact with the photoconductor drum 1, so transfer carrier particles can be collected from the photoconductor drum 1 with the transfer carrier particle collecting portions 70. In addition, as shown in FIG. 51, the development roller 411 other than the transfer carrier particle collecting portion 70 is coated with toner, and, as described in the eleventh embodiment, the adhesion between toner and transfer carrier particles is less than the adhesion between the photoconductor drum 1 and transfer carrier particles. Therefore, in the part other than the transfer carrier particle collecting portions 70 on the development roller 411, transfer carrier particles are difficult to be collected from the photoconductor drum 1. From above, by providing the transfer carrier particle collecting portions 70 on the surface of the development roller 411, the developing device can also serve as a manner of collecting transfer carrier particles from the photoconductor drum 1.

Next, the behavior of transfer carrier particles after being collected to the development roller 411 will be described. Transfer carrier particles collected from the photoconductor drum 1 to the development roller 411 are scraped from the development roller 411 together with toner on the development roller 411 into cells in a toner supplying roller 43 in a contact portion between the toner supplying roller 43 and the development roller 411. The toner and the transfer carrier particles scraped into the cells of the toner supplying roller 43 are discharged from the cells of the toner supplying roller 43 into the developer containing portion 4 after the toner supplying roller 43 passes through the contact portion with the development roller 411. Thus, the toner and the transfer carrier particles are mixed with the developer in the developer containing portion. The transfer carrier particles mixed from the cells of the toner supplying roller 43 into the developer in the developer containing portion 4 is carried on the development roller 411 again, and then supplied again from the development roller 411 to the surface of the photoconductor drum 1.

As described above, by scraping transfer carrier particles collected onto the development roller 411 with the toner supplying roller 43, transfer carrier particles circulate between the photoconductor drum 1 and the developing device. Therefore, depletion or degradation of transfer carrier particles in the developing device is suppressed.

For the thirteenth embodiment, effect confirmation test was performed as in the case of the eleventh and twelfth embodiments. To confirm the effect of the thirteenth embodiment, similar effect confirmation test to those of the eleventh and twelfth embodiments were performed by using image forming apparatuses of the embodiments and Comparative Examples as described below.

In the configuration of Modification 6, the development roller 411 of which the area ratio of the transfer carrier particle collecting portions 70 on the surface of the development roller 411 was 1.35% was used. The area ratio was the result calculated with the contact profilometer as in the case of the twelfth embodiment. The other configuration is similar to that of the thirteenth embodiment, so the description is omitted.

Subsequently, in the configuration of Comparative Example 12, the development roller 411 of which the area ratio of the transfer carrier particle collecting portions 70 on the surface of the development roller 411 was 0.72% was used. The area ratio was the result calculated with the contact profilometer as in the case of the twelfth embodiment. The other configuration is similar to that of the thirteenth embodiment, so the description is omitted.

Subsequently, the results of effect confirmation test of the thirteenth embodiment, Modification 6, and Comparative Example 12 will be described. As shown in FIG. 52, in the thirteenth embodiment and Modification 6, the residual toner density was lower than or equal to 1.0 in both a new state and a state after printing 1000 sheets, and primary transferability was good. Melt-adhesion of transfer carrier particles was not observed on the photoconductor drum 1 after printing 1000 sheets.

On the other hand, in the configuration of Comparative Example 12, the residual toner density in a new state was 0.3; whereas, the residual toner density in a state after printing 1000 sheets was 1.4, primary transferability deteriorated, and residual toner was identified. Furthermore, after printing 1000 sheets, melt-adhesion of transfer carrier particles was partially observed on the photoconductor drum 1. This suggests that, when the area ratio of the transfer carrier particle collecting portions 70 formed on the surface of the development roller 411 is too small as in the case of Comparative Example 12, a sufficient amount of transfer carrier particles cannot be collected from the photoconductor drum 1. Thus, it is found that contamination with transfer carrier particles on the surface of the photoconductor drum 1 and an accompanying primary transfer defect occur.

As described above, by appropriately providing transfer carrier particle collecting portions made of protruded portions higher than the number average particle diameter of toner on the surface of the development roller 411 as in the case of the thirteenth embodiment, the developing device can also serve as a manner of collecting transfer carrier particles. At this time, the pressing forces F1, F2 and the total numbers N1, N2 of transfer carrier particles, described in the eleventh embodiment, are in the relationship F1=F2 and N1=N2. As a result, even when the collector roller 7 is not provided, a decrease in primary transfer efficiency due to contamination with transfer carrier particles supplied to the surface of the photoconductor drum 1 is suppressed.

An image forming apparatus of a fourteenth embodiment will be described. In the image forming apparatus of the fourteenth embodiment, the area ratio of the transfer carrier particle collecting portions 70 on the surface of the development roller 411 is reduced and the peripheral speed ratio that is the ratio of the peripheral speed of the development roller 411 to the peripheral speed of the photoconductor drum 1 is increased in the configurations of the thirteenth embodiment and Modification 6. The other configuration is similar to those of the thirteenth embodiment and Modification 6, so the description is omitted.

A manner of supplying transfer carrier particles in the fourteenth embodiment will be described. In the image forming apparatus of the fourteenth embodiment, transfer carrier particles supplied from the development roller 411 increases because the peripheral speed ratio of the development roller 411 to the photoconductor drum 1 is increased.

Figure 53A:
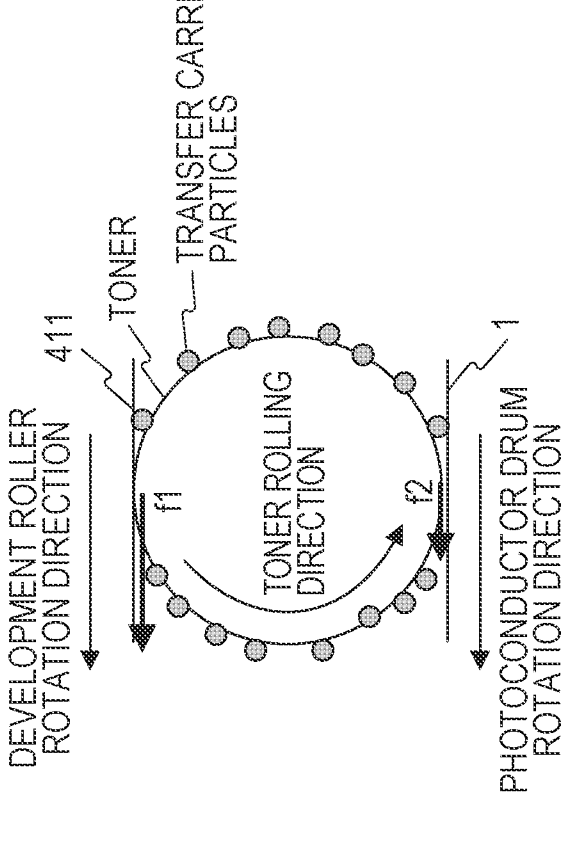
FIG. 53A and FIG. 53B are schematic diagrams at the time of supply of transfer carrier particles in the image forming apparatus in a fourteenth embodiment.
Figure 53B:
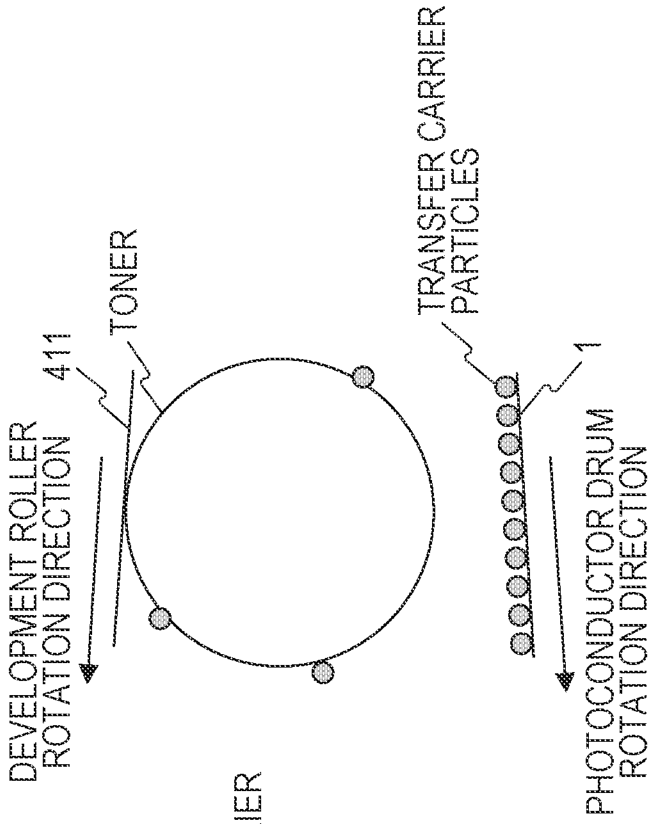

FIG. 53A is a schematic diagram showing the behavior of toner and transfer carrier particles in the developing nip portion when the development roller 411 and the photoconductor drum 1 are set in a non-image forming potential relation. As shown in FIG. 53A, because of a peripheral speed difference between the development roller 411 and the photoconductor drum 1, the following phenomenon occurs. A force f1 parallel to the rotation direction of the development roller 411, which the toner interposed between the development roller 411 and the photoconductor drum 1 receives from the development roller 411, and a force f2 parallel to the rotation direction of the photoconductor drum 1, which the toner interposed between the development roller 411 and the photoconductor drum 1 receives from the photoconductor drum 1, do not balance. As a result, toner rolls in the developing nip portion. When the toner rolls, transfer carrier particles on the toner, not in contact with the photoconductor drum 1, move with the rolling of the toner and are able to contact with the photoconductor drum 1. Therefore, the opportunity to supply transfer carrier particles to the photoconductor drum 1 increases. Thus, as shown in FIG. 53B, transfer carrier particles greater in number than that of the thirteenth embodiment can be supplied from the development roller 411 to the photoconductor drum 1 after passage of the developing nip.

Figure 54A:
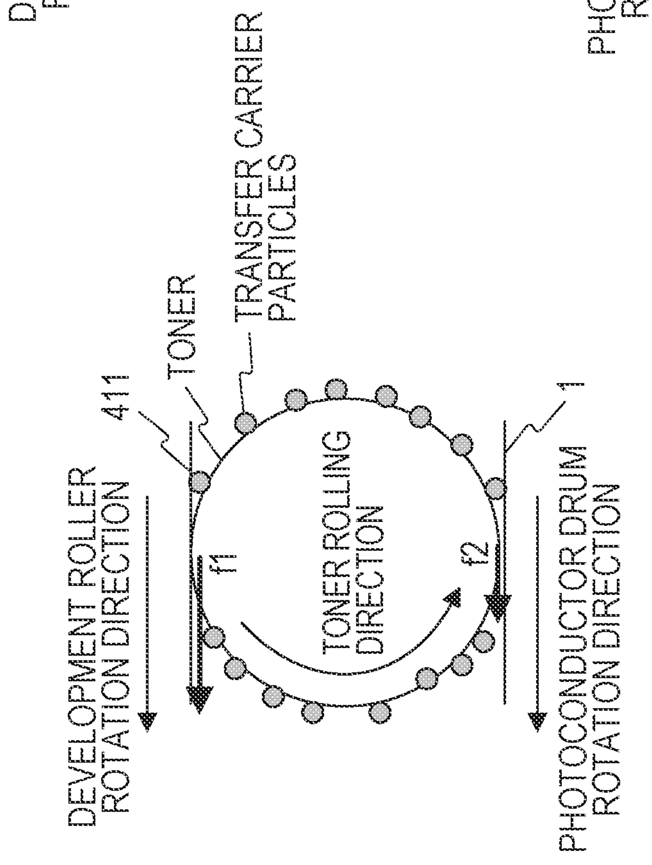
FIG. 54A and FIG. 54B are schematic diagrams at the time of supply of transfer carrier particles in the image forming apparatus in the fourteenth embodiment.
Figure 54B:
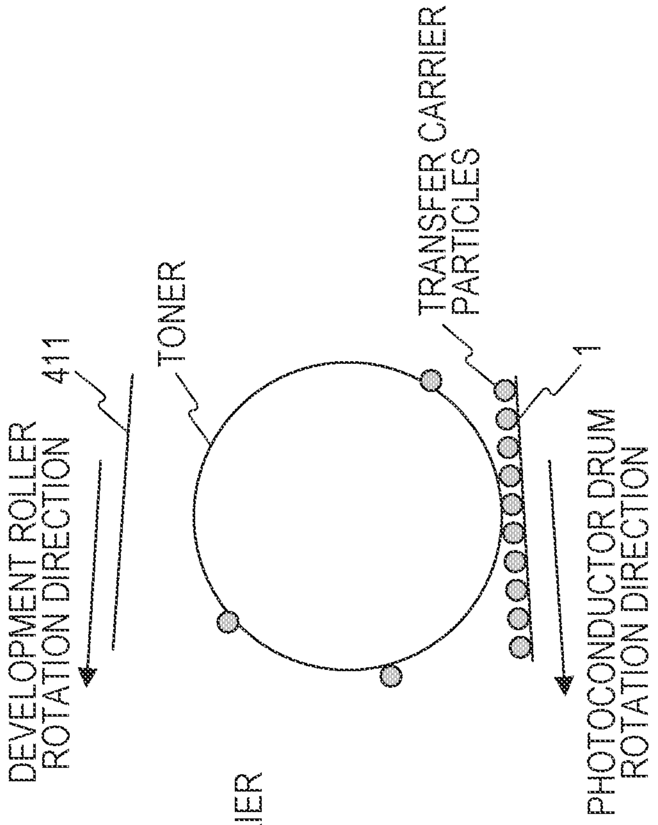

FIG. 54A is a schematic diagram showing the behavior of toner and transfer carrier particles in the developing nip portion when the development roller 411 and the photoconductor drum 1 are set in an image forming potential relation. As shown in FIG. 54A, even when the development roller 411 and the photoconductor drum 1 are set in an image forming potential relation as well, toner rolls in the developing nip because of the peripheral speed difference between the development roller 411 and the photoconductor drum 1. Thus, similar to the mechanism of FIG. 53A and FIG. 53B, the efficiency of supplying transfer carrier particles to the photoconductor drum 1 in the developing nip improves. As shown in FIG. 54B, the development roller 411 and the photoconductor drum 1 are set in an image forming potential relation, so, after passage of the developing nip, toner is developed from the development roller 411 to the photoconductor drum 1. Because the efficiency of supplying transfer carrier particles to the photoconductor drum 1 at the time of passage of the developing nip is improved, a large amount of transfer carrier particles can be interposed between the photoconductor drum 1 and toner developed on the photoconductor drum 1.

From above, in the fourteenth embodiment, even when the transfer carrier particle supply operation is not performed before development of a toner image unlike the thirteenth embodiment, transfer carrier particles can coat the photoconductor drum 1 simultaneously with development of a toner image and transfer carrier particles can be interposed between the toner image and the photoconductor drum 1.

In the eleventh to fourteenth embodiments, no cleaning member is provided on the photoconductor drum 1. However, in the configuration of the fourteenth embodiment, which is capable of supplying transfer carrier particles simultaneously with development, a cleaning member may be provided on the photoconductor drum 1. In other words, even with a configuration in which transfer carrier particles coating the photoconductor drum 1 are collected by a cleaning member every rotation of the photoconductor drum 1, the effect of improving primary transfer efficiency with transfer carrier particles is obtained.

Next, a manner of collecting transfer carrier particles in the fourteenth embodiment will be described. In the fourteenth embodiment, the peripheral speed ratio of the development roller 411 to the photoconductor drum 1 is increased, with the result that the development roller 411 is rotated faster than the photoconductor drum 1, and the area in which the transfer carrier particle collecting portions 70 on the surface of the development roller 411 contact with the photoconductor drum 1 at the time of passage of the developing nip increases. Therefore, the efficiency of collecting transfer carrier particles on the photoconductor drum 1 with the development roller 411 further improves as compared to the thirteenth embodiment. The efficiency of collecting transfer carrier particles from the photoconductor drum 1 with the development roller 411 is proportional to the area ratio of the surface of the photoconductor drum 1, which contacts with the transfer carrier particle collecting portions 70 on the surface of the development roller 411 at the time of passing through the developing nip portion. Therefore, the area ratio of the surface of the photoconductor drum 1, which contacts with the transfer carrier particle collecting portions 70 on the surface of the development roller 411 at the time of passing through the developing nip portion, can be calculated by the following expression. (Area ratio of the transfer carrier particle collecting portions on the surface of the development roller 411)×(Peripheral speed ratio of the development roller 411 to the photoconductor drum 1) In the fourteenth embodiment, the area ratio of the transfer carrier particle collecting portions 70 on the surface of the development roller 411 was set to 0.72%, and the peripheral speed ratio of the development roller 411 to the photoconductor drum 1 was set to 1.4. Therefore, the area ratio of the surface of the photoconductor drum 1, which contacts with the transfer carrier particle collecting portions 70 on the surface of the development roller 411 at the time of passing through the developing nip portion, was 1.01%.

For the thirteenth embodiment, Modification 6, and Comparative Example 12, similarly, the calculated results of the area ratio of the surface of the photoconductor drum 1, which contacts with the transfer carrier particle collecting portions 70 on the surface of the development roller 411 at the time of passing through the developing nip portion, is shown in FIG. 52.

Next, in the configuration of the fourteenth embodiment, effect confirmation test as in the case of the eleventh to thirteenth embodiments was conducted. As shown in FIG. 52, in the configuration of the fourteenth embodiment, the peripheral speed ratio of the development roller 411 to the photoconductor drum 1 was increased. With this configuration, although the development roller 411 of which the area ratio of the transfer carrier particle collecting portions was 0.72% that was the same as Comparative Example 12 was used, the residual toner density was lower than or equal to 1.0 in both a new state and a state after printing 1000 sheets, and primary transferability was good. In addition, melt-adhesion of transfer carrier particles was not observed on the photoconductor drum 1 after printing 1000 sheets.

As shown in FIG. 52, in the case where the peripheral speed ratio was taken into consideration, when the area ratio of the surface of the photoconductor drum 1, which contacted with the transfer carrier particle collecting portions 70 on the surface of the development roller 411 at the time of passing through the developing nip portion, was higher than or equal to 1%, the residual toner density was lower than or equal to 1.0.

As described above, by providing the transfer carrier particle collecting portions 70 on the surface of the development roller 411 and further increasing the peripheral speed ratio of the development roller 411 to the photoconductor drum 1, a primary transfer defect resulting from an insufficient amount of collection of transfer carrier particles from the photoconductor drum 1 can be suppressed.

From the above results, the fourteenth embodiment provides the image forming apparatus having the following configuration.

When the photoconductor drum drive 110 is a first drive, the development roller drive 130 that drives the development roller 411 is a second drive. The control section 200 controls the second drive such that, in the developing nip portion, the surface moving speed of the development roller 411 is different from the surface moving speed of the photoconductor drum 1.

In the configuration of the fourteenth embodiment, the intermediate transfer system that uses the intermediate transfer belt 10 is adopted; however, a direct transfer system that directly transfers a toner image to a recording medium P may be adopted. For example, a recording medium P may be placed on a transfer belt and a toner image may be directly transferred from the photoconductor drum 1 to the recording medium P, or the belt configuration does not need to be used.

(Longitudinal Configuration of Process Member)

Next, the relationship in the longitudinal width of a fifteenth embodiment will be described with reference to FIG. 55.

Figure 55:
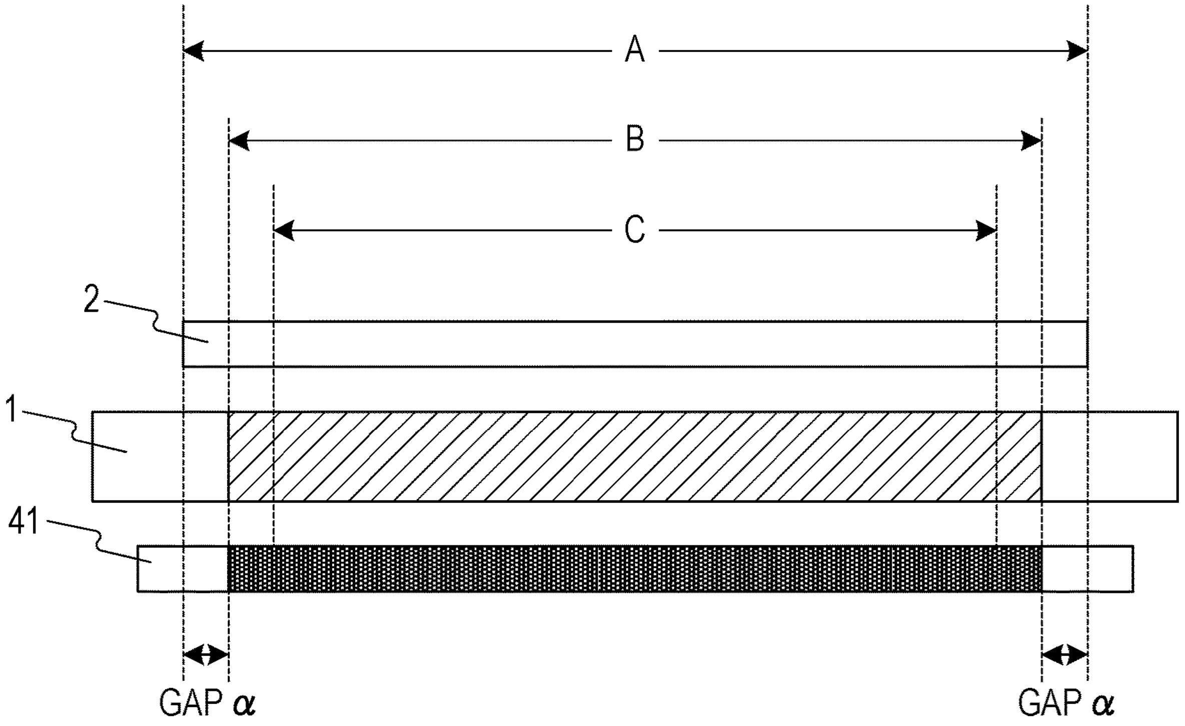
FIG. 55 is a diagram illustrating the longitudinal width of a process member in a fifteenth embodiment.

In the fifteenth embodiment, as shown in FIG. 55, the longitudinal width B of a development opening is longer than the longitudinal width C of an image region, so a sufficient amount of transfer carrier particles can be supplied from the development roller 411 to the photoconductor drum 1 over the entire image forming region. Here, since the charging roller 2 is rotated by friction with the photoconductor drum 1, when a large amount of transfer carrier particles is present on the photoconductor drum 1, friction reduces, and the rotation of the charging roller 2 can be instable. In other words, when the charging roller 2 is rotated in a state where transfer carrier particles are interposed in all the longitudinal region of the charging roller 2 on the surface of the photoconductor drum 1 in the charging portion, the rotation of the charging roller 2 can be higher than the rotation of the photoconductor drum 1. In the fifteenth embodiment, the longitudinal width B of the development opening is set so as to be shorter than the longitudinal width A of the charging roller 2. Thus, transfer carrier particles are not supplied to the photoconductor drum 1 in a gap α at each end portion between the longitudinal width B of the development opening and the longitudinal width A of the charging roller 2. As a result, the charging roller 2 is able to contact with the photoconductor drum 1 without intervening transfer carrier particles at the portions corresponding to the gaps α. Where a torque based on frictional force at the gaps α is T1 and a sliding torque of the charging roller 2 with bearings is T2, when T1>T2 is satisfied, the charging roller 2 is able to be rotated without slipping relative to the photoconductor drum 1.

The torque T1 based on the frictional force at the gaps α is expressed by the following expression 12. μ a static friction coefficient between the photoconductor drum 1 and the charging roller 2. S1 is a contact area in all the longitudinal region between the photoconductor drum 1 and the charging roller 2. S2 is a contact area between the photoconductor drum 1 and the charging roller 2 in the gaps α. Nt is a load on the charging roller 2. d is a distance from the rotating shaft of the charging roller 2 to the surface.

$$T1=\mu\times(Nt/S1)\times S2\times d \tag{12}$$

In the fifteenth embodiment, transfer carrier particles are constantly present on the photoconductor drum 1, so the frictional force between the charging roller 2 and the photoconductor drum 1 remarkably reduces. Thus, on the assumption that the frictional force in the region where transfer carrier particles are present is zero, only the frictional force in the gaps α where no transfer carrier particles are supplied is taken into consideration. Actually, there is a slight frictional force in a part where transfer carrier particles are present; however, a condition in which the charging roller 2 is reliably rotated even if there is no frictional force is obtained.

Hereinafter, a parameter of T1 and a method of measuring T2 will be described.

The static friction coefficient μ between the photoconductor drum 1 and the charging roller 2 can be obtained by applying the load Nt between the photoconductor drum 1 and the charging roller 2 and measuring a torque at the time when the photoconductor drum 1 begins to slip relative to the fixed charging roller 2. An area in which toner transferred to the charging roller 2 when the charging roller 2 is brought into contact under the load Nt with the photoconductor drum 1 on which toner is adhered on all the surface is measured as the contact area S1 between the photoconductor drum 1 and the charging roller 2.

The sliding torque T2 of the charging roller 2 with the bearings can be obtained by multiplying a value, obtained by subtracting a sole torque of the photoconductor drum 1 from the torque of the photoconductor drum 1 by which the charging roller 2 is rotated, by a value obtained by dividing the diameter of the charging roller 2 by the diameter of the photoconductor drum 1.

In the fifteenth embodiment, the charging roller 2 is made up of a metal core and an elastic layer. The elastic layer made up of a mixture of acrylonitrile-butadiene rubber (NBR) and styrene-butadiene rubber (SBR) is provided around the metal core and subjected to UV irradiation. A large number of protruded portions are provided on the surface layer. An average height of the protruded portions is about 10 μm. A nonconductive polyacetal resin (POM) is used for a drive-side bearing of the charging roller 2, a conductive POM is used for a nondrive-side bearing of the charging roller 2, and a conductive grease is applied to the drive-side bearing.

In the fifteenth embodiment, the distance d from the rotation axis of the charging roller 2 to the surface is 3.5 mm, and the load Nt on the charging roller 2 is 600 gf. Through measurement of the T1 parameter, the static friction coefficient μ between the photoconductor drum 1 and the charging roller 2 is 4.8, and the nip width that is the contact region between the photoconductor drum 1 and the charging roller 2 is 1 mm, so the contact area S1 between the photoconductor drum 1 and the charging roller 2 is calculated as 228 $mm^2$. In addition, T2 is 150 gf-mm (gram force millimeter).

It is found from the above values that, in the fifteenth embodiment, the sum of the longitudinal widths of the gaps α needs to be greater than or equal to 3.4 mm to satisfy the relationship T1>T2.

In the fifteenth embodiment, the longitudinal width A of the charging roller 2 is 228 mm, the longitudinal width B of the development opening is 224 mm, the drive-side gap α and the nondrive-side gap α each are set to 2 mm, and the sum of the gaps α is 4 mm.

Figure 56:
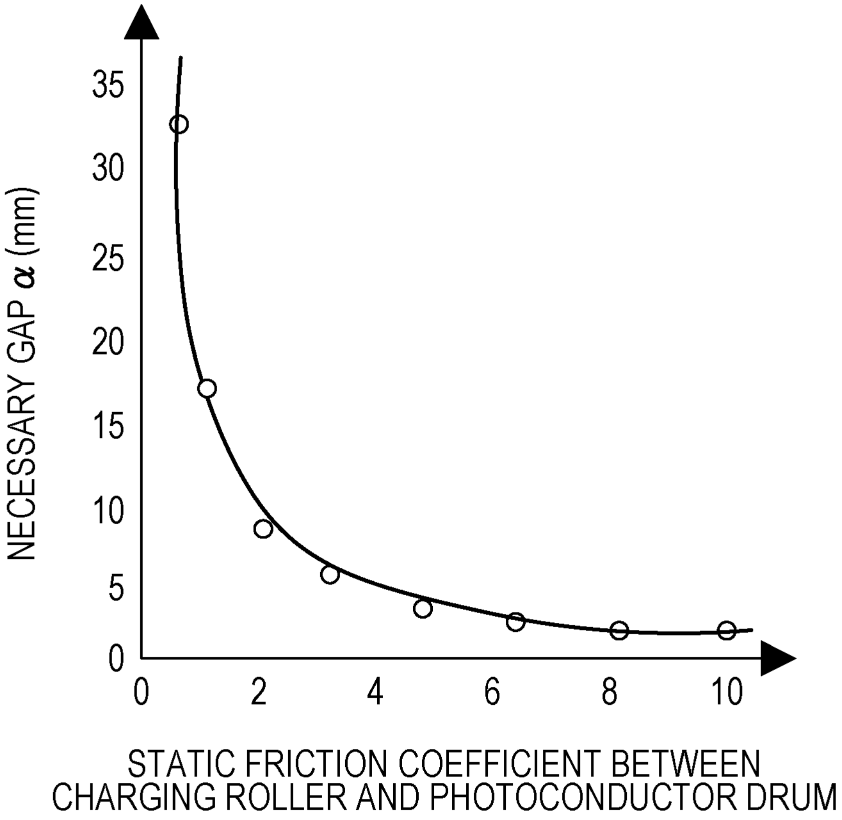
FIG. 56 shows measured results of adhesion in the fifteenth embodiment.

When the material of the charging roller 2, UV surface treatment time, the number of protruded portions on the surface layer, and the like are changed, the static friction coefficient μ between the photoconductor drum 1 and the charging roller 2 changes and can fall within the range of about 0.5 to about 10. FIG. 56 is a graph showing the relationship between the static friction coefficient μ between the photoconductor drum 1 and the charging roller 2, and the gap α needed for T1>T2. From FIG. 56, when the static friction coefficient μ between the photoconductor drum 1 and the charging roller 2 falls within the range of about 0.5 to about 10, the gap α can be set within the range of 2 mm to 35 mm.

(Effect of Adjusting Longitudinal Width for Transfer Carrier Particles)

Next, the effect of the fifteenth embodiment will be described.

In the fifteenth embodiment, when a sufficient amount of transfer carrier particles to improve transfer efficiency is supplied to the photoconductor drum 1, a region in which no transfer carrier particles are supplied (direct contact region) is provided at each end portion of the photoconductor drum 1. By providing the direct contact regions, the photoconductor drum 1 and the charging roller 2 directly contact with each other at the end portions to stabilize the driven rotation of the charging roller 2. For the purpose of confirming the effect of the fifteenth embodiment, the rotation stability of the charging roller 2 of each of the configuration of this embodiment and the configuration of Comparative Example was checked.

Checking was performed after printing 4000 sheets from a new state in accordance with whether there was a light and dark difference in a halftone image due to small rotational fluctuations of the charging roller 2. In the configuration of the fifteenth embodiment, the gaps α are 4 mm. In the configuration of Comparative Example 13, the gaps α are 0 mm.

In the fifteenth embodiment, no transfer carrier particles were supplied to the end portions of the photoconductor drum 1, so the rotation of the charging roller 2 was stable, and there was no image defect. On the other hand, in the configuration of Comparative Example 13, transfer carrier particles were present all the region where the photoconductor drum 1 contacts with the charging roller 2, so the rotation of the charging roller 2 became unstable, small rotational fluctuations occurred, and there was an image defect.

From the above results, the fifteenth embodiment has the following configuration.

The image forming apparatus includes the charging roller 2 that is a rotary member that contacts with the photoconductor drum 1 to form a charging portion and that is rotated by the rotation of the photoconductor drum 1. It is assumed that the pressing force pressing the development roller 41 against the photoconductor drum 1 is F1 and the total number of transfer carrier particles interposed between toner particles and the photoconductor drum 1 is N1. The adhesion between transfer carrier particles and toner particles, measured when the transfer carrier particles are pressed against the toner particles with F1/N1 that is a pressing force per unit transfer carrier particle, is defined as Ft. The adhesion between transfer carrier particles and the photoconductor drum 1, measured when the transfer carrier particles are pressed against the photoconductor drum 1 with F1/N1, is defined as Fdr1. Ft and Fdr1 satisfy Ft≤Fdr1. In addition, the region of the development roller 41 in which developer is carried in the rotation axis direction of the development roller 41 is set so as to be shorter than the charging portion in the rotation axis direction.

As described above, with the configuration of the fifteenth embodiment, while a sufficient amount of transfer carrier particles to improve transfer efficiency is supplied to the photoconductor drum 1, the rotation of the charging roller 2 that is rotated by the photoconductor drum 1 can be stabilized.

In the fifteenth embodiment, the state where the photoconductor drum 1 is coated with transfer carrier particles by supplying transfer carrier particles from toner carried on the development roller 41 to the photoconductor drum 1 was established. As a method of establishing a similar state, a supply roller that only supplies transfer carrier particles may be provided. In the fifteenth embodiment, the configuration to cause the charging roller 2 to be rotated is adopted. Alternatively, a peripheral speed difference may be provided by driving the charging roller 2 relative to the photoconductor drum 1.

In the configuration of an image forming apparatus to be applied in a sixteenth embodiment, like reference signs are assigned to the same members as those of the fifteenth embodiment, and the description is omitted.

The sixteenth embodiment will be described with reference to FIG. 57, FIG. 58, and FIG. 59.

In the sixteenth embodiment, different from the fifteenth embodiment, a collecting member to collect transfer carrier particles on the photoconductor drum 1 in a region outside the longitudinal width B of the development opening is provided. In the configuration of the sixteenth embodiment, even when transfer carrier particles adhere to longitudinally outside the longitudinal width B of the development opening, the transfer carrier particles can be collected, so the rotation of the charging roller 2 can be stabilized.

(Collecting Member for Transfer Carrier Particles)

Hereinafter, a manner of collecting transfer carrier particles will be described.

Figure 57:
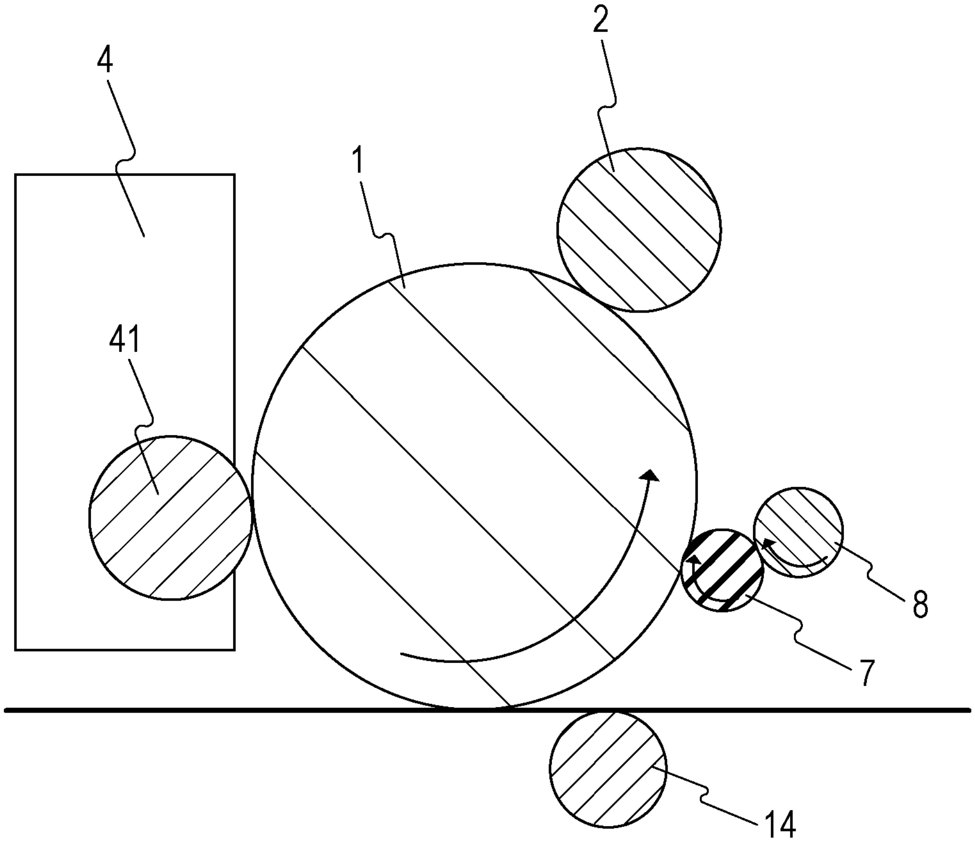
FIG. 57 is a cross-sectional view of an image forming unit in a sixteenth embodiment.

As shown in FIG. 57, in an image forming apparatus of the sixteenth embodiment, the collector roller 7 is provided upstream of the charging roller 2 in the rotation direction of the photoconductor drum 1 and downstream of the primary transfer portion. The collector roller 7 has a function to collect transfer carrier particles on the photoconductor drum 1. The scraper roller 8 that contacts with the collector roller 7 to form a contact portion is a sponge roller having a porous elastic layer. The scraper roller 8 is driven for rotation in a counter direction to the collector roller 7 in the contact portion. With this configuration, the scraper roller 8 plays a role in scraping transfer carrier particles collected onto the collector roller 7 while holding the transfer carrier particles in the porous elastic layer.

The collector roller 7 is an elastic roller made up of a metal core, a base layer made of silicone rubber at each end of the metal core, and a surface layer made of urethane resin, sequentially laminated. The collector roller 7 is pressed against the photoconductor drum 1 with 200 gf and is driven for rotation at a peripheral speed of 140% relative to the photoconductor drum 1 in the forward direction to the rotation direction of the photoconductor drum 1.

Figure 59:
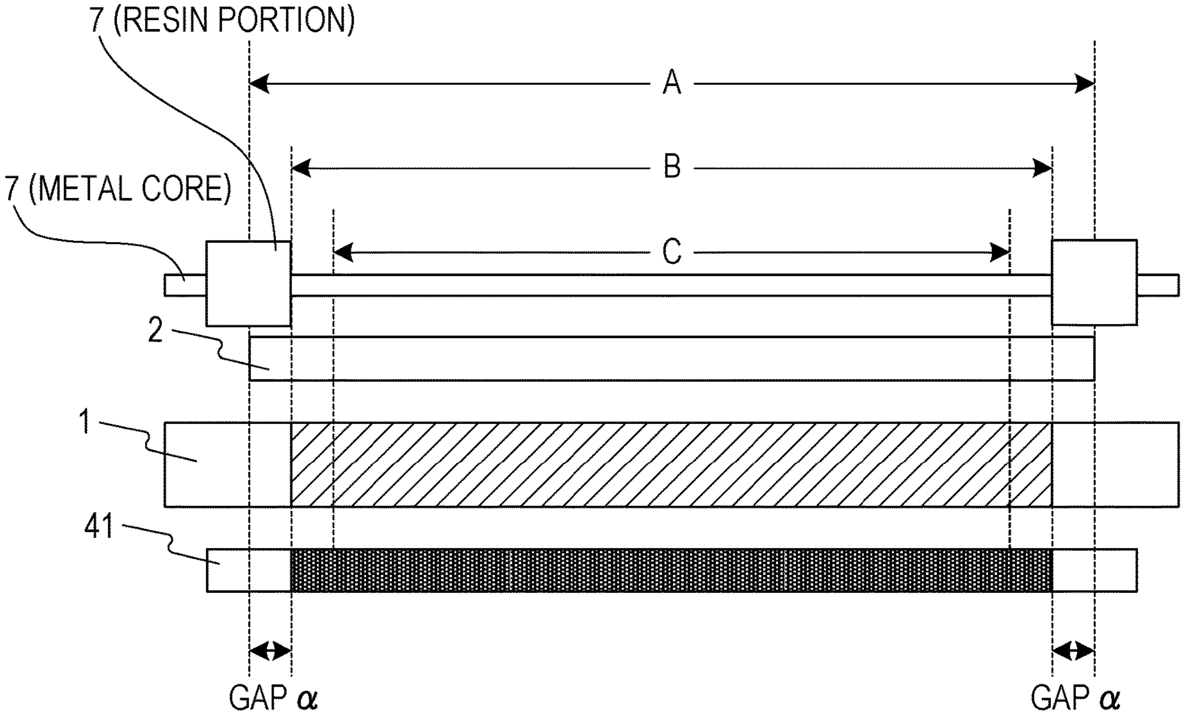
FIG. 59 is a diagram illustrating the longitudinal width of a process member in the sixteenth embodiment.

As shown in FIG. 59, each resin portion that is a collecting portion of the collector roller 7 collects transfer carrier particles outside the longitudinal width B of the development opening, so the resin portion is disposed so as to collect transfer carrier particles at each of the drive-side and non-drive-side end portions. In the sixteenth embodiment, the resin portion of the collector roller 7 is provided at each end portion; however, the resin portion may be provided at only one-side end portion.

As described above, the material of the surface layer of the collector roller 7 is urethane resin softer than polycarbonate used for the surface layer of the photoconductor drum 1. With this configuration, when the surface layer of the collector roller 7 is pressed by transfer carrier particles on the photoconductor drum 1, the surface layer of the collector roller 7 deforms more than the surface of the photoconductor drum 1, and the contact area between the surface layer of the collector roller 7 and transfer carrier particles increases. When the contact area between the surface layer of the collector roller 7 and transfer carrier particles increases, the adhesion between the surface layer of the collector roller 7 and transfer carrier particles increases, and transfer carrier particles easily transfer from the photoconductor drum 1 to the surface layer of the collector roller 7.

Next, measurement of the adhesion Fr between the surface of the collector roller 7 and transfer carrier particles in the collecting portion and the adhesion Fdr2 between the surface of the photoconductor drum 1 and transfer carrier particles will be described.

Measurement was performed with an SPM. After the cantilever was pressed against each of the surface of the collector roller 7 and the surface of the photoconductor drum 1 with a predetermined pressing force, a force needed to separate the cantilever from the surface of the collector roller 7 and a force needed to separate the cantilever from the surface of the photoconductor drum 1 were measured.

The cantilever was made of silicon of which the surface is coated with a silicon oxide film and was a round tip type with a tip diameter of 100 nm.

When the surface material of the cantilever is $SiO_2$ that is the same as transfer carrier particles and the tip diameter is set to 100 nm equal to the number average particle diameter of transfer carrier particles, transfer carrier particles and adhesions among the members can be accurately reproduced.

Figure 58:
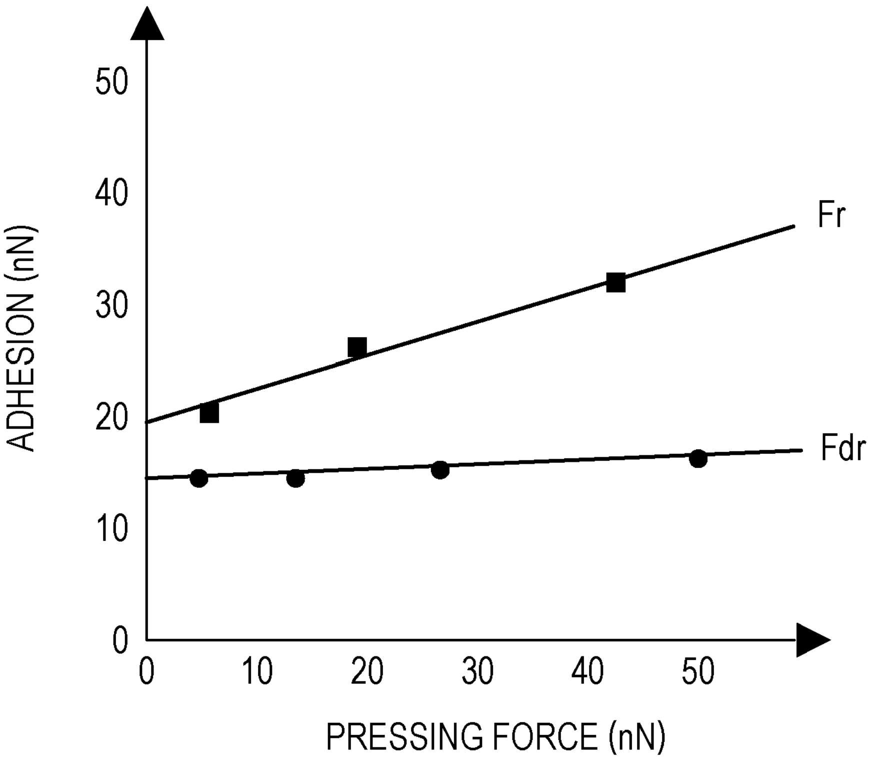
FIG. 58 is a graph showing the relationship between adhesion and pressing force in the sixteenth embodiment.

FIG. 58 shows the measured results of the adhesions. As shown in FIG. 58, the adhesions are in the relationship Fr>Fdr2 regardless of the pressing force of the cantilever on the horizontal axis, and this indicates that (Adhesion between the surface of the collector roller 7 and transfer carrier particles)>(Adhesion between the surface of the photoconductor drum 1 and transfer carrier particles) in the collecting portion. With this relationship, the collector roller 7 can be caused to collect transfer carrier particles on the photoconductor drum 1.

In measurement of the sixteenth embodiment, the adhesions are in the relationship Fr>Fdr2 regardless of the pressing force of the cantilever on the horizontal axis; however, the magnitude relationship in adhesion can change according to the pressing force of the cantilever on the horizontal axis depending on the materials and the like used for the collector roller 7, transfer carrier particles, and the photoconductor drum 1. For this reason, when the magnitude relationship in adhesion is compared, the adhesions can be compared in the case where the horizontal axis represents a pressing force received by a transfer carrier particle held between the collector roller 7 and the photoconductor drum 1 in an actual contact portion between the collector roller 7 and the photoconductor drum 1.

Actually, on the assumption that the collector roller 7 and the photoconductor drum 1 are in contact with each other via transfer carrier particles, the pressing force Fr1 received by a transfer carrier particle held between the collector roller 7 and the photoconductor drum 1 can be calculated by the following expression 13.

Fr1=(Pressing force of the collector roller 7 against the photoconductor drum 1)/(Number of transfer carrier particles present in the contact portion between the collector roller 7 and the photoconductor drum 1) (13)

The "Number of transfer carrier particles present in the contact portion between the collector roller 7 and the photoconductor drum 1" in the expression 13 is calculated by the following expression 14.

(Area of the contact portion between the collector roller 7 and the photoconductor drum 1)×(Coverage of transfer carrier particles on the surface of the photoconductor drum 1)/(Cross-section area of a transfer carrier particle) (14)

The pressing force of the collector roller 7 against the photoconductor drum 1 is 200 gf. The contact portion has a nip width of 2 mm, a longitudinal width of 20 mm on each of the drive side and the nondrive side, and the sum of the drive-side and nondrive-side contact areas is 80 $mm^2$. The coverage of transfer carrier particles on the surface of the photoconductor drum 1 outside the longitudinal width B of the development opening is calculated as follows. The surface of the photoconductor drum 1 was observed at a magnification of 3000 times with a laser microscope (VK-X200 Keyence Corporation), and the observed image was acquired. After that, when the surface of the photoconductor drum 1 in the observed image was binarized into a part where transfer carrier particles were coating and a part where transfer carrier particles were not coating and the coverage was calculated, transfer carrier particles of about 1% in area coverage were present. In addition, the cross-section area of a transfer carrier particle can be calculated from the average particle diameter of transfer carrier particles.

By substituting the above values into the expression 13 and the expression 14, the pressing force received by a transfer carrier particle held between the collector roller 7 and the photoconductor drum 1 in the contact portion between the collector roller 7 and the photoconductor drum 1 was 19.2 (nN).

From FIG. 58, the adhesions are in the relationship Fr>Fdr2 even around 19.2 (nN) on the horizontal axis, and this indicates that (Adhesion between the collector roller 7 and transfer carrier particles)>(Adhesion between the photoconductor drum 1 and transfer carrier particles).

Therefore, with the materials described in the sixteenth embodiment, transfer carrier particles can be collected from the photoconductor drum 1 to the surface of the collector roller 7 in the contact portion between the collector roller 7 and the photoconductor drum 1.

As described above, with the configuration of the sixteenth embodiment, while a sufficient amount of transfer carrier particles to improve transfer efficiency is supplied to the photoconductor drum 1, transfer carrier particles in the region outside the longitudinal width B of the development opening are collected by the collector roller 7. Therefore, as compared to the fifteenth embodiment, the rotation of the charging roller 2 that is rotated by the photoconductor drum 1 can be further stabilized. Thus, it is advantageous in the long lifetime of cartridges, a wide range of selection of the material of the charging roller 2 and the sliding member of the charging roller 2, and the like.

In the configuration of an image forming apparatus to be applied in a seventeenth embodiment, like reference signs are assigned to the same members as those of the fifteenth and sixteenth embodiments, and the description is omitted.

In the seventeenth embodiment, different from the fifteenth or sixteenth embodiment, primary collection is performed to collect transfer carrier particles outside the longitudinal width B of the development opening on the photoconductor drum 1 with the development roller 42. Then, secondary collection is performed to collect transfer carrier particles collected by the development roller 42 with a member attached to a developer container so as to be in contact with both ends of the development opening portion of the development roller 42.

In the seventeenth embodiment, the development roller 42 has both functions to supply and collect transfer carrier particles in regions different in the longitudinal position, so an independent member to collect transfer carrier particles on the photoconductor drum 1 is not needed, and the size of cartridges can be reduced.

FIG. 60 shows the relationship in the longitudinal width of the seventeenth embodiment. A region inside the longitudinal width B of the development opening of the development roller 42 is coated with toner. Therefore, from the relationship (Adhesion between transfer carrier particles and toner)<(Adhesion between transfer carrier particles and the photoconductor drum 1) described in the fifteenth embodiment, the development roller 42 supplies transfer carrier particles to the photoconductor drum 1. On the other hand, the function to collect transfer carrier particles on the photoconductor drum 1 is provided in a region outside the longitudinal width B of the development opening of the development roller 42, not coated with toner.

Hereinafter, a manner of primarily collecting transfer carrier particles will be described.

The surface layer of the development roller 42, as well as the surface layer of the collector roller 7 of the sixteenth embodiment, was made of urethane resin softer than polycarbonate used for the surface layer of the photoconductor drum 1. Thus, from FIG. 58, Fr>Fdr2, so the relationship (Adhesion between the development roller 42 and transfer carrier particles)>(Adhesion between the photoconductor drum 1 and transfer carrier particles) was set.

The pressing force received by a transfer carrier particle held between the photoconductor drum 1 and the region outside the longitudinal width B of the development opening of the development roller 42 is calculated on the assumption that the photoconductor drum 1 and the region outside the longitudinal width B of the development opening are in contact with each other via transfer carrier particles. Then, the pressing force can be calculated from expressions obtained by replacing "collector roller 7" in the expression 13 and the expression 14 with "region outside the longitudinal width B of the development opening of the development roller 42".

The pressing force between the photoconductor drum 1 and the region outside the longitudinal width B of the development opening of the development roller 42 was 8.5 gf. The contact portion had a nip width of 2 mm, a longitudinal width of 5 mm on each side of the drive side and the nondrive side, and the sum of the drive-side and non-drive-side contact areas was 20 $mm^2$. The coverage of transfer carrier particles on the surface of the photoconductor drum 1 in the region outside the longitudinal width B of the development opening was 1% when calculated as in the case of the sixteenth embodiment. In addition, the cross-section area of a transfer carrier particle can be calculated from the average particle diameter of transfer carrier particles.

By substituting the above values into the expression 13 and the expression 14 of the sixteenth embodiment, the calculated pressing force received by a transfer carrier particle held between the photoconductor drum 1 and the region outside the longitudinal width B of the development opening of the development roller 42 was 3.3 (nN).

From FIG. 58, the adhesions are in the relationship Fr>Fdr2 even around 3.3 (nN) on the horizontal axis, and this indicates that (Adhesion between transfer carrier particles and the region outside the longitudinal width B of the development opening)>(Adhesion between the photoconductor drum 1 and transfer carrier particles).

Therefore, with the configuration of the present disclosure, transfer carrier particles are collected from the photoconductor drum 1 to the surface of the development roller 42 in the contact portion between the photoconductor drum 1 and the region outside the longitudinal width B of the development opening.

Hereinafter, a manner of secondarily collecting transfer carrier particles will be described.

Figure 60A:
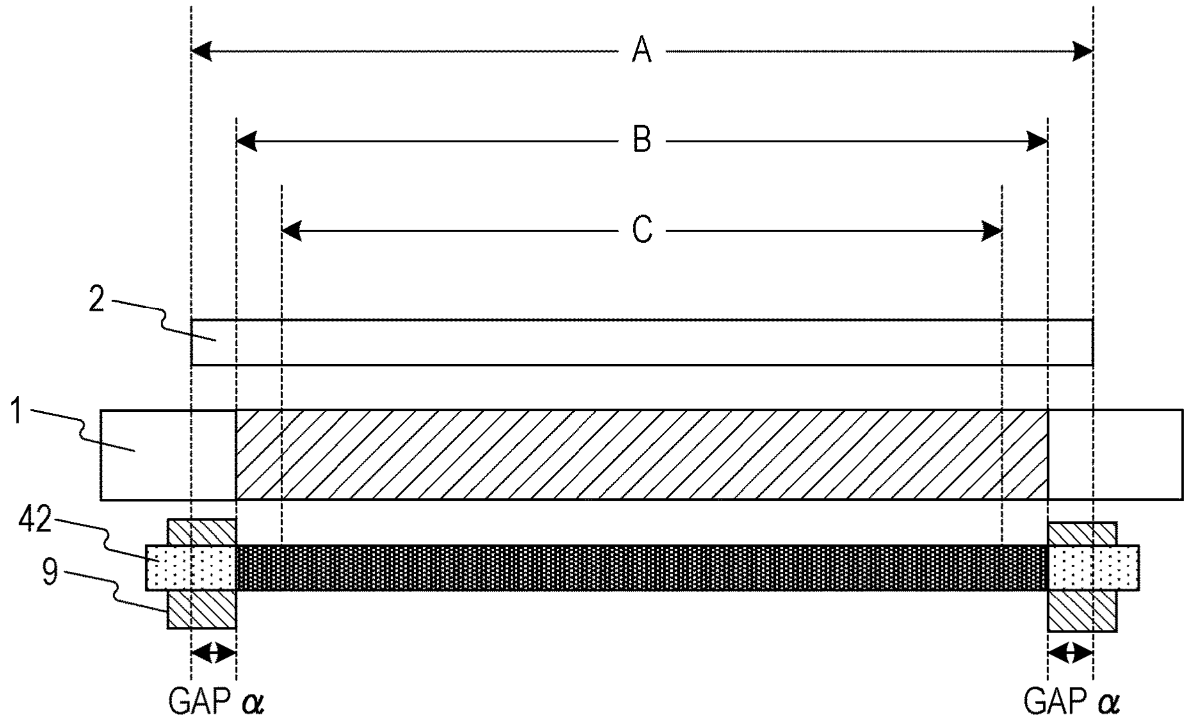
FIG. 60A is a diagram illustrating the longitudinal width of a process member in a seventeenth embodiment.
Figure 60B:
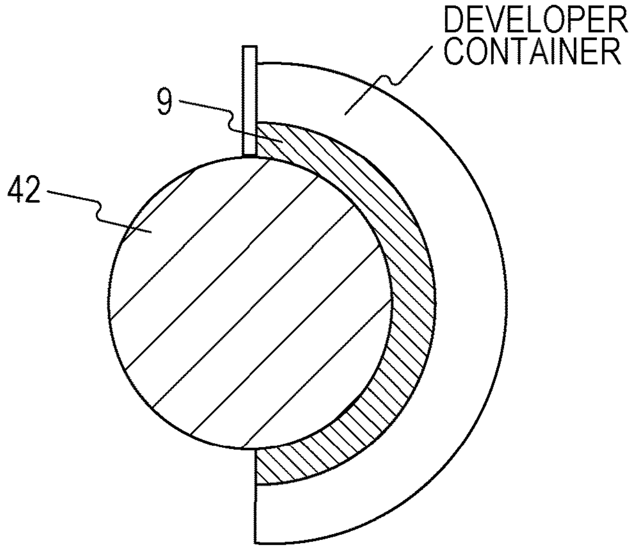
FIG. 60B is a cross-sectional view of a configuration at each end of a development opening of a development roller in the seventeenth embodiment.

As shown in FIG. 60A, a secondary collecting member 9 is provided at each end of the longitudinal width B of the development opening of the development roller 42. FIG. 60B is a cross-sectional view of the development roller 42 at one of the end portions in the longitudinal direction. As shown in FIG. 60B, the secondary collecting member 9 is in contact along the surface of each end of the development opening of the development roller 42. Each secondary collecting member 9 has a function to collect transfer carrier particles collected outside the longitudinal width B of the development opening of the development roller 42 and a function to restrict toner leakage from the developer container.

The secondary collecting members 9 each are made up of a base layer and a surface layer. A foam layer made from urethane foam is used as the base layer. A pile made by weaving felt or fiber is used as the surface layer. When the secondary collecting member 9 contacts with the development roller 42 and the development roller 42 is driven to rotate, transfer carrier particles are mechanically collected from the development roller 42 and are held in the foam layer.

As described above, with the configuration of the seventeenth embodiment, while a sufficient amount of transfer carrier particles to improve transfer efficiency is supplied to the photoconductor drum 1, transfer carrier particles in the region outside the longitudinal width B of the development opening are primarily collected by the development roller 42 and secondarily collected by the secondary collecting members 9. Therefore, the rotation of the charging roller 2 that is rerated by the photoconductor drum 1 can be further stabilized. Furthermore, the development roller 42 also has a function to collect transfer carrier particles, so the size of cartridges can be reduced, and a cost reduction is possible.

In the seventeenth embodiment, the case where the surface of the photoconductor drum 1 is polycarbonate and the surface of the development roller 42 is urethane is illustrated. However, as long as the above-described relationship in adhesion is satisfied, a combination of the same materials having different hardnesses or properties and a combination of different raw materials are applicable.

From the above results, the sixteenth embodiment and the seventeenth embodiment have the following configurations.

It is assumed that the pressing force pressing the collector roller 7 against the photoconductor drum 1 is F2 and the total number of transfer carrier particles interposed between the photoconductor drum 1 or the development roller 41 and the collector roller 7 in the collecting portion where the collector roller 7 and the photoconductor drum 1 contact with each other is N2. The adhesion between transfer carrier particles and the collector roller 7, measured when the transfer carrier particles are pressed against toner particles with F2/N2 that is a pressing force per unit transfer carrier particle, is defined as Fr. The adhesion between transfer carrier particles and the collector roller 7, measured when the transfer carrier particles are pressed against the collector roller 7 with F2/N2, is defined as Fdr2. Fr and Fdr2 satisfy Fr≥Fdr2.

As described above, in the configuration of the seventeenth embodiment, by effectively supplying transfer carrier particles to the surface of the photoconductor drum 1, transfer efficiency is improved.

In the configuration of the seventeenth embodiment, the intermediate transfer system that uses the intermediate transfer belt 10 is adopted; however, a direct transfer system that directly transfers a toner image to a recording medium P may be adopted. For example, a recording medium P may be placed on a transfer belt and a toner image may be directly transferred from the photoconductor drum 1 to the recording medium P, or the belt configuration does not need to be used.

Figure 61:
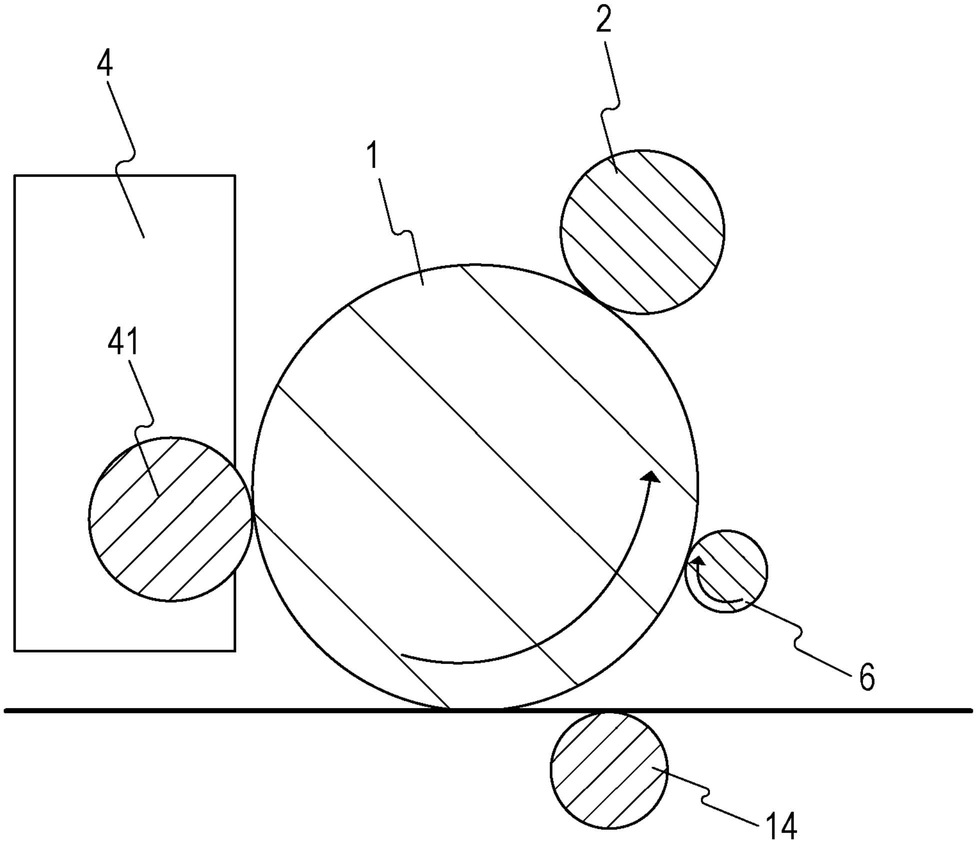
FIG. 61 is a cross-sectional view of an image forming unit in another embodiment.

The charging roller 2 is used as a member that is rotated by the photoconductor drum 1; however, the member to be rotated by the photoconductor drum 1 may be another roller to be rotated. For example, as shown in FIG. 61, the roller to be rotated may be a foreign matter collector roller 61 to collect foreign matter, such as residual toner and paper dust, from the surface of the photoconductor drum 1.

As described above, according to the present disclosure, in the configuration to supply a sufficient amount of fine particles to the surface of the photoconductor drum to improve transfer efficiency, occurrence of an adverse effect in an image is reduced by stabilizing the rotation of a process member that rotates in contact with the photoconductor drum.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus comprising:
- an image bearing member configured to be rotatable;
- a developing member configured to be rotatable and to carry developer, which is a single-component developer, made up of toner particles and external additive particles that are externally added to surfaces of the toner particles, wherein the developing member further is configured to contact with the image bearing member to form a developing portion and to supply the developer to a surface of the image bearing member in the developing portion; and
- a developer container configured to contain the developer,
- wherein, in a state where the image bearing member is rotating, the external additive particles that have been contained in the developer container and carried on a surface of the developing member are supplied to the surface of the image bearing member in the developing portion, and
- wherein, where a pressing force pressing the developing member against the image bearing member is F1 and a total number of the external additive particles interposed between the toner particles and the image bearing member is N1,
- an adhesion Ft between an external additive particle and a toner particle, measured when the external additive particle is pressed against the toner particle with F1/N1 that is a pressing force per unit external additive particle, and an adhesion Fdr1 between the external additive particle and the image bearing member, measured when the external additive particle is pressed against the image bearing member with F1/N1, satisfy Ft≤Fdr1.

2. The image forming apparatus according to claim 1, wherein the developer has protruded portions made from fine particles containing an organic silicon polymer, the protruded portions are present on a surface of each of the toner particles, the external additive particles are disposed on the protruded portions, and the organic silicon polymer has a composition expressed by the following formula (1), $$R\text{—}Si(O_{1/2})_3 \quad (1)$$

- where R denotes a hydrocarbon group having a carbon number greater than or equal to one and less than or equal to six.

3. The image forming apparatus according to claim 2, wherein, where a closest distance between adjacent two of the protruded portions is a protrusion gap G, an average protrusion gap of the protrusion gaps G is less than or equal to an average particle diameter of the external additive particles.

4. The image forming apparatus according to claim 2, wherein, where a height of each of the protruded portions from the surface of each of the toner particles is a protrusion height H, an average protrusion height of the protrusion height H is less than or equal to an average particle diameter of the external additive particles.

5. The image forming apparatus according to claim 1, further comprising:
- a charging member configured to be in contact with the image bearing member and to charge the surface of the image bearing member;
- a charging voltage source configured to apply a charging voltage to the charging member; and
- an exposure unit configured to form an electrostatic latent image by exposing the surface of the image bearing member,
- wherein the image forming apparatus is capable of performing an image forming mode in which the developer is developed on the electrostatic latent image, and performing a supply mode in which the external additive particles are supplied from the developing member to the image bearing member.

6. The image forming apparatus according to claim 5, wherein a control section is configured to control a first drive such that the image bearing member is rotated one or more times in the supply mode.

7. The image forming apparatus according to claim 5, further comprising a development voltage source configured to apply a development voltage to the developing member,
- wherein, in the supply mode and in order for developer charged with a normal polarity not to be developed from the developing member to the image bearing member, a control section is configured to control a surface potential formed on the surface of the image bearing member in the developing portion such that the surface potential is higher toward the normal polarity than the development voltage to be applied to the developing member in the developing portion.

8. The image forming apparatus according to claim 1, wherein the external additive particles are silica.

9. The image forming apparatus according to claim 1, wherein the external additive particles are organic silica polymer.

10. The image forming apparatus according to claim 1, wherein an average particle diameter of the external additive particles is greater than or equal to 30 nanometers (nm) and less than or equal to 1000 nm.

11. The image forming apparatus according to claim 1, further comprising:

a collecting member configured to contact with the image bearing member to form a contact portion and collect the external additive particles from the surface of the image bearing member in the contact portion, wherein the collecting member includes an external additive particle collecting portion at a surface of the collecting member, where the external additive particle collecting portion is configured to collect the external additive particles, wherein, in the state where the image bearing member is rotating, the external additive particles carried on the surface of the developing member and contained in the developer container are supplied to the surface of the image bearing member in the developing portion, and wherein, where a pressing force pressing the collecting member against the image bearing member is F2 and a second total number of the external additive particles interposed between the toner particles and the image bearing member in the contact portion is N2, an adhesion Fr between the external additive particle and the external additive particle collecting portion, measured when the external additive particle is pressed against the external additive particle collecting portion with F2/N2 that is a pressing force per unit external additive particle, and an adhesion Fdr2 between the external additive particle and the image bearing member, measured when the external additive particle is pressed against the image bearing member with F2/N2, satisfy $Fr \geq Fdr2$.

12. The image forming apparatus according to claim 11, wherein the external additive particle collecting portion has a size such that the external additive particle collecting portion falls within a circumference having a diameter of less than or equal to 200 um.

13. The image forming apparatus according to claim 11, wherein $F1=F2$, and $N1=N2$, and wherein the developing member also serves as the collecting member.

14. The image forming apparatus according to claim 13, wherein a value obtained by multiplying an area ratio of an area of the external additive particle collecting portion to an area of the surface of the collecting member by a peripheral speed ratio expressed by a ratio between a surface moving speed of the collecting member and a surface moving speed of the image bearing member is higher than or equal to 1.0%.

15. The image forming apparatus according to claim 1, further comprising:

a rotary member configured to contact with the image bearing member to form a contact portion and be rotated by rotation of the image bearing member, wherein an external additive region of the developing member, in which the developer is carried, in a rotation axis direction of the developing member is shorter than the contact portion in the rotation axis direction.

16. The image forming apparatus according to claim 15, wherein an end amount of the external additive particles that are externally added to the surface of the image bearing member in the rotation axis direction at an end portion of the image bearing member in the rotation axis direction is smaller than a center amount of the external additive particles that are externally added to the surface of the image bearing member in a center region at a center portion of the image bearing member in the rotation axis direction.

17. The image forming apparatus according to claim 16, wherein an end region at the end portion of the image bearing member is a non-image forming region not used for image formation.

18. The image forming apparatus according to claim 16, further comprising a collecting member configured to collect external additive particles that are externally added to an end region at the end portion of the image bearing member in a collecting portion.

19. The image forming apparatus according to claim 18, wherein the collecting member is configured to contact with the developing member to form the collecting portion.

20. The image forming apparatus according to claim 18, wherein the collecting member is configured to contact with the image bearing member to form the collecting portion.

21. The image forming apparatus according to claim 20, wherein, where a pressing force pressing the collecting member against the image bearing member is F2 and the total number of the external additive particles interposed between the image bearing member or the developing member and the collecting member in the collecting portion is N2, an adhesion Fr between the external additive particle and the collecting member, measured when the external additive particle is pressed against the toner particle with F2/N2 that is a pressing force per unit external additive particle, and an adhesion Fdr2 between the external additive particle and the collecting member, measured when the external additive particle is pressed against the collecting member with F2/N2, satisfy $Fr \geq Fdr2$.

22. The image forming apparatus according to claim 15, further comprising a supporting bearing member supporting the rotary member such that the rotary member is rotatable and disposed at an end portion of the image bearing member in the rotation axis direction, wherein, in a state where the image bearing member and the rotary member are rotating and where (i) a torque generated by friction between the image bearing member and the rotary member is T1, and (ii) a torque generated by sliding between the rotary member and the supporting bearing member is T2, $T1>T2$ is satisfied.

23. The image forming apparatus according to claim 15, wherein the rotary member is a charging member configured to charge the surface of the image bearing member.

24. The image forming apparatus according to claim 15, wherein the rotary member is a foreign substance collecting member configured to collect a foreign substance from the surface of the image bearing member, where the foreign substance includes at least one of the developer and paper dust.

25. The image forming apparatus according to claim 1, wherein an average particle diameter of the toner particles is greater than an average particle diameter of the external additive particles.

* * * * *